(12) United States Patent
Gauttier et al.

(10) Patent No.: US 12,534,533 B2
(45) Date of Patent: Jan. 27, 2026

(54) ANTI-CHEMOKINE LIKE RECEPTOR 1 HUMANIZED ANTIBODIES AND THEIR THERAPEUTIC APPLICATIONS

(71) Applicant: OSE IMMUNOTHERAPEUTICS, Nantes (FR)

(72) Inventors: Vanessa Gauttier, Reze (FR); Nicolas Poirier, Grandchamps des Fontaines (FR); Caroline Mary, Sainte-Pazanne (FR); Charlene Trilleaud, Reze (FR)

(73) Assignee: OSE IMMUNOTHERAPEUTICS, Nantes (FR)

( * ) Notice: Subject to any disclaimer, the term of this patent is extended or adjusted under 35 U.S.C. 154(b) by 962 days.

(21) Appl. No.: 17/767,606

(22) PCT Filed: Oct. 9, 2020

(86) PCT No.: PCT/EP2020/078488
§ 371 (c)(1),
(2) Date: Apr. 8, 2022

(87) PCT Pub. No.: WO2021/069709
PCT Pub. Date: Apr. 15, 2021

(65) Prior Publication Data
US 2024/0084019 A1  Mar. 14, 2024

(30) Foreign Application Priority Data

Oct. 9, 2019  (EP) .................................. 19306322
Oct. 9, 2019  (EP) .................................. 19306323

(51) Int. Cl.
*C07K 16/28* (2006.01)
*A61K 39/395* (2006.01)
*A61P 35/00* (2006.01)
*A61P 37/06* (2006.01)
*A61K 39/00* (2006.01)

(52) U.S. Cl.
CPC ...... *C07K 16/2866* (2013.01); *A61K 39/3955* (2013.01); *A61K 39/39558* (2013.01); *A61P 35/00* (2018.01); *A61P 37/06* (2018.01); *A61K 2039/505* (2013.01); *C07K 2317/34* (2013.01); *C07K 2317/56* (2013.01); *C07K 2317/565* (2013.01); *C07K 2317/73* (2013.01)

(58) Field of Classification Search
CPC .......... A61K 39/3955; A61K 39/39558; A61K 2039/505; C07K 16/28; C07K 16/2863; C07K 16/2866; C07K 2317/56; C07K 2317/565; C07K 2317/34; C07K 2317/73
See application file for complete search history.

(56) References Cited

U.S. PATENT DOCUMENTS

| | | |
|---|---|---|
| 4,816,567 A | 3/1989 | Cabilly et al. |
| 5,225,539 A | 7/1993 | Winter |
| 5,229,275 A | 7/1993 | Goroff |
| 5,545,806 A | 8/1996 | Lonberg et al. |
| 5,545,807 A | 8/1996 | Surani et al. |
| 5,565,332 A | 10/1996 | Hoogenboom et al. |
| 5,567,610 A | 10/1996 | Borrebaeck et al. |
| 5,573,905 A | 11/1996 | Lerner et al. |
| 5,585,089 A | 12/1996 | Queen et al. |
| 5,591,669 A | 1/1997 | Krimpenfort et al. |
| 5,598,369 A | 1/1997 | Chen et al. |
| 5,693,761 A | 12/1997 | Queen et al. |
| 5,693,762 A | 12/1997 | Queen et al. |
| 5,859,205 A | 1/1999 | Adair et al. |
| 6,150,584 A | 11/2000 | Kucherlapati et al. |
| 8,536,307 B2 | 9/2013 | Skerra et al. |
| 2004/0086966 A1 | 5/2004 | Wittamer et al. |
| 2005/0202029 A1 | 9/2005 | Zabel et al. |
| 2007/0286863 A1 | 12/2007 | Sinal et al. |
| 2009/0280113 A1 | 11/2009 | Graham et al. |
| 2012/0244596 A1 | 9/2012 | Skerra et al. |
| 2014/0175018 A1 | 6/2014 | Winqvist et al. |
| 2015/0025153 A1 | 1/2015 | Graham et al. |

FOREIGN PATENT DOCUMENTS

| | | |
|---|---|---|
| CN | 109942676 A | 6/2019 |
| EP | 3804754 A1 | 4/2021 |
| JP | 2010229093 A | 10/2010 |
| WO | 03/006996 A2 | 1/2003 |
| WO | 03/006996 A3 | 1/2003 |
| WO | 2005/000875 A2 | 1/2005 |
| WO | 2005/000875 A3 | 1/2005 |
| WO | 2008068637 A2 | 6/2008 |
| WO | 2012/172336 A2 | 12/2012 |
| WO | 2012/172336 A3 | 12/2012 |
| WO | 2013117518 A2 | 8/2013 |
| WO | 2018213592 A1 | 11/2018 |
| WO | 2019/193029 A1 | 10/2019 |

OTHER PUBLICATIONS

Aghasafari et al. A review of inflammatory mechanism in airway diseases. Inflamm Res 68: 59-74, 2019.*
An et al. Chemerin/CMKLR1 ameliorates nonalcoholic steatohepatitis by promoting autophagy and alleviating oxidative stress through the JAK2-STAT3 pathway. Peptides 135: 170422, 2021 (10 total pages).*
Antar et al. Examining the contribution of Notch signaling to lung disease development. Naunyn-Schmiedeberg's Archives Pharmacol, doi.org/10.1007/s00210-024-03105-8, 2024.*
Bondue et al. ChemR23 Dampens Lung Inflammation and Enhances Anti-viral Immunity in a Mouse Model of Acute Viral Pneumonia. PLoS Pathog 7(11): e1002358, 2011 (17 total pages).*
Brorson et al. Mutational analysis of avidity and fine specificity of anti-levan antibodies. J Immunol 163: 6694-6701, 1999.*

(Continued)

*Primary Examiner* — Bridget E Bunner
(74) *Attorney, Agent, or Firm* — McNeill PLLC

(57) ABSTRACT

The present invention provides humanized anti-CMKLR1 compounds having an agonist capability on the interaction between Resolvin E1 and CMKLR1, and their uses for treating or preventing a disease, in particular wherein the resolution of inflammation is delayed or disrupted.

20 Claims, 35 Drawing Sheets

Figure 1A:
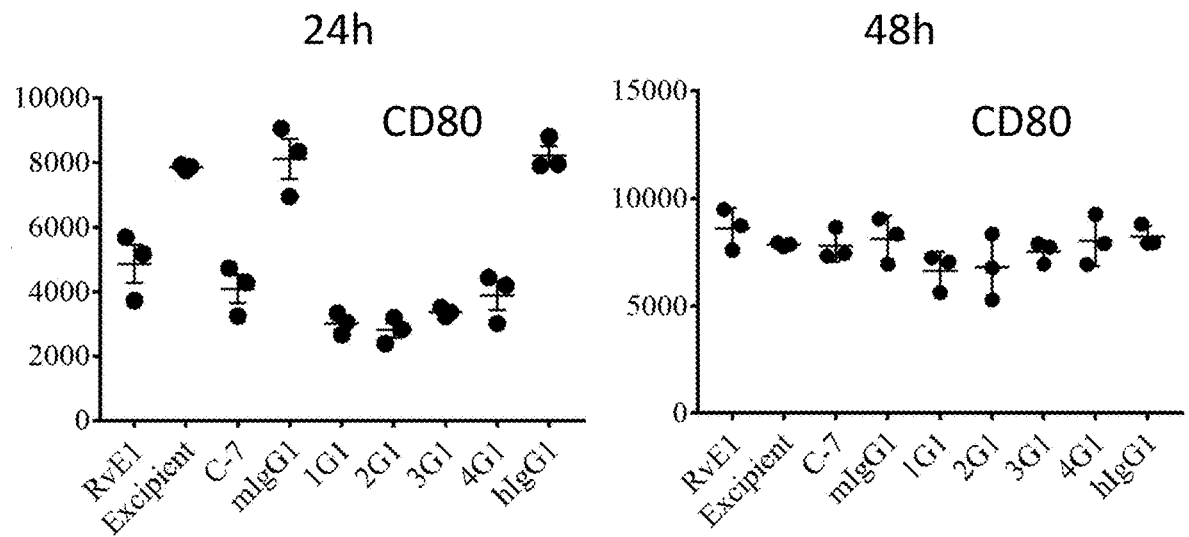

Specification includes a Sequence Listing.

(56) References Cited

OTHER PUBLICATIONS

Brummell et al. Probing the combing site of an anti-carbohydrate antibody by saturation-mutagenesis: role of the heavy-chain CDR3 residues. Blochem 32:1180-1187, 1993.*

Burks et al. In vitro scanning saturation mutagenesis of an antibody binding pocket. Proc Natl Acad Sci USA 94: 412-417, 1997.*

Campbell et al. Resolvin E1 promotes mucosal surface clearance of neutrophils: a new paradigm for inflammatory resolution. Faseb J 21: 3162-3170, 2007.*

Cassett et al. A peptide mimetic of an anti-CD4 monoclonal antibody by rationale design. Biochem Biophys Res Comm 307: 198-205, 2003.*

Chen et al. Selection and analysis of an optimized anti-VEGF antibody: crystal structure of an affinity-matured Fab in complex with antigen. J Mol Biol 293: 865-881, 1999.*

Colman, P.M. Effects of amino acid sequence changes on antibody-antigen interactions. Res Immunol 145: 33-36, 1994.*

De Pascalis et al. Grafting and "abbreviated" complementarity-determining regions containing specificity-determining residues essential for ligand contact to engineer a less immunogenic humanized monoclonal antibody. J Immunol 169: 3076-3084, 2002.*

Doyle et al. Development of a Membrane-anchored Chemerin Receptor Agonist as a Novel Modulator of Allergic Airway Inflammation and Neuropathic Pain. J Biol Chem 289(19): 13385-13396, 2014.*

Edwards et al. The remarkable flexibility of the human antibody repertoire; isolation of over one thousand different antibodies to a single protein, BLyS. J Mol Biol 334: 103-118, 2003.*

Gauttier et al. Triggering the resolution of inflammation with agonistic anti-ChemR23 antibody dampens inflammation-driven carcinogenesis. Cancer Res 81(Suppl 13): 1766, 2021.*

Holm et al. Functional mapping and single chain construction of the anti-cytokeratin 8 monoclonal antibody TS1. Mol Immunol 44: 1075-1084, 2007.*

Ikeuchi et al. Delicate balance among thermal stability, binding affinity, and conformational space explored by single-domain VHH antibodies. Sci Reports 11: 20624, 2021 (9 total pages).*

Jang et al. The structural basis for DNA binding by an anti-DNA autobody. Mol Immunol 35: 1207-1217, 1998.*

Kakde et al. Emerging Therapies for Non-Alcoholic Steatohepatitis (NASH): A Comprehensive Review of Pharmacological and Non-Pharmacological Approaches. Cureus 16(9): e69129, 2024 (9 total pages).*

Kiyokawa et al. Notch signaling in the mammalian respiratory system, specifically the trachea and lungs, in development, homeostasis, regeneration, and disease. Develop Growth Differ 62: 67-69, 2020.*

Kobayashi et al. Tryptophan H33 plays an important role in pyrimidine (6-4) pyrimidone photoproduct binding by a high affinity antibody. Protein Engineer 12(10): 879-884, 1999.*

Lavy et al. ChemR23 activation reprograms macrophages toward a less inflammatory phenotype and dampens carcinoma progression. Front Immunol 14: 1196731, 2023 (17 total pages).*

Lipman et al. Monoclonal Versus Polyclonal Antibodies: Distinguishing Characteristics, Applications, and Information Resources. Ilar J 46(3): 258-268, 2005.*

Lloyd et al. Modelling the human immune response: performance of a 1011 human antibody repertoire against a broad panel of therapeutically relevant antigens. Protein Eng Design Selection 22(3): 159-168, 2009.*

Luangsay et al. Mouse ChemR23 Is Expressed in Dendritic Cell Subsets and Macrophages, and Mediates an Anti-Inflammatory activity of Chemerin in a Lung Disease Model. J Immunol 183(10): 6489-6499, 2009.*

MacCallum et al. Antibody-antigen interactions: contact analysis and binding site topography. J Mol Biol 262: 732-745, 1996.*

Paul, William E., Fundamental Immunology, 3rd Edition, Raven Press, New York, Chapt. 8, pp. 292-295 (1993).*

Rudikoff et al. Single amino acid substitution altering antigen-binding specificity. Proc Natl Acad Sci USA 79: 1979-1983, 1982.*

Sela-Culang et al. The structural basis of antibody-antigen recognition. Front Immunol 4: 302, 2013 (13 total pages).*

Sheka et al. Nonalcoholic steatohepatitis a review. JAMA 323(12): 1175-1183, 2020.*

Trilleaud et al. Agonist anti-ChemR23 mAb reduces tissue neutrophil accumulation and triggers chronic inflammation resolution. Sci Adv 7: eabd1453, 2021.*

Tu et al. Regulatory effect of chemerin and therapeutic efficacy of chemerin-9 in pancreatogenic diabetes mellitus. Mol Med Reports 21: 981-988, 2020.*

Vajdos et al. Comprehensive functional maps of the antigen-binding site of an anti-ErbB2 antibody obtained with shotgun scanning mutagenesis. J Mol Biol 320: 415-428, 2002.*

Vasudevan et al. A single amino acid change in the binding pocket alters specificity of an anti-integrin antibody AP7.4 as revealed by its crystal structure. Blood Cells Mol Diseases 32: 176-181, 2004.*

White et al. Cancer Prevention for the Next Generation. J Adolesc Health 52: S1-S7, 2013.*

Wu et al. Humanization of a murine monoclonal antibody by simultaneous optimization of framework and CDR residues. J Mol Biol. 294: 151-162, 1999.*

Zhang et al. Comprehensive optimization of a single-chain variable domain antibody fragment as a targeting ligand for a cytotoxic nanoparticle. mAbs 7(1): 42-52, 2015.*

Zong et al. Notch signaling in lung diseases: focus on Notch1 and Notch3. Ther Adv Respir Dis 10(5): 468-484, 2016.*

Peyrassol et al., "Development by Genetic Immunization of Monovalent Antibodies (Nanobodies) Behaving as Antagonists of the Human ChemR23 Receptor," The Journal of Immunology, 196: 2893-2901 (2016).

International Search Report issued in corresponding International Patent Application No. PCT/EP2020/078488 dated Dec. 22, 2020.

Written Opinion issued in corresponding International Patent Application No. PCT/EP2020/078488 dated Dec. 22, 2020.

Aoki et al., "Resolvin E1 Dampens Airway Inflammation and Hyperresponsiveness in a Murine Model of Asthma," Biochemical and Biophysical Research Communications, 2008, 367: 509-515.

Arijs et al., "Effect of Vedolizumab (Anti-α4β7-Integrin) Therapy on Histological Healing and Mucosal Gene Expression in Patients with UC," Gut, 2017; 67: 43-52.

Arijs et al., "Mucosal Gene Expression of Antimicrobial Peptides in Inflammatory Bowel Disease Before and After First Infliximab Treatment," PLoS One, 2009, 4(11): e7984.

Arijs et al., "Mucosal Gene Signatures to Predict Response to Infliximab in Patients with Ulcerative Colitis," Gut, 2009, 58: 1612-1619.

Arita et al., "Resolvin E1, an endogenous lipid mediator derived from omega-3 eicosapentaenoic acid, protects against 2,4,6-trinitrobenzene sulfonic acid-induced colitis," Proc Natl Acad Sci U S A., 2005, 102(21): 7671-6.

Arita et al., "Stereochemical assignment, antiinflammatory properties, and receptor for the omega-3 lipid mediator resolvin E1," J Exp Med. 2005, 201(5): 713-22.

Bannenberg et al., "Molecular Circuits of Resolution: Formation and Actions of Resolvins and Protectins," J Immunol., 2005, 174(7): 4345-55.

Bird et al., "Single-Chain Antigen-Binding Proteins," Science, 1998, 242(4877): 423-6.

Bozaoglu et al., "Chemerin Is a Novel Adipokine Associated with Obesity and Metabolic Syndrome," Endocrinology, 2007, 148(10): 4687-4694.

Buckley et al., "Pro-Resolving Lipid Mediators and Mechanisms in the Resolution of Acute Inflammation," Immunity 2014, 40(3): 315-327.

Cash et al., "Synthetic Chemerin-Derived Peptides Suppress Inflammation Through ChemR23," J Exp Med., 2008, 205 (4): 767-775.

D'Angelo et al., "Many Routes to an Antibody Heavy-Chain CDR3: Necessary, Yet Insufficient, for Specific Binding," Frontiers in Immunology, 2018, 9(305): 1-11.

Darios et al., "The Adipokine Chemerin Amplifies Electrical Field-Stimulated Contraction in the Isolated Rat Superior Mesenteric Artery," Am J Physiol Heart Circ Physiol., 2016, 311(2): 498-507.

(56) References Cited

OTHER PUBLICATIONS

Dickie et al., "The Chemerin Receptor 23 Agonist, Chemerin, Attenuates Monosynaptic C-Fibre Input to Lamina I Neurokinin 1 Receptor Expressing Rat Spinal Cord Neurons in Inflammatory Pain," Molecular Pain, 2014, 10(24): 1-15.
El Kebir et al., "Resolvin E1 promotes phagocytosis-induced neutrophil apoptosis and accelerates resolution of pulmonary inflammation," Proc Natl Acad Sci U S A., 2012, 109(37):14983-8.
Ernst et al., "Chemerin: At the Crossroads of Inflammation and Obesity," Trends Endocrinol. Metab., 2010, (11): 660-7.
European Search Report issued in corresponding European Patent Application No. 19306322.9, dated Apr. 9, 2020 (12 pages).
European Search Report issued in corresponding European Patent Application No. 19306323.7, dated Apr. 9, 2020 (7 pages).
Foote et al., "Antibody Framework Residues Affecting the Conformation of the Hypervariable Loops;" J. Mol Biol., 1992, 224: 487-499.
Goralski et al., "Chemerin, a Novel Adipokine that Regulates Adipogenesis and Adipocyte Metabolism," J Biol Chem, 2007, 282(38): 28175-88.
Huston et al., "Protein Engineering of Antibody Binding Sites: Recovery of Specific Activity in an Anti-Digoxin Single-Chain Fv Analogue Produced in *Escherichia coli*," Proc Natl Acad Sci., 1988, 85(16): 5879-5883.
Ichim et al., "A Fate Worse than Death: Apoptosis as an Oncogenic Process," Nat Rev Cancer, 2016, 16(8): 539-48.
International Search Report and Written Opinion issued in corresponding International Patent Application No. PCT/EP2019/058358, dated Oct. 10, 2019 (13 pages).
Ishida et al., "Resolvin E1, an endogenous lipid mediator derived from eicosapentaenoic acid, prevents dextran sulfate sodium induced colitis," Inflamm Bowel Dis., 2010, 16(1): 87-95.
Kaur et al., "Identification of Chemerin Receptor (ChemR23) in Human Endothelial Cells: Chemerin-Induced Endothelial Angiogenesis," Biochem Biophys Res Commun, 2010, 391(4): 1762-8.
Kennedy et al., "International Union of Basic and Clinical Pharmacology CIII: Chemerin Receptors CMKLR1 (Chemerin1) and GPR1 (Chemerin2) Nomenclature, Pharmacology, and Function," Pharmacological Reviews, 2018, 70(1): 174-196.
Krehenbrink et al., "Artificial Binding Proteins (Affitins) as Probes for Conformational Changes in Secretin PuID," J. Mol. Biol., 2008, 383(5): 1058-68.
Kumar et al., "The Role of Chemerin and ChemR23 in Stimulating the Invasion of Squamous Oesophageal Cancer Cells," British Journal of Cancer, 2016, 114(10): 1152-1159.
Lee et al., "Resolvin E1 Reverses Experimental Periodontitis and Dysbiosis," J Immunol, 2016, 197(7): 2796-806.
Li et al., "Resolvin E1 Improves Tear Production and Decreases Inflammation in a Dry Eye Mouse Model," J Ocul Pharmacol Ther., 2010, 26(5): 431-9.
Meyers et al., "Optimal Alignments in Linear Space," Comput Appl Biosci., 1988, 4(1): 11-17.
Muller et al., "Determination of Affinity and Specificity of Anti-Hapten Antibodies by Competitive Radioimmunoassay," Methods in Enzymology, 1983, 92: 589-601.
Needleman et al., "A General Method Applicable to the Search for Similarities in the Amino Acid Sequence of Two Proteins," J Mol Biol., 1970, 48(3): 443-53.
Office Action received in corresponding Brazil Application No. 11 2022 006760 7, dated May 27, 2025, 7 pages (English translation).
Office Action received in corresponding Chinese Application No. 202080084501.6, dated Feb. 28, 2025, 15 pages (English translation).
Office Action received in corresponding Israel Application No. 277701, dated Oct. 1, 2024, 5 pages.
Office Action received in corresponding Ukrainian Application No. a202201472, dated Apr. 15, 2025, 5 pages (English translation).
Oh et al., "Pro-Resolving Actions and Stereoselective Biosynthesis of 18S E-Series Resolvins in Human Leukocytes and Murine Inflammation," The Journal of Clinical Investigation, 2011, 121(2): 569-581.
Ohira et al., "Resolvin E1 Receptor Activation Signals Phosphorylation and Phagocytosis, Journal of Biological Chemistry," 2010, 285(5): 3451-3461.
Perez de la Lastra et al., "Epitope Mapping of 10 Monoclonal Antibodies Against the Pig Analogue of Human Membrane Cofactor Protein (MCP)," Immunology, 1999, 96: 663-670.
Roh et al., "Chemerin—A New Adipokine That Modulates Adipogenesis Via Its Own Receptor," Biochem. Biophys. Res. Commun., 2007, 362(4): 1013-1018.
Samson et al., "ChemR23, a Putative Chemoattractant Receptor, is Expressed in Monocyte-Derived Dendritic Cells and Macrophages and is a Coreceptor for SIV and Some Primary HIV-1 Strains," Eur J Immunol., 1998, 28(5): 1689-700.
Schlehuber et al., "Tuning Ligand Affinity, Specificity, and Folding Stability of an Engineered Lipocalin Variant—A So-Called 'Anticalin'—Using a Molecular Random Approach," Biophys Chem., 2002, 96(2-3): 213-28.
Sell et al. "Chemerin Is a Novel Adipocyte-Derived Factor Inducing Insulin Resistance in Primary Human Skeletal Muscle Cells," Diabetes, 2009, 58(12): 2731-2740.
Serhan, "Pro-Resolving Lipid Mediators are Leads for Resolution Physiology," Nature, 2014, 510(7503): 92-101.
Sima et al., "ERV1 Overexpression in Myeloid Cells Protects against High Fat Diet Induced Obesity and Glucose Intolerance," Sci Rep. 2017, 9;7(1): 12848.
Skerra, "Alternative Binding Proteins: Anticalins—Harnessing the Structural Plasticity of the Lipocalin Ligand Pocket to Engineer Novel Binding Activities," Febs J., 2008, 275(11): 2677-83.
Sulciner et al., "Resolvins Suppress Tumor Growth and Enhance Cancer Therapy," J Exp Med, 2018, 215(1): 115-140.
Trilleaud et al., "Antibody-Mediated ChemR23 Resolutive Activation Prevents Chronic Inflammation in Preclinical Models of Colitis," OSE Immunotherapeutics Poster, SFI conference (French Society of Immunology—journées de la Société Francaise d'Immunologie à la Cité des congrès de Nantes), Nov. 12 to 14, 2019 in Nantes town (France), 1 page.
Trilleaud et al., "Triggering the Resolution Pathway with an Agonistic Anti ChemR23 mAb Ameliorates Recovery in Colitis Models;" OSE Immunotherapeutics; Resolution Days 2018, a conference held in Besançon (France) on Apr. 4-6, 2018, 1-16.
Ward et al., "Binding Activities of a Repertoire of Single Immunoglobulin Variable Domains Secreted from *Escherichia coli*," Nature, 1989, 341: 544-546.
Watts et al., "Chemerin Connects Fat to Arterial Contraction," Arterioscler. Thromb. Vasc. Biol., 2013, 33: 1320-1328.
Wittamer et al., "Specific Recruitment of Antigen-presenting Cells by Chemerin, a Novel Processed Ligand from Human Inflammatory Fluids," J Exp Med., 2003, 198(7): 977-985.
Wittamer et al., "The C-terminal Nonapeptide of Mature Chemerin Activates the Chemerin Receptor with Low Nanomolar Potency," Journal of Biological Chemistry, 2004, 79(11): 9956-9962.
Yoshimura et al., "Chemokine-like Receptor 1 (CMKLR1) and Chemokine (C—C motif) Receptor-like 2 (CCRL2); Two Multifunctional Receptors with Unusual Properties," Exp. Cell Res., 2011, 317(5): 674-684.
Zabel et al., "Chemokine-Like Receptor 1 Expression by Macrophages In Vivo: Regulation by TGF-β and TLR ligands," Experimental Hematology, 2006, 34: 1106-1114.
Zabel et al., "Leukocyte Chemoattractant Receptors in Human Disease Pathogenesis," Annu Rev Pathol., 2015, 10: 51-81.

\* cited by examiner

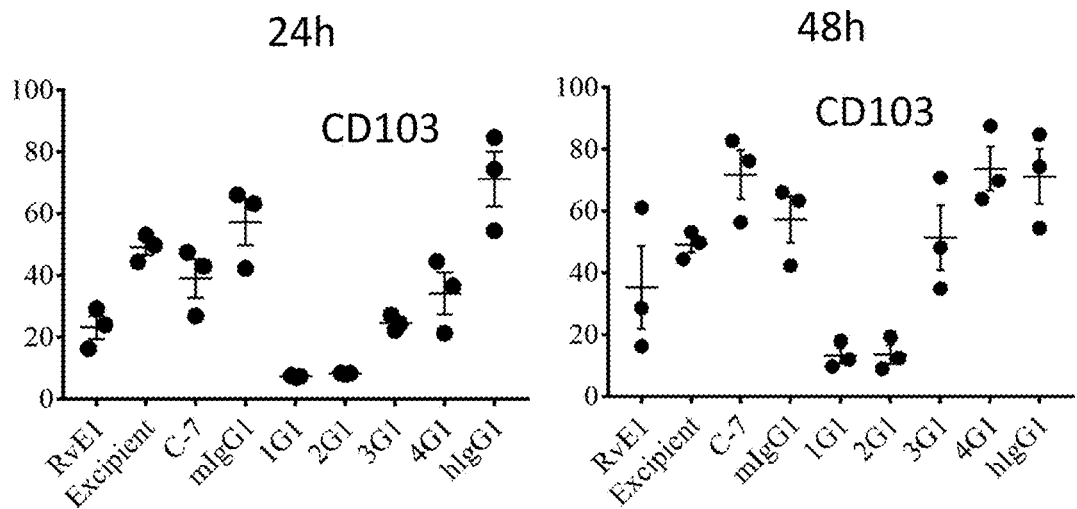
FIG. 1C
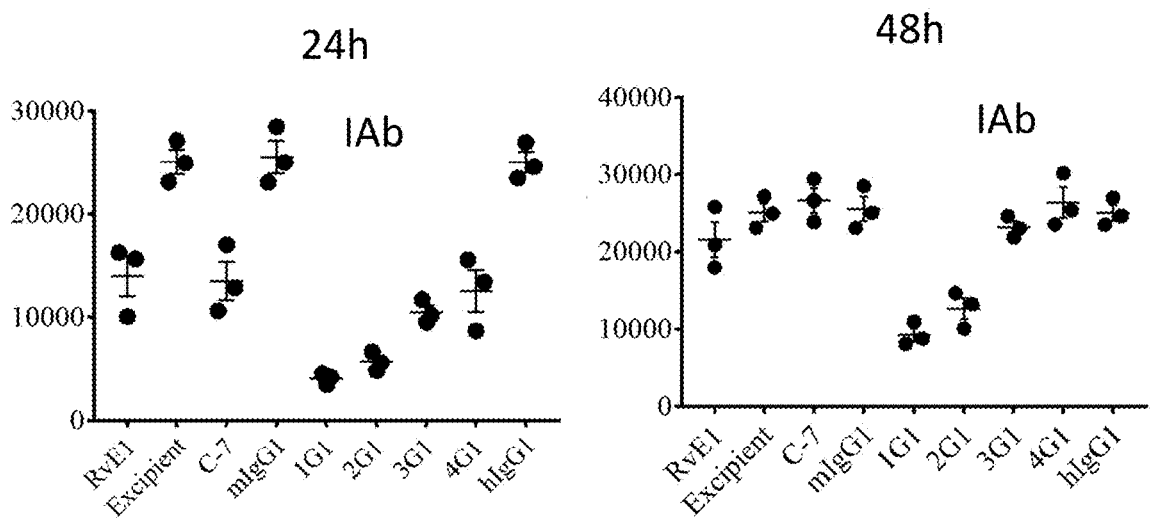
FIG. 1D
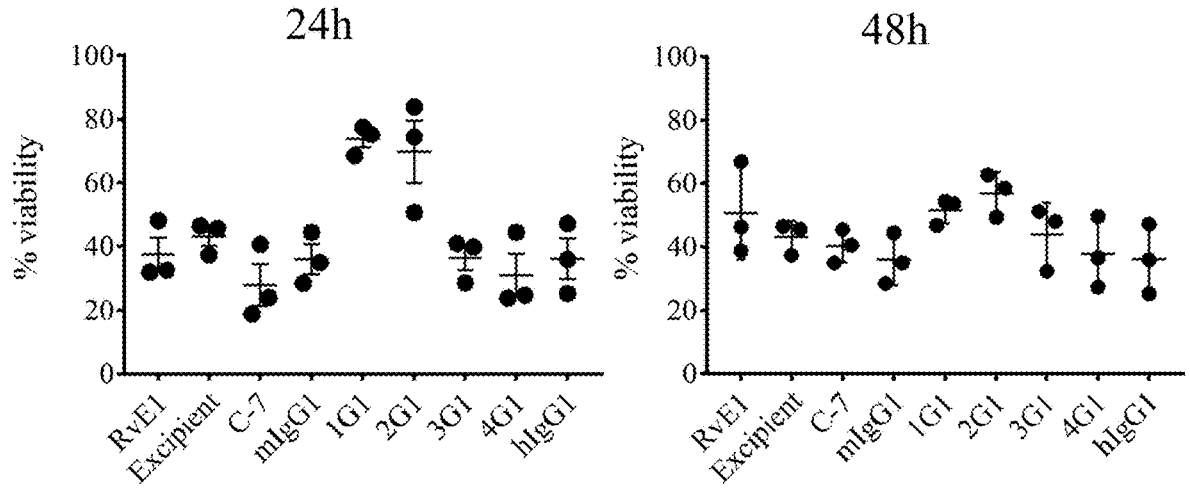
FIG. 1E                    FIG. 1F

| Production in COS (surpernatant) | | | | |
|---|---|---|---|---|
| ng/ml | VH WT | VHvAv3-23 (SEQ 37) | VHvAV1-46 | VHvAv4-1 |
| VL WT | 1028,1 | 501,9 | <12 | <12 |

| ng/ml | VL WT | VLvAv1-13 (SEQ 49) | VLvAv6-21 | VLvAv3-11 |
|---|---|---|---|---|
| VH WT | 1028,1 | 2035,3 | 158,6 | 75,3 |
| VHvAv3-23 (SEQ 37) | 501,9 | 861,1 | - | - |

| Production in CHO (surpernatant) | | | | |
|---|---|---|---|---|
| ng/ml | VH WT | VHvAv3-23 (SEQ 37) | VHvAV1-46 | VHvAv4-1 |
| VL WT | 509,3 | 249,7 | <12 | <12 |

| ng/ml | VL WT | VLvAv1-13 (SEQ 49) | VLvAv6-21 | VLvAv3-11 |
|---|---|---|---|---|
| VH WT | 509,3 | 831,3 | 78,4 | 40,4 |
| VHvAv3-23 (SEQ 37) | 249,7 | 443,7 | - | - |

*FIG. 21*

| Production in CHO cells and purification on Protein A | | |
|---|---|---|
| | Concentration (mg/ml) | Yield (mg/L) |
| VH WT + VL WT | 2,8 | 33,6 |
| VH WT + VLvAv1-13 (SEQ 49) | 0,96 | 4 |
| VHvAv3-23 (SEQ 37) + VLvAv1-13 (SEQ 49) | 2,3 | 21,08 |

*FIG. 22*

|  | ED50 (ng/ml) |
| --- | --- |
| 2G1wt | 269,2 |
| HALA | 557,3 |
| HCLC | 167,4 |
| HCLD | 332,9 |
| HDLC | 196,6 |
| HDLD | 195,1 |

ROS production
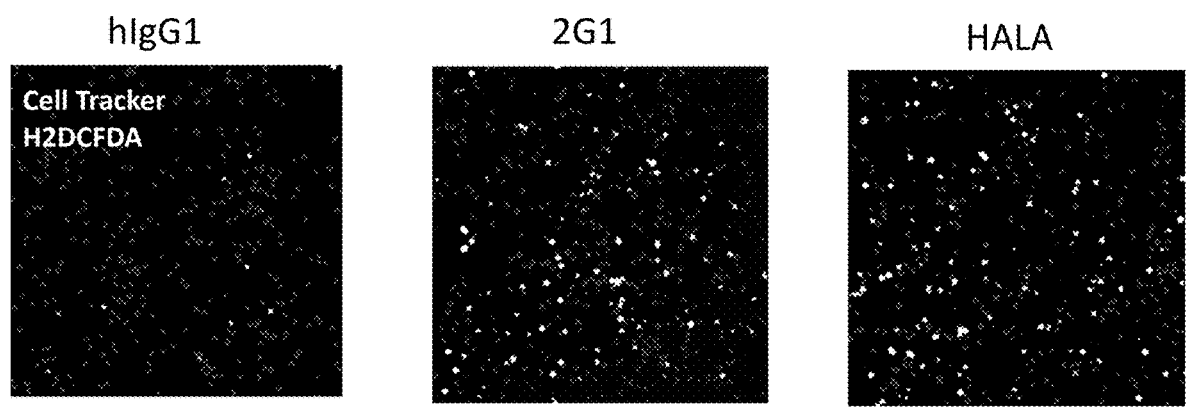
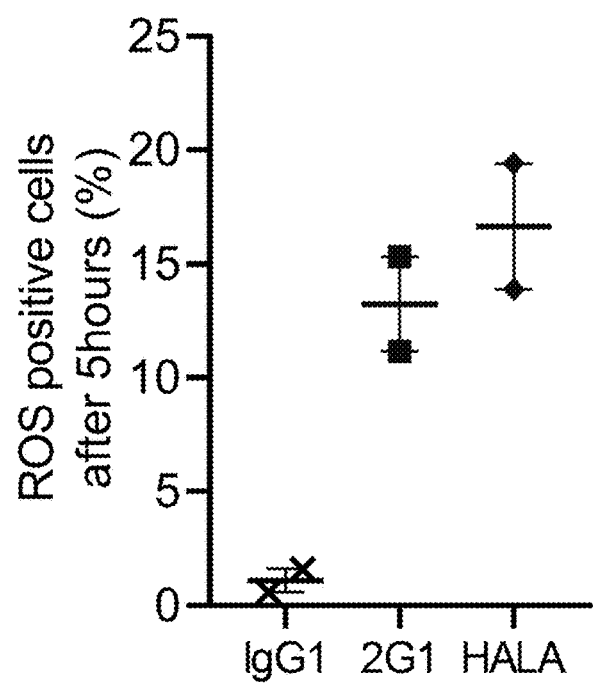
*FIG. 26C*

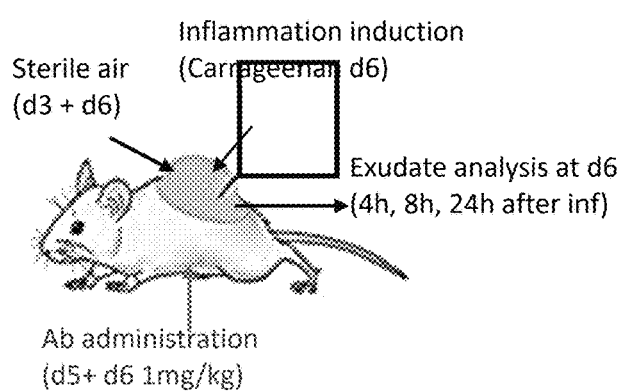
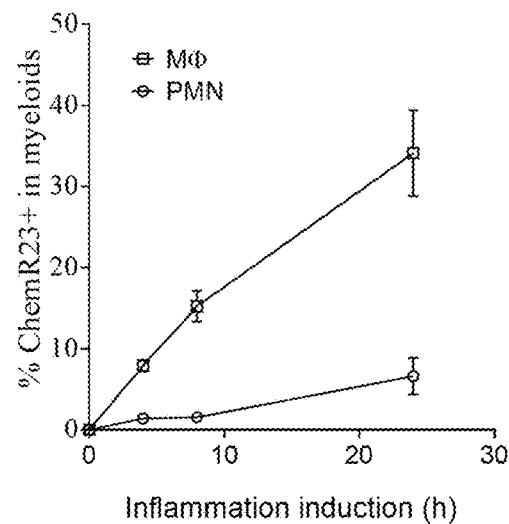
FIG. 27A  FIG. 27B
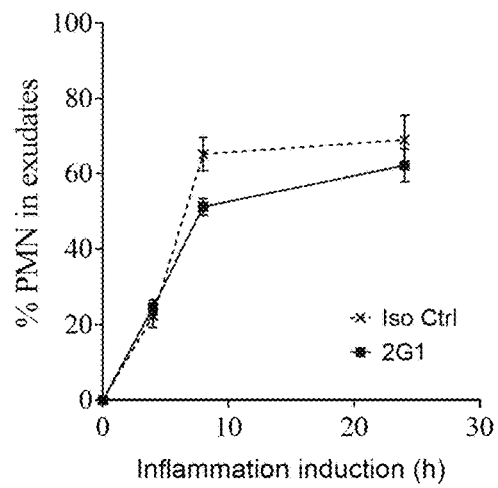
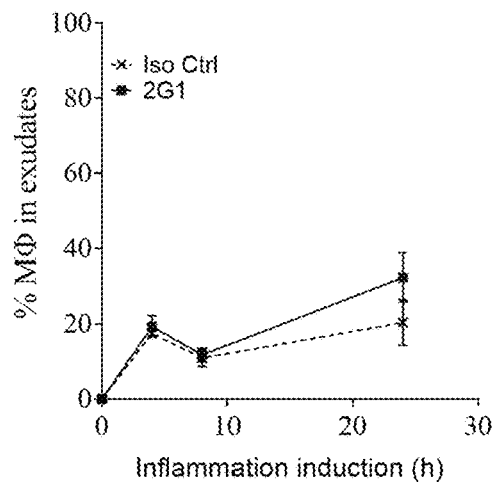
FIG. 27C  FIG. 27D
% dead PMN
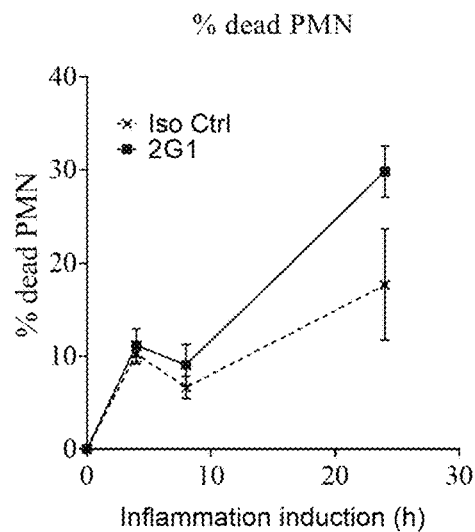
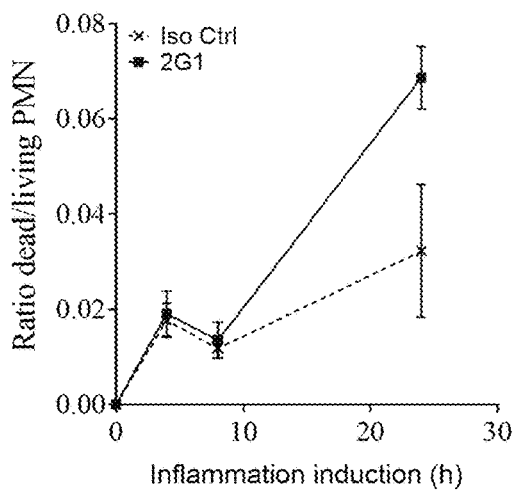
FIG. 27E  FIG. 27F

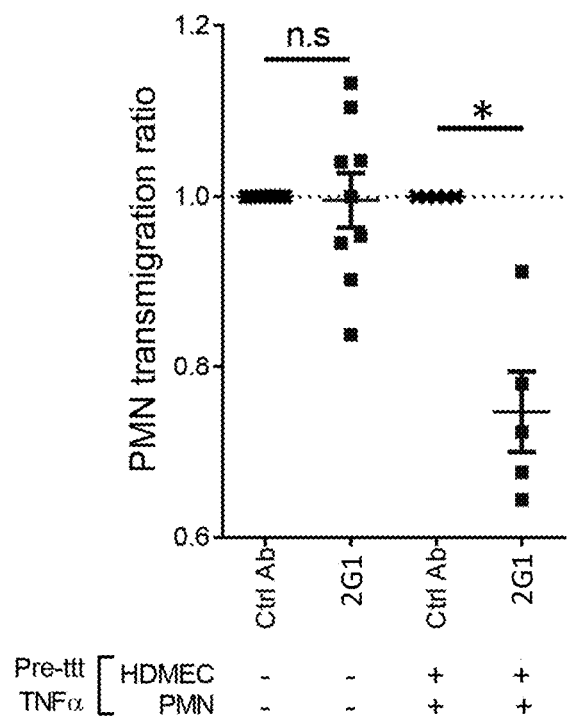 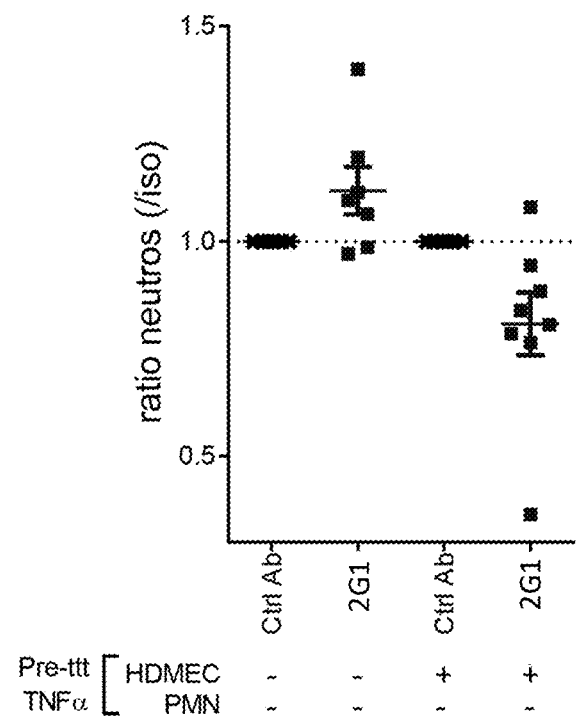
*FIG. 28A*  *FIG. 28B*
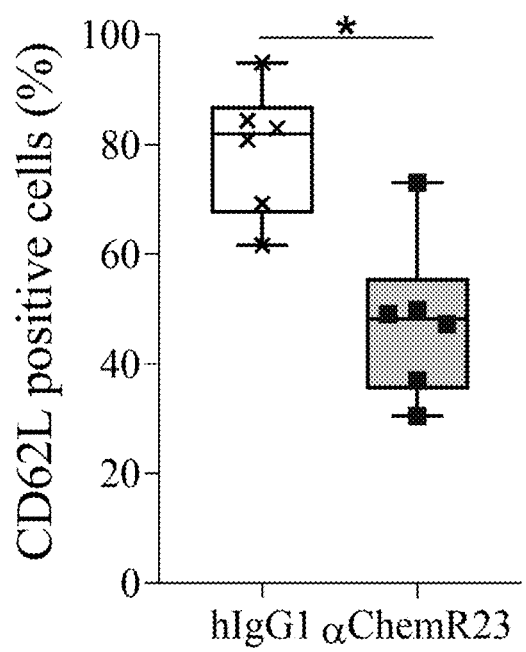 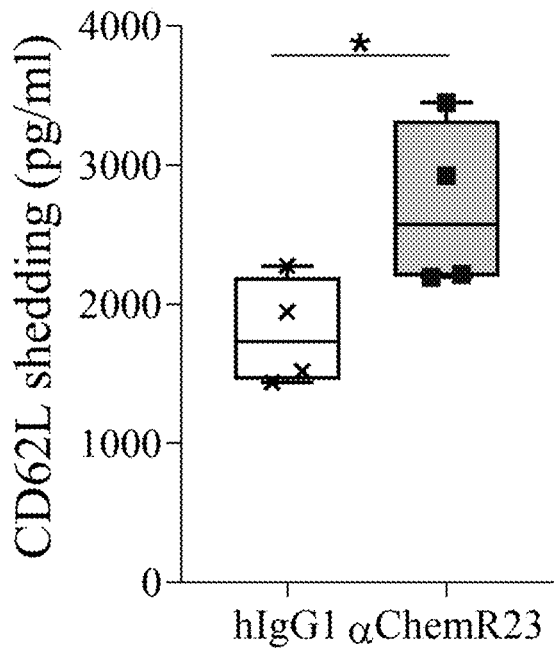
*FIG. 29*

| | ED50 (ng/ml) |
|---|---|
| 2G1wt #170919 | 222,0 |
| HALA#170919 | 253,4 |
| HALA | 194,5 |
| HDLD | 192,6 |
| HD-LDT52S | 237,4 |
| HEF-LDT52S | 125,7 |
| HEF-LEF | 182,8 |

| | loading | 36°C | | 17 à 27°C | |
|---|---|---|---|---|---|
| | | % aggregates | % monomers | % aggregates | % monomers |
| HDLD | 100µl à 0,18mg/ml | 7,9 | 92,1 | 5 | 95 |
| HEF-LDT52S | 100µl à 0,15mg/ml | 2,8 | 97,2 | 4,3 | 95,7 |
FIG. 34B
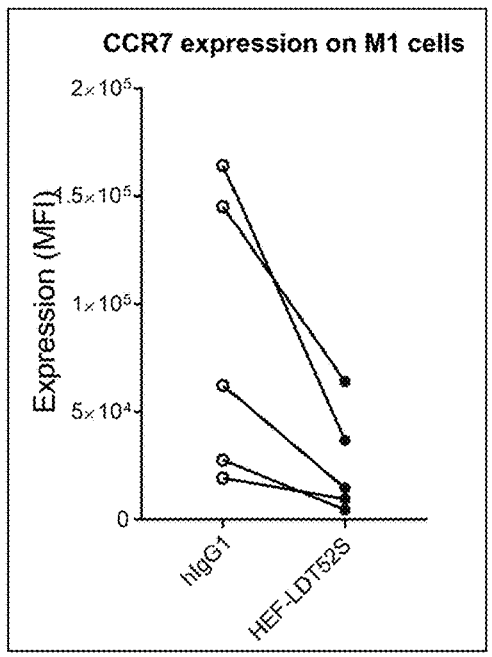
FIG. 35
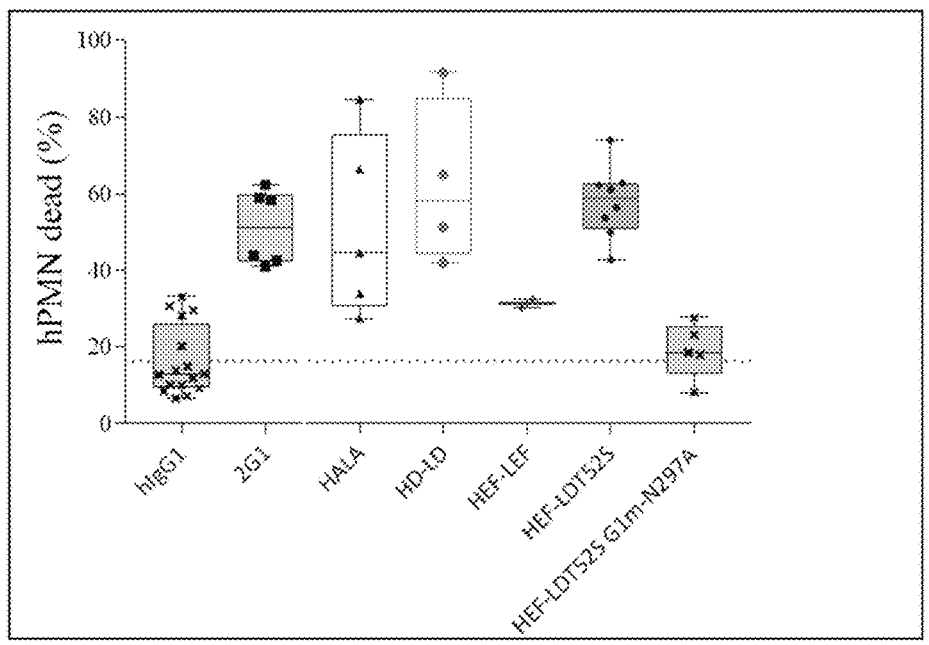
FIG. 36

ANTI-CHEMOKINE LIKE RECEPTOR 1 HUMANIZED ANTIBODIES AND THEIR THERAPEUTIC APPLICATIONS

SEQUENCE LISTING SUBMISSION VIA EFS-WEB

A computer readable text file, entitled "SequenceListing.txt" created on Mar. 22, 2022 with a file size of 66,563 bytes contains the sequence listing for this application and is hereby incorporated by reference in its entirety.

FIELD OF THE INVENTION

The invention pertains to the field of immunotherapy. The present invention provides new humanized anti-chemerin receptor antibodies which have a Resolvin E1-like agonist activity on chemokine like receptor-1 (CMKLR1). The present invention also provides uses of such antibody in therapy, in particular for treating autoimmune diseases and chronic inflammatory diseases, infectious diseases, cancers, and any condition wherein the resolution phase of inflammation is disrupted or delayed.

BACKGROUND OF THE INVENTION

The critical role of inflammatory processes in health and diseases has long been recognized. The detailed molecular mechanisms and biological events that regulate the progression and the resolution of inflammation remain of critical interest. Recent investigations have provided strong evidence that the resolution of inflammation is not a passive process, as believed earlier. Resolution of the inflammation is instead a biosynthetically active process, regulated by biochemical mediators and receptors-signaling pathways. Resolution is therefore driven by specialized pro-resolving mediators.

Inflammation is a spontaneous mechanism that occurs during an infection, an injury or a traumatism. Inflammation is inevitable and usually salutary, and its response is orchestrated by a delicate balance between positive and negative feedback loops. The inflammation is usually divided in 3 steps: initiation, amplification and resolution.

The resolution process which allows the ending of the inflammatory response is a complex process involving the sequential and chronological engagement of cellular (e.g. granulocytes or macrophages) and chemical (e.g. cytokines or specialized pro-solving mediators or factors) effectors.

Chemokine-like receptor 1 (CMKLR1), also known as ChemR23, and chemokine receptor-like 2 (CCRL2) are 7-transmembrane receptors identified by their homology to known G-protein-coupled receptors (AJ Kennedy and AP Davenport, 2018). The Chemokine-like Receptor 1 (CMKLR1; also named Dez in Murine animals), is an orphan G protein-coupled receptor related to GPR-1 (38% overall amino acid identity), C3a receptor (38%), C5a anaphylatoxin receptor (36%) and formyl Met-Leu-Phe receptors (35%). ChemR23 is more distantly related to the chemokine receptors subfamily (Samson et al., 1998). CMKLR1 is expressed on monocytes, on macrophages, on dendritic cells, and on NK cells, as well as on adipocytes and endothelial cells. Recent studies identified ligands for these receptors and their functions have begun to be unveiled. Accordingly, a first plasma protein-derived chemoattractant named chemerin has been identified as a ligand for CMKLR1.

The second ligand of CMKLR1 is the lipid mediator Resolvin E1 (RvE1) that belongs to the Resolvin family. The anti-inflammatory lipid mediator Resolvin E1 inhibits leukocyte infiltration and pro-inflammatory gene expression.

Initially, the interest in the chemerin system (i.e. the signaling pathway(s) activated or not by Chemerin receptors by their ligands like Chemerin and Resolvin) was focused on its role in inflammation and chemotaxis of immune cells following its discovery in psoriasis disease. Most recently, in connection with its role in inflammation, in obesity, metabolic syndrome, its potential role in association with cardiovascular functions has been considered, as well as role in reproductive biology. Therefore, the chemerin system is of major interest for its role in the inflammation process, in particular for its role in the resolution of the inflammation. A number of diseases are related to delay or disruption of the resolution process. Most of the specialized pro-resolving factor mediators currently known are derived from polyunsaturated fatty acids, including lipoxins, the resolving family, including E-series resolvins and D-series resolvins, protectins, and maresins. Nonetheless, pro-resolving molecules are difficult to synthesize because of their lipidic nature.

Production of pro-resolving molecules in sufficient quantities, for a clinical trial for example, is a burden, and very few SPM have gone through efficient production. Besides that, antibodies specifically targeting G-protein-coupled receptors are difficult to produce. There is therefore a need for molecules having the capability to take part, in particular to initiate or enhance the resolution stage of the inflammatory response like pro-resolving factors.

SUMMARY OF THE INVENTION

In a first aspect, the invention relates to a humanized anti-CMKLR1 antibody or antigen-binding fragment thereof or antigen-binding antibody mimetic or modified antibody.

The inventors have sought to obtain improved humanized antibodies when compared to wild type anti-CMKLR1 antibody known in the prior art. While it is known that some residues in the variable domain CDR and framework (FR) sequences, including residues in the Vernier zone, canonical residues, residues at the variable heavy and variable light chains interface, etc, are critical in the structure of an antibody and should not be mutated in order to preserve the biochemical and biological activity of an antibody, the inventors have surprisingly discovered that some mutations within the heavy chain variable domain and/or the light chain variable domain sequence of wild type antibody, including some of such critical residues, allow increasing human residue content (up to 99% of humanization) while functional features are associated with these humanized antibodies, which are not shared by wild type anti-CMKLR1 in particular which are improved, and at the same time that production of these humanized antibodies may be improved as compared to less or distinctly humanized anti-CMKLR1 antibodies. These humanized antibodies lead to the provision of compounds exhibiting functional features useful in the treatment of diseases, including diseases wherein inflammation is implicated, which can be produced on a large scale for candidate drug development. The combination of these two features leads to the provision of anti-CMKLR1 antibodies showing improved capabilities as compared to the antibodies of the prior art.

Starting from a not humanized anti-CMKLR1 antibody and selecting human germline sequences, the inventors designed particular humanized heavy chain variable domains and light chain variable domains. The humanized heavy chain variable domain and light chain variable domain derived from non-humanized antibody allow a production of functional antibodies in different cell lines, like but no limited to Chinese Hamster Ovary (CHO) cell line, transformed African Green Monkey Kidney Fibroblast Cells (COS-7) cell line and Human Embryonic Kidney cell line (HEK 293) in conditions that enable recovering significant yield of antibodies that bind their target with an activity that may even be increased with respect to the binding activity of the wild type antibody. Some of the obtained humanized heavy chain variable domain and light chain variable domain were in particular further humanized with respect to a first humanization step carried out on framework regions of the heavy and light chains variable domains, leading to the provision of antibodies suitable for high yield production in different cell lines, with a reduced immunogenicity, and having at least the functional features of their parental antibody. The skilled artisan would not have expected that said mutations, particularly at such positions in the CDR domains and in framework regions of the heavy and/or light chain variable domain would lead to the provision of anti-CMKLR1 antibodies with a preserved binding capability in particular preserved affinity, a preserved stability, the preservation of the Resolvin-like agonist capability of these antibodies on CMKLR1, with a lowered immunogenicity index, while the production scale of these antibodies comprising a heavy variable domain and a light variable domain according to the invention would be improved as compared to less or differently humanized antibodies. It was not foreseeable that the introduction of the disclosed mutations, and particularly in the CDR2 of the heavy chain would result in improved production, while still preserving binding features and advantageously other functional features of the anti-CMKLR1 antibodies of the prior art. Anti-CMKLR1 antibodies exhibiting the recited features (binding capability, in particular affinity, for CMKLR1, in particular for the particular third extra-loop of CMKLR1, low immunogenicity, good production scale and Resolvin-like agonist capability for CMKLR1) are useful for a potent treatment of several diseases, including diseases wherein inflammation is involved, and more particularly inflammatory diseases.

Further, as will be explained later in the present application, several very advantageous biological effects have been reached, associated in particular to the apoptosis of neutrophils and to the reduction of migration and/or transmigration of neutrophils and/or macrophages notably, leading to strong benefic action in the resolution of inflammation.

The new compounds allow thus to combine the production capacity and the biological activity.

Accordingly, in a first aspect of the invention, it is disclosed an antibody or antigen-binding fragment thereof, which binds to Chemokine-like receptor 1 (CMKLR1), in particular human CMKLR1, comprising:
a) an antibody heavy chain variable (VH) domain comprising the three CDRs VHCDR1, VHCDR2 and VHCDR3, wherein:
VHCDR1 is selected from the group consisting of SEQ ID No.3, SEQ ID No. 4, SEQ ID No. 5, SEQ ID No. 6 and SEQ ID No. 7;
VHCDR2 is selected from the group consisting of SEQ ID No. 9, SEQ ID No. 10, SEQ ID No. 11, SEQ ID No. 12 and SEQ ID No. 61;
VHCDR3 is selected from the group consisting of SEQ ID No. 13, SEQ ID No. 14, SEQ ID No. 15 and SEQ ID No. 16;
b) an antibody light chain variable (VL) domain comprising the three CDRs VLCDR1, VLCDR2 and VLCDR3, wherein:
VLCDR1 is selected from the group consisting of SEQ ID No. 17, SEQ ID No. 18, SEQ ID No. 19, SEQ ID No. 20, SEQ ID No. 21, SEQ ID No. 22 and SEQ ID No. 23;
VLCDR2 is selected from the group consisting of SEQ ID No. 24, SEQ ID No. 25, SEQ ID No. 26, SEQ ID No. 27, SEQ ID No. 28, SEQ ID No. 29, SEQ ID No. 30, SEQ ID No. 31, SEQ ID No. 32 and SEQ ID No. 33;
VLCDR3 is selected from the group consisting of SEQ ID No. 34, SEQ ID No. 35 and SEQ ID No. 36.

In a particular embodiment, said antibody or antigen-binding fragment thereof, which binds to Chemokine-like receptor 1 (CMKLR1), in particular human CMKLR1, comprises:
a) an antibody heavy chain variable (VH) domain comprising the three CDRs VHCDR1, VHCDR2 and VHCDR3, wherein:
VHCDR1 is selected from the group consisting of SEQ ID No.3, SEQ ID No. 4, SEQ ID No. 5, SEQ ID No. 6 and SEQ ID No. 7;
VHCDR2 is selected from the group consisting of SEQ ID No. 9, SEQ ID No. 10, SEQ ID No. 11 and SEQ 61; or VHCDR2 corresponds to the amino acid sequence of SEQ ID No. 12 or SEQ ID No. 63 with the proviso that VHCDR1 is not SEQ ID No. 3 or SEQ ID No. 4;
VHCDR3 is selected from the group consisting of SEQ ID No. 13, SEQ ID No. 14, SEQ ID No. 15 and SEQ ID No. 16;
b) an antibody light chain variable (VL) domain comprising the three CDRs VLCDR1, VLCDR2 and VLCDR3, wherein:
VLCDR1 is selected from the group consisting of SEQ ID No. 17, SEQ ID No. 18, SEQ ID No. 19, SEQ ID No. 20, SEQ ID No. 21, SEQ ID No. 22 and SEQ ID No. 23;
VLCDR2 is selected from the group consisting of SEQ ID No. 24, SEQ ID No. 25, SEQ ID No. 26, SEQ ID No. 27, SEQ ID No. 28, SEQ ID No. 29, SEQ ID No. 30, SEQ ID No. 31, SEQ ID No. 32 and SEQ ID No. 33;
VLCDR3 is selected from the group consisting of SEQ ID No. 34, SEQ ID No. 35 and SEQ ID No. 36.

In another particular embodiment, said antibody or antigen-binding fragment thereof, which binds to Chemokine-like receptor 1 (CMKLR1), in particular human CMKLR1, comprises:
a) an antibody heavy chain variable (VH) domain comprising the three CDRs VHCDR1, VHCDR2 and VHCDR3, wherein:
VHCDR1 is selected from the group consisting of SEQ ID No.3, SEQ ID No. 4, SEQ ID No. 5, SEQ ID No. 6 and SEQ ID No. 7;
VHCDR2 is selected from the group consisting of SEQ ID No. 9, SEQ ID No. 10, SEQ ID No. 11 and SEQ No. 61,
when VHCDR1 is SEQ ID No. 3 or SEQ ID No. 4 and VHCDR2 corresponds to the amino sequence of SEQ ID NO: 12 said heavy chain variable (VH) domain does not comprise a framework VHFR3 of SEQ ID No. 70, preferably with the proviso that said heavy chain variable (VH) domain comprises a framework FR3 of SEQ ID NO: 69, VHCDR3 is selected from the group consisting of SEQ ID No. 13, SEQ ID No. 14, SEQ ID No. 15 and SEQ ID No. 16;
b) an antibody light chain variable (VL) domain comprising the three CDRs VLCDR1, VLCDR2 and VLCDR3, wherein:
VLCDR1 is selected from the group consisting of SEQ ID No. 17, SEQ ID No. 18, SEQ ID No. 19, SEQ ID No. 20, SEQ ID No. 21, SEQ ID No. 22 and SEQ ID No. 23;
VLCDR2 is selected from the group consisting of SEQ ID No. 24, SEQ ID No. 25, SEQ ID No. 26, SEQ ID No. 27, SEQ ID No. 28, SEQ ID No. 29, SEQ ID No. 30, SEQ ID No. 31, SEQ ID No. 32 and SEQ ID No. 33;
VLCDR3 is selected from the group consisting of SEQ ID No. 34, SEQ ID No. 35 and SEQ ID No. 36.

In particular advantageously, the antibody or antigen-binding fragment thereof binds specifically to the third extra-cellular loop (EL3) of CMKLR1, in particular an epitope located within the third extra-cellular loop (EL3) of CMKLR1; more particularly the antibody or antigen-binding fragment thereof binds specifically to a polypeptide comprising amino acid sequence SEQ ID No: 2 or SEQ ID No. 59 or to an epitope located within amino acid sequence SEQ ID No. 60.

An antibody or an antigen-binding fragment thereof according to this embodiment is suitable for production in different cell lines, including but not limited to mammalian cell lines, with a yield of production suitable for purposes of development of a drug candidate, while the specific binding capability to the extra cellular third loop of CMKLR1 and its Resolvin E1-like agonist capability on CMKLR1 are retained. The humanized antibodies disclosed herein may therefore be efficiently produced and share the functional capabilities of their parental antibody.

In a particular aspect of the invention, which may be distinguished from the definition of the antibodies of the invention solely by their CDR domains, but which may be combined with such a definition in particular embodiments, it is disclosed an antibody or antigen-binding fragment thereof, which binds to Chemokine-like receptor 1 (CMKLR1), in particular human CMKLR1, suitable for the production in mammalian cells such as COS or CHO or HEK cells, in particular with a yield over 0.1 mg/ml, in particular with a yield over 1 mg/ml, more particularly with a yield of at least 10 mg/ml, and again more particularly with a yield over 100 mg/ml wherein:
a) the Variable Heavy (VH) domain comprises the amino acid sequence of the frameworks (FR1, FR2, FR3 and FR4) of a Heavy Chain variable domain wherein each framework harbors a sequence identity respectively with the framework of the same rank in the sequence of SEQ ID No. 41 that is 100% for FR1, at least 60% for FR2, at least 78% for FR3 and at least 80% for FR4; more particularly 100% or FR1, at least 80% for FR2, at least 85% for FR3 and at least 90% for FR4;
b) the Variable Light (VL) domain comprises the amino acid sequence of the frameworks (FR1, FR2, FR3 and FR4) of a Light Chain Variable domain wherein each framework harbors a sequence identity respectively with the framework of the same rank in the sequence of SEQ ID No.50 that is at least 60% for FR1, at least 70% for FR2, at least 75% for FR3 and at least 80% for FR4, and more particularly of 100% for FR1, at least 90% for FR2, at least 90% for FR3 and 100% for FR4. In particular, said humanized anti-CMKLR1 antibody or said antigen binding fragment thereof specifically binds to the third extra-cellular loop (EL3) of CMKLR1, in particular the antibody or antigen-binding fragment thereof binds specifically to a polypeptide comprising amino acid sequence SEQ ID No: 2 or SEQ ID No. 59 or to an epitope located within amino acid sequence SEQ ID No. 60.

The inventors, starting from the anti-CMKLR1 antibody 2G1, synthetized various heavy chain variable domains and light chain variable domains. The humanized heavy chain variable domain of SEQ ID No. 41 and the humanized light chain variable domain of SEQ ID No. 50 were particularly suitable for the production of humanized anti-CMKLR1 antibodies in cell or cell line, including mammalian cell like CHO cells or COS cells or HEK Cells. Having selected a particular human germline sequence for the design of the heavy chain variable domain and light chain variable domain, humanized antibodies with the herein defined identities in framework regions were also able to be produced in decent amounts in cell or cell line for the purpose of developing an antibody that may give rise to a drug candidate. There is a high interest in the provision of humanized antibodies which are able to be produced in high amount in cell or cell line, in particular in mammalian cell or cell line, for developing therapeutic antibodies. The particular anti-CMKLR1 antibodies provided herein share a highly similar structure with their parental antibody comprising heavy chain variable domain of SEQ ID No. 41 and light chain variable domain of SEQ ID No. 50, allowing the correct production, conformation and secretion of the anti-CMKLR1 antibody, thereby allowing the provision of an antibody which binds to the particular epitope of the Chemerin-like receptor 1 and having a Resolvin E1-like agonist capability on this receptor in sufficient amount for therapeutic purposes.

In a particular embodiment of the invention, it is provided an antibody which is a humanized anti-Chemerin Like Receptor 1 (CMKLR1) antibody or an antigen-binding fragment thereof suitable for the production in mammalian cells such as COS or CHO cells, in particular with a yield over 0.1 mg/ml, more particularly with a yield over 1 mg/ml, more particularly with a yield over 10 mg/ml, again more particularly with a yield over 100 mg/ml, wherein:
a) the Variable Heavy (VH) domain comprises the amino acid sequence of the frameworks (FR1, FR2, FR3 and FR4) of a Heavy Chain variable domain wherein each framework harbors a sequence identity respectively with the framework of the same rank in the sequence of SEQ ID No. 41 that is at least 90% for FR1, at least 70% for FR2, at least 80% for FR3 and at least 80% for FR4;
b) the Variable Light (VL) domain comprises the amino acid sequence of the frameworks (FR1, FR2, FR3 and FR4) of a Light Chain Variable domain wherein each framework harbors a sequence identity respectively with the framework of the same rank in the sequence of SEQ ID No.50 that is at least 60% for FR1, at least 80% for FR2, at least 75% for FR3 and at least 70% for FR4.

In particular, said humanized anti-CMKLR1 antibody or said antigen binding fragment thereof specifically binds to the third extra-cellular loop (EL3) of CMKLR1; in particular the antibody or antigen-binding fragment thereof binds specifically to a polypeptide comprising amino acid sequence SEQ ID No: 2 or SEQ ID No. 59 or located within amino acid sequence SEQ ID No 60.

In a particular embodiment of the humanized antibody or the antigen-binding fragment thereof defined above, such humanized antibody or the antigen-binding fragment thereof comprises
a) an antibody heavy chain variable (VH) domain comprising the three CDRs VHCDR1, VHCDR2 and VHCDR3, wherein:
VHCDR1 is selected from the group consisting of SEQ ID No.3, SEQ ID No. 4, SEQ ID No. 5, SEQ ID No. 6 and SEQ ID No. 7; and
VHCDR2 is selected from the group consisting of SEQ ID No. 9, SEQ ID No. 10, SEQ ID No. 11, SEQ ID No. 12 and SEQ 61; and
VHCDR3 is selected from the group consisting of SEQ ID No. 13, SEQ ID No. 14, SEQ ID No. 15 and SEQ ID No. 16; and
b) an antibody light chain variable (VL) domain comprising the three CDRs VLCDR1, VLCDR2 and VLCDR3, wherein:
VLCDR1 is selected from the group consisting of SEQ ID No. 17, SEQ ID No. 18, SEQ ID No. 19, SEQ ID No. 20, SEQ ID No. 21, SEQ ID No. 22 and SEQ ID No. 23; and In a particular embodiment, of the humanized antibody or the antigen-binding fragment thereof defined above, such humanized antibody or the antigen-binding fragment thereof comprises:
a) an antibody heavy chain variable (VH) domain comprising the three CDRs VHCDR1, VHCDR2 and VHCDR3, wherein:
VHCDR1 is selected from the group consisting of SEQ ID No.3, SEQ ID No. 4, SEQ ID No. 5, SEQ ID No. 6 and SEQ ID No. 7; and
VHCDR2 is selected from the group consisting of SEQ ID No. 9, SEQ ID No. 10, SEQ ID No. 11 and SEQ 61; or VHCDR2 comprises or consists of the amino acid sequence of SEQ ID No. 12 or SEQ ID No. 63 with the proviso that VHCDR1 is not SEQ ID No.3 or SEQ ID No. 4; and
VHCDR3 is selected from the group consisting of SEQ ID No. 13, SEQ ID No. 14, SEQ ID No. 15 and SEQ ID No. 16; and
b) an antibody light chain variable (VL) domain comprising the three CDRs VLCDR1, VLCDR2 and VLCDR3, wherein:
VLCDR1 is selected from the group consisting of SEQ ID No. 17, SEQ ID No. 18, SEQ ID No. 19, SEQ ID No. 20, SEQ ID No. 21, SEQ ID No. 22 and SEQ ID No. 23; and
VLCDR2 is selected from the group consisting of SEQ ID No. 24, SEQ ID No. 25, SEQ ID No. 26, SEQ ID No. 27, SEQ ID No. 28, SEQ ID No. 29, SEQ ID No. 30, SEQ ID No. 31, SEQ ID No. 32 and SEQ ID No. 33; and
VLCDR3 is selected from the group consisting of SEQ ID No. 34, SEQ ID No. and SEQ ID No. 36.

In another particular embodiment of the humanized antibody or the antigen-binding fragment thereof defined above, such humanized antibody or the antigen-binding fragment thereof comprises:
a) an antibody heavy chain variable (VH) domain comprising the three CDRs VHCDR1, VHCDR2 and VHCDR3, wherein:
VHCDR1 is selected from the group consisting of SEQ ID No.3, SEQ ID No. 4, SEQ ID No. 5, SEQ ID No. 6 and SEQ ID No. 7; and
VHCDR2 is selected from the group consisting of SEQ ID No. 9, SEQ ID No. 10, SEQ ID No. 11 and SEQ 61;
when VHCDR1 is SEQ ID No. 3 or SEQ ID No. 4 and VHCDR2 comprises or consists of the amino acid sequence of SEQ ID No. 12 said heavy chain variable (VH) domain does not comprise a framework VHFR3 of SEQ ID No. 70, preferably with the proviso that said heavy chain variable (VH) domain comprises VHFR3 of SEQ ID No. 69; and
VHCDR3 is selected from the group consisting of SEQ ID No. 13, SEQ ID No. 14, SEQ ID No. 15 and SEQ ID No. 16; and
b) an antibody light chain variable (VL) domain comprising the three CDRs VLCDR1, VLCDR2 and VLCDR3, wherein:
VLCDR1 is selected from the group consisting of SEQ ID No. 17, SEQ ID No. 18, SEQ ID No. 19, SEQ ID No. 20, SEQ ID No. 21, SEQ ID No. 22 and SEQ ID No. 23; and
VLCDR2 is selected from the group consisting of SEQ ID No. 24, SEQ ID No. 25, SEQ ID No. 26, SEQ ID No. 27, SEQ ID No. 28, SEQ ID No. 29, SEQ ID No. 30, SEQ ID No. 31, SEQ ID No. 32 and SEQ ID No. 33; and
VLCDR3 is selected from the group consisting of SEQ ID No. 34, SEQ ID No. and SEQ ID No. 36.

Such antibody presents the same advantageous features as the antibodies defined according to the first aspect and the second aspect of the invention; i.e. high yield production, specific binding to an epitope located within the third extra loop of the chemerin-like Receptor 1, a Resolvin E1-like agonist capability.

The disclosed antibodies are suitable for being used in the treatment of a condition wherein the resolution of the inflammation is delayed or disrupted. All antibodies described herein are suitable for inducing the resolution of the inflammation, and/or enhancing resolution of the inflammation, and/or initiating resolution of the inflammation.

In the following disclosure, a humanized anti-CMKLR1 compound is considered as being either a humanized anti-CMKLR1 antibody or antigen-binding fragment thereof or antigen-binding antibody mimetic or modified antibody. In a particular embodiment of the invention, said compound is defined by the sequences of its CDR. In a more particular embodiment of the invention, the anti-CMKLR1 compound is an antibody defined by the sequences of its CDRs and its framework regions (FR). An anti-CMKLR1 compound is a compound which binds specifically to the Chemokine-like receptor 1 (CMKLR1). In the following disclosure, the terms Chemokine-like receptor 1, CMKLR1 and ChemR23 are used interchangeably, and all designate the receptor encoded by gene CMKLR1 in human or cmklr1 in non-human animals. In a particular embodiment of the invention, the anti-CMKLR1 compound binds specifically to human CMKLR1 or, in other words, the invention relates to an anti-human CMKLR1 compound. As used herein, the term "CMKLR1" refers to a Chemokine-Like Receptor 1 protein (also designated as chemR23), a member of the G-protein coupled receptor family from a mammal species, preferably a human CMKLR1. A reference sequence of the human CMKLR1 protein, used in the examples of the present application, corresponds to the sequence associated to the Uniprot Accession number Q99788 (SEQ ID No: 1).

In a particular aspect, the invention relates to an anti-CMKLR1 antibody or antigen-binding fragment thereof or antigen-binding antibody mimetic or modified antibody defined by at least one functional feature. In a preferred embodiment, said anti-CMKLR1 compound is defined by its capability to inhibit secretion of pro-inflammatory cytokines, in particular IL12, and/or its capability to enhance secretion of anti-inflammatory cytokines, in particular IL10. In a more particular embodiment, the anti-CMKLR1 compound inhibits or enhances cytokine secretion by macrophages, in particular by pro-inflammatory macrophages and/or by pro-resolution of the inflammation macrophages. In a particular embodiment, the anti-CMKLR1 compound of the invention enhances the polarization of macrophages into anti-inflammatory macrophages, in particular pro-resolution macrophages. In a particular embodiment, the anti-CMKLR1 compound of the invention enhances the apoptosis of neutrophils as compared to a control antibody.

In a particular aspect, the invention relates to an anti-CMKLR1 antibody or antigen-binding fragment thereof or antigen-binding antibody mimetic that has agonist properties towards the Resolvin E1 (RvE1)/CMKLR1 interaction, thereby mimicking at least one of the effects induced by the binding of RvE1 to CMKLR1 on CMKLR1-positive cells. "Agonist properties towards RvE1-CMKLR1 interaction" means that the antibody or antigen-binding fragment thereof or antigen-binding antibody mimetic or modified antibody of the invention, which targets the CMKLR1, has the effect of mimicking at least one of the effects provided by the binding of RvE1 to CMKLR1, thereby activating the receptor signaling pathway normally activated by RvE1, especially the binding of human RvE1 to human CMKLR1, in particular on dendritic cells, neutrophils, monocytes and macrophages. As a result of binding and activation of the receptor to produce a biological response, the compounds of the invention may lead to the activation of the G protein signaling pathway, in particular Gα, signaling pathway and/or Gαo, without activating the β-arrestin pathway. In particular, the compound of the invention may lead to the inhibition of the β-arrestin pathway. In particular, the binding of a compound according to the invention induces the activation of Akt and/or Erk protein(s) in vitro and/or in vivo. In a particular embodiment, the compound may be considered as an anti-CMKLR1 agonist having a Resolvin E1-like capability when the G-protein signaling pathway is activated in CMKLR1-positive cells stimulated with the compound of the invention, and in a more particular embodiment, also when the β-arrestin pathway is not activated, and in particular conditions, when the B-arrestin pathway is inhibited. In other words, a Resolvin-E1 like agonist antibody may be defined as an antibody able to bind CMKLR1, and thereby able to induce the phosphorylation of the Akt and/or Erk protein(s), as compared to a control antibody. A control antibody may be an antibody which does not specifically bind CMKLR1. Phosphorylation of a protein may be determined according to methods well known by the skilled artisan, for example by the method disclosed in the examples of the present description. In a particular embodiment, the compound of the invention enhances activation of the G protein pathway induced by CMKLR1. In another embodiment, the compound of the invention does not induce the activation of the β-arrestin pathway induced by CMKLR1. In another embodiment, the compound of the invention inhibits the β-arrestin pathway induced by CMKLR1. In another embodiment, since a compound of the invention induces at least one agonist effect of the binding of RvE1 to CMKLR1, and since RvE1 is a pro-resolution factor or pro-resolution mediator, a compound of the invention is a pro-resolution factor or a pro-resolution mediator; e.g. a pro-resolution factor may be defined as a compound which inhibits the β-arrestin pathway induced by CMKLR1 and/or enhances activation of the G protein pathway induced by CMKLR1 in CMKLR1-positive cells, as compared to a control compound, which is known for not specifically interacting with CMKLR1. The activation/inhibition of these pathways may be assessed according to the methods disclosed in the working examples of the invention. In a particular embodiment, the effect of the agonist compound is assessed in human cells.

In a particular embodiment, a compound of the invention does not interfere with the binding of Chemerin to CMKLR1. Chemerin is one of the natural ligand of CMKLR1. In other words, a compound according to the invention is not an agonist and/or not an antagonist of the interaction between Chemerin and CMKLR1. The absence of such an agonist and/or antagonist capability may be assessed according to the examples of the invention, wherein a competition assay to measure Chemerin-dependent Beta-arrestin recruitment by CMKLR1 receptor in presence of anti-CMKLR1 antibody of the invention is disclosed. In a preferred embodiment, the anti-CMKLR1 compound of the invention does not compete with Chemerin for the binding to CMKLR1. The absence of competition between an anti-CMKLR1 compound of the invention and chemerin may be determined when, in presence of the CMKLR1 compound of the invention, the binding of Chemerin to CMKLR1 is at least 50%, more preferably at least 80%, still more preferably at least 90% and most preferably similar, to the binding of Chemerin to CMKLR1, under the same experimental conditions but without the presence of the anti-CMKLR1 of the invention. Alternatively, the absence of competition between an anti-CMKLR1 compound of the invention and Chemerin may be determined according to the method illustrated in example 9.

In a particular embodiment, the anti-CMKLR1 compound has the capability in vitro and/or in vivo to activate at least one of the Akt signaling pathway proteins (also known as PI3K-Akt Pathway) and/or Erk signaling pathway proteins, preferably Akt protein and/or Erk protein, preferably both the Akt and the Erk proteins. Activation of a pathway may be assessed according to methods known in the art, and in particular with methods disclosed in the examples of the present invention.

DETAILED DESCRIPTION OF THE INVENTION

The present invention relates to an agonist of CMKLR1 having a Resolvin E1-like capability for use in the therapeutic treatment of an inflammatory condition in a patient, in particular an inflammatory condition wherein the resolution phase of the inflammation is delayed or disrupted, in particular in a chronic inflammation, in particular said agonist being selected from the group consisting of an antibody or antigen-binding fragment thereof, a peptide, a polypeptide and a protein.

In the following description, without any contrary mention, agonist of CMKLR1 having a Resolvin E1-like capability may be identified as the or a "agonist"; both terms include an antibody or antigen-bind fragment thereof (also reference anti-CMKLR1 antibody), a protein, a peptide or a polypeptide; the term compound or anti-CMKLR1 compound may also be used in the following description as a synonym of "agonist" (of the invention), thereby including an antibody or antigen-bind fragment thereof (also referred to as anti-CMKLR1 antibody), a protein, a peptide or a polypeptide. Among the effects provided by the use of such an agonist, the following particular effects have been demonstrated:

- an agonist of CMKLR1 having a Resolvin E1-like capability induces the apoptosis of polymorphonuclear neutrophils (also simply referenced neutrophils, PMN or PMNs herein), and/or the decrease or the inhibition of the migration capability of these cells, in particular through the inhibition of their capacity of transmigration through endothelium towards the site of inflammation as described later in the application
- an agonist of CMKLR1 having a Resolvin E1-like capability induces the internalization of different receptors expressed on the cell surface on various myeloid cells, notably macrophages and/or dendritic cells, thereby enhancing the processes which induce or sustain the resolution of the inflammation as described later in the application;
- in particular an agonist of CMKLR1 having a Resolvin E1-like capability induces the internalization of different receptors CMKLR1, and CXCR4 and/or CCR7 expressed on the cell surface of macrophages and/or dendritic cells, such internalization leading to the much lower targeting and recognition of the CXCR4, CCR7 receptors by cytokines known to induce the migration of the cells in direction to the site of inflammation, and as a consequence leading to the decrease or inhibition of the migration of macrophages and/or dendritic cells from the site of inflammation to secondary lymphoid organs and/or towards the site of inflammation;
- An agonist of CMKLR1 having a Resolvin E1-like capability decreases or inhibits the capability of neutrophils and macrophages and/or dendritic cells to migrate; in particular, it decreases or inhibits the ability of neutrophils to transmigrate through the site of inflammation by lowering the rolling capability of these cells due to the internalization and/or the decrease of cell surface expression of CD62L, reducing their ability to transmigrate through the endothelium;
- In a particular aspect of the invention, the inventors demonstrated that agonist of CMKLR1 having a Resolvin E1-like capability comprising a domain suitable for interaction with a Fc receptor, like IgG constant domain, in particular IgG1 constant domain, are particularly efficient. The Fc Receptors of macrophages or neutrophils recognize particularly very efficiently the Fc fragment of the anti-CMKLR1 IgG-constant domain, or IgG1 constant domain, leading or contributing to the apoptosis of the neutrophils recognized by the anti-CMKLR1 IgG1-antibodies
- The inventors herein demonstrate that myeloid cells which are involved in the inflammation process (i.e. which sustain inflammation) and which express CMKLR1, and CXCR4 and/or CCR7, are particularly suitable targets for an agonist of CMKLR1 having a Resolvin E1-like capability, for the treatment of a pathological inflammation process.

The invention relates especially to an agonist of anti-Chemerin Like Receptor 1 (CMKLR1) having a Resolvin E1-like capability, for use in the treatment of a patient suffering from an inflammatory condition, in particular an inflammatory condition wherein the resolution of inflammation is delayed or disrupted, wherein the agonist of CMKLR1 having a Resolvin E1-like capability is selected from the group consisting of an antibody or antigen-binding fragment thereof, a peptide, a polypeptide and a protein, and wherein the agonist:

- induces or activates the apoptosis of neutrophils at the site of inflammation, and/or
- inhibits or decreases the transmigration capability of neutrophils through endothelium towards the site of inflammation, and/or
- inhibits the migration of macrophages and/or of dendritic cells from the site of inflammation to secondary lymphoid organs and/or towards the site of inflammation.

The invention relates to the use of an agonist of CMKLR1 having a Resolvin E1-like capability, like an antibody, in particular a humanized antibody, or antigen-binding fragment thereof, to induce or enhance or activate the apoptosis of neutrophils, in the treatment of an inflammatory condition, in particular an inflammatory condition wherein the resolution of inflammation is delayed or disrupted.

In particular embodiment, the invention relates to a humanized anti-CMKLR1 antibody or antigen-binding fragment thereof or antigen-binding antibody mimetic or modified antibody.

As used herein, the term "antibody" comprises polyclonal antibodies, monoclonal antibodies or recombinant antibodies. As used herein, a "monoclonal antibody" is intended to refer to a preparation of antibody molecules to obtain antibodies which share a common heavy chain and common light chain amino acid sequence, in contrast with "polyclonal" antibody preparations which contain a mixture of antibodies of different amino acid sequence. Monoclonal antibodies can be generated by several known technologies like phage, bacteria, yeast or ribosomal display, as well as by classical methods exemplified by hybridoma-derived antibodies. They may also be synthetized using the disclosed amino acid sequences as reference. Thus, the term "monoclonal" is used to refer to all antibodies derived from one nucleic acid clone.

As used herein, the term "antibody" further comprises antibodies which have been modified as compared to a wild type antibody; and encompass chimeric antibodies, humanized antibodies, modified antibodies, and antigen-binding antibody mimetics. A particular wild type antibody of reference in the context of the invention is antibody 2G1.

The antibodies of the present invention include recombinant antibodies. As used herein, the term "recombinant antibody" refers to antibodies which are produced, expressed, generated or isolated by recombinant means, such as antibodies which are expressed using a recombinant expression vector transfected into a host cell; antibodies isolated from a recombinant combinatorial antibody library; antibodies isolated from an animal (e.g. a mouse) which is transgenic due to human immunoglobulin genes; or antibodies which are produced, expressed, generated or isolated in any other way in which particular immunoglobulin gene sequences (such as human immunoglobulin gene sequences) are assembled with other DNA sequences. Recombinant antibodies include, for example, chimeric and humanized antibodies.

As used herein, a "chimeric antibody" refers to an antibody in which the sequence of the variable domain derived from the germline of a mammalian species, such as a mouse, have been grafted onto the sequence of the constant domain derived from the germline of another mammalian species, such as a human.

As used herein, a "humanized antibody" refers in a first embodiment to an antibody in which CDR sequences derived from the germline of another mammalian species, such as a mouse, have been grafted onto human or especially humanized framework sequences. In a further embodiment, a "humanized antibody" refers to an antibody wherein at least one CDR and all or part of framework sequences have been humanized.

As used herein, an "antigen-binding fragment of an antibody" means a part of an antibody, i.e. a molecule corresponding to a portion of the structure of the antibody of the invention, that exhibits antigen-binding capability for CMKLR1, possibly in its native form; such fragment especially exhibits the same or substantially the same antigen-binding specificity for said antigen compared to the antigen-binding specificity of the corresponding four-chain antibody. Advantageously, the antigen-binding fragments have a similar binding affinity as the corresponding 4-chain antibodies. However, antigen-binding fragment that have a reduced antigen-binding affinity with respect to corresponding 4-chain antibodies are also encompassed within the invention. The antigen-binding capability can be determined by measuring the affinity between the antibody and the target fragment. These antigen-binding fragments may also be designated as "functional fragments" of antibodies.

Antigen-binding fragments of antibodies are fragments which comprise their hypervariable domains designated CDRs (Complementary Determining Regions) or part(s) thereof encompassing the recognition site for the antigen, i.e. the extracellular domain of CMKLR1, in particular the third loop of the extracellular domain of CMKLR1 (designated EL3), thereby defining antigen recognition specificity. EL3 is localized between amino acid residue 283 and amino acid residue 300 of SEQ ID No: 1. The amino acid sequence of the EL3 domain is the amino acid sequence of SEQ ID No: 2. EL3 is also comprised within the polypeptide of SEQ ID No: 52. Each Light and Heavy chain variable domains (respectively VL and VH) of a four-chain immunoglobulin has three CDRs designated VLCDR1, VLCDR2 and VLCDR3 for the light chain variable domain; and VHCDR1, VHCDR2, VHCDR3 for the heavy chain variable domain. Each Light chain and Heavy chain variable domains of a four-chain immunoglobulin has four framework regions (FR), designated LFR1, LFR2, LFR3 and LFR4 for the light chain variable domain; and HFR1, HFR2, HFR3 and HFR4 for the heavy chain variable domain. The nomenclature system used for defining the CDR domains and the framework domains is the kabat system.

The skilled person is able to determine the location of the various regions/domains of antibodies by reference to the standard definitions in this respect set forth, including a reference numbering system, a reference to the numbering system of KABAT or by application of the IMGT "collier de perle" algorithm. In this respect, for the definition of the sequences of the invention, it is noted that the delimitation of the regions/domains may vary from one reference system to another. Accordingly, the regions/domains as defined in the present invention encompass sequences showing variations in length or localization of the concerned sequences within the full-length sequence of the variable domains of the antibodies, of approximately +/-10%.

Based on the structure of four-chain immunoglobulins, antigen-binding fragments can thus be defined by comparison with sequences of antibodies in the available databases and prior art, and especially by comparison of the location of the functional domains in these sequences, noting that the positions of the framework and constant domains are well defined for various classes of antibodies, especially for IgGs, in particular for mammalian IgGs. Such comparison also involves data relating to 3-dimensional structures of antibodies.

For illustration purpose of specific embodiments of the invention, antigen binding fragments of an antibody that contain the variable domains comprising the CDRs of said antibody encompass Fv, dsFv, scFv, Fab, Fab', F(ab')2. Fv fragments consist of the VL and VH domains of an antibody associated together by hydrophobic interactions; in dsFv fragments, the VH:VL heterodimer is stabilized by a disulphide bond; in scFv fragments, the VL and VH domains are connected to one another via a flexible peptide linker thus forming a single-chain protein. Fab fragments are monomeric fragments obtainable by papain digestion of an antibody; they comprise the entire L chain, and a VH-CH1 fragment of the H chain, bound together through a disulfide bond. The F(ab')2 fragment can be produced by pepsin digestion of an antibody below the hinge disulfide; it comprises two Fab' fragments, and additionally a portion of the hinge region of the immunoglobulin molecule. The Fab' fragments are obtainable from F(ab')2 fragments by cutting a disulfide bond in the hinge region. F(ab')2 fragments are divalent, i.e. they comprise two antigen binding sites, like the native immunoglobulin molecule; on the other hand, Fv (a VHVL dimmer constituting the variable part of Fab), dsFv, scFv, Fab, and Fab' fragments are monovalent, i.e. they comprise a single antigen-binding site. These basic antigen-binding fragments of the invention can be combined together to obtain multivalent antigen-binding fragments, such as diabodies, tribodies or tetrabodies. These multivalent antigen-binding fragments are also part of the present invention.

As used herein, the term modified antibody includes "bispecific" antibodies and refers to antibodies that recognize two different antigens by virtue of possessing at least one region (e.g. derived from a variable region of a first antibody) that is specific for a first antigen, and at least a second region (e.g. derived from a variable region of a second antibody) that is specific for a second antigen. A bispecific antibody specifically binds to two target antigens and is thus one type of multispecific antibody. Multispecific antibodies, which recognize two or more different antigens, can be produced by recombinant DNA methods or include, but are not limited to, antibodies produced chemically by any convenient method. Bispecific antibodies include all antibodies or conjugates of antibodies, or polymeric forms of antibodies which are capable of recognizing two different antigens. Bispecific antibodies include antibodies that have been reduced and reformed so as to retain their bivalent characteristics and to antibodies that have been chemically coupled so that they can have several antigen recognition sites for each antigen such as BiME (Bispecific Macrophage Enhancing antibodies), BiTE (bispecific T cell engager), DART (Dual affinity retargeting); DNL (dock-and-lock), DVD-Ig (dual variable domain immunoglobulins), HAS (human serum albumin), kih (knobs into holes).

Antigen-binding antibody mimetics are organic compounds that specifically bind antigens, but that are not structurally related to antibodies. They are usually artificial peptides or small proteins with a molar mass of about 3 to 20 kDa. Nucleic acids and small molecules are sometimes considered antibody mimetics as well, but not artificial antibodies, antibody fragments and fusion proteins composed from these. Common advantages over antibodies are better solubility, tissue penetration, stability towards heat and enzymes, and comparatively low production costs. Antibody mimetics are being developed as therapeutic and diagnostic agents. Antigen-binding antibody mimetics may also be selected among the group comprising affibodies, affilins, affimers, affitins, DARPins, and Monobodies.

An antigen-binding antibody mimetic is more preferentially selected from the groups comprising affitins and anticalins. Affitins are artificial proteins with the ability to selectively bind antigens. They are structurally derived from the DNA binding protein Sac7d, found in *Sulfolobus acidocaldarius*, a microorganism belonging to the archaeal domain. By randomizing the amino acids on the binding surface of Sac7d, e.g. by generating variants corresponding to random substitutions of 11 residues of the binding interface of Sac7d, an affitin library may be generated and subjecting the resulting protein library to rounds of ribosome display, the affinity can be directed towards various targets, such as peptides, proteins, viruses and bacteria. Affitins are antibody mimetics and are being developed as tools in biotechnology. They have also been used as specific inhibitors for various enzymes (Krehenbrink et al., J. mol. Biol., 383:5, 2008). The skilled person may readily develop affitins with the required binding properties using methods know in the art, in particular as disclosed in patent application WO2008068637 and the above-cited publication, in particular the generation of phage display and/or ribosome display libraries and their screening using an antigen as disclosed herein. Anticalins are artificial proteins that are able to bind to antigens, either to proteins or to small molecules. They are antibody mimetics derived from human lipocalins which are a family of naturally binding proteins. Anticalins are about eight times smaller with a size of about 180 amino acids and a mass of about 20 kDa (Skerra, Febs J., 275:11, 2008). Anticalin phage display libraries have been generated which allow for the screening and selection, in particular of anticalins with specific binding properties. The skilled person may readily develop anticalins with the required binding properties using methods know in the art, in particular as disclosed in EP patent EP1270725 B1, US patent U.S. Pat. No. 8,536,307 B2, Schlehuber and Skerra, Biophys. Chem., 96:2-3, 2002 and the above-cited publication, in particular the generation of phage display and/or ribosome display libraries and their screening using an antigen as disclosed herein. Anticalins and affitins may both be produced in a number of expression system comprising bacterial expression systems. Thus, the invention includes the use of affitins, anticalins and other similar antibody mimetics with the features of the antibodies described herein, in particular with regard to their binding capability to CMKLR1, to their agonist capability towards the binding between RvE1 and CMKLR1, their capability to induce or inhibit secretion of particular cytokines as described herein, to their use in the treatment or the prevention of a disease as described herein, all of which are contemplated as mimetics according to the invention.

As used herein, a "modified antibody" refers to antibodies the amino sequence of which has been modified by mutation of at least one amino acid residue. Accordingly, "modified antibody" encompasses chimeric antibodies or humanized antibodies as defined herein, "modified antibody" may also correspond to a molecule comprising an antibody or an antigen-binding fragment thereof, wherein said monoclonal antibody or functional fragment thereof is associated with a functionally different molecule. A modified antibody of the invention may be either a fusion chimeric protein or a conjugate resulting from any suitable form of attachment including covalent attachment, grafting, chemical bonding with a chemical or biological group or with a molecule, such as a PEG polymer or another protective group or molecule suitable for protection against proteases cleavage in vivo, for improvement of stability and/or half-life of the antibody or functional fragment.

"Humanized" forms of non-human (e.g., murine) antibodies are chimeric immunoglobulins, immunoglobulin chains or fragments thereof (such as Fv, Fab, Fab', F(ab')2 or other target-binding subsequences of antibodies) which contain minimal sequence derived from non-human immunoglobulin. In general, the humanized antibody will comprise substantially all of at least one, and typically two, variable domains, in which all the CDR regions correspond to those of a non-human immunoglobulin and/or humanized version of those; and all or substantially all of the FR regions are those of a human immunoglobulin template sequence or harbors substitution of non-human residues (such as rodent residues) for amino acid residues present in the human immunoglobulin template sequence at the corresponding location. The humanized antibody may also comprise at least a portion of an immunoglobulin constant region (Fc), typically that of a human immunoglobulin template chosen. In a particular embodiment, the invention relates to an antibody comprising a heavy chain variable region as disclosed herein and a light chain variable region as disclosed herein, the heavy chain variable region and/or the light chain variable region further comprising a constant region, in particular a Fc region.

The terms "Specifically binding" and "specifically bind to" refer to the ability of an antibody, antigen-binding fragment thereof, antigen-binding antibody mimetic or a modified antibody according to the invention to bind to CMKLR1 with an affinity of at least $1\times10^{-6}$ M, $1\times10^{-7}$ M, $1\times10^{-8}$ M, $1\times10^{-9}$ M, $1\times10^{-10}$ M, $1\times10^{-11}$ M, $1\times10^{-12}$ M, or more, and/or to bind to CMKLR1 with an affinity which is at least two-fold greater to its affinity for a non-specific target (e.g. another protein than CMKLR1). The affinity may be assessed according to various methods well known from those skilled in the art. These methods include but are not limited to biosensors such as Biacore analysis, Blitz analysis and Scatchard plot.

The term "therapeutically effective amount" is used to refer to an amount of any given compound as defined herein sufficient for at least the improvement of the clinical or physiological condition of a treated patient. The therapeutically effective amount of the antibody, antigen-binding fragment thereof, antigen-binding antibody mimetic or modified antibody according to the invention to be administered is governed by considerations such as the disorder being treated, the particular mammal being treated, the clinical condition of the individual patient, the cause of the disorder, the site of delivery of the agent, the method of administration, the scheduling of administration, and other factors known to medical practitioners.

All the embodiments disclosed herein for antibodies or antigen-binding fragments thereof are transposed mutatis mutandis to macromolecules of the invention, in particular to antigen-binding antibody mimetics and to modified antibodies.

In a particular embodiment of the invention, the CMKLR1 is a human CMKLR1, which corresponds to NCBI Protein accession number Q99788.2.

A heavy chain variable domain and a light chain variable domain both comprise 3 CDRs (CDR1, CDR2 and CDR3 from 5' end to 3' end respectively) and 4 framework regions (FR1, FR2, FR3 and FR4 from 5' end to 3' end respectively). Humanization of the murine antibody may consist of humanizing at least one framework region within the light chain variable region and/or within the heavy chain variable region or both. In a particular embodiment, several framework regions may be humanized, in particular within the heavy chain variable region and within the light chain variable region. The wild type CDRs may be conserved, but the CDRs may also be replaced by the CDRs described herein. Hence, the anti-CMKLR1 compound according to the invention may comprise at least 1, or at least 2, or at least 3 or at least 4, or at least 5, or 6 wild type CDRs when the framework regions are humanized. In other words, the anti-CMKLR1 compound is a humanized version of the parental chimeric antibody 2G1 (which comprises the heavy chain variable domain of SEQ ID No. 37 and the light chain variable domain of SEQ ID No. 49), wherein at least 1 framework region is humanized, in particular wherein at least 1 framework region and at least 1 CDR are humanized. In a particular embodiment of the invention, the variable regions of the antibody may be associated with antibody constant regions, like IGg1, IgG2, IgG3 or IgG4 constant regions, especially IgG1 constant region. These constant regions may be further mutated or modified, by methods known in the art, for modifying their binding capability towards Fc receptor. In a particular embodiment, the antibody or antigen-binding fragment thereof according to the invention is a humanized monoclonal antibody, in particular wherein the antibody light chain constant domain is derived from a human kappa light chain constant domain, in particular wherein the light chain constant domain comprises or consists of the sequence of SEQ ID No: 79, and wherein the antibody heavy chain constant domain is derived from a human IgG1, IgG2, IgG3, or IgG4 heavy chain constant domain, especially IgG1 heavy chain constant domain in particular wherein the antibody heavy chain constant domain comprises or consists of the amino acid sequence of SEQ ID 80, SEQ ID No. 81, SEQ ID No. 82, SEQ ID No. 83 or SEQ ID No. 84, in particular from a human IgG1 heavy chain constant domain, in particular wherein the antibody heavy chain constant domain comprises or consists of the amino acid sequence of SEQ ID No:80 or SEQ ID No. 83.

The binding to the polypeptide comprising or consisting of amino acid residues of sequence SEQ ID No: 2 and/or SEQ Id No: 59 and/or located within amino acid sequence SEQ ID No 60 and/or for the binding to the third extra-loop of CMKLR1 may be assessed by the examples disclosed in the examples of the invention by binding affinity analysis by ELISA assays. To determine if a test antibody can compete for binding to the same antigen or to the third loop or to the same epitope bound by the 2G1 antibody (or an antigen-binding fragment comprising the heavy variable domain corresponding to SEQ ID No: 37 and the light chain domain corresponding to SEQ ID No: 49), a cross-blocking assay (e.g. a competitive ELISA assay) can be performed. In an exemplary competitive ELISA assay, a polypeptide comprising or consisting of the epitope or the third loop may be coated on the wells of a microtiter plate and pre-incubated with or without candidate competing antibody and then a biotin-labeled 2G1 antibody of the invention is added. The amount of labeled anti-2G1 antibody bound to the polypeptide comprising or consisting of the polypeptide of SEQ ID No: 2 and/or SEQ Id No: 59 and/or located within amino acid sequence SEQ ID No 60 and/or the third loop of CMKLR1 in the wells is measured using avidin-peroxidase conjugate and appropriate substrate. The antibody can be labeled with a radioactive or fluorescent label or some other detectable and measurable label. The amount of labeled anti-2G1 antibody that bound to the polypeptide of SEQ ID No: 2 and/or SEQ Id No: 59 and/or located within amino acid sequence SEQ ID No 60 and/or to the third loop will have an indirect correlation to the ability of the candidate competing antibody (test antibody) to compete for binding to the same epitope or to the same loop, i.e., the greater the affinity of the test antibody for the same epitope, the less labeled 2G1 antibody will be bound to the antigen-coated wells. A candidate competing antibody is considered an antibody that competes for binding to the same polypeptide or third loop as 2G1 antibody of the invention when the candidate antibody can block binding of the 2G1 antibody by at least 20%, preferably by at least 20-50%, even more preferably, by at least 50% as compared to a control performed in parallel in the absence of the candidate competing antibody (but may be in the presence of a known non-competing antibody). It will be understood that variations of this assay can be performed to arrive at the same quantitative value.

The anti-CMKLR1 antibody or antigen-binding fragment thereof has an effect of a pro-resolution factor of inflammation, in particular has such an effect by interacting with myeloid cell lineages.

In a particular embodiment of the invention, a particular VHCDR2 is present in antibodies which may present a reduced immunogenicity in human, thereby allowing the provision of antibodies which may be more potent for therapeutic purposes, since less side-effects are expected when reduced-immunogenic antibodies are administered to a patient.

In a particular aspect of the invention, it is disclosed anti-Chemokine Like Receptor 1 (CMKLR1) antibody or an antigen-binding fragment thereof which binds to CMKLR1, in particular human CMKLR1, said antibody of antigen-binding fragment thereof comprising:
  a. an antibody heavy chain variable (VH) domain comprising the three CDRs VHCDR1, VHCDR2 and VHCDR3, wherein:
  VHCDR1 is selected from the group consisting of SEQ ID No.3, SEQ ID No. 4, SEQ ID No. 5, SEQ ID No. 6 and SEQ ID No. 7;
  VHCDR2 is selected from the group consisting of SEQ ID No. 9, SEQ ID No. 10, SEQ ID No. 11, SEQ ID No. 12 and SEQ ID No. 61;
  VHCDR3 is selected from the group consisting of SEQ ID No. 13, SEQ ID No. 14, SEQ ID No. 15 and SEQ ID No. 16;
  b. an antibody light chain variable (VL) domain comprising the three CDRs VLCDR1, VLCDR2 and VLCDR3, wherein:
  VLCDR1 is selected from the group consisting of SEQ ID No. 17, SEQ ID No. 18, SEQ ID No. 19, SEQ ID No. 20, SEQ ID No. 21, SEQ ID No. 22 and SEQ ID No. 23;
  VLCDR2 is selected from the group consisting of SEQ ID No. 24, SEQ ID No. 25, SEQ ID No. 26, SEQ ID No. 27, SEQ ID No. 28, SEQ ID No. 29, SEQ ID No. 30, SEQ ID No. 31, SEQ ID No. 32 and SEQ ID No. 33;
  VLCDR3 is selected from the group consisting of SEQ ID No. 34, SEQ ID No. 35 and SEQ ID No. 36.

In particular, the antibody or antigen-binding fragment thereof binds specifically to an epitope located within the third extra-cellular loop (EL3) of CMKLR1, more particularly the antibody or antigen-binding fragment thereof binds specifically to a polypeptide comprising amino acid sequence SEQ ID No: 2 or SEQ ID No. 59 or to an epitope located within amino acid sequence SEQ ID No. 60.

In another particular aspect of the invention, it is disclosed anti-Chemokine Like Receptor 1 (CMKLR1) antibody or an antigen-binding fragment thereof which binds to CMKLR1, in particular human CMKLR1, said antibody of antigen-binding fragment thereof comprising:

a. an antibody heavy chain variable (VH) domain comprising the three CDRs VHCDR1, VHCDR2 and VHCDR3, wherein:
VHCDR1 is selected from the group consisting of SEQ ID No.3, SEQ ID No. 4, SEQ ID No. 5, SEQ ID No. 6 and SEQ ID No. 7;
VHCDR2 is selected from the group consisting of SEQ ID No. 9, SEQ ID No. 10, SEQ ID No. 11 and SEQ ID No. 61; or VHCDR2 corresponds to the amino acid residues of SEQ ID No. 12 or SEQ ID No. 63 with the proviso that VHCDR1 is not SEQ ID No. 3 or SEQ ID No. 4;
VHCDR3 is selected from the group consisting of SEQ ID No. 13, SEQ ID No. 14, SEQ ID No. 15 and SEQ ID No. 16;
b. an antibody light chain variable (VL) domain comprising the three CDRs VLCDR1, VLCDR2 and VLCDR3, wherein:
VLCDR1 is selected from the group consisting of SEQ ID No. 17, SEQ ID No. 18, SEQ ID No. 19, SEQ ID No. 20, SEQ ID No. 21, SEQ ID No. 22 and SEQ ID No. 23;
VLCDR2 is selected from the group consisting of SEQ ID No. 24, SEQ ID No. 25, SEQ ID No. 26, SEQ ID No. 27, SEQ ID No. 28, SEQ ID No. 29, SEQ ID No. 30, SEQ ID No. 31, SEQ ID No. 32 and SEQ ID No. 33;
VLCDR3 is selected from the group consisting of SEQ ID No. 34, SEQ ID No. 35 and SEQ ID No. 36.

In particular, the antibody or antigen-binding fragment thereof binds specifically to an epitope located within the third extra-cellular loop (EL3) of CMKLR1, more particularly the antibody or antigen-binding fragment thereof binds specifically to a polypeptide comprising amino acid sequence SEQ ID No: 2 or SEQ ID No. 59 or to an epitope located within amino acid sequence SEQ ID No. 60.

In another particular aspect of the invention, it is disclosed anti-Chemokine Like Receptor 1 (CMKLR1) antibody or an antigen-binding fragment thereof which binds to CMKLR1, in particular human CMKLR1, said antibody of antigen-binding fragment thereof comprising:
a. an antibody heavy chain variable (VH) domain comprising the three CDRs VHCDR1, VHCDR2 and VHCDR3, wherein:
VHCDR1 is selected from the group consisting of SEQ ID No.3, SEQ ID No. 4, SEQ ID No. 5, SEQ ID No. 6 and SEQ ID No. 7;
VHCDR2 is selected from the group consisting of SEQ ID No. 9, SEQ ID No. 10, SEQ ID No. 11 and SEQ ID No. 61;
when VHCDR1 is SEQ ID No. 3 or SEQ ID No. 4 and VHCDR2 corresponds to the amino sequence of SEQ ID NO: 12 said heavy chain variable (VH) domain does not comprise a framework VHFR3 of SEQ ID No. 70, preferably with the proviso that said heavy chain variable (VH) domain comprises a framework FR3 of SEQ ID NO: 69, and
VHCDR3 is selected from the group consisting of SEQ ID No. 13, SEQ ID No. 14, SEQ ID No. 15 and SEQ ID No. 16;
b. an antibody light chain variable (VL) domain comprising the three CDRs VLCDR1, VLCDR2 and VLCDR3, wherein:
VLCDR1 is selected from the group consisting of SEQ ID No. 17, SEQ ID No. 18, SEQ ID No. 19, SEQ ID No. 20, SEQ ID No. 21, SEQ ID No. 22 and SEQ ID No. 23;
VLCDR2 is selected from the group consisting of SEQ ID No. 24, SEQ ID No. 25, SEQ ID No. 26, SEQ ID No. 27, SEQ ID No. 28, SEQ ID No. 29, SEQ ID No. 30, SEQ ID No. 31, SEQ ID No. 32 and SEQ ID No. 33;
VLCDR3 is selected from the group consisting of SEQ ID No. 34, SEQ ID No. 35 and SEQ ID No. 36.

In particular, the antibody or antigen-binding fragment thereof binds specifically to an epitope located within the third extra-cellular loop (EL3) of CMKLR1, more particularly the antibody or antigen-binding fragment thereof binds specifically to a polypeptide comprising amino acid sequence SEQ ID No: 2 or SEQ ID No. 59 or to an epitope located within amino acid sequence SEQ ID No. 60.

The binding to the epitope located within the third extra-cellular loop (EL3) of CMKLR1, in particular wherein the antibody or antigen-binding fragment thereof binds specifically to a polypeptide comprising amino acid sequence SEQ ID No: 2 or SEQ ID No. 59 or to an epitope located within amino acid sequence of SEQ ID No. 60, may be assessed according to the method disclosed here above. The particular selection of VHCDR2 may allow the provision of antibodies with a reduced immunogenicity as compared to antibodies which have a different VHCDR2.

Such an antibody is an agonist of CMKLR1 mimicking the effect of a binding of Resolvin E1 to CMKLR1' i.e. having a Resolvin E1-like capability as defined here above. The anti-CMKLR1 antibody or antigen-binding fragment thereof has an effect of a pro-resolution factor of inflammation, in particular has such an effect by interacting with myeloid cell lineages.

In a particular embodiment of the invention, the anti-CMKLR1 antibody or an antigen-binding fragment thereof comprises:
VHCDR1 selected from the group consisting of SEQ ID No. 3 and SEQ ID No. 4.

In a particular embodiment of the invention, the anti-CMKLR1 antibody or an antigen-binding fragment thereof comprises:
VHCDR2 selected from the group consisting of SEQ ID No. 9, SEQ ID No. 10, SEQ ID No. 11 and SEQ ID No. 61.

In a particular embodiment of the invention, the anti-CMKLR1 antibody or an antigen-binding fragment thereof comprises:
VHCDR3 selected from the group consisting of SEQ ID No. 13, SEQ ID No. 14 and SEQ ID No. 15.

In a particular embodiment of the invention, the anti-CMKLR1 antibody or an antigen-binding fragment thereof comprises:
VLCDR1 selected from the group consisting of SEQ ID No. 17, SEQ ID No. 18, SEQ ID No. 19 and SEQ ID No. 23.

In a particular embodiment of the invention, the anti-CMKLR1 antibody or an antigen-binding fragment thereof comprises:
VLCDR2 selected from the group consisting of SEQ ID No. 24, SEQ ID No. 25, SEQ ID No. 26, SEQ ID No. 27 and SEQ ID No. 33.

In a particular embodiment of the invention, the anti-CMKLR1 antibody or an antigen-binding fragment thereof comprises:
VLCDR3 selected from the group consisting of SEQ ID No. 34, SEQ ID No. 35 and SEQ ID No. 36.

In a particular embodiment of the invention, the anti-CMKLR1 antibody or an antigen-binding fragment thereof comprises:

VHCDR1 selected from the group consisting of SEQ ID No. 3 and SEQ ID No. 4; and/or VHCDR2 selected from the group consisting of SEQ ID No. 9, SEQ ID No. 10, SEQ ID No. 11 and SEQ ID No. 61; and/or VHCDR3 selected from the group consisting of SEQ ID No. 13, SEQ ID No. 14 and SEQ ID No. 15.

VLCDR1 selected from the group consisting of SEQ ID No. 17, SEQ ID No. 18, SEQ ID No. 19 and SEQ ID No. 23, and/or VLCDR2 selected from the group consisting of SEQ ID No. 24, SEQ ID No. 25, SEQ ID No. 26, SEQ ID No. 27 and SEQ ID No. 33; and/or VLCDR3 selected from the group consisting of SEQ ID No. 34, SEQ ID No. 35 and SEQ ID No. 36.

In a particular embodiment, the anti-CMKLR1 antibody or an antigen-binding fragment thereof comprises the following CDRs: VHCDR1 of SEQ ID NO: 4, VHCDR2 of SEQ ID NO: 12, VHCDR3 of SEQ ID NO: 13, VLCDR1 of SEQ ID NO: 19, VLCDR2 of SEQ ID NO: 26 and VLCDR3 of SEQ ID NO: 35.

In a particular embodiment of the invention, the anti-CMKLR1 antibody or an antigen-binding fragment thereof comprises a heavy chain variable domain comprising or consisting of an amino acid sequence selected from the group consisting of SEQ ID No. 38, SEQ ID No. 39, SEQ ID No. 40, SEQ ID No. 62, SEQ ID No. 89, SEQ ID No. 90 and SEQ ID No. 91.

In a more particular embodiment, the anti-CMKLR1 antibody or an antigen-binding fragment thereof comprises a heavy chain variable domain comprising or consisting of an amino acid sequence of SEQ ID No. 91.

In a particular embodiment of the invention, the anti-CMKLR1 antibody or an antigen-binding fragment thereof comprises a light chain variable domain comprising or consisting of an amino acid sequence selected from the group consisting of SEQ ID No. 49, SEQ ID No. 50, SEQ ID No. 51, SEQ ID No. 52, SEQ ID No. 53, SEQ ID No. 54, SEQ ID No. 55, SEQ ID No. 56, SEQ ID No. 57, SEQ ID No. 58, SEQ ID No. 92 and SEQ ID No. 93.

In a more particular embodiment of the invention, the anti-CMKLR1 antibody or an antigen-binding fragment thereof comprises a light chain variable domain comprising or consisting of an amino acid sequence of SEQ ID No. 93.

In a particular embodiment of the invention, the anti-CMKLR1 antibody or an antigen-binding fragment thereof comprises:
a heavy chain variable domain comprising or consisting of an amino acid sequence selected from the group consisting of SEQ ID No. 38, SEQ ID No. 39, SEQ ID No. 40, SEQ ID No. 62, SEQ ID No. 89, SEQ ID No. 90 and SEQ ID No. 91; and
a light chain variable domain comprising or consisting of an amino acid sequence selected from the group consisting of SEQ ID No. 49, SEQ ID No. 50, SEQ ID No. 51, SEQ ID No. 52, SEQ ID No. 53, SEQ ID No. 54, SEQ ID No. 55, SEQ ID No. 56, SEQ ID No. 57, SEQ ID No. 58, SEQ ID No. 92 and SEQ ID No. 93.

Any combination of a particular heavy chain variable domain and a light chain variable domain as disclosed herein is encompassed by the present disclosure.

In a more particular embodiment, the anti-CMKLR1 antibody or an antigen-binding fragment thereof according to the invention comprises a heavy chain variable domain comprising or consisting of the amino acid residues selected from the group consisting of 38, SEQ ID No. 39, SEQ ID No. 40, and SEQ ID No. 62; and a light chain variable domain comprising or consisting of an amino acid sequence selected from the group consisting of SEQ ID No. 54, SEQ ID No. 55 and SEQ ID No. 56.

In a more particular embodiment of the invention, the anti-CMKLR1 antibody or an antigen-binding fragment thereof comprises a heavy chain variable domain comprising or consisting of an amino acid sequence SEQ ID No. 38 and a light chain variable domain of SEQ ID No. 49.

In a more particular embodiment of the invention, the anti-CMKLR1 antibody or an antigen-binding fragment thereof comprises a heavy chain variable domain comprising or consisting of an amino acid sequence of SEQ ID No. 91, and a light chain variable domain comprising or consisting of an amino acid sequence of SEQ ID No. 93.

In addition said antibody is advantageously characterized in that its Fc fragment is characteristic of an IgG1.

In a second aspect of the invention, it is disclosed a compound selected from the group of an antibody, an antigen-binding fragment thereof or a chimeric, modified or humanized antibody, which specifically binds to CMKLR1, in particular human CMKLR1, said compound comprising an antibody heavy chain variable domain comprising (i) VHCDR2 comprising or consisting of an amino acid sequence set forth in SEQ ID No: 9, SEQ ID No. 10, SEQ ID No. 11, SEQ ID No. 12 and SEQ ID No. 61, and (ii) VHCDR3 comprising or consisting of an amino acid sequence set forth in SEQ ID No: 13, SEQ ID No. 14, SEQ ID No. 15 and SEQ ID No. 16 or a mutated sequence thereof wherein amino acid residue(s) is(are) substituted provided that amino acid residues at positions 1 and 2 of the mutated sequence are respectively L and I; and
wherein the anti-CMKLR1 compound binds specifically to an epitope located within the third extra-cellular loop (EL3) of CMKLR1, in particular wherein the compound binds specifically to a polypeptide comprising or consisting of amino acid sequence SEQ ID No: 2 or SEQ ID No. 59 or to an epitope located within amino acid sequence SEQ ID No. 60; and
wherein said compound competes with an antibody comprising the heavy chain variable domain corresponding to SEQ ID No: 37 and the light chain variable domain corresponding to SEQ ID No: 49, for the binding to a polypeptide comprising or consisting of amino acid sequence of sequence SEQ ID No: 2 or SEQ ID No. 59 or of sequence SEQ ID No. 60 or to a polypeptide comprising or consisting of the third loop (EL3) of the extracellular domain of CMKLR1.

The combination of the heavy chain variable domain of SEQ ID No. 37 and light chain variable domain of SEQ ID No. 49 corresponds to the parental antibody 2G1. The binding of the compound to a polypeptide comprising or consisting of amino acid sequence of sequence SEQ ID No: 2 or SEQ ID No. 59 or located within SEQ ID No. 60 or to a polypeptide comprising or consisting of the third loop (EL3) of the extracellular domain of CMKLR1 may be assessed according to the method disclosed here above, and illustrated in the examples of the invention.

In a more particular embodiment, the anti-CMKLR1 antibody or an antigen-binding fragment thereof comprises a heavy chain variable domain comprising or consisting of an amino acid sequence of SEQ ID No. 91.

In a more particular embodiment of the invention, the anti-CMKLR1 antibody or an antigen-binding fragment thereof comprises a light chain variable domain comprising or consisting of an amino acid sequence of SEQ ID No. 93.

In a more particular embodiment of the invention, the anti-CMKLR1 antibody or an antigen-binding fragment thereof comprises a heavy chain variable domain comprising or consisting of an amino acid sequence of SEQ ID No. 91, and a light chain variable domain comprising or consisting of an amino acid sequence of SEQ ID No. 93.

In addition said antibody is advantageously characterized in that its Fc fragment is characteristic of an IgG1.

The invention relates to any of the above defined compound of the invention, for use in the prevention and/or the treatment of a disease wherein the resolution of inflammation is delayed or disrupted, and/or a disease selected from the group of inflammatory diseases, in particular acute inflammatory diseases, chronic inflammatory diseases such as chronic inflammatory pulmonary diseases (e.g asthma), keratoconjunctivitis, periodontal disease, eczema, inflammatory bowel disease, in particular Crohn's disease or colitis, in particular ulcerative colitis or spontaneous colitis, cystic fibrosis, cutaneous inflammation; autoimmune diseases such as diabetes, NASH, in particular type I diabetes, psoriasis, lupus, rheumatoid arthritis, multiple sclerosis, Sjögren's syndrome, celiac disease, vasculitis, myasthenia gravis; infection diseases such as sepsis, severe viral indications with severe inflammatory conditions, such as coronavirus (e.g. COVID-19), peritonitis; degenerative diseases; wound healing disorders, dry eye syndrome; cancer diseases, in particular solid and liquid cancers, metastatic cancers, in particular carcinoma, in particular mammary carcinoma or colon carcinoma, or colorectal cancer or lung cancer or mesothelioma, or myeloid cancer, in particular leukemia, in particular a cancer wherein cancer cells express CMKLR1 or where the microenvironment of the tumor is invaded by cells expressing or overexpressing CMKLR1.

Fibrosis (notably lung and hepatic fibrosis), ANCA (Anti neutrophil Cytoplasmic Autoantibodies) pathologies (vasculitis), and pathologies due to apoptosis of neurons linked to ChermR23 are in particular concerned.

In a particular embodiment, the invention relates to any of the above defined compound of the invention, for use in the prevention and/or the treatment of a disease wherein the resolution of inflammation is delayed or disrupted, and/or a disease selected from the group of inflammatory diseases, in particular acute inflammatory diseases, chronic inflammatory diseases such as asthma, keratoconjunctivitis, periodontal disease, eczema, inflammatory bowel disease, in particular Crohn's disease or colitis, in particular ulcerative colitis or spontaneous colitis; cystic fibrosis, autoimmune diseases such as diabetes, in particular type I diabetes, psoriasis, lupus, rheumatoid arthritis, multiple sclerosis, Sjögren's syndrome, celiac disease, vasculitis, myasthenia gravis; infection diseases such as sepsis, peritonitis; severe viral indications with severe inflammatory conditions, such as coronavirus (e.g. COVID-19), degenerative diseases; wound healing disorders, NASH (Nonalcoholic steatohepatitis), scleroderma, and dry eye syndrome. In another particular embodiment of the invention, the invention relates to any of the above defined compound of the invention, for use in the prevention and/or the treatment of a cancer, in particular solid and liquid cancers, metastatic cancers, in particular carcinoma, in particular mammary carcinoma or colon carcinoma, or colorectal cancer or lung cancer or myeloid cancer, in particular leukemia, in particular a cancer wherein cancer cells express CMKLR1 or where the microenvironment of the tumor is invaded by cells expressing or overexpressing CMKLR1.

In a particular embodiment, the antibody of the invention elicits at least one of the following effect in favor of resolution in vitro and/or in vivo:

- increases the apoptosis of polymorphonuclear neutrophils, referenced herein under the acronym PMN or PMNs, on the inflammation site; such an effect is illustrated in the examples of the invention. The regulation of apoptosis of neutrophils is crucial for therapeutic intervention in inflammatory related-diseases. As illustrated in the examples of the invention, the use of an agonist of CMKLR1 having Resolvin E1-like capability antibody on PMNs induces a strong apoptosis of neutrophils, as compared to a control antibody, during the inflammation induction.
- enhances the caspase-3 expression in neutrophils, thereby leading to caspase-3 dependent apoptosis; It may be considered that apoptosis is enhanced or induced when the expression of caspase-3 is over 1-log, more preferably 2-log, and most preferably 3-log, after 11 hours of treatment with an agonist of CMKLR1 having Resolvin E1-like capability antibody as compared to a negative control; a method is disclosed in the examples of the invention;
- reduces or inhibits transmigration through endothelium of PMNs (neutrophils) towards the site of inflammation; preventing them to relocate to the site of inflammation, and exert their pro-inflammation effects. In a particular embodiment of the invention, the migration and transmigration of neutrophils is prevented or reduced by the administration of an agonist of CMKLR1 having Resolvin E1-like capability IgG1 antibody. Therefore, in a particular embodiment, the Agonist of CMKLR1 having Resolvin E1-like capability is a humanized antibody with human constant regions derived or issued from human IgG1. In a particular embodiment, the Agonist of CMKLR1 having Resolvin E1-like capability antibody is of the human IgG1 isotype, i.e. the constant fragment of the heavy chain and of the light chain are derived or issued from a human IgG1 antibody constant heavy chain and light chain fragment. Accordingly, the agonist of CMKLR1 having Resolvin E1-like capability antibody of the present invention comprises a Fc domain of IgG1 isotype. Transmigration of neutrophils may be assessed by the method disclosed in the examples of the invention; it may be considered that a neutrophil has a reduced migration and/or transmigration capability when the cell surface expression of CD62L is reduced by at least 1-log in a staining experiment, as compared to a negative control. The inventors found that agonist of CMKLR1 having Resolvin E1-like capability humanized IgG1 antibodies of the invention does not exhibit cytotoxicity in vivo; in other words, the use of the agonist of CMKLR1 does not exhibit a significant depletion of CMKLR1-positive cells in vivo. In a particular embodiment, the use of the agonist of the invention does not exhibit a cytotoxic activity on CMKLR1-positive cells;
- decreases the cell surface expression of CMKLR1, and CXCR4 and/or CCR7. In a particular embodiment, the cell surface expression is considered on macrophages and/or dendritic cells. When the agonist of CMKLR1 having Resolvin E1 capability binds to its target, CMKLR1, and CXCR4 and/or CCR7 hand are heterodimerized and internalized. In a preferred embodiment, the antibody of the invention does induce the internalization and/or inhibit the expression of CMLKLR1 and/or CXCR4 and/or CCR7 at the cell surface of CMKLR1-positive cells. Thus, the cell surface expression of CMLKLR1, and CXCR4 and/or CCR7 in cells incubated in the presence of the antibody is reduced, or is significantly reduced, relatively to cell surface expression in cells incubated in otherwise identical conditions, but in the absence of the Agonist of CMKLR1 having Resolvin E1-like capability.

In a particular aspect, the invention relates to humanized anti-Chemerin Like Receptor 1 (CMKLR1) antibody or an antigen-binding fragment thereof suitable for the production in mammalian cells such as COS or CHO cells with a yield over 0.1 mg/ml, in particular over 1 mg/ml, in particular over 10 mg/ml, and more particularly over 100 mg/ml, wherein:
  a) the Variable Heavy (VH) domain comprises the amino acid sequence of the frameworks (FR1, FR2, FR3 and FR4) of a Heavy Chain variable domain wherein each framework harbors a sequence identity respectively with the framework of the same rank in the sequence of SEQ ID No. 41 that 100% for FR1, at least 60% for FR2, at least 78% for FR3 and at least 80% for FR4; more particularly 100% or FR1, at least 80% for FR2, at least 85% for FR3 and at least 90% for FR4;
  b) the Variable Light (VL) domain comprises the amino acid sequence of the frameworks (FR1, FR2, FR3 and FR4) of a Light Chain Variable domain wherein each framework harbors a sequence identity respectively with the framework of the same rank in the sequence of SEQ ID No.50 that is at least 60% for FR1, at least 70% for FR2, at least 75% for FR3 and at least 80% for FR4; and more particularly of 100% for FR1, at least 90% for FR2, at least 90% for FR3 and 100% for FR4.

In a particular embodiment, the humanized anti-CMKLR1 antibody or antigen binding fragment thereof specifically binds to the third extra-cellular loop (EL3) of CMKLR1, in particular wherein the antibody or antigen-binding fragment thereof binds specifically to a polypeptide comprising amino acid sequence SEQ ID No: 2 or SEQ ID No. 59 or located within amino acid sequence SEQ ID No 60. This embodiment may lead to ease the production of antibodies (or antigen-binding fragment thereof) in vitro. It should be noted that this definition of the antibody is independent from any other definition of the anti-CMKLR1 antibody of the invention, including the definition of antibodies by CDR domains. In a particular aspect of the invention, the definition of the antibody of the invention by FR sequences may be combined by a definition with CDR domains and/or functional features. To this end, it is also encompassed by the present invention the antibody defined by its FR domains and characterized by their CDR domains that are selected from a particular group.

To this end, such an antibody, which may or may not exhibit identity to the framework domains as disclosed herein, comprises at least one, in particular six, of the following CDRs:
  a VHCDR1 selected from the group consisting of SEQ ID No.3, SEQ ID No. 4, SEQ ID No. 5, SEQ ID No. 6 and SEQ ID No. 7; and/or
  a VHCDR2 selected from the group consisting of SEQ ID No 9, SEQ ID No. 10, SEQ ID No. 11, SEQ ID No. 12, SEQ 61, SEQ ID No. 63 and SEQ ID No. 64; and/or
  a VHCDR3 selected from the group consisting of SEQ ID No. 13, SEQ ID No. 14, SEQ ID No. 15 and SEQ ID No. 16; and/or
  and wherein the Variable Light (VL) domain comprises:
  a VLCDR1 selected from the group consisting of SEQ ID No. 17, SEQ ID No. 18, SEQ ID No. 19, SEQ ID No. 20, SEQ ID No. 21, SEQ ID No. 22 and SEQ ID No. 23; and/or
  a VLCDR2 selected from the group consisting of SEQ ID No. 24, SEQ ID No. 25, SEQ ID No. 26, SEQ ID No. 27, SEQ ID No. 28, SEQ ID No. 29, SEQ ID No. 30, SEQ ID No. 31, SEQ ID No. 32 and SEQ ID No. 33; and/or
  a VLCDR3 selected from the group consisting of SEQ ID No. 34, SEQ ID No. 35 and SEQ ID No. 36.

In a more particular aspect, at least one of the framework domains HFR1, HFR2, HFR3, HFR4, LFR1, LFR2, LFR3 and LFR4 is selected from the following groups:
  for VHFR1 of SEQ ID No. 65;
  for VHFR2 of SEQ ID No. 66, SEQ ID No. 67 or SEQ ID NO. 68;
  for VHFR3 of SEQ ID No. 69 or SEQ ID No. 70;
  for VHFR4 of SEQ ID No: 71;
  for VLFR1 of SEQ ID No. 72;
  for VLFR2 of SEQ ID No. 73 or SEQ ID No. 74;
  for VLFR3 of SEQ ID No. 75 or SEQ ID No. 76
  for VLFR4 of SEQ ID No. 77.

It should be understood that a plurality of framework domains, or all, may be selected from the groups recited here above.

In a more particular embodiment, the antibody or antigen-binding fragment thereof according to the two previous paragraphs has the amino acid sequence of the heavy chain variable domain selected from the group of SEQ ID No: 41, SEQ ID No: 38 SEQ ID No: 42, SEQ ID No: 43 and the amino acid sequence of the light chain variable domain is the sequence of SEQ ID No: 50.

In a more particular embodiment, said antibody or antigen-binding fragment thereof comprises the following frameworks domains:
  VHFR1 of SEQ ID NO:65
  VHFR2 of SEQ UD NO: 67,
  VHFR3 of SEQ ID NO: 69
  VHFR4 of SEQ ID NO: 71,
  VLFR1 of SEQ ID NO: 72,
  VLFR2 of SEQ ID NO: 73
  VLFR3 of SEQ ID NO: 76, and
  VLFR4 of SEQ ID NO: 77.

In a more particular embodiment, said antibody comprises the following frameworks domains:
  VHFR1 of SEQ ID NO:65
  VHFR2 of SEQ ID NO: 67,
  VHFR3 of SEQ ID NO: 69
  VHFR4 of SEQ ID NO: 71,
  VLFR1 of SEQ ID NO: 72,
  VLFR2 of SEQ ID NO: 73
  VLFR3 of SEQ ID NO: 76,
  VLFR4 of SEQ ID NO: 77,
  and comprises the following CDRs:
    a VHCDR1 selected from the group consisting of SEQ ID No.3, SEQ ID No. 4, SEQ ID No. 5, SEQ ID No. 6 and SEQ ID No. 7; and/or
    a VHCDR2 selected from the group consisting of SEQ ID No 9, SEQ ID No. 10, SEQ ID No. 11, SEQ ID No. 12, SEQ 61, SEQ ID No. 63 and SEQ ID No. 64; and/or
    a VHCDR3 selected from the group consisting of SEQ ID No. 13, SEQ ID No. 14, SEQ ID No. 15 and SEQ ID No. 16; and/or
  and wherein the Variable Light (VL) domain comprises:
    a VLCDR1 selected from the group consisting of SEQ ID No. 17, SEQ ID No. 18, SEQ ID No. 19, SEQ ID No. 20, SEQ ID No. 21, SEQ ID No. 22 and SEQ ID No. 23; and/or a VLCDR2 selected from the group consisting of SEQ ID No. 24, SEQ ID No. 25, SEQ ID No. 26, SEQ ID No. 27, SEQ ID No. 28, SEQ ID No. 29, SEQ ID No. 30, SEQ ID No. 31, SEQ ID No. 32 and SEQ ID No. 33; and/or a VLCDR3 selected from the group consisting of SEQ ID No. 34, SEQ ID No. and SEQ ID No. 36.

This embodiment may lead to ease the production of antibodies (or antigen-binding fragment thereof) in vitro.

The invention particularly relates to humanized anti-CMKLR1 antibody or an antigen-binding fragment thereof optimized to reduce immunogenicity while maintaining high binding activity and stability and biological functions, said antibody or antigen-binding fragment thereof comprises the following CDRs:

a VHCDR1 of SEQ ID NO: 4,
a VHCDR2 of SEQ ID NO: 12,
a VHCDR3 of SEQ ID NO: 13,
a VLCDR1 of SEQ ID NO: 19
a VLCDR2 of SEQ ID NO: 26, and
a VLCDR3 of SEQ ID NO: 35.

In a particular embodiment, said antibody or an antigen-binding fragment thereof whose CDRs sequences are SEQ ID NO: 4, 12, 13, 19, 26 and 35 comprises the following frameworks domains:

a VHFR1 of SEQ ID NO: 65
a VHFR2 of SEQ ID NO: 67,
a VHFR3 of SEQ ID NO: 69
a VHFR4 of SEQ ID NO: 71,
a VLFR1 of SEQ ID NO: 72,
a VLFR2 of SEQ ID NO: 73
a VLFR3 of SEQ ID NO: 76,
a VLFR4 of SEQ ID NO: 77.

The present disclosure particularly relates to an antibody anti-CMKLR1 or an antigen-binding fragment thereof optimized to reduce immunogenicity while maintaining high binding activity and stability and biological functions which is suitable for in vitro production.

The antibody anti-CMKLR1 or an antigen-binding according to the previous paragraph has the amino acid sequence of the heavy chain variable domain of SEQ ID No: 91, and the amino acid sequence of the light chain variable domain is the sequence of SEQ ID No: 93.

In addition said antibody is advantageously characterized in that its Fc fragment is characteristic of an IgG1.

In a particular embodiment, the antibodies of the invention may be characterized by the amino acid sequence of framework domains as disclosed above and further characterized by the amino acid sequence of at least one of their CDR domains. In particular, the humanized anti-CMKLR1 antibody or an antigen binding fragment thereof according to this embodiment harbors a Heavy Chain variable domain VHCDR2 comprising or consisting of an amino acid sequence selected from the group consisting of SEQ ID No 9, SEQ ID No. 10, SEQ ID No. 11, SEQ ID No. 12, SEQ 61, SEQ ID No. 63 and SEQ ID No. 64.

In a particular embodiment of the invention, it is provided an antibody or antigen-binding fragment thereof, which comprises:

a) an antibody heavy chain variable (VH) domain comprising the three CDRs VHCDR1, VHCDR2 and VHCDR3, wherein:
VHCDR1 is selected from the group consisting of SEQ ID No.3, SEQ ID No. 4, SEQ ID No. 5, SEQ ID No. 6 and SEQ ID No. 7;
VHCDR2 is selected from the group consisting of SEQ ID No. 9, SEQ ID No. 10, SEQ ID No. 11 and SEQ ID No. 61; or VHCDR2 corresponds to the amino acid residues of SEQ ID No. 12 with the proviso that VHCDR1 is not SEQ ID No. 4;
VHCDR3 is selected from the group consisting of SEQ ID No. 13, SEQ ID No. 14, SEQ ID No. 15 and SEQ ID No. 16;

b) an antibody light chain variable (VL) domain comprising the three CDRs VLCDR1, VLCDR2 and VLCDR3, wherein:
VLCDR1 is selected from the group consisting of SEQ ID No. 17, SEQ ID No. 18, SEQ ID No. 19, SEQ ID No. 20, SEQ ID No. 21, SEQ ID No. 22 and SEQ ID No. 23;
VLCDR2 is selected from the group consisting of SEQ ID No. 24, SEQ ID No. 25, SEQ ID No. 26, SEQ ID No. 27, SEQ ID No. 28, SEQ ID No. 29, SEQ ID No. 30, SEQ ID No. 31, SEQ ID No. 32 and SEQ ID No. 33;
VLCDR3 is selected from the group consisting of SEQ ID No. 34, SEQ ID No. 35 and SEQ ID No. 36;

for the preventive or the therapeutic treatment of:
an inflammatory disease, in particular acute inflammatory diseases, chronic inflammatory diseases such as chronic inflammatory pulmonary diseases (e.g. asthma), keratoconjunctivitis, periodontal disease, eczema, inflammatory bowel disease, in particular Crohn's disease or colitis, in particular ulcerative colitis or spontaneous colitis, cystic fibrosis, NASH (Nonalcoholic steatohepatitis), hepatic fibrosis, lung fibrosis, anti-neutrophil cytoplasm antibodies-related disease (ANCA), vasculitis, in particular ANCA mediated vasculitis, scleroderma, in particular wherein, as a result of the administration of the treatment, the resolution of inflammation is enhanced;

an autoimmune disease such as diabetes, in particular type I diabetes, psoriasis, lupus, rheumatoid arthritis, multiple sclerosis, Sjögren's syndrome, celiac disease, vasculitis, myasthenia gravis, or an infection disease such as sepsis, peritonitis, degenerative diseases, wound healing disorders or dry eye syndrome, severe viral indications with severe inflammatory conditions, such as coronavirus (e.g. COVID-19), in particular wherein, as a result of the administration of the treatment, the resolution of inflammation is enhanced;

a cancer, in particular metastatic cancers, solid or liquid cancers such as carcinoma, more particularly hepatocarcinoma, in particular mammary carcinoma or colon carcinoma, or lung cancer or myeloid cancer such as leukemia, in particular a cancer wherein cancer cells express CMKLR1 or where the microenvironment of the tumor is invaded by cells expressing or overexpressing CMKLR1, in particular wherein, as a result of the administration of the treatment, the resolution of inflammation is enhanced.

In another particular embodiment of the invention, it is provided an antibody or antigen-binding fragment thereof, which comprises:

a) an antibody heavy chain variable (VH) domain comprising the three CDRs VHCDR1, VHCDR2 and VHCDR3, wherein:
VHCDR1 is selected from the group consisting of SEQ ID No.3, SEQ ID No. 4, SEQ ID No. 5, SEQ ID No. 6 and SEQ ID No. 7;

VHCDR2 is selected from the group consisting of SEQ ID No. 9, SEQ ID No. 10, SEQ ID No. 11 and SEQ 61;

when VHCDR1 is SEQ ID No. 3 or SEQ ID No. 4 and VHCDR2 corresponds to the amino sequence of SEQ ID NO: 12, said heavy chain variable (VH) domain does not comprise a framework VHFR3 of SEQ ID No. 70, preferably with the proviso that said heavy chain variable (VH) domain comprises a framework FR3 of SEQ ID NO: 69, VHCDR3 is selected from the group consisting of SEQ ID No. 13, SEQ ID No. 14, SEQ ID No. 15 and SEQ ID No. 16;

b) an antibody light chain variable (VL) domain comprising the three CDRs VLCDR1, VLCDR2 and VLCDR3, wherein:

VLCDR1 is selected from the group consisting of SEQ ID No. 17, SEQ ID No. 18, SEQ ID No. 19, SEQ ID No. 20, SEQ ID No. 21, SEQ ID No. 22 and SEQ ID No. 23;

VLCDR2 is selected from the group consisting of SEQ ID No. 24, SEQ ID No. 25, SEQ ID No. 26, SEQ ID No. 27, SEQ ID No. 28, SEQ ID No. 29, SEQ ID No. 30, SEQ ID No. 31, SEQ ID No. 32 and SEQ ID No. 33;

VLCDR3 is selected from the group consisting of SEQ ID No. 34, SEQ ID No. 35 and SEQ ID No. 36; for the preventive or the therapeutic treatment of the diseases as described above.

In a particular embodiment of the invention, the humanized antibody or antigen-binding fragment thereof, or antigen-binding antibody mimetic or modified antibody comprises:

a) the Variable Heavy (VH) domain comprises the amino acid sequence of the frameworks (FR1, FR2, FR3 and FR4) of a Heavy Chain variable domain wherein each framework harbors a sequence identity respectively with the framework of the same rank in the sequence of SEQ ID No. 41 that 100% for FR1, at least 60% for FR2, at least 78% for FR3 and at least 80% for FR4; more particularly 100% or FR1, at least 80% for FR2, at least 85% for FR3 and at least 90% for FR4;

b) The Variable Light (VL) domain comprises the amino acid sequence of the frameworks (FR1, FR2, FR3 and FR4) of a Light Chain Variable domain wherein each framework harbors a sequence identity respectively with the framework of the same rank in the sequence of SEQ ID No.50 that is at least 60% for FR1, at least 70% for FR2, at least 75% for FR3 and at least 80% for FR4, and more particularly of 100% for FR1, at least 90% for FR2, at least 90% for FR3 and 100% for FR4;

for the preventive or the therapeutic treatment of:

an inflammatory disease, in particular acute inflammatory diseases, chronic inflammatory diseases such as chronic inflammatory pulmonary diseases (e.g. asthma), keratoconjunctivitis, periodontal disease, eczema, inflammatory bowel disease, in particular Crohn's disease or colitis, in particular ulcerative colitis or spontaneous colitis, cystic fibrosis, NASH (Nonalcoholic steatohepatitis), hepatic fibrosis, lung fibrosis, anti-neutrophil cytoplasm antibodies-related disease (ANCA), vasculitis, in particular ANCA mediated vasculitis, scleroderma, in particular wherein, as a result of the administration of the treatment, the resolution of inflammation is enhanced;

an autoimmune disease such as diabetes, in particular type I diabetes, psoriasis, lupus, rheumatoid arthritis, multiple sclerosis, Sjögren's syndrome, celiac disease, vasculitis, myasthenia gravis, or an infection disease such as sepsis, peritonitis, degenerative diseases, wound healing disorders, severe viral indications with severe inflammatory conditions, such as coronavirus (e.g. COVID-19), or dry eye syndrome, in particular wherein, as a result of the administration of the treatment, the resolution of inflammation is enhanced;

a cancer, in particular metastatic cancers, solid or liquid cancers such as carcinoma, more particularly hepatocarcinoma, in particular mammary carcinoma or colon carcinoma, or lung cancer or myeloid cancer such as leukemia, in particular a cancer wherein cancer cells express CMKLR1 or where the microenvironment of the tumor is invaded by cells expressing or overexpressing CMKLR1, in particular wherein, as a result of the administration of the treatment, the resolution of inflammation is enhanced.

In a particular embodiment, the antibody comprises the following frameworks domains, a VHFR1 of SEQ ID NO: 65
a VHFR2 of SEQ UD NO: 67,
a VHFR3 of SEQ ID NO: 69
a VHFR4 of SEQ ID NO: 71,
a VLFR1 of SEQ ID NO: 72,
a VLFR2 of SEQ ID NO: 73
a VLFR3 of SEQ ID NO: 76,
a VLFR4 of SEQ ID NO: 77, and comprises the following CDRs:

VHCDR1 is selected from the group consisting of SEQ ID No.3, SEQ ID No. 4, SEQ ID No. 5, SEQ ID No. 6 and SEQ ID No. 7; and/or VHCDR2 is selected from the group consisting of SEQ ID No. 9, SEQ ID No. 10, SEQ ID No. 11, SEQ ID No. 12 and SEQ No. 61;

VHCDR3 is selected from the group consisting of SEQ ID No. 13, SEQ ID No. 14, SEQ ID No. 15 and SEQ ID No. 16;

and wherein the Variable Light (VL) domain comprises:

a VLCDR1 is selected from the group consisting of SEQ ID No. 17, SEQ ID No. 18, SEQ ID No. 19, SEQ ID No. 20, SEQ ID No. 21, SEQ ID No. 22 and SEQ ID No. 23; and/or VLCDR2 is selected from the group consisting of SEQ ID No. 24, SEQ ID No. 25, SEQ ID No. 26, SEQ ID No. 27, SEQ ID No. 28, SEQ ID No. 29, SEQ ID No. 30, SEQ ID No. 31, SEQ ID No. 32 and SEQ ID No. 33; and/or VLCDR3 is selected from the group consisting of SEQ ID No. 34, SEQ ID No. 35 and SEQ ID No. 36 and is for use in the preventive or therapeutic treatment of:

an inflammatory disease, in particular acute inflammatory diseases, chronic inflammatory diseases such as chronic inflammatory pulmonary diseases (e.g. asthma), keratoconjunctivitis, periodontal disease, eczema, inflammatory bowel disease, in particular Crohn's disease or colitis, in particular ulcerative colitis or spontaneous colitis, cystic fibrosis, NASH (Nonalcoholic steatohepatitis), hepatic fibrosis, lung fibrosis, anti-neutrophil cytoplasm antibodies-related disease (ANCA), vasculitis, in particular ANCA mediated vasculitis, scleroderma, in particular wherein, as a result of the administration of the treatment, the resolution of inflammation is enhanced;

an autoimmune disease such as diabetes, in particular type I diabetes, psoriasis, lupus, rheumatoid arthritis, multiple sclerosis, Sjögren's syndrome, celiac disease, vasculitis, myasthenia gravis, or an infection disease such as sepsis, peritonitis, degenerative diseases, wound healing disorders, severe viral indications with severe inflammatory conditions, such as coronavirus (e.g. COVID-19), or dry eye syndrome, in particular wherein, as a result of the administration of the treatment, the resolution of inflammation is enhanced;

a cancer, in particular metastatic cancers, solid or liquid cancers such as carcinoma, more particularly hepatocarcinoma, in particular mammary carcinoma or colon carcinoma, or lung cancer or myeloid cancer such as leukemia, in particular a cancer wherein cancer cells express CMKLR1 or where the microenvironment of the tumor is invaded by cells expressing or overexpressing CMKLR1, in particular wherein, as a result of the administration of the treatment, the resolution of inflammation is enhanced.

Such particular antibody or antigen-binding fragment thereof for the preventive or therapeutic treatment of one of the conditions disclosed above is particular characterized in that it comprises the following CDRs: VHCDR1 of SEQ ID NO: 4, VHCDR2 of SEQ ID NO: 12, VHCDR3 of SEQ ID NO: 13 and, VLCDR1 of SEQ ID NO: 19, VLCDR2 of SEQ ID NO: 26, VLCDR3 of SEQ ID NO: 35 and the following frameworks VHFR1 of SEQ ID NO: 65, VHFR2 of SEQ ID NO: 67, VHFR3 of SEQ ID NO: 69, VHFR4 of SEQ ID NO: 71, VLFR1 of SEQ ID NO: 72, VLFR2 of SEQ ID NO: 73, VLFR3 of SEQ ID NO: 76, VLFR4 of SEQ ID NO: 77. In particular for the above disclosed preventive or therapeutic use of the antibody or antigen-binding fragment thereof, the amino acid sequence of the heavy chain variable domain of the antibody comprises or consists of SEQ ID NO: 91 and the amino acid sequence of the light chain variable domain of the antibody comprises or consists of SEQ ID NO: 93.

In another aspect, the invention relates to a composition comprising an anti-CMKLR1 compound as described herein, in particular a pharmaceutical composition comprising an anti-CMKLR1 compound according to the invention and a further therapeutic agent, or pharmaceutical acceptable carrier. In a particular embodiment, the invention relates to a composition comprising an anti-CMKLR1 compound according to the invention and a therapeutic agent selected from the group consisting of immunomodulatory agent, immune checkpoint blocker, immune checkpoint activator, antibody, or anti-SIRPa antibody (P84-anti-mouse SIRPa from Merck Millipore).

In another aspect, the invention relates to a combination of compounds comprising an anti-CMKLR1 compound as described herein, in particular a pharmaceutical composition comprising an anti-CMKLR1 compound according to the invention and an anti-PD1 or an anti-PDL1 compound, in particular an anti-PD1 compound; such a compound is in particular selected from the group consisting of an antibody, an antigen-binding antibody fragment, an antigen-binding antibody mimetic, a small molecule like an aptamer or a peptide, a modified antibody, like but not limited to a humanized or a chimeric antibody, able to bind to PD1 or PDL1.

In another aspect, the invention relates to a combination of compounds comprising an anti-CMKLR1 compound as described herein, in particular a pharmaceutical composition comprising an anti-CMKLR1 compound according to the invention and an anti-SIRPa compound; such a compound is in particular selected from the group consisting of an antibody, an antigen-binding antibody fragment, an antigen-binding antibody mimetic, a small molecule like an aptamer or a peptide, a modified antibody, like but not limited to a humanized or a chimeric antibody, able to bind to SIRPa, in particular human SIRPa.

The invention also relates to a combination, for instance for fibrosis treatment, comprising a therapeutic compound, which is or not a cytokine, and which stimulates pro-resolution macrophages.

In another aspect, the invention concerns the therapeutic use of the anti-CMKLR1 compound of the invention, especially for inducing and/or enhancing the resolution of inflammation, in particular for inducing and/or enhancing the resolution of inflammation when said resolution is delayed or disrupted, in view of treating diseases wherein the extension of the inflammation is pathologic, or wherein the duration of the resolution of inflammation is pathologic.

In a particular embodiment of the invention, the anti-CMKLR1 compound binds CMKLR1 with an affinity (KD value) of at least 10E−8 M, more preferably with an affinity of at least 10E−9 M. The specific binding between the antibody, or antigen-binding fragment thereof, or antigen-binding antibody mimetic or modified antibody of the invention and CMKLR1 (or a region of CMKLR1 comprising the third extra-cellular loop, including amino acid sequences set forth in SEQ ID No: 2 and 59 or located within amino acid sequences of SEQ ID No. 60) implies that the antibody exhibits appreciable affinity for CMKLR1. "Appreciable affinity" includes binding with an affinity of about $10^{-8}$ M (KD) or stronger. Preferably, binding is considered specific when the binding affinity is between $10^{-8}$ M and $10^{-12}$ M, optionally between $10^{-9}$ M and $10^{-10}$ M, in particular at least $10^{-9}$ M. Whether a binding domain specifically reacts with or binds to a target can be tested readily by, inter alia, comparing the reaction of said binding domain with a target protein or antigen with the reaction of said binding domain with proteins or antigens other than the target protein. Such an antibody of the invention specifically binds CMKLR1 and has an agonist effect towards the interaction between RvE1 and CMKLR1. Methods for determining antibody specificity and affinity by competitive inhibition are known in the art (see, e.g., Harlow et al., Antibodies: A Laboratory Manual, Cold Spring Harbor Laboratory Press, Cold Spring Harbor, NY (1998); Colligan et al., Current Protocols in Immunology, Green Publishing Assoc., NY (1992; 1993); Muller, Meth. Enzym, 92:589-601 (1983)). These methods include, but are not limited to, Biacore Analysis, Blitz analysis, flow cytometry and ELISA assay.

In a particular embodiment of the invention, the anti-CMKLR1 compound binds specifically to an epitope localized within the third extra-loop of CMKLR1, in particular to an epitope localized within amino acid residue sequences set forth in SEQ ID No: 2 or SEQ ID No: 59 or SEQ ID No. 60, in particular SEQ ID No: 2. An anti-CMKLR1 compound binding within this particular region of CMKLR1 may have an agonist property on CMKLR1, thereby mimicking the binding of RvE1 to CMKLR1.

In another aspect, the invention relates to an anti-CMKLR1 antibody or antigen-binding fragment thereof or antigen-binding antibody mimetic or modified antibody as defined here above, which has an agonist capability towards the interaction between RvE1 and CMKLR1, for use as a medicament.

In another aspect, the invention relates to an anti-CMKLR1 antibody or antigen-binding fragment thereof or antigen-binding antibody mimetic or modified antibody as defined here above, which has the capability to induce the activation of Akt and/or Erk protein(s) in vitro and/or in vivo. The activation of these proteins may be assessed by the methods described in the examples of the present invention. In particular, the anti-CMKLR1 antibody or antigen-binding fragment thereof or antigen-binding antibody mimetic or modified antibody has the capability to activate either Akt and/or Erk protein, or both, in macrophages, in particular in human macrophages.

The present invention also relates to a method of treatment in a subject in need thereof comprising administering to said subject an effective amount of an anti-CMKLR1 antibody or antigen-binding fragment thereof or antigen-binding antibody mimetic as defined above, which has an agonist capability towards the interaction between RvE1 and CMKLR1, or in other words which is an RvE1-agonist like factor or modulator.

Modifying the polarization of macrophages to favour anti-inflammatory cells can be useful in a number of pathologies or situations. As described above, this modification is particularly useful in the context of a disease selected from the group of inflammatory diseases, including but not limited to acute inflammatory diseases and chronic inflammatory diseases, inflammatory bowel disease, Crohn's disease, asthma, keratoconjunctivitis, periodontal disease, eczema, colitis, in particular ulcerative colitis or spontaneous colitis, cystic fibrosis; diabetes, in particular type I diabetes, peritonitis, psoriasis, carcinoma, in particular mammary carcinoma or colon carcinoma, cancers, metastatic cancers, lung cancer, degenerative disease, infection disease, in particular sepsis, autoimmune diseases, NASH, scleroderma, colitis or Crohn's disease in a subject that is refractory to corticosteroids and/or immunosuppressive treatment.

The present invention also relates to the use of an anti-CMKLR1 antibody or antigen-binding fragment thereof or antigen-binding antibody mimetic as defined above, which has a Resolvin E1-like agonist capability, in the manufacture of a medicament.

In another aspect, the invention relates to an anti-CMKLR1 antibody or antigen-binding fragment thereof or antigen-binding antibody mimetic or modified antibody, like but not limited to humanized or chimeric antibody, as defined here above, for its use in the treatment of a chronic inflammatory disease, in particular for treating chronic colitis.

In another aspect, the invention relates to an anti-CMKLR1 antibody or antigen-binding fragment thereof or antigen-binding antibody mimetic as defined above, which has an agonist activity towards the interaction of CMKLR1 for use in the treatment of a delayed or disrupted resolution of an inflammatory condition, in particular an inflammatory disease wherein its resolution is delayed or disrupted, and/or in the treatment or the prevention of a disease selected from the group of inflammatory diseases, including but not limited to acute inflammatory diseases and chronic inflammatory diseases, inflammatory bowel disease, Crohn's disease, asthma, keratoconjunctivitis, periodontal disease, eczema, colitis, in particular ulcerative colitis or spontaneous colitis, cystic fibrosis, diabetes, in particular type I diabetes, peritonitis, psoriasis, carcinoma, in particular mammary carcinoma or colon carcinoma, cancers, degenerative disease, infection disease, in particular sepsis, autoimmune diseases.

As defined herein, "a delay or a disruption in the resolution of an inflammatory condition" occurs when the resolution of inflammation is delayed or disrupted as compared to a normal resolution (i.e. the resolution occurring in a patient who experiences physiological resolution after an inflammatory event). A resolution delay or defect can result in an increased penetration of granulocytes at the inflammatory site. Hence, a resolution delay or defect may be assessed by quantification of granulocytes at the inflammatory site. Granulocyte population may be measured for example by histology, cytometry or indirect biochemical techniques such as elastase quantification by enzyme immunoassay or molecular quantification by PCR of granulocyte receptor 1). A resolution delay or defect may also be assessed by the determination of a delay in the apoptosis of granulocytes, measured for example by cytology using specific antibodies against annexin 5. A defect or a delay in the resolution of the inflammation may also be determined by assessing by quantifying the synthesis of pro-inflammatory cytokines such as TNF-alpha, IL8 or IL12 and anti-inflammatory cytokines such as IL-10. Cytokine secretion may be assessed by enzyme immunoassay or by PCR. A defect or a delay in the resolution of the inflammation may also be determined by assessing the activation of transcription factors involved in the synthesis of inflammatory cytokines, such as NF-kappaB which can be measured for example by nuclear translocation or by Western blot and/or by quantification of the level of degradation of IkappaB). A defect or a delay in the resolution of the inflammation may also be determined by quantifying specialized pro-resolving mediators (such as lipoxins, resolvins, protectins or maresins) or their precursors (like 17-HDOHE or 14-HDOHE) by mass spectrometry or enzyme immunoassay. A defect or a delay of the resolution then results in a defect of the synthesis of one or more of these mediators. A resolution defect or delay can also be determined when expression of the receptors of the resolution molecules is decreased. These receptors may be selected from the group comprising ALX, CMK1R1, GPR32 or GPR18. Alternatively or complementarily, the internalization and processing of those receptors into the cytoplasm may also be assessed. Alternatively or complementarily, expression of some receptors of inflammatory cytokines or lipids may also be assessed, an overexpression compared to a normal condition being significant of a delay or a defect in the resolution of the inflammation. These conditions may be measured by histology, cytology or PCR. The resolution defect can also result in a decreased or inhibited switch of pro-inflammatory to pro-resolutive macrophages, a damage in phagocytosis or efferocytosis of the same cells. Hence, a delay or a defect of the resolution may be assessed by analyzing the switch of pro-inflammatory to pro-resolutive macrophages in a particular condition as compared to a normal condition, as exemplified in the examples of the present invention.

According to a particular embodiment, anti-CMKLR1 compound can be used to treat an individual who has a cancer selected from the group consisting of mammary cancer, in particular mammary carcinoma cancer, melanoma, colon cancer, in particular colon carcinoma cancer, leukemia, in particular acuter myeloid leukemia, in particular when cancer cells over-express CMKLR1.

In an embodiment, the invention relates to an anti-human CMKLR1 antibody or antigen-binding fragment thereof or antigen-binding antibody mimetic or modified antibody as defined above, for its uses as defined above, wherein said anti-human CMKLR1 antibody or antigen-binding fragment thereof or antigen-binding antibody mimetic or modified antibody of the invention is administered to a patient presenting a CMKLR1-positive tumor.

The antibody or antigen-binding fragment thereof of the invention can be administered in a variety of suitable routes, e.g., intravenously (IV), subcutaneously (SC), or, intramuscularly (IM) to the subject. The anti-CMKLR1 compound can be administered alone or in combination with another therapeutic agent, e.g., a second human monoclonal antibody or antigen binding fragment thereof. In another example, the antibody is administered together with another agent, for example, an immunosuppressive agent, an erythropoiesis-stimulating agent (ESA), in combination with therapeutic cell compositions, and the like. In an embodiment, the invention relates to an anti-CMKLR1 compound or antigen-binding fragment thereof or antigen-binding antibody mimetic for its use as defined above, wherein the anti-CMKLR1 antibody or antigen-binding fragment is combined with a second therapeutic agent.

The administration of the second therapeutic agent can be simultaneous or not with the administration of the anti-CMKLR1 compound. Depending on the nature of the second agent, a co-administration can be prepared in the form of a combination drug (product), also known as a "combo". A combo is a fixed-dose combination that includes two or more active pharmaceutical ingredients combined in a single dosage form, which is manufactured and distributed in fixed doses. But the dose regimen and/or the administration route can also differ.

In a preferred embodiment, this second therapeutic agent is selected from the group consisting of chemotherapeutic agents, radiotherapy agents, immunotherapeutic agents, cell therapy agents (such as CAR-T cells), antibiotics and probiotics.

In particular, immunotherapeutic agents useful in the context of the invention are selected from the group consisting of therapeutic vaccines (DNA, RNA or peptide vaccines), immune checkpoint blockers or activators, in particular of adaptive immune cells (T or B lymphocytes) or immunoconjugates such as antibody-drug conjugates.

As used herein, the term "immunotherapeutic agents" refers in particular to agents that could take cancer vaccines from interesting biological phenomena to effective therapeutic agents including: T-cell growth factors to increase number and repertoire of naive T cells, growth factors to increase the number of dendritic cells (DCs), agonists to activate DCs and other antigen-presenting cells (APCs), adjuvants to allow and augment cancer vaccines, agonists to activate and stimulate T cells, inhibitors of T-cell checkpoint blockade, T-cell growth factors to increase the growth and survival of immune T cells, agents to inhibit, block, or neutralize cancer cell and immune cell-derived immunosuppressive cytokine.

Numerous immune checkpoint blocker or activator are known in the art. In the context of the invention, examples of immune checkpoint blockers or activators of adaptive immune cells (B or T lymphocytes) that could be useful are anti-PDL1, anti-PD1, anti-CTLA4, anti-SIRPa; anti-CD137, anti-CD2, anti-CD28, anti-CD40, anti-HVEM, anti-BTLA, anti-CD160, anti-TIGIT, anti-TIM-1/3, anti-LAG-3, anti-2B4, and anti-OX40, anti-CD40 agonist, CD40-L, TLR agonists, anti-ICOS, ICOS-L and B-cell receptor agonists, in particular anti-CD137 and anti-SIRPa. In a particular embodiment of the invention, the second therapeutic agent is an anti-PDL1 or an anti-PD1 compound, in particular an anti-PD1 compound, and more particularly an anti-PD1 antibody. In a particular embodiment of the invention, the second therapeutic agent is an anti-SIRPa compound, in particular an anti-SIRPa antibody Said immunotherapeutic agent can also be an antibody targeting tumoral antigen, particularly selected from the group consisting of anti-Her2, anti-EGFR, anti-CD20, anti-CD19, anti-CD52.

The antibody may be provided at an effective dose from about 1 ng/kg body weight to about 30 mg/kg body weight, or more. In specific embodiments, the dosage may range from 1 μg/kg to about 20 mg/kg, optionally from 10 μg/kg up to 10 mg/kg or from 100 μg/kg up to 5 mg/kg.

The term "effective dose" or "effective dosage" or "effective amount" is defined as an amount sufficient to achieve or at least partially achieve the desired effect. The term "effective dose" is meant to encompass an amount sufficient to cure or at least partially arrest the disease and its complications or alleviate the symptoms of the disease in a patient already suffering from the disease. Amounts or doses effective for this use will depend on the condition to be treated, the delivered antibody construct, the therapeutic context and objectives, the severity of the disease, prior therapy, the patient's clinical history and response to the therapeutic agent, the route of administration, the size (body weight, body surface or organ size) and/or condition (the age and general health) of the patient, and the general state of the patient's own immune system. The proper dose can be adjusted such that it can be administered to the patient once or over a series of administrations, and in order to obtain the optimal therapeutic effect.

Dosing for such purposes may be repeated as required, e.g. daily, semi-weekly, weekly, semi-monthly, monthly, or as required during relapses.

In another aspect, the invention relates to a pharmaceutical composition comprising an antibody or antigen-binding fragment thereof as defined above and a pharmaceutically acceptable carrier.

As used herein, a "pharmaceutical composition" is meant to encompass a composition suitable for administration to a subject or patient, such as a mammal, especially a human.

In general, a "pharmaceutical composition" is sterile and is usually free of contaminants that are capable of eliciting an undesirable response within the subject (e.g. the compound(s) in the pharmaceutical composition is pharmaceutical grade). Pharmaceutical compositions can be designed for administration to subjects or patients in need thereof via a number of different routes of administration including oral, buccal, rectal, parenteral, intraperitoneal, intradermal, intratracheal and the like.

As used herein, a "pharmaceutically acceptable carrier" is meant to encompass an excipient, diluent, carrier, and adjuvant that are useful in preparing a pharmaceutical composition that are generally safe, non-toxic and neither biologically nor otherwise undesirable, and include an excipient, diluent, carrier, and adjuvant that are acceptable for veterinary use as well as human pharmaceutical use. "A pharmaceutically acceptable carrier" as used herein includes both one and more than one such excipient, diluent, carrier, and adjuvant.

In particular, the invention relates to a pharmaceutical composition which comprises as an active ingredient an antibody or antigen-binding fragment thereof as defined above and a pharmaceutically acceptable carrier.

In another aspect, the invention relates to a therapeutic means, in particular a combination product means, which comprises as active ingredients: an anti-SIRPa antibody or antigen-binding fragment thereof or antigen-binding antibody mimetic as defined above and a second therapeutic agent, wherein said active ingredients are formulated for separate, sequential or combined therapy, in particular for combined or sequential use.

In particular, the invention relates to a combination product comprising an anti-CMKLR1 compound as defined above and a second therapeutic agent for simultaneous, separate or sequential use a medicament.

In an embodiment, the invention relates to a combination product as defined above, wherein the second therapeutic agent is selected from the group consisting of chemotherapeutic agents, radiotherapy agents, cell therapy agents, immunotherapeutic agents, antibiotics and probiotics.

In an embodiment, the invention relates to a combination product as defined above, wherein said immunotherapeutic agent is selected from the group consisting of therapeutic vaccines, immune checkpoint blockers or activators, in particular of adaptive immune cells (T and B lymphocytes) and antibody-drug conjugates.

In an embodiment, the invention relates to a combination product as defined above, wherein said immune checkpoint blocker or activator of adaptive immune cells (T and B lymphocytes) is selected from the group consisting of anti-PDL1, anti-PD1, anti-SIRPA, anti-CTLA4, anti-CD137, anti-CD2, anti-CD28, anti-CD40, anti-HVEM, anti-BTLA, anti-CD160, anti-TIGIT, anti-TIM-1/3, anti-LAG-3, anti-2B4, and anti-OX40, anti-CD40 agonist, CD40-L, TLR agonists, anti-ICOS, ICOS-L and B-cell receptor agonists, in particular selected from the group consisting of anti-PDL1, anti-PD1 and anti-CD137. In a particular embodiment of the invention, the second therapeutic agent is an anti-PDL1 or an anti-PD1 compound, in particular an anti-PD1 compound, and more particularly an anti-PD1 antibody. In a particular embodiment of the invention, the second therapeutic agent is an anti-SIRPa compound, in particular an anti-SIRPa antibody.

In one embodiment, said immunotherapeutic agent is an antibody targeting tumoral antigen, particularly selected from the group consisting of anti-Her2, anti-EGFR, anti-CD20, anti-CD19, anti-CD52.

In an aspect, the invention relates to a combination product as defined above, for simultaneous, separate or sequential use in the treatment of any condition susceptible of being improved or prevented by modifying macrophage polarization to proresolutive macrophages.

In an embodiment, the invention relates to a method of treatment of any condition susceptible of being improved or prevented by modifying macrophage polarization to proresolutive macrophages in a subject in need thereof comprising administering simultaneously, separately or sequentially to said subject an effective amount of a combination product as defined above.

In an embodiment, the invention relates to the use of a combination product as defined above in the manufacture of a medicament for the treatment of any condition susceptible of inducing proresolutive-inflammatory macrophages.

In an aspect, the invention relates to a combination product as defined above, for simultaneous, separate or sequential use in the treatment of a pathology selected from the group consisting of inflammatory diseases, including but not limited to acute inflammatory diseases and chronic inflammatory diseases, inflammatory bowel disease, Crohn's disease, NASH, scleroderma, asthma, keratoconjunctivitis, periodontal disease, eczema, colitis, in particular ulcerative colitis or spontaneous colitis, cystic fibrosis, diabetes, in particular type I diabetes, peritonitis, psoriasis, carcinoma, in particular mammary carcinoma or colon carcinoma, cancers, metastatic cancers, lung cancer, degenerative disease, infection disease, in particular sepsis, autoimmune diseases or for use in vaccination.

In an embodiment, the invention relates to a method of treatment of a pathology selected from the group of inflammatory diseases, including but not limited to acute inflammatory diseases and chronic inflammatory diseases, inflammatory bowel disease, Crohn's disease, NASH, scleroderma, asthma, keratoconjunctivitis, periodontal disease, eczema, colitis, in particular ulcerative colitis or spontaneous colitis, cystic fibrosis, diabetes, in particular type I diabetes, peritonitis, psoriasis, carcinoma, in particular mammary carcinoma or colon carcinoma, cancers, metastatic cancers, lung cancer, degenerative disease, infection disease, in particular sepsis, autoimmune diseases of a subject in need thereof comprising administering simultaneously, separately or sequentially to said subject an effective amount of a combination product as defined above.

The invention also relates to a polynucleotide encoding an anti-CMKLR1 compound as defined herein. To this end, the invention also relates to a nucleic acid molecule, or a group of nucleic acid molecules, more particularly an isolated nucleic acid molecule(s) and/or a recombinant a nucleic acid molecule(s), which encode(s) any anti-CMKLR1 compound according to the present disclosure, more particularly which encode(s) a heavy chain variable domain comprising or consisting of the amino acid residues of sequences set forth in SEQ ID No. 38, SEQ ID No. 39, SEQ ID No. 40 and SEQ ID No. 62; and a light chain variable domain comprising or consisting of the amino acid residues of sequences set forth in SEQ ID No. 49, SEQ ID No. 50, SEQ ID No. 51, SEQ ID No. 52, SEQ ID No. 53, SEQ ID No. 54, SEQ ID No. 55, SEQ ID No. 56, SEQ ID No. 57 and SEQ ID No. 58. In a particular embodiment, the present invention relates to a nucleic acid molecule, or a group of nucleic acid molecules, more particularly an isolated nucleic acid molecule(s) and/or a recombinant a nucleic acid molecule(s), which encode(s) a heavy chain variable domain of the antibody consists of SEQ ID NO: 91 and the amino acid sequence of the light chain variable domain of the antibody consists of SEQ ID NO: 93.

The nucleic acid molecule(s) may further comprise regulation sequences, like but not limited to enhancers, silencers, promoters, in particular expression promoters, signal peptide, for transcription and expression of the encoded heavy chain variable domain and/or the light chain variable domain.

The invention also relates to a vector comprising the polynucleotide as disclosed herein, or comprising the nucleic acid molecule(s) as disclosed herein. As used herein, a vector is a nucleic acid molecule used as a vehicle to transfer a genetic material into a cell, and in a preferred embodiment allows the expression of a polynucleotide inserted within the vector. The term vector encompasses plasmids, viruses, cosmids and artificial chromosomes. A vector generally comprises an origin of replication, a multicloning site, and a selectable marker. The vector itself is generally a nucleotide sequence, commonly a DNA sequence, that comprises an insert (transgene) and a larger sequence that serves as the "backbone" of the vector. Modern vectors may encompass additional features besides the transgene insert and a backbone: promoter, genetic marker, antibiotic resistance, reporter gene, targeting sequence, protein purification tag. Vectors called expression vectors (expression constructs) specifically are for the expression of the transgene in the target cell, and generally have control sequences.

In another aspect, the invention relates to a cell, an isolated cell, a host cell, an isolated host cell, or a cell line comprising a vector as defined above. As used herein, these terms related to cells are intended to include any individual cell or cell culture that can be or has been recipient of vectors, exogenous nucleic acid molecules, and polynucleotides encoding the antibody construct of the present invention; and/or recipients of the antibody construct itself. The introduction of the respective material into the cell can be carried out by way of transformation, transfection and the like. These terms are also intended to include progeny or potential progeny of a single cell. Suitable host cells include prokaryotic or eukaryotic cells, and also include but are not limited to bacteria, yeast cells, fungi cells, plant cells, and animal cells such as insect cells and mammalian cells, e.g., murine, rat, rabbit, macaque or human.

In a particular embodiment of the invention, the cell or cell line is selected from the group consisting of CHO, COS and HEK cells, and produced at least 0.1 mg/ml, in particular at least 1 mg/ml of antibodies, in particular at least 10 mg/ml, more particularly at least 100 mg/ml, when genetically engineered with a vector comprising vectors, exogenous nucleic acid molecules, and polynucleotides encoding the antibody construct of the present invention; and/or recipients of the antibody construct itself.

The following Figures and Examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

In a particular embodiment, the invention concerns the use of an antibody or antigen binding fragment thereof as defined in any one of the embodiments disclosed herein, for the manufacture of a medicament. In a particular embodiment, the invention concerns the use of an antibody or antigen binding fragment thereof as defined in any one of the embodiments disclosed herein, for the manufacture of a medicament useful for treating a condition wherein inflammation is involved. In a particular embodiment, the invention concerns the use of an antibody or antigen binding fragment thereof as defined in any one of the embodiments disclosed herein, for the manufacture of a medicament useful for preventive or the therapeutic treatment of:

an inflammatory disease, in particular acute inflammatory diseases, chronic inflammatory diseases such as chronic inflammatory pulmonary diseases (e.g. asthma) keratoconjunctivitis, periodontal disease, eczema, inflammatory bowel disease, in particular Crohn's disease or colitis, in particular ulcerative colitis or spontaneous colitis, cystic fibrosis, NASH (Nonalcoholic steatohepatitis), scleroderma, anti-neutrophil cytoplasm antibodies-related disease ANCA associated disease, in particular wherein, as a result of the administration of the treatment, the resolution of inflammation is enhanced;

an autoimmune disease such as diabetes, in particular type I diabetes, psoriasis, lupus, rheumatoid arthritis, multiple sclerosis, Sjögren's syndrome, celiac disease, vasculitis, myasthenia gravis, or an infection disease such as sepsis, peritonitis, degenerative diseases, wound healing disorders, severe viral indications with severe inflammatory conditions, such as coronavirus (e.g. COVID-19), or dry eye syndrome, in particular wherein, as a result of the administration of the treatment, the resolution of inflammation is enhanced;

a cancer, in particular metastatic cancers, solid or liquid cancers such as carcinoma, more particularly hepatocarcinoma, in particular mammary carcinoma or colon carcinoma, colorectal cancer or lung cancer or mesothelioma or myeloid cancer such as leukemia, in particular a cancer wherein cancer cells express CMKLR1 or where the microenvironment of the tumor is invaded by cells expressing or overexpressing CMKLR1, in particular wherein, as a result of the administration of the treatment, the resolution of inflammation is enhanced;

NASH (Nonalcoholic steatohepatitis), scleroderma, cystic fibrosis or anti-neutrophil cytoplasm antibodies-related disease (ANCA).

FIGURE LEGENDS

Figure 1B:
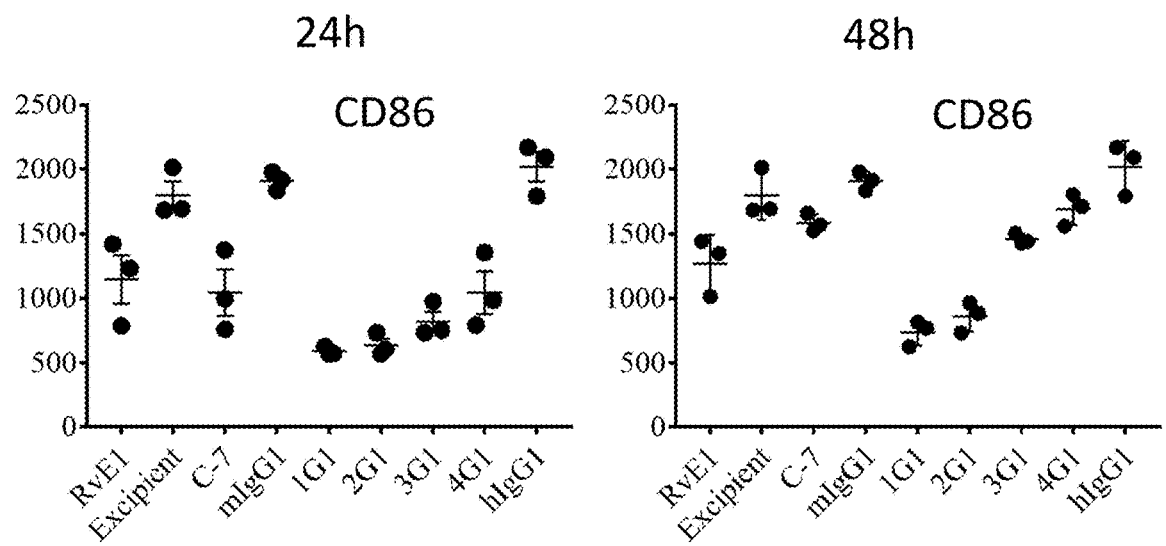
Figure 2A:
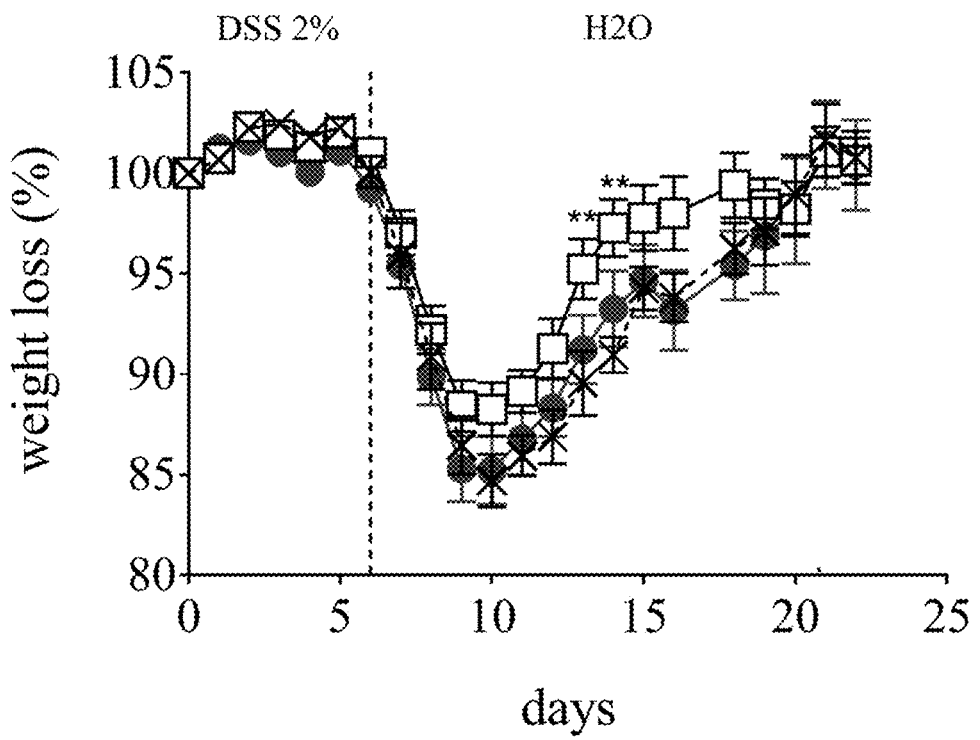
Figure 2B:
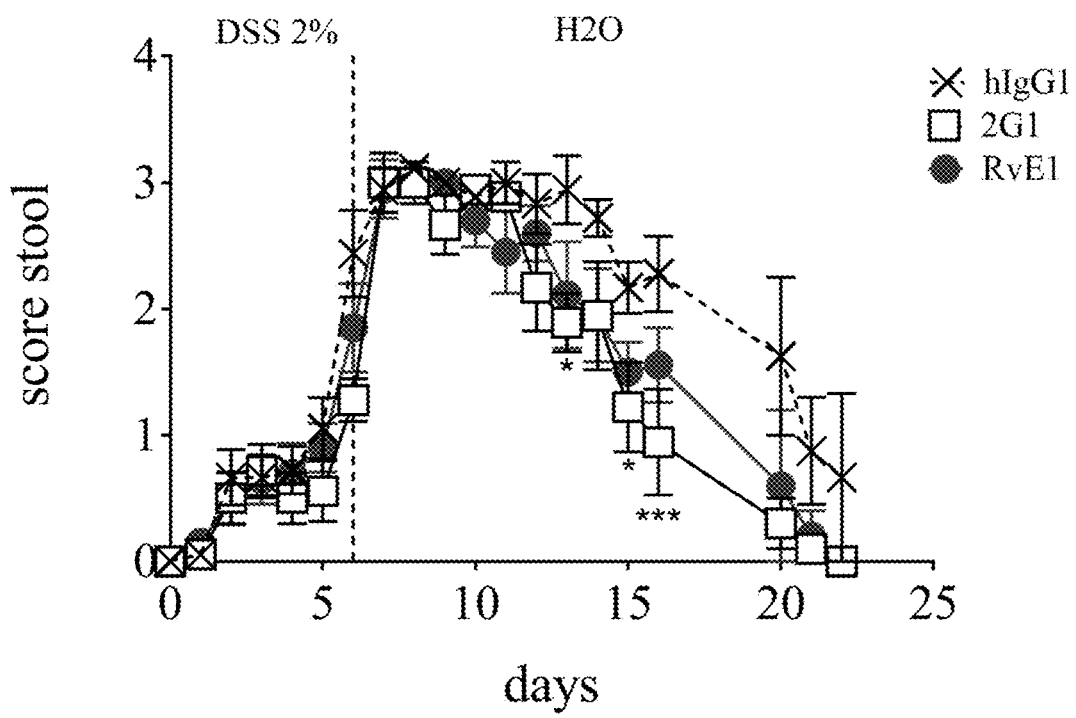
Figure 2C:
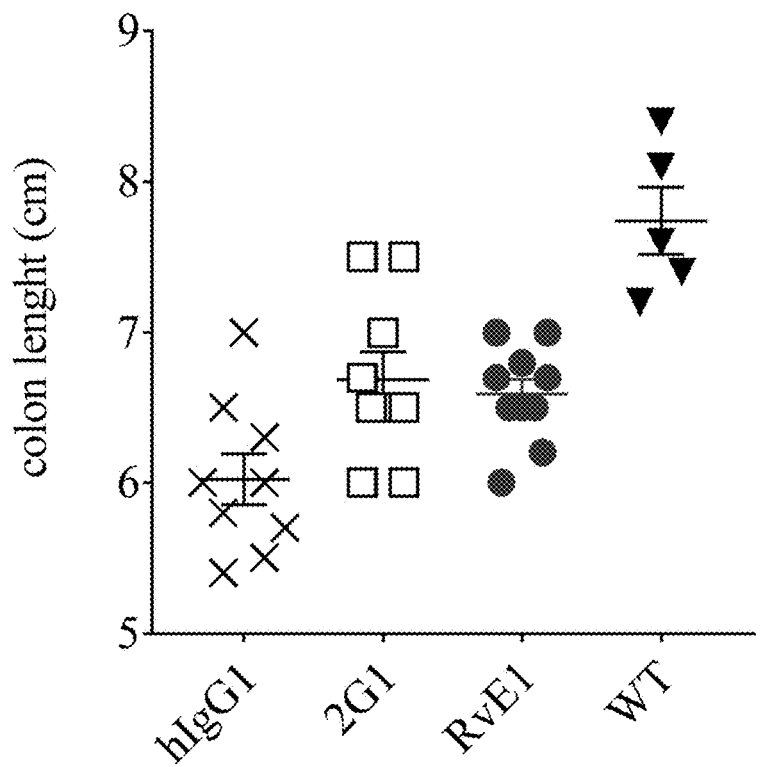
Figure 2D:
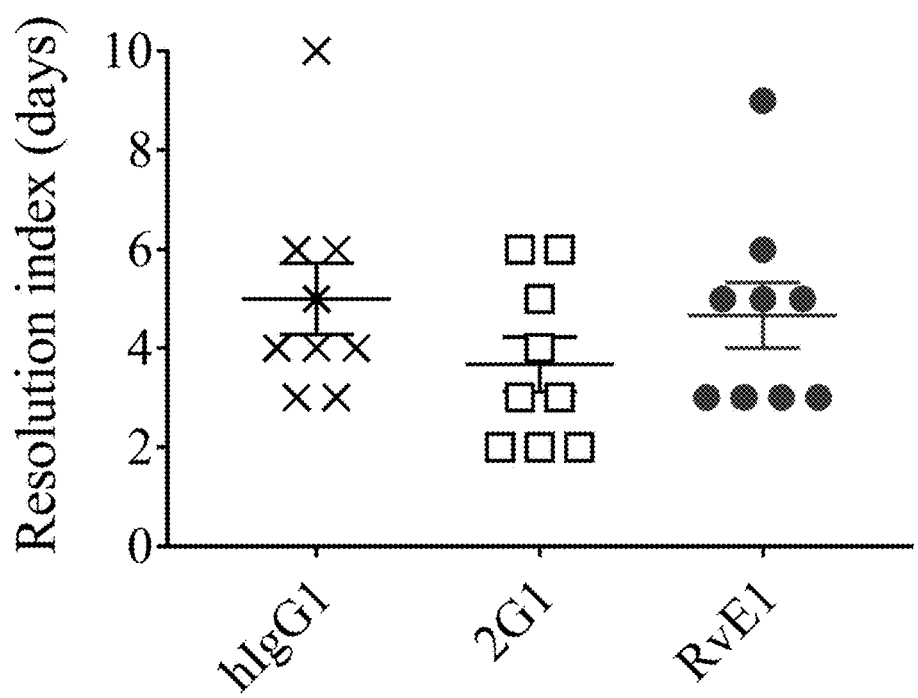

FIG. 1. Effect of the anti-CMKLR1 variants 1G1, 2G1, 3G1 and 4G1 chimeric antibodies on the DCs maturation and differentiation. Mice dendritic cells were incubated during maturation phase (24 h or 48 h) followed by a differentiation phase with excipient or RvE1 or anti-CMKLR1 antibodies variants (mutations on positions 1 and 2 of SEQ ID No. 8, corresponding to the VH-CDR3: 1G1 (LL), 2G1 (LI), 3G1 (IL) or 4G1 (II) or isotype controls (hIgG1 or mIgG)). Cells were then stained for FACS analysis with cell marker antibodies: A. CD80-PE; B. CD86-FITC; C. CD103-PerCPCy5.5; D. I/Ab-APC. Mean of Fluorescence was determined in each condition. E and F represent the viability of the cells measured by FACS using LIVE/DEAD® kit from Life Technologies in each condition after 24 or 48 hours of maturation respectively.

FIG. 2. Effect of an anti-CMKLR1 antibody on a mice acute inflammatory colitis model induced by DSS. Mice were injected after 6 days of DSS induction with isotype control hIgG1 (10 µg per mouse) (x), RvE1 (1 µg per mouse) daily (●), or 2G1 antibody (10 µg per mouse) three times (□) for 5 days. Wild type mice, not treated, are represented by an ▼. A. Animal weight loss. B. Animal stool score C. Colon length. D. Resolution index.

Figure 3:
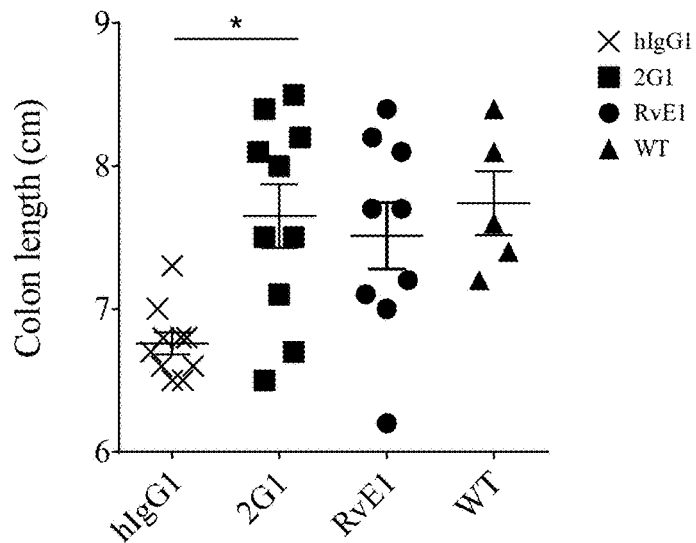

FIG. 3. Effect of an anti-CMKLR1 antibody on a mice acute inflammatory colitis model induced by TNBS. Mice received 200 µL of the haptenating agent TNBS at 5% in 50% ethanol on day 0 and then were injected with isotype control hIgG1 (10 µg per mouse) (x), RvE1 (1 µg per mouse) daily (●), or 2G1 antibody (10 µg per mouse) three times (□) for 5 days, or non-treated (wild type animals) (▲). Mice were sacrificed colon length was measured in each condition.

FIG. 4. Effect of an anti-CMKLR1 antibody on a IL10 KO mice chronic inflammatory colitis model. Mice KO for IL10 develop a spontaneous inflammatory colitis. They were treated with an Anti-CMKLR1 antibody (2G1) (□) or isotype control (hIgG1) (x) intra-peritoneally (25 µg/injection, 3 times a week). A. Animal weight loss during and after treatment. B. Animal score stool.

Figure 5A:
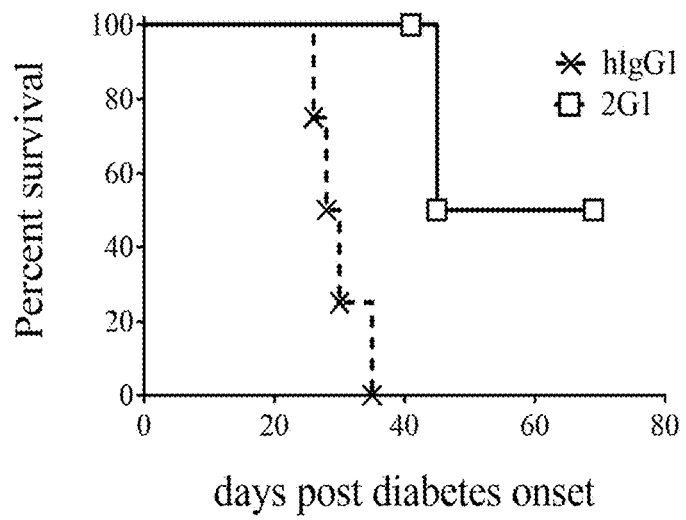
Figure 5B:
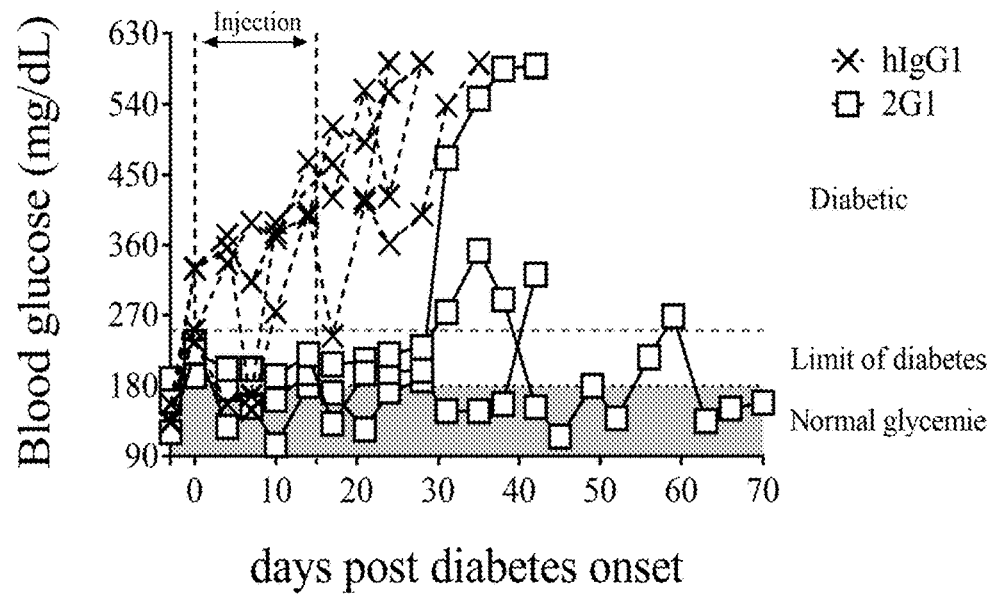
Figure 5C:
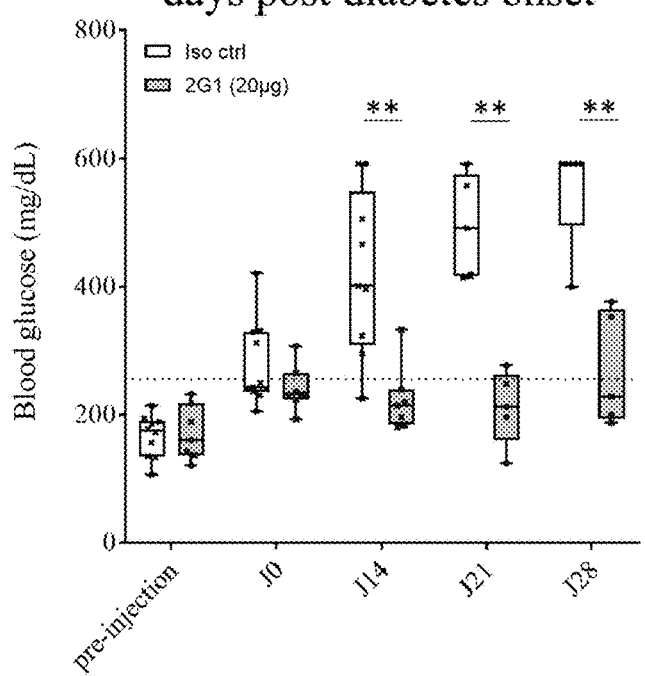

FIG. 5. Effect of an anti-CMKLR1 antibody on a mice type1 non-obese diabetes model. Mice develop spontaneous diabetes. When glycaemia was between 180 and 234 mg/dL, they were treated with anti-CMKLR1 antibody (□ in A and B, ■ in C) or isotype control antibody (x in A and B; □ in C) intraperitoneally at 20 µg/injection three times a week for 2 weeks. A. Percentage of survival, B. individual representation of blood glucose concentration in mg/dL. C. pooled representation of blood glucose concentration in mg/dL.

Figure 6A:
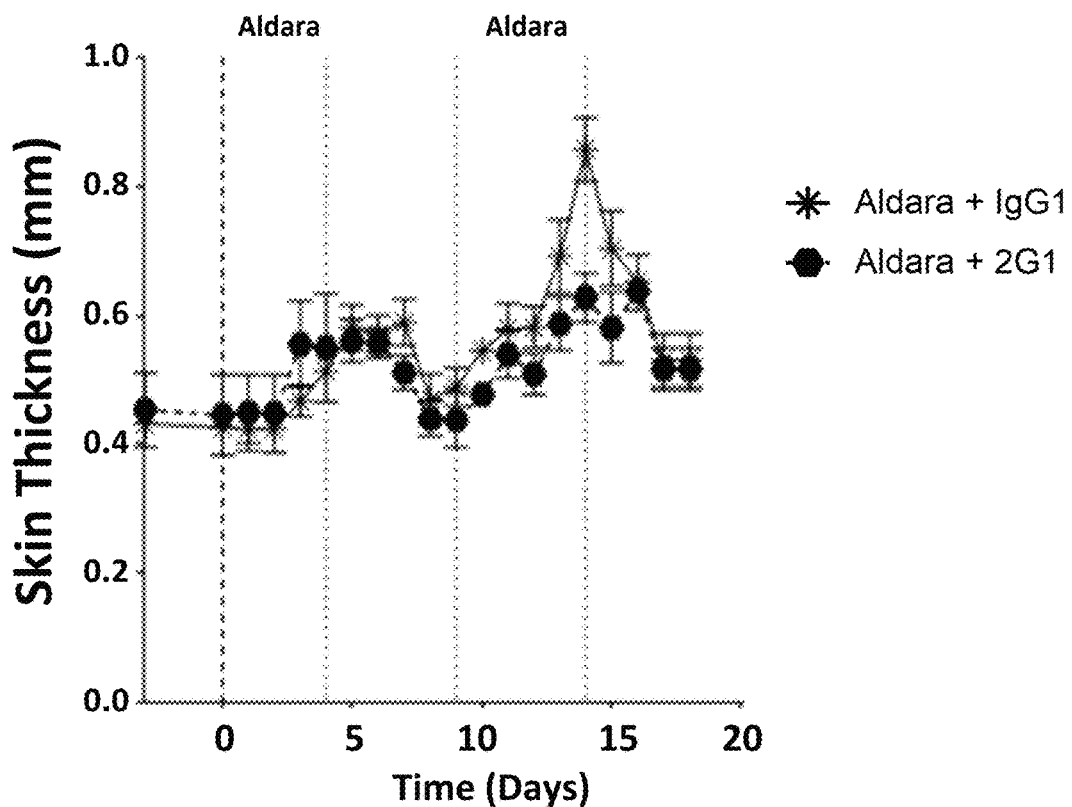

FIG. 6. Effect of anti-CMKLR1 agonist on an autoimmune disease such as mice psoriasis model. Aldara treated mice for 4 to 6 consecutive days were injected intraperitoneally with: 2G1 (●) or isotype control antibody (x). A. thicknesses and B weight.

Figure 7A:
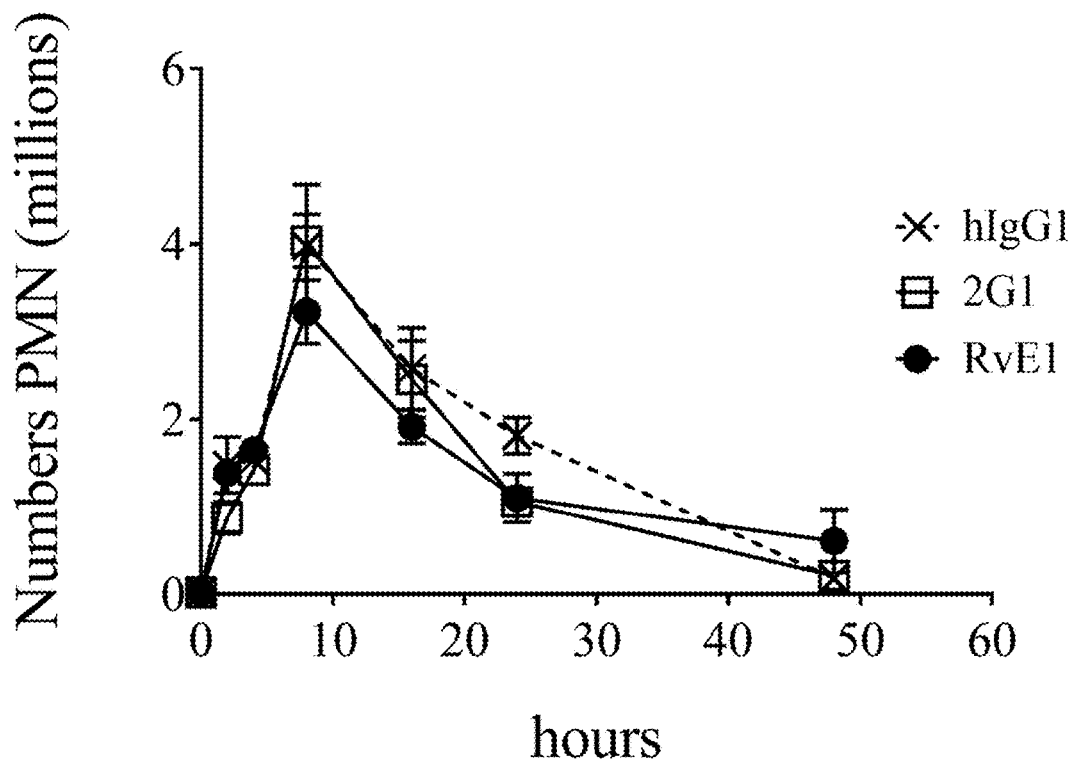
Figure 7B:
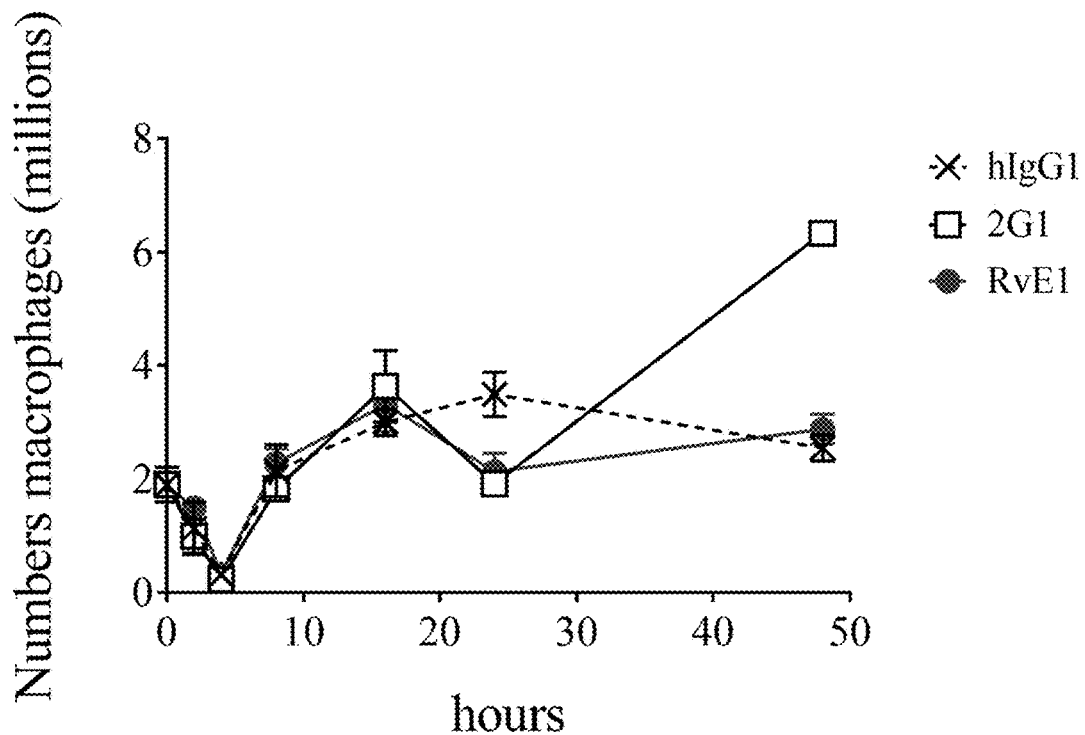
Figure 7C:
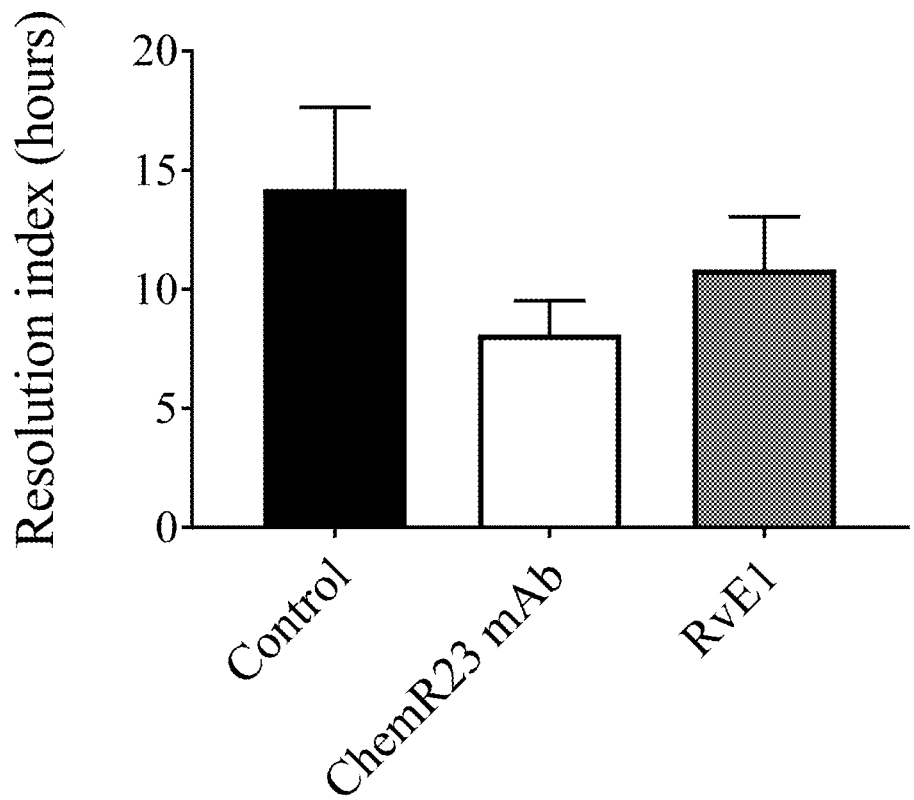

FIG. 7. Effect of an anti-CMKLR1 antibody on a mice peritonitis model. Preventive injection of anti-CMKLR1 was performed before Zymosan A injection (1 mg per mouse in 1 mL): RvE1 (1 µg per mouse) (●), 2G1 antibody (10 µg per mouse) (□) or isotype control antibody (x). A. PMN numbered during the first 50 hours after Zymosan A injection. B. Macrophages numbered during the first 50 hours after Zymosan A injection. C. Resolution index.

FIG. 8. Effect of an anti-CMKLR1 antibody on a 4T1 breast tumor model. Mice were inoculated with 4T1 cells (0.25 million) in the mammary gland. Then the anti-CMKLR1 antibody (2G1) (A. □B. ●) or an anti-41BB antibody (3H3) (●) or both antibodies (▲) were injected twice at day 4 and day 7 (10 µg/injection) or a control antibody (IgG1 isotype antibody clone 3G8) (x A. and B.) was injected three time a week for three weeks. A. The tumor area was measured 8 days after tumor injection and then every 2 days. B. Tumor lung metastasis was measured by Bioluminescence imaging (BLI) in animals treated with isotype control and anti-CMKLR1 antibody (n=4).

FIG. 9. Effect of an anti-CMKLR1 antibody on 2 different colon carcinoma mice models. Two mice models were studied, and animals received isotype control antibody (3G8) (x) or anti-CMKLR1 (2G1) (□) at 20 µg/injection intraperitoneally for 3 weeks. A-C. Results in the CT26 colon carcinoma model comparing single treatment with p84 (A) and 2G1 (B) with combined therapy with both antibodies (C). D: Results in the MC38 colon carcinoma model.

FIG. 10. Expression of CMKLR1 on Ulcerative Colitis (UC) or Crohn's Disease patient biopsies before and after anti-TNFa treatment. ■ represents controls; D represents CMKLR1 expression in patient responding to corticosteroids treatment and/or immunosuppression treatment before Infliximab treatment; represents CMKLR1 expression in patient non-responding to corticosteroids treatment and/or immunosuppression treatment before Infliximab treatment; A represents CMKLR1 expression in patient responding to corticosteroids treatment and/or immunosuppression treatment after Infliximab treatment; ▲ represents CMKLR1 expression in patient non-responding to corticosteroids treatment and/or immunosuppression treatment after Infliximab treatment. A. CMKLR1 transcript expression in Ulcerative colitis patients before and after Infliximab treatment. B. CMKLR1 transcript expression in Crohn's Disease patients before and after Infliximab treatment in inflamed colon biopsies.

Figure 11:
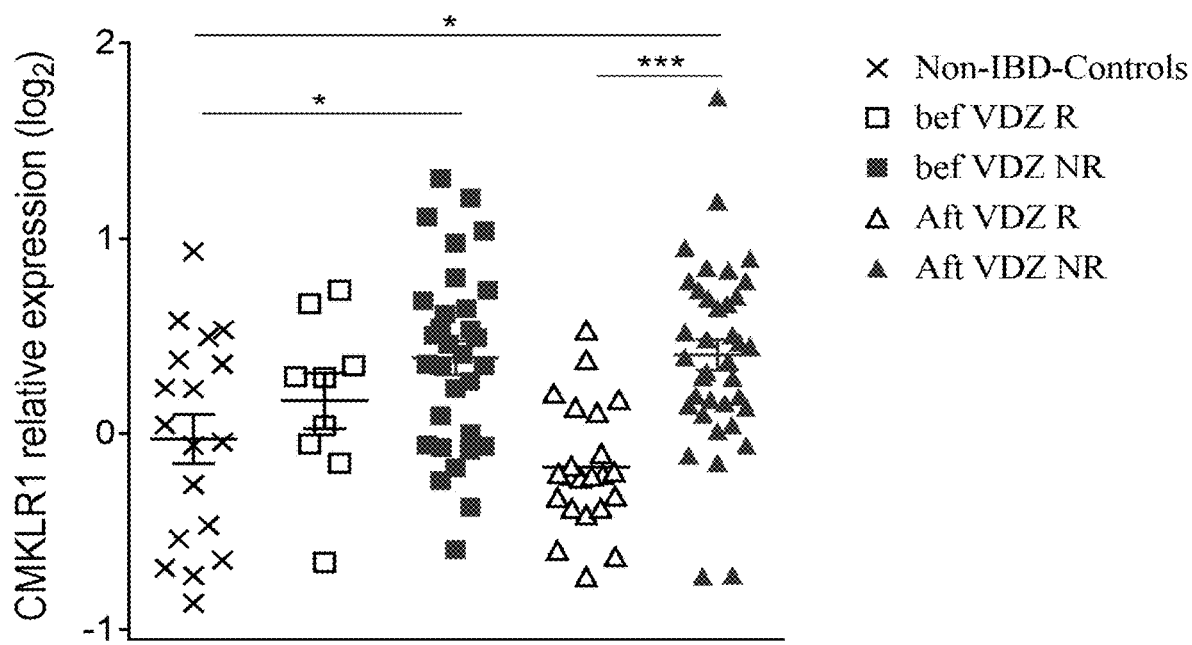

FIG. 11. Expression of CMKLR1 on UC patient biopsies before and after anti α4β7 (VDZ) treatment. A. Represents the CMKLR1 (CMKLR1) transcript expression in Ulcerative colitis patients before and after Vedolizumab treatment in inflamed colon biopsies. R corresponds to patient responsive to VDZ treatment, NR corresponds to patient non-responsive to VDZ treatment.

Figure 12:
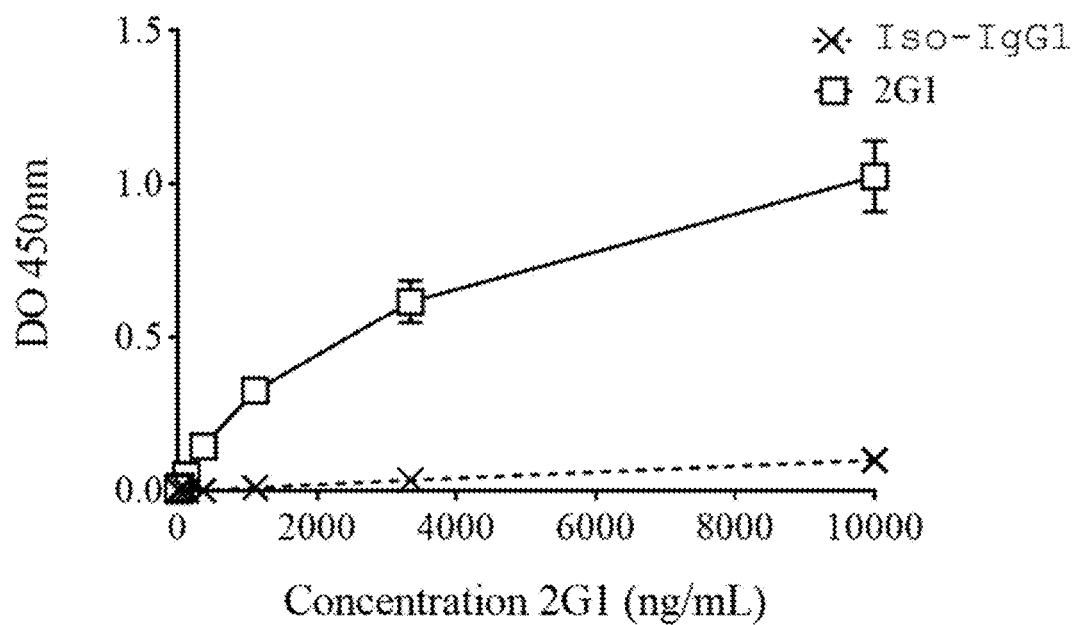

FIG. 12. Binding analysis of the anti-CMKLR1 antibody on a CMKLR1 peptide by ELISA. The binding of the 2G1 antibody (□) on the CMKLR1 EL3 loop (SEQ ID No: 18) was compared to the isotype control antibody (3G8) (x) by measuring the OD at 450 nm by ELISA.

FIG. 13. Study of CMKLR1 expression on different cell lines by FACS and western blot. A. The protein expression at cell surface of CMKLR1 was determined using the 2G1 antibody at different concentration (ng/ml) on two human different T cell lines Thp1 and U937. B. the CMKLR1 protein expression was tested by western blot on T cell lines (Thp1 and U937), fibroblast cell line MRC5, NK cell lines NKL and negative and transduced CHO cells for CMKLR1.

FIG. 14. Expression of CMKLR1 on mice myeloid cells by FACS. After differentiation, mice myeloid lineage cells were analyzed for their CMKLR1 expression at cell surface. A. expression on macrophage monocytes (M0). B and C. expression on macrophages (pro-inflammatory mM1 and pro-resolution mM2 macrophages). D and E. expression on Dendritic cells (mDC and iDC).

Figure 15A:
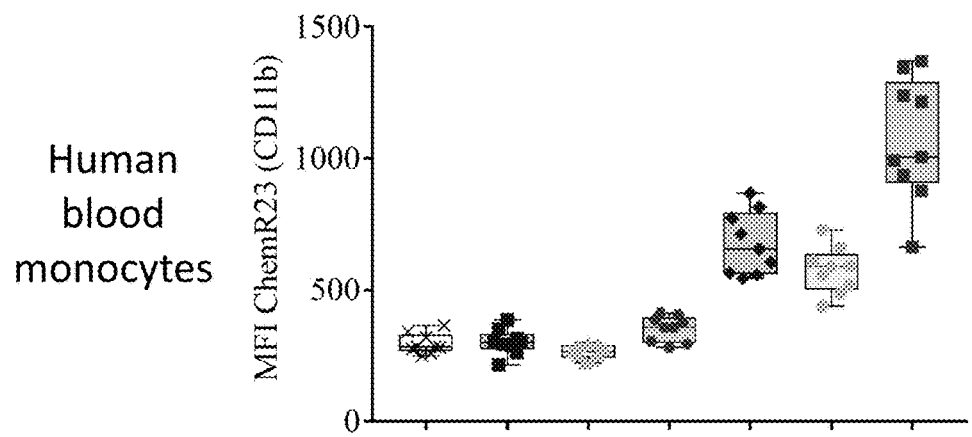
Figure 15B:
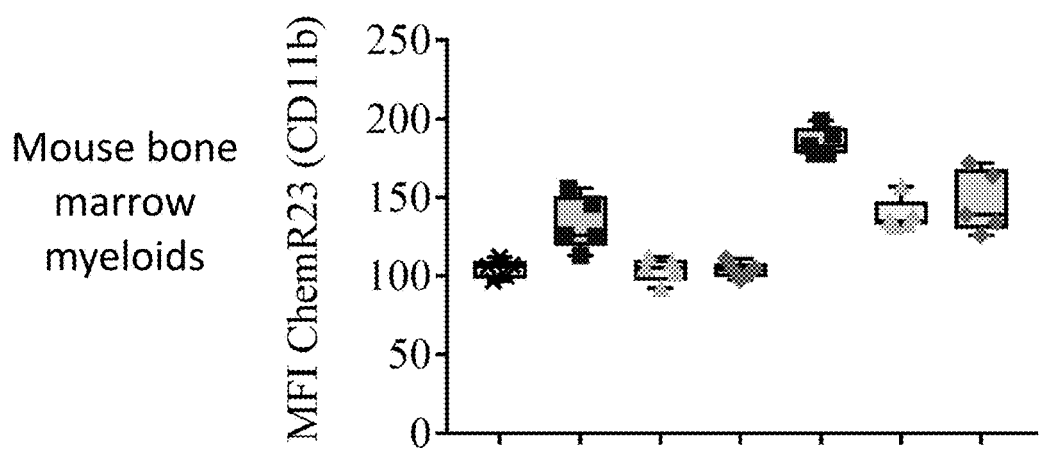
Figure 15C:
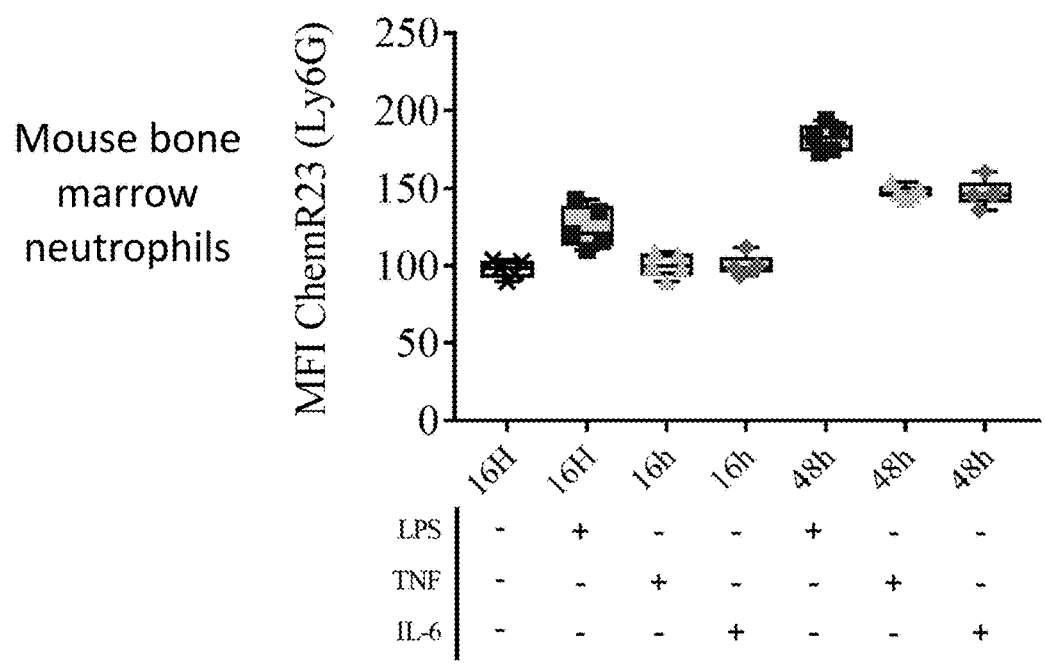
Figure 16A:
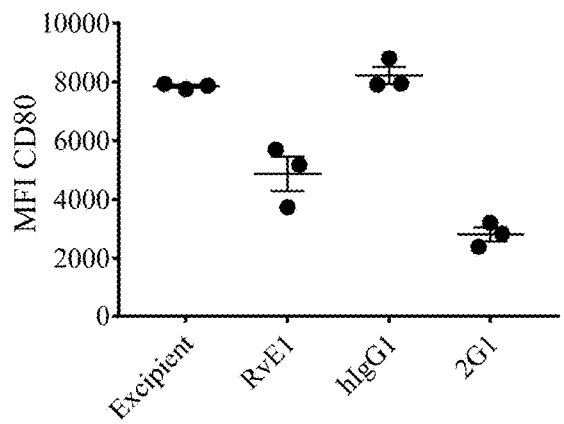
Figure 16B:
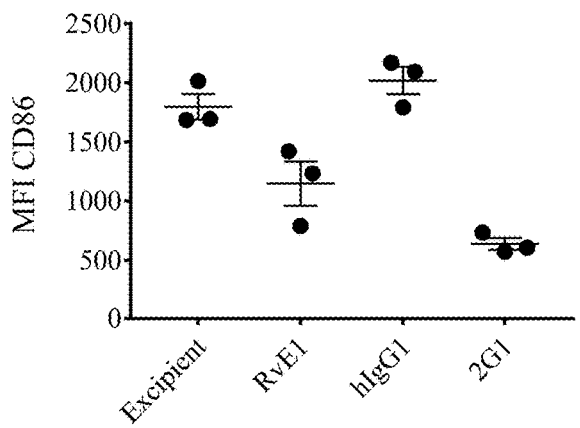
Figure 16C:
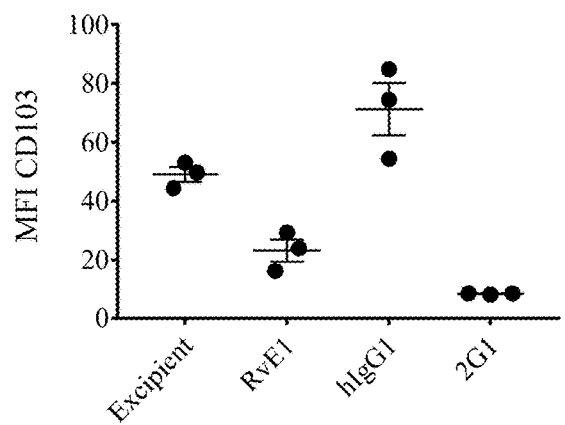
Figure 16D:
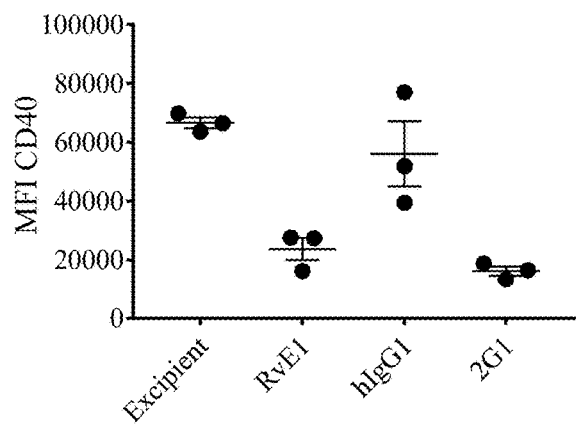
Figure 16E:
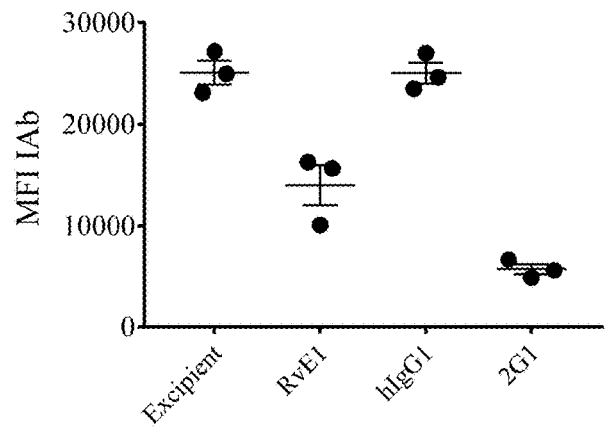

FIG. 15. Expression of CMKLR1 on human monocytes and mice bone marrow cells stimulated with pro-inflammatory stimuli.

After 16 or 48 hours of stimulation of the cells with LPS, TNFa or IL6, expression of the CMKLR1 (ChemR23) was measured by FACS. A. Results on human blood monocytes, B. and C. Results on myeloid and neutrophil cells from mice bone marrow.

FIG. 16. Study of the myeloid cell activation markers after CMKLR1 pathway activation. Dendritic cells incubated in excipient, RvE1, 2G1 or isotype control (hIgG1) were then stained for FACS analysis with marker antibodies: A. CD80-PE. B. CD86-FITC. C. CD103-PerCPCy5.5. D. CD40-PeCy7. E. I/Ab-APC. Mean of Fluorescence was determined in each condition.

Figure 17A:
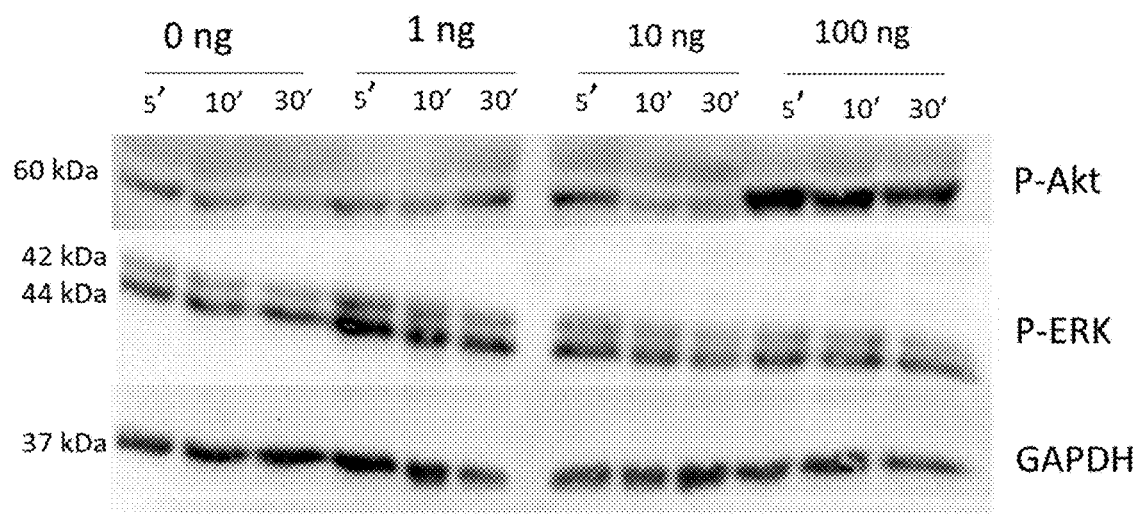
Figure 17B:
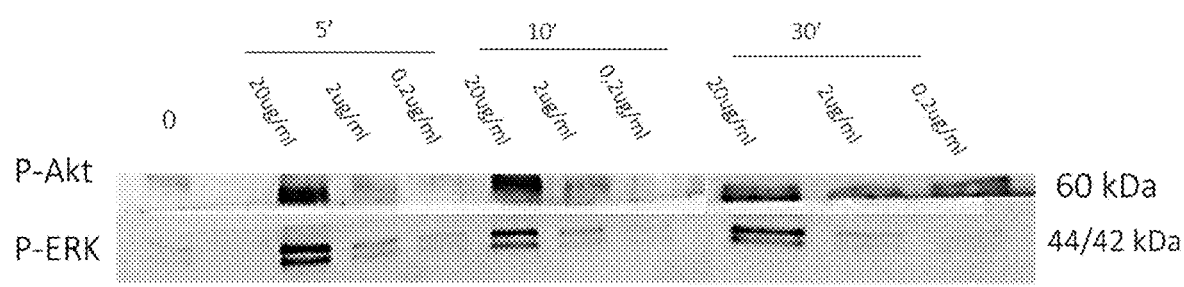

FIG. 17. Study of the CMKLR1 pathway activation: Akt and Erk phosphorylation. Western blot analysis of the ERK and AKT activation pathway after 5, 10 and 30 minutes of mice pro-inflammatory (M1) macrophages incubated with 2G1 or RvE1. The Phosphorylated protein Akt or Erk were assessed using P-Akt antibody or P-Erk antibody (p44/42). A. Erk and Akt activation with RvE1. B. Erk and Akt activation with 2G1.

Figure 18A:
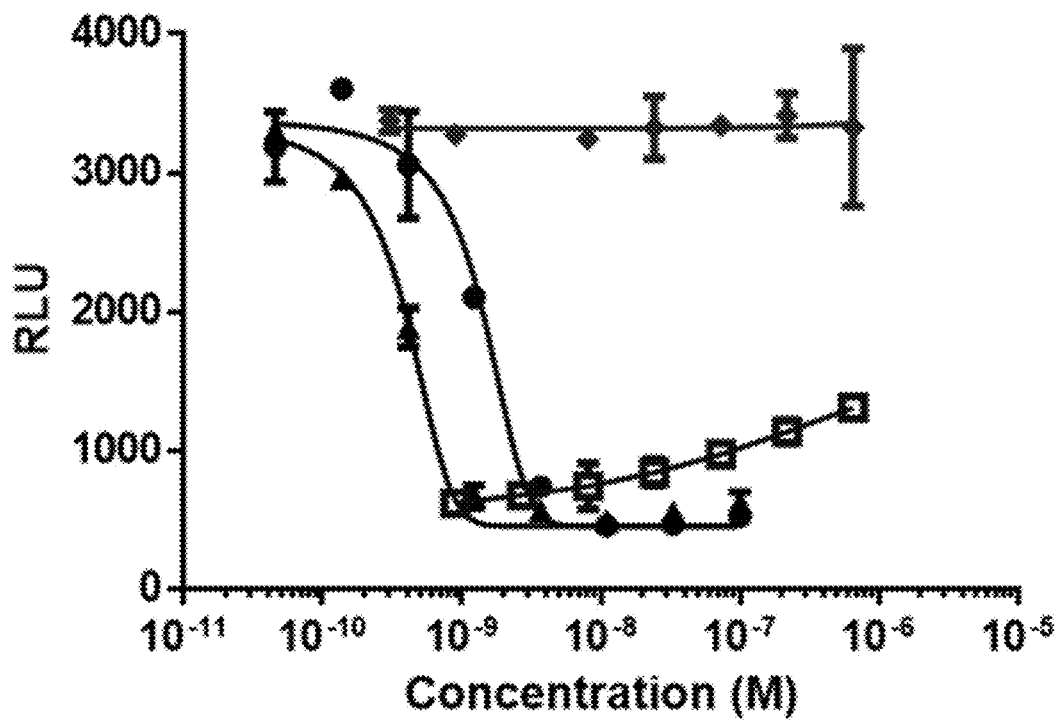

FIG. 18. Competition study on chemerin-CMLKR1 interaction with anti-CMKLR1 antibodies.
  A. Inhibition of the cAMP by Chemerin from two different providers were tested from DiscoverX (●) or R&D System (▲) or combined with anti-CMKLR1 antibody (2G1) alone (◊) or combined with chemerin from DiscoverX (□).
  B. beta Arrestin activation in presence of anti-CMKLR1 antibody at different concentrations from 1 µM to 1 nM and Chemerin 2 nM (◊) or 6 nM (●)

FIG. 19. Effect of an anti-CMKLR1 antibody in the CD45Rb$^{high}$ T-cell transfer chronic colitis mouse model. A. Weight variation of treated animals was followed up to sixty days. Animals were treated with isotype control hIgG1 (x) or anti-CMKLR1 antibody (n). B. Histological staining of colon tissue in the mice treated with the anti-CMKLR1 (right) compared to control (left). C. Anatomic pathology scores used to calculate the severity of the pathology and the inflammation (inflammation score, vasculitis score, colon thickness and fibrotic colon wall). D. CD3 and Ly6G infiltration.

Figure 20:
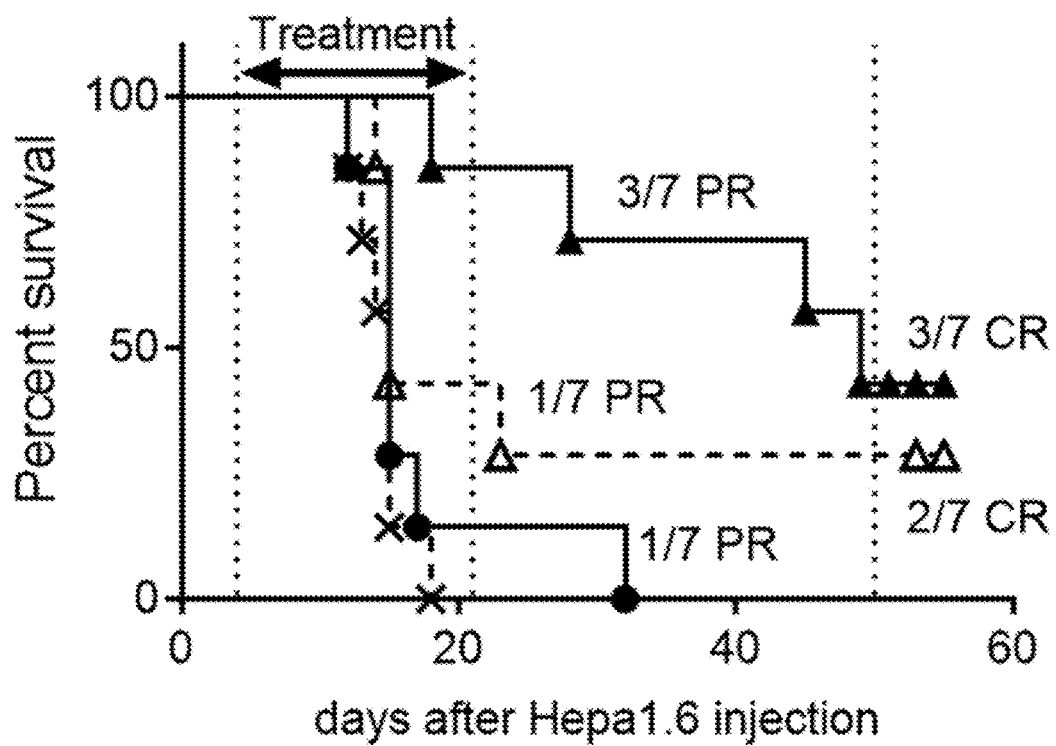

FIG. 20. Effect of an anti-CMKLR1 antibody on a Hepatocarcinoma mice model (HCC model). Anti-tumor effect of anti-CMKLR1 antibody (2G1, 0.8 mg/kg) i.p. administration three times a week for 2 weeks in combination (▲) or not (●) with two injections on day 4 and 8 of anti-PD1 mAb (RMP1-14 clone, 8 mg/kg) or with injections (twice a week) of anti-PD-1 antibody alone (Δ). Mice have been treated during 2 weeks in an orthotopic model of murine hepatoma (2.5.10^6 of Hepa 1.6 cells injected through the portal vein on day 0). Isotype control antibody was used at 0.8 mg/kg three times a week for 2 weeks. Mice response were considered partial (PR) when mice survive few days to 1 month after stop of treatment or complete (CR) when mice survive over 1 month or cured when they survive three times longer than the time necessary to all control mice dye.

FIG. 21. Production of anti-CMKLR1 antibody in different cell lines.

CDR of 2G1 heavy chain were grafted in three human germlines framework, named IGHV3-23*04, IGHV1-46*01 and IGHV7-4-1 (IMGT nomenclature). CDR of 2G1 light chain were grafted in three human germlines framework, named IGKV1-13*02, IGKV6-21*01 and IGKV3-11*01 (IMGT nomenclature). Each sequence was fused to constant fragment of human immunoglobulin and co-transfected in mammalian cells to produce humanized antibody in COS and CHO cells. Production was assessed in the supernatant. VH WT and VL WT correspond respectively to the heavy and light chains of 2G1 antibody.

FIG. 22. Production of humanized antibody derived from 2G1.

Concentration and yield of production of different combinations of heavy variable chain and light variable chain domains in CHO cells. VH WT and VL WT corresponds to the variable domains of the 2G1 antibody. The germline is issued from humanized version of the variable domains of 2G1, and are disclosed here below in the examples.

Figure 23:
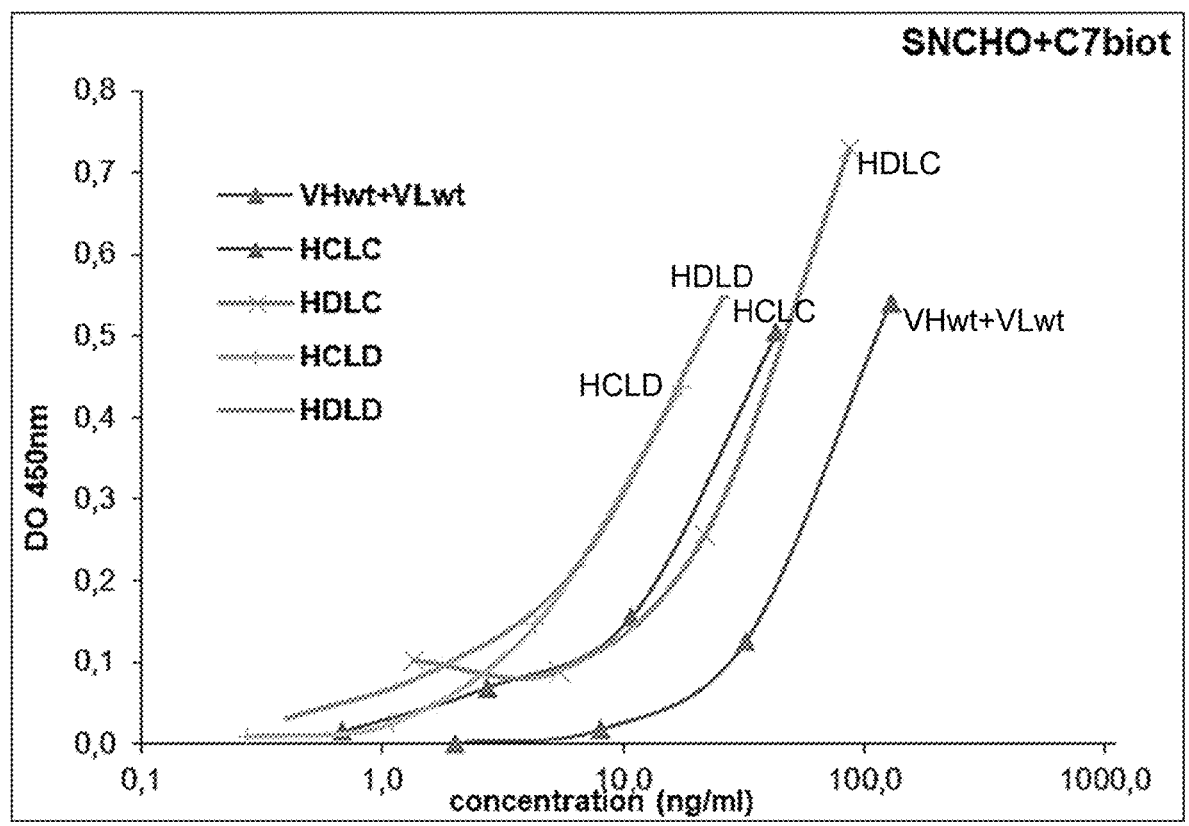

FIG. 23. Binding recognition of C7 peptide by humanized anti-CMKLR1 derived from 2G1. Binding of C7biot in the supernatant of CHO cells transfected with different combinations of heavy and light chains (VHWT+VLWT: combination of SEQ ID No. 37 and SEQ ID No. 49; HCLC: combination of SEQ ID No. 42 and SEQ ID No.52; HDLC: combination of SEQ ID No. 43 and SEQ ID No.52; HCLD: combination of SEQ ID No. 42 and SEQ ID No.53; HDLD: combination of SEQ ID No. 43 and SEQ ID No.53).

Figures 24, 25:
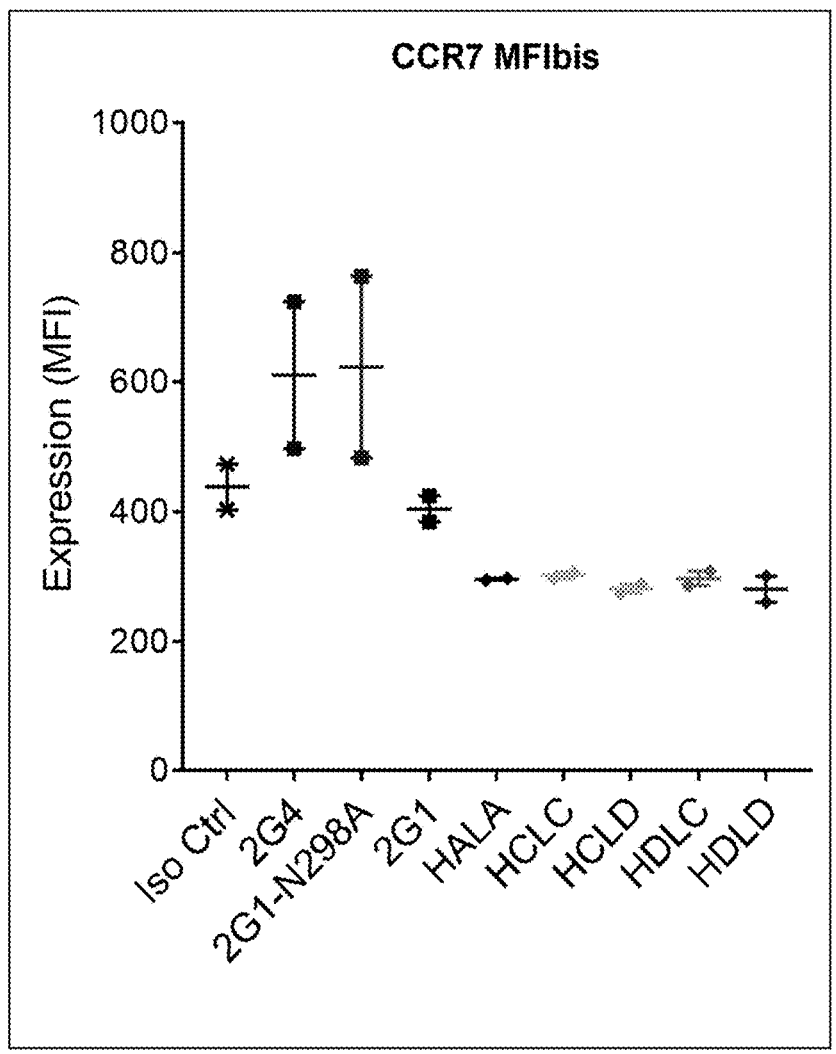

FIG. 24. ED50 of anti-CMKLR1 derived from 2G1 antibody. 2G1 wt: HALA: combination of SEQ ID No. 41 and SEQ ID No. 50; combination of SEQ ID No. 37 and SEQ ID No. 49; HCLC: combination of SEQ ID No. 42 and SEQ ID No.52; HDLC: combination of SEQ ID No. 43 and SEQ ID No.52; HCLD: combination of SEQ ID No. 42 and SEQ ID No.53; HDLD: combination of SEQ ID No. 43 and SEQ ID No.53.

FIG. 25. Inhibition of CCR7 expression on M1 macrophages cells in vitro with anti-ChemR23 antibodies coated. 2G1 and all humanized 2G1 variants (HALA, HCLC, HCLD, HDLC and HDLD) were immobilized on plate. Isotype control were added as controls. Two isotypes which prevent FcRγ binding, i.e., 2G1-N297A (2G1 wt mutated in N297A to reduce FcγR binding), and 2G4 (wt with isotype IgG4mutated in S228P to stabilise hinge region) were also added. Pro-inflammatory macrophages M1 were added on coated plate for 48 h, and CCR7 expression at the surface of the macrophages was measured by flow cytometry.

FIG. 26—Neutrophil apoptosis. A) Survival/Mortality of neutrophils B) Caspase-3 expression C) ROS production.

Neutrophils were isolated from blood of healthy volunteers and cultured for 24 h (Mortality analysis), or 4 h, 6 h, 11 h (Caspase-3 assay), or 5 h (ROS assay) on coated Iso ctrl (cross), chimeric anti-ChemR23 2G1 (square) or different humanized versions of the 2G1 (diamonds). Mortality of PMN was analyzed by incubating PMN with specific markers of the mortality and viability and then counted by picture analysis. Caspase-3 is revealed by western blot and intensity of signals was determined with a software. ROS production was revealed with a specific marker and analyzed on pictures.

FIG. 27—in vivo neutrophils apoptosis —A) Experimental proceedings—B) ChemR23 expression C) neutrophils frequency in exudates D) macrophages frequency in exudates G) neutrophils mortality F) Ratio dead/living neutrophils.

Sterile air was injected two times at d3 and d6 and inflammation was initiated with the injection of carrageenan. Exudates were collected at different times and stained for flow cytometry analysis.

FIG. 28—Neutrophils transmigration ratio-A) transmigration ratio of PMNs in healthy patients—B) Ratio PMNs in inflamed patients suffering from ANCA Endothelial cells were coated and +/−activated with 100 U/mL of TNFa overnight. Then PMN were added with or without TNFa at 100 U/mL and Ab for two hours. The transmigrated PMN were collected and analyzed by flow cytometry.

FIG. 29—CD62L expression. PMN from healthy volunteers were incubated in culture medium with coated Ab at 10 μg/mL for different times and collected for CD62L staining analyzed by flow cytometry (left panel). The soluble form of the CD62L released by shedding is detected by ELISA in the supernatant of PMN incubated with coated Ab (right panel).

Figure 30:
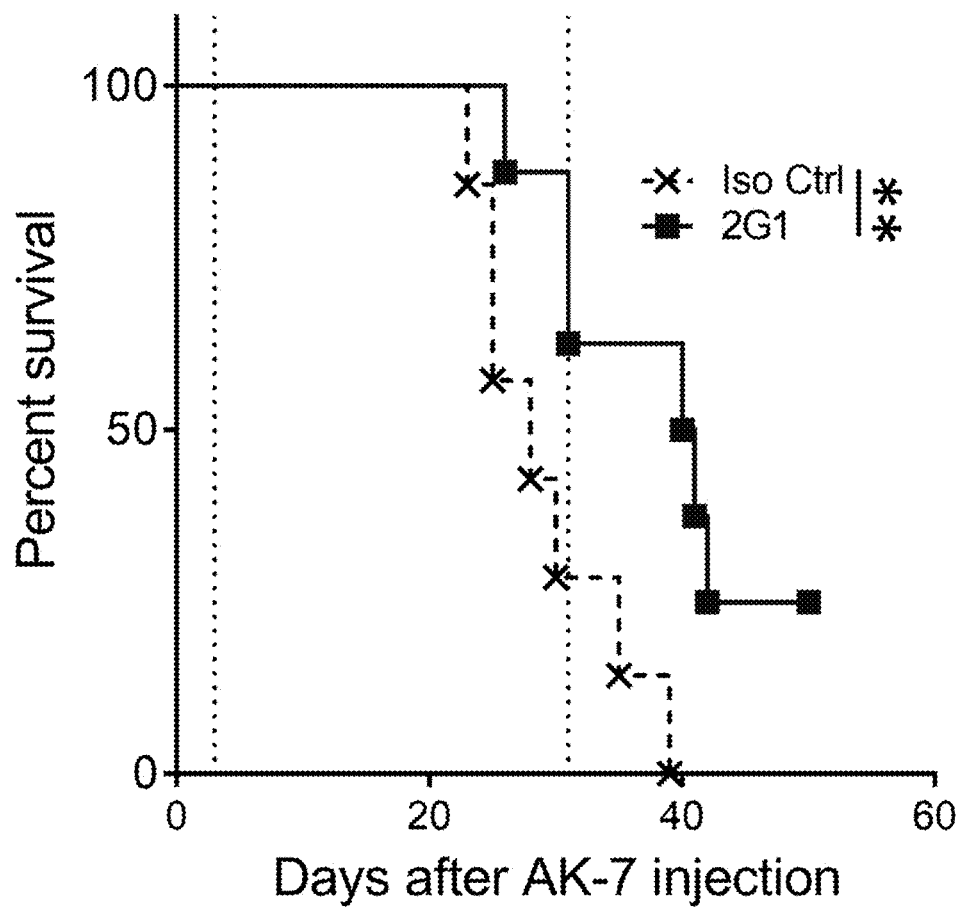

FIG. 30—Mesothelioma model Survival

AK-7 cells (3M) were injected in the pleural cavity and mice received either Iso ctrl or 2G1 three times a week for 3 weeks starting at d4 at 1 mg/kg.

FIG. 31—CRC model A) Tumor cell inoculated model of CRC: tumor development and survival B) Chemically and inflammation induced CRC.

Tumor inoculation was performed with 0.5M of MC38 CRC cell line subcutaneously. Mice were injected three times a week with 1 mg/kg of 2G1 or Ctrl Ab for 3 weeks starting at d4 after tumor induction. Cyclophosphamide was injected I.P. once at 100 mg/kg. Tumor development was assessed three times a week and survival curves were established when mice developed a tumor >1000 mm3.

In the AOM-DSS model, mice received an IP injection of azoxymethane at 7.5 mg/kg and 5 days later, three cycles of 5 days-DSS and 14 days-water started. Treatment or placebo were administered after the $1^{st}$ cycle and kept going until the end two times a week. Mice were weighted and stool analyzed two times a week. Colons and tumors were measured and numbered 80 days after the chemical injection.

Figure 32A:
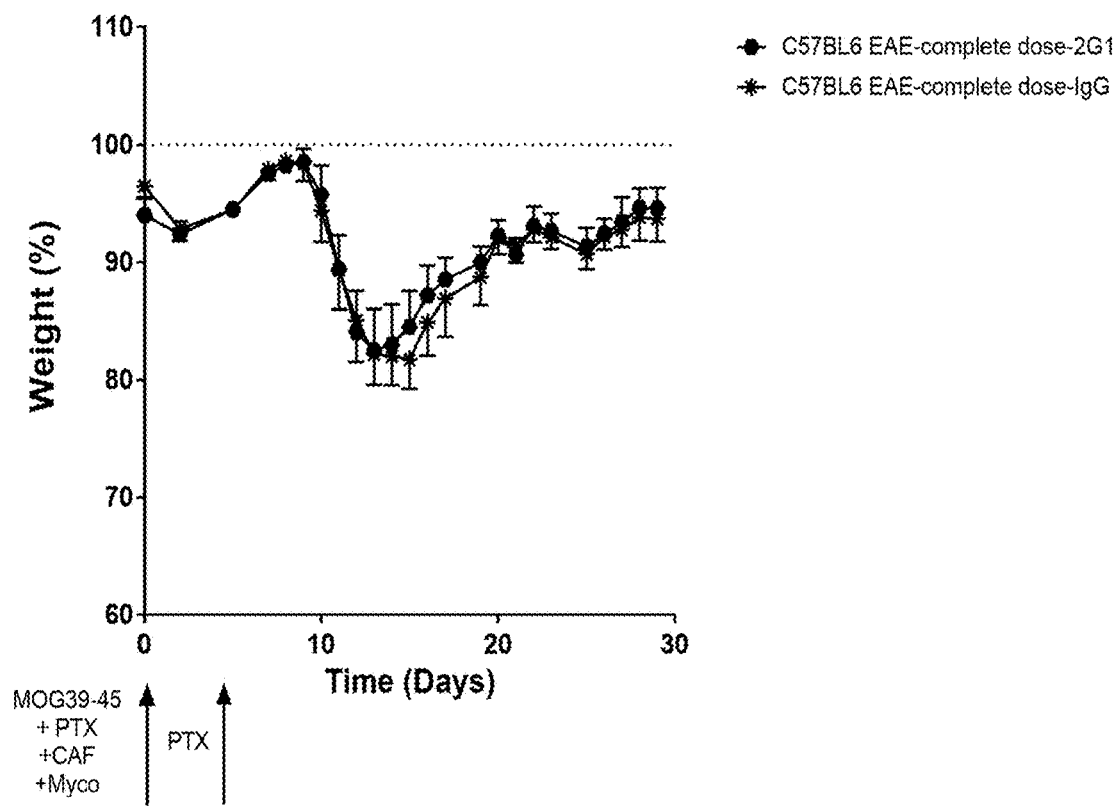

FIG. 32—autoimmune encephalomyelitis experimental model.—A) Weight variation overtime B) illness score Lesions in the central nervous system were induced by injection of the immunogenic MOG peptide combined with adjuvants. Treatment (2G1) or Isotype control were administered at 1 mg/kg when animals had a clinical score equal to 2 meaning the central nervous system is already affected by T cell activity, until the end of the experiment.

Figures 33A, 33B:
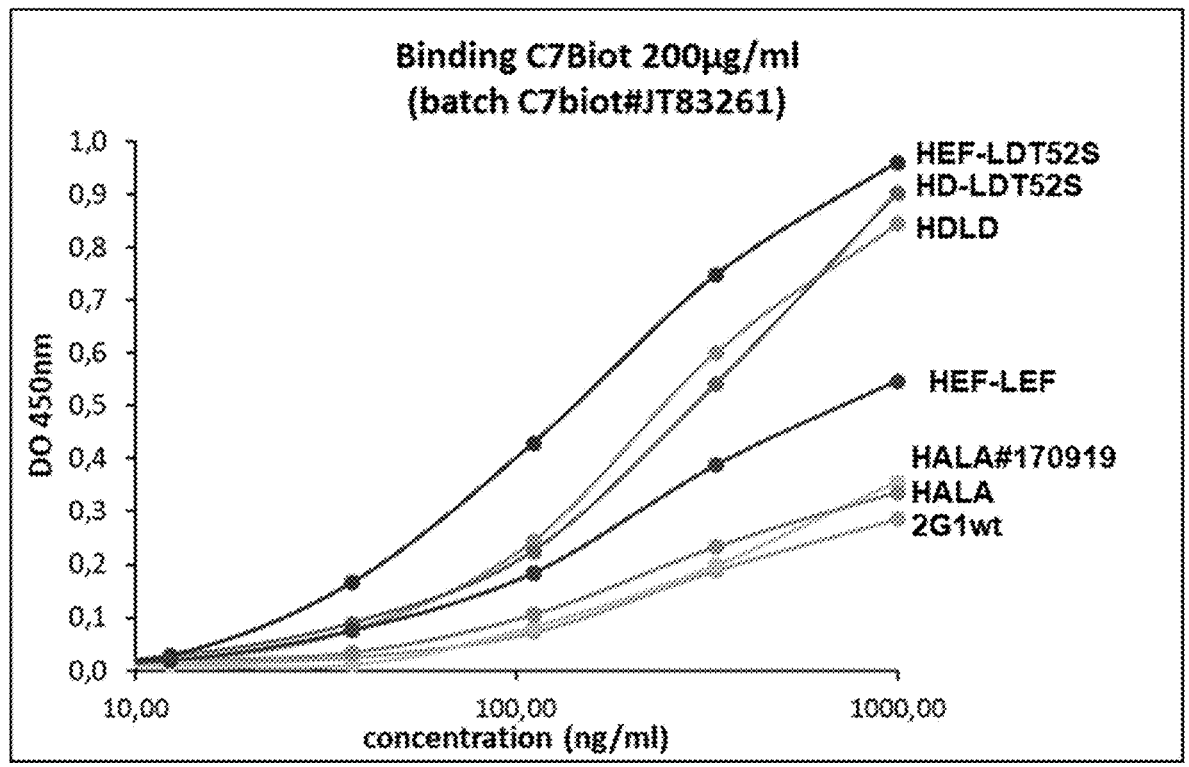

FIG. 33—Binding of purified antibodies on human ChemR23 peptide by ELISA assay (A), with ED50 concentration (ng/ml) (B). For activity ELISA assay, donkey anti-human IgG, Fc specific (Jackson Immunoresearch; USA; reference 709-005-098) was immobilized on plastic at 1.3 μg/ml in borate buffer (pH9) and purified antibody was added to measure binding in BSA1% buffer, compared to wild-type 2G1. After incubation and washing, biotinylated antigen-specific peptide (Biot-C7 peptide) then, peroxidase-streptavidin (Jackson Immunoresearch; USA; reference 016-030-084) was added and revealed by conventional methods.

FIG. 34—A. Binding of purified antibodies incubated 7 days at 4° C. or 37° C. on human ChemR23 ELISA assay. B. SEC profile by gel filtration chromatography of purified antibodies incubated 7 days at 37° C. Each purified humanized anti-ChemR23 antibody (HALA, HDLD, HD-LDT52S, HEF-LDT52S, HEF-LEF) were incubated for 7 days at 4° C. or 37° C. After 7 days, the binding of purified antibodies was analyzed by ELISA assay and the aggregate formation was analyzed by gel filtration (Superdex 200 10/300GL, GeHealthcare).

FIG. 35—Inhibition of CCR7 expression on M1 macrophages cells in vitro with anti-ChemR23 antibody coated. The humanized 2G1 variant HEF-LD-T52S was immobilized on plate. Isotype control were added as controls. Pro-inflammatory macrophages M1 were added on coated plate, and CCR7 expression at the surface of the macrophages was measured by flow cytometry.

FIG. 36—Increase of dead PMN neutrophils in vitro with anti-ChemR23 antibodies coated. PMN from healthy volunteers were incubated in culture medium with coated HEF-LDT52S, HEF-LEF and HDLD antibody variants at 10 µg/mL for 24 h and stained either with a dead/viability kit (LIVE/DEAD (Invitrogen)). The percentages of positive cells were obtained by analyzing the pictures with Fiji software. Isotype control was added as control. A mutated version of HEF-LDT52S antibody which does not bind to Fc receptors (FcR) (HEF-LDT52S N297A) were also added.

EXAMPLES

Production and Selection of Anti-CMKLR1 Antibody

Several antibodies having different CDR sequences within their heavy and light chain variable domains have been synthetized. The distinct antibodies were tested for their ability to induce maturation and differentiation of dendritic cells towards a pro-inflammatory pathway or an anti-inflammatory pathway. They selected antibody 2G1 (SEQ ID No: 37 and SEQ ID No: 49) to assess its properties in resolving inflammatory status of at least influencing said status in resolution phase, and the generation of 3 germlines for assessing the production of antibodies in vitro.

As shown in FIG. 1; the 2G1 and 1G1 (another synthetized antibody) antibodies were able to inhibit DCs activation and/or maturation in a stronger manner than other synthetized antibodies (3G1 and 4G1) cells towards a pro-inflammatory pathway since level of detection of DCs expressing CD103 and IAb treated with 2G1 was lower than DCs cells treated with C7 antibody (the method used in this assay is described in point 10.2 of the examples). As shown in FIGS. 1E and 1F, the viability of cells is enhanced after treatment with 1G1 or 2G1 antibodies as compared to cells treated with others antibodies, including C7, or Resolvin E1.

The 2G1 was humanized using in silico CDR grafting method, a method of humanization. The resulting humanized sequences from the CDR and FR regions, as well as from the variable heavy chain and light chain are described in the following tables.

TABLE 1

Heavy chain variable domain germlines

| Germline | Amino acid Sequence | SEQ ID No. |
|---|---|---|
| VH_IGHV3-23*04 | EVQLVESGGGLVQPGGSLRL SCAASGFTFSSYGMSWVRQA PGKGLELVATINRYGGSTYY PDSVKGRFTISRDNSKNTLY LQMNSLRAEDTAVYYCPRLI YYGNEGDSWGQGTLVTVSS | 41 |
| VH_IGHV1-46*01 | QVQLVQSGAEVKKPGASVKV SCKASGFTFSSYGMSWVRQA PGQGLELVATINRYGGSTYY PDSFKGRVTITRDNSTSTLY MELSSLRSEDTAVYYCPRLI YYGNEGDSWGQGTLVTVSS | 85 |
| VH_IGHV7-4-1*02 | QVQLVQSGSELKKPGASVKV SCKASGFTSSYGMSWVRQAP GQGLELVATINRYGGSTYYP DSFKGRFVISRDNSVSTLYL QISSLKAEDTAVYYCPRLIY YGNEGDSWGQGTLVTVSS | 86 |

TABLE 2

Light chain variable domain germlines

| Germline | Amino acid Sequence | SEQ ID No. |
|---|---|---|
| VL_IGKV1-13*02 | AIQLTQSPSSLSASVGDRVT ITCSASSSVSFMHWYQQKPG KAPKRWIYDTTKLTSGVPSR FSGSGSGTDYTLTISSLQPE DFATYYCQQWNSKPPLTFGG GTKVEIK | 50 |
| VL_IGKV6-21*01 | EIVLTQSPDFQSVTPKEKVT ITCSASSSVSFMHWYQQKPD QSPKRWIYDTTKLTSGVPSR FSGSGSGTDYTLTINSLEA EDAATYYCQQWNSKPPLTFG GGTKVEIK | 87 |
| VL_IGKV3-11*01 | EIVLTQSPATLSLSPGERAT LSCSASSSVSFMHWYQQKPG QAPRRWIYDTTKLTSGIPAR FSGSGSGTDYTLTISSLEPE DFAVYYCQQWNSKPPLTFG GGTKVEIK | 88 |

Examples of therapeutic efficacy of anti-CMKLR1 antibody treatment on preclinical models of autoimmune and inflammatory diseases Example 1. Induction of Colitis by DSS Colitis was induced in 8-10 weeks-old-C57Bl/6 male mice by adding 2% (wt/vol) of DSS to the sterile drinking ad libitum water for 6 days. Treatments were injected intra-peritoneally: Isotype control hIgG1 (10 µg per mouse), RvE1 (1 µg per mouse) daily, or 2G1 antibody (10 µg per mouse) three times for 5 days. Colitis follow-up consisting of body weight and stool score (0: normal stool; 4: blood in stool) parameters were performed daily. When mice were euthanized, colon length representing the pathology severity was measured. Resolution index was determined in the different conditions as described in Bannenberg et al., 2005.

RESULTS: The DSS animal model presented on FIG. 2 is an acute inflammatory model. FIG. 2 shows a better overall state of the animals treated with the anti-CMKLR1 antibody than states of animals receiving the control antibody or the resolvin RvE1. The anti-CMKLR1 treated mice lost significantly less weight (FIG. 2A) and the score stool (FIG. 2B) was significantly better. Regarding the colon length and resolution index (FIGS. 2C and 20), the animals receiving the anti-CMKLR1 or RvE1 presented similar results.

Example 2. Induction of Colitis by TNBS

Colitis was induced in 8-10 weeks-old-C57Bl/6 male mice by intrarectal injection of 200 μL of the haptenating agent TNBS at 5% in 50% ethanol on day 0. Treatments were injected intra-peritoneally; RvE1 (1 μg per mouse) daily for three days, or 2G1 antibody (10 μg per mouse) twice for 3 days. Colitis follow-up consisting of body weight and stool score (0: normal stool; 4: blood in stool) parameters were performed daily (data not represented). When mice are euthanized, colon length representing the pathology severity was measured.

RESULTS: Colitis induced by TNBS is another model of acute inflammation. FIG. 3 shows that animals treated with anti-CMKLR1 or RvE1 have a colon length which is the same as normal animal (wt). However, those treated with the isotype control presented a shorten colon length. These results confirmed the therapeutic potential of an anti-CMKLR1 antibody acting like RvE1 on acute inflammatory mice models.

Example 3. IL10-KO Model—Spontaneous Colitis Model

IL-10KO mice develop a spontaneous colitis from 20 weeks of age mostly due to the absence of regulatory T cells function through IL-10 secretion in the intestine. IL-10KO mice were followed-up three times a week from 18-week old for their weight loss and stool consistency which are clinical hallmarks of this pathology. Anti-CMKLR1 antibody (2G1) or isotype control (hIgG1) were injected intra-peritoneally when the weight loss was superior to 5% and the stool score was superior or equal to 1 for 2 weeks (25 μg/injection, 3 times a week).

Figure 4A:
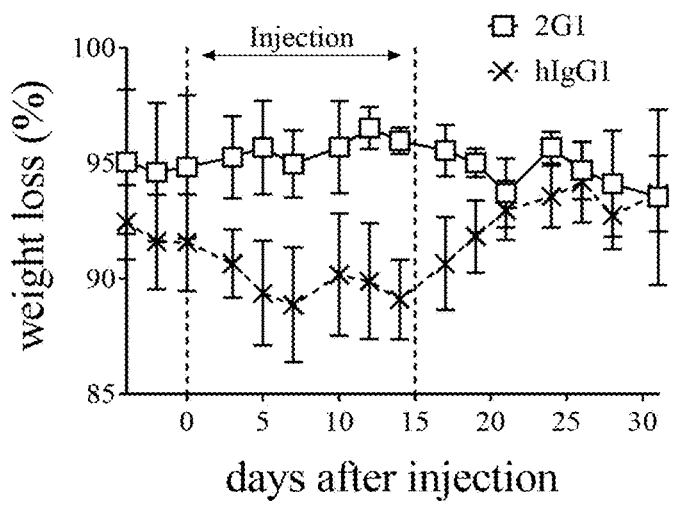
Figure 4B:
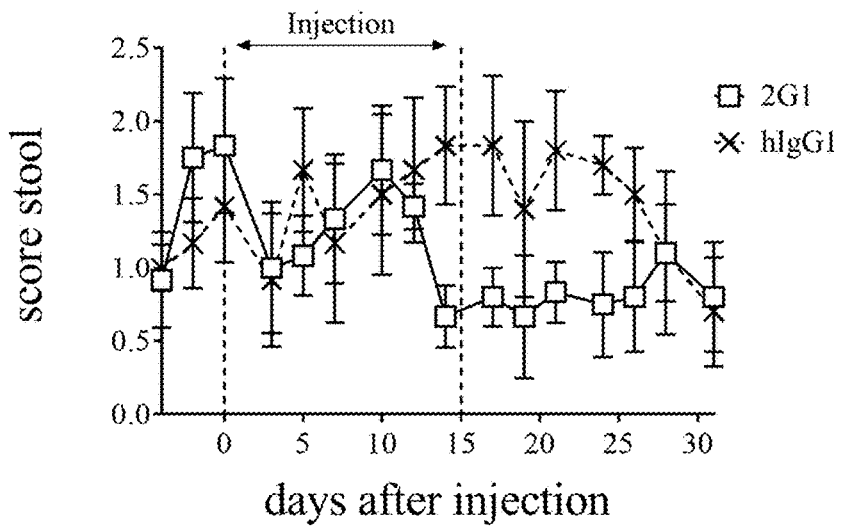

RESULTS: A chronic inflammatory model was used to study the efficacy of anti-CMKLR1 antibody treatment. FIG. 4 shows the analysis of the percentage of weight loss (FIG. 4A) and the score stool (FIG. 4B) when animals were treated with isotype control or anti-CMKLR1 antibody. Results show that animals lost less weight when treated with the anti-CMKLR1 antibody and had a better score stool than those receiving the isotype control. Anti-CMKLR1 antibody seems hence to present a therapeutic potential on chronic inflammatory diseases.

Example 4. Preclinical Model of Type 1 Diabetes: The Mice NOD Model 8 weeks-old NOD female mice were obtained from Charles River laboratory. These mice develop a spontaneous type 1 diabetes at age between 12 to 20 weeks. The diabetes initiation can be measured by the high glycaemia. When the glycaemia was between 180 and 234 mg/dL, anti-CMKLR1 and isotype control were given intra-peritoneally at 20 μg/injection three times a week for 2 weeks. Mice were euthanized when the glycaemia was superior to 600 mg/dL corresponding to an irreversible diabetes.

RESULTS: this type 1 diabetes model is considered as a mice autoimmune disease model as well. Results presented FIG. 5 A-C show that animals treated with an anti-CMKLR1 antibody presented a better survival percentage and an almost normal glycaemia as indicated by measurement of the blood glucose concentration. This recovery seems to be stable over time and indicate a potential total recovery of animals that were previously ill. Anti-CMKLR1 antibody restored a tolerated state against glucose.

Example 5. Imiquimod-Induced Psoriasis-Like Skin Inflammation

Figure 6B:
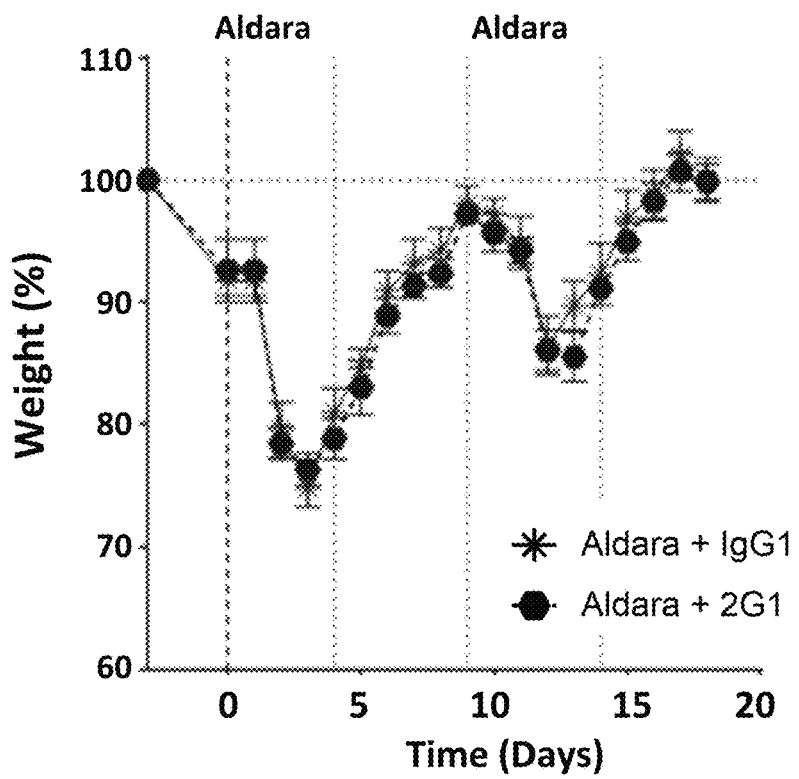

Aldara® cream which is known to induce psoriasis in mice was used on male C57Bl/6 mice (8-10-week old). Mice received a daily topical dose of Aldara. Treatments (anti-CMKLR1 agonist or control compound) were injected intra-peritoneally:

RESULTS: Anti-CMKLR1 agonist (2G1) reduces the thickness of the skin (FIG. 6A) after Aldara administration (see for example on day 15), while the weight of the animals is not impacted by the administration of the agonist (FIG. 6B). These results suggest an application for agonist anti-CMKLR1 compound therapy on psoriasis mice model, illustrative of an autoimmune disease.

Example 6. Therapeutic Efficacy of Anti-CMKLR1 Antibody on Preclinical Model of Sepsis: Mice Peritonitis Model Common peritonitis is induced by intraperitoneal injection of Zymosan A® (1 mg per mouse in 1 mL). Preventive injection of anti-CMKLR1 was performed 5 minutes before Zymosan A injection: RvE1 (1 μg per mouse), 2G1 antibody (10 μg per mouse). Murine peritoneal polymorphonuclear neutrophil (PMN) and macrophages were collected at 2-4-8-16-24 and 48 h after Zymosan A injection and numbered by flow cytometry analysis to determinate the resolution index (Bannenberg et al., 2005).

RESULTS: Results presented on FIG. 7 on PMNs (7A) and Macrophages (7B) numbers and on resolution index (7C) show that animals treated with RvE1 or an anti-CMKLR1 antibody presented identical results and a slightly less PMNs and macrophages cells along with a better resolution index compared to the isotype control. In sepsis, even a slight difference could be of importance for therapy. Hence, these results are very positive for a potential application of an anti-CMKLR1 antibody in sepsis.

Example 7. Therapeutic Efficacy of Anti-CMKLR1 Antibody Treatment on Preclinical Models of Cancers Example 7.1. Effect of an Anti-CMKLR1 Antibody on the Growth of a Primary Tumor and its Lung Metastasis Development in an Orthotopic Mammary Carcinoma Model Mice were anesthetized with 3% of isoflurane. Mice were shaved on the abdomen and 4T1 cells (0.25 millions) were injected in the mammary gland with an insulinic syringe (30 Gauges) in 50 μL of PBS. The anti-CMKLR1 antibody (2G1) or an anti-41BB antibody (3H3) or both antibodies were injected twice at day 4 and day 7 (10 μg/injection); a control antibody was injected three times a week for three weeks intraperitoneally in PBS (100 μg/injection). In a second study to measure the lung metastasis following mammary carcinoma development, animals were treated with anti-CMKLR1 antibody at 0.8 mg/kg or control antibody (100 µg/injection) three times a week for three weeks.

Figure 8A:
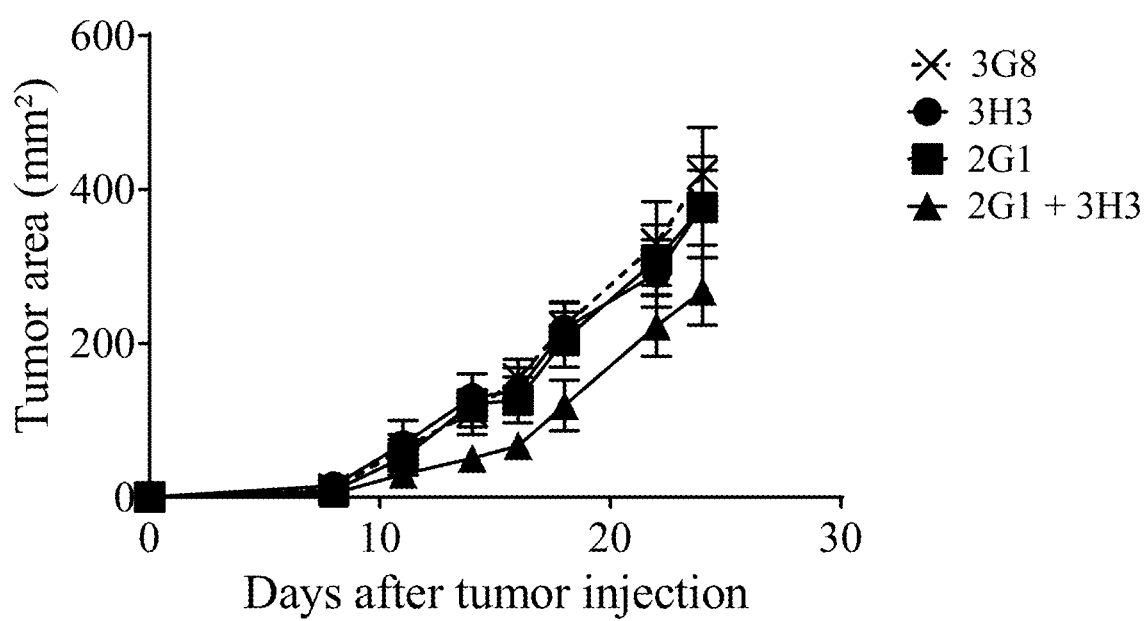
Figure 8B:
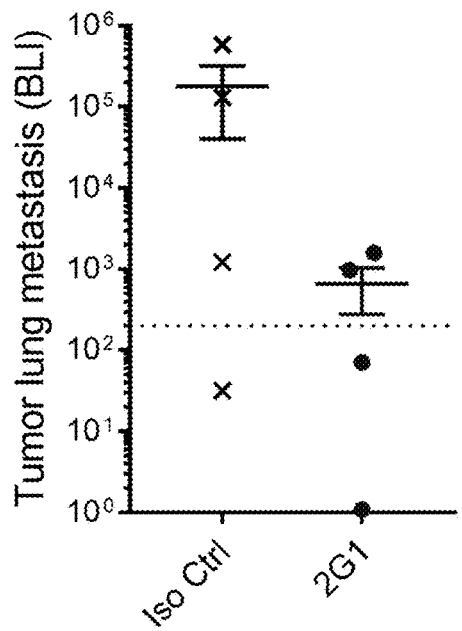

RESULTS: As shown in FIG. 8A, animals treated by a single compound (2G1 or 3H3) did not show any improvement in the tumor growth compared to the animals receiving isotype control antibody. However, the animals treated with the combination of anti-CMKLR1 antibody and anti-41BB antibody show significant (p<0.01) reduction in the growth of the tumor in the mammary carcinoma model. Since this model of mammary carcinoma is a pretty aggressive model, results are considered positive. As shown on FIG. 8B, which illustrates the effects of an anti-CMKLR1 compound on the lung metastasis by bioluminescence imaging, it can be seen than the anti-CMKLR1 treatment reduces the lung metastasis as compared to animals treated with the control antibody. The analysis of the lymph node metastasis shows that no animals treated with the anti-CMKLR1 compound has metastasis while two animals in the control have metastasis (data not shown). Those results indicate that anti-CMLKR1 antibody with agonist activity mimicking RvE1 has an anti-metastatic effect. In this model, the antibody of the invention does not present any significant efficacy on primary tumor development. However, results show an improvement when animals are treated by a combination of anti-CMKLR1 and anti-41BB antibodies.

Example 7.2. Therapeutic Effect on Tumor Growth in a Colon Carcinoma Model 8-week old C57bl/6J male mice were anesthetized with 3% of isoflurane. Mice were shaved on the flank and MC38 cells (0.5·10≠cells/mouse) cell lines were injected subcutaneously with an insulinic syringe (30 Gauges) in 50 µL of PBS. Another model was used, in which 8-week old Balb/c male mice were anesthetized with 3% of isoflurane. Mice were shaved on the flank and CT26 cells (1.10≠cells/mouse) were injected subcutaneously with an insulinic syringe (30 Gauges) in 50 µL of PBS.

The agonistic anti-CMKLR1 antibody (2G1) or an anti-SIRPa antibody (p84-anti-mouse SIRPa from Merck Millipore) (SIRPa is a new checkpoint inhibitor) were injected once a week (20 µg/injection) intraperitoneally for 3 weeks starting at d4 after tumor inoculation alone or combined.

Figure 9A:
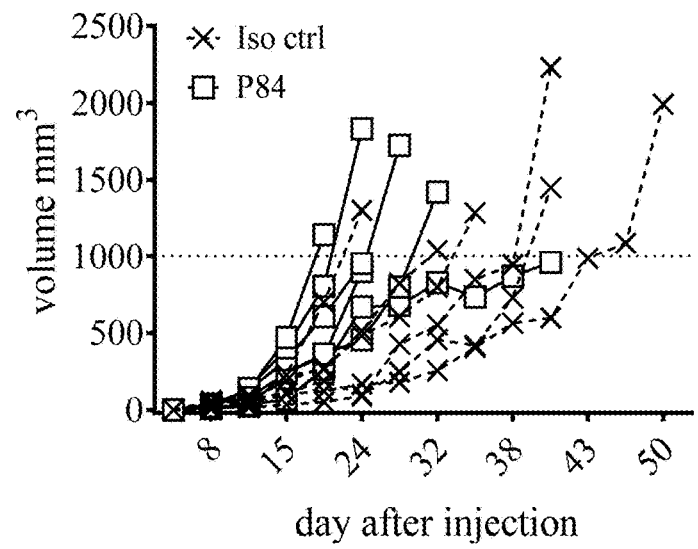
Figure 9B:
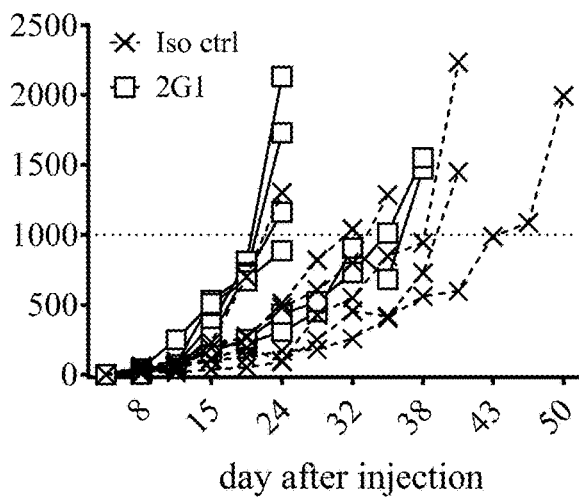
Figure 9C:
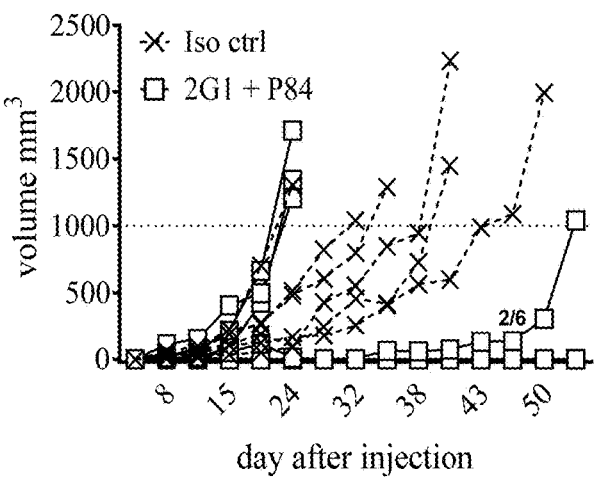
Figure 9D:
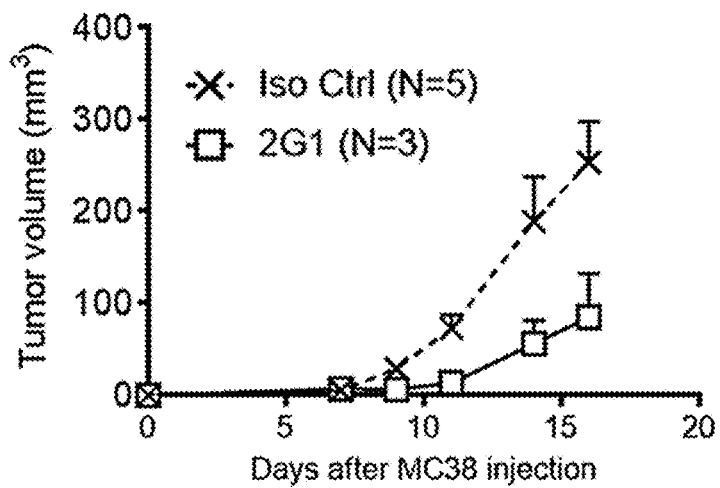

RESULTS: As shown in FIG. 9 A-C, in the CT26 carcinoma model, the anti-CMKLR1 antibody on its own (FIG. 9B) did not demonstrate a clinical effect on the tumor development compared to the control group nor did the anti-SIRPa alone (FIG. 9A). However, and surprisingly, the combination of both compounds enabled an inhibition of the tumor growth in a timely manner (FIG. 9C). In another mice colon carcinoma model presented on FIG. 9D, the anti-CMKLR1 did show an efficacy in the inhibition of the tumor growth compared to the isotype control. All together, these results for two different colon carcinoma models indicate that an agonist anti-CMKLR1 antibody can prevent tumor development on its own, or in combination with another therapeutic agent.

Example 8. Meta-Analysis of the CMKLR1 Expression on UC or CD Human Patient Biopsies Treated with an Anti-TNFa or Anti-α4β7 Antibody Therapies Signaling networks perpetuating chronic gastrointestinal inflammation in Crohn's disease (CD) and ulcerative colitis (UC), the two main forms of inflammatory bowel diseases (IBD), remain unclear in human. According to an analysis of nearly 500 patients with IBD and 100 controls, inventors report here that CMKLR1 transcript are accumulated in inflamed colon tissues of severe IBD patients who were not responding to immunosuppressive/corticosteroids and immunotherapies such as anti-TNFa (infliximab) or anti-α4β7 integrin (vedolizumab) therapies. The inventors first analyzed the mucosal CMKLR1 transcript expression by performing a meta-analysis of publicly available transcriptional datasets of three cohorts of UC patients (GSE16879 (Arijs et al., 2009a) and GSE12251 (Arijs et al., 2009b), and GSE73661 with colon mucosa biopsies performed before anti-TNF treatment (within a week) in patients refractory to corticosteroids and/or immunosuppression. In these three cohorts, anti-TNF response was defined as histological healing analyzed 4-6 weeks after their first anti-TNF infusion (altogether: n=18 non-IBD controls, n=41 UC non-responders and n=28 UC responders).

Figure 10A:
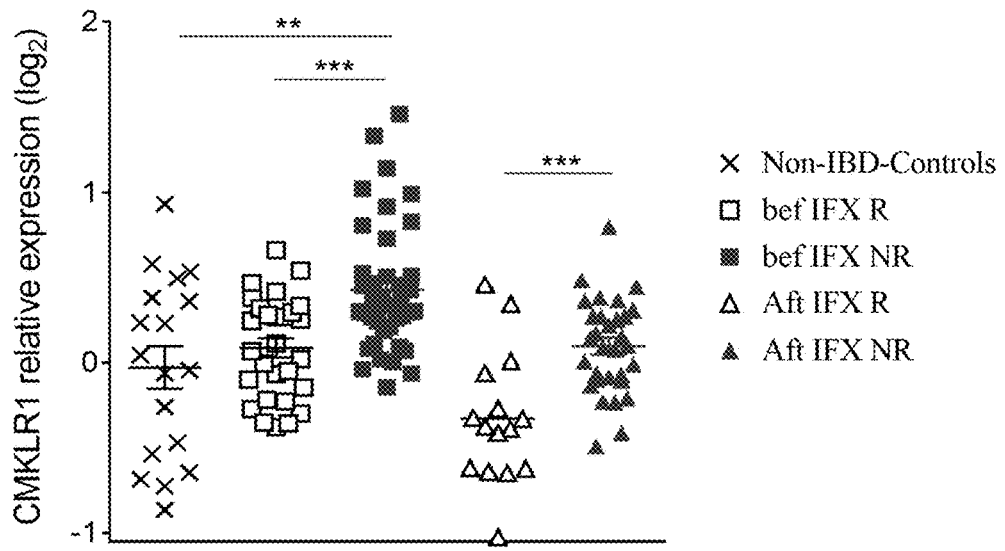
Figure 10B:
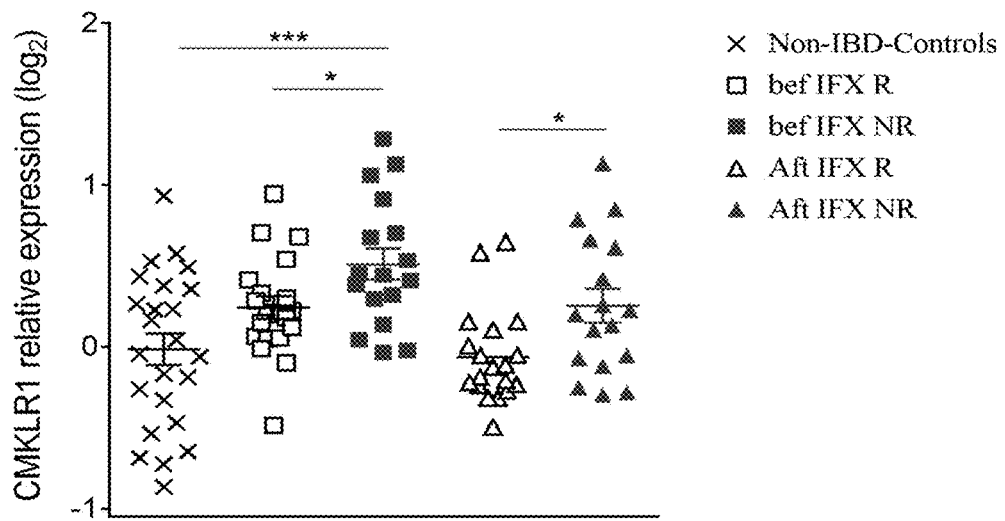

RESULTS: The analysis showed that CMKLR1 transcript expression is significantly increased in colon biopsies of primary UC non-responder patients before and after treatment with anti-TNF therapy as compared to non-IBD controls or patients with UC before anti-TNF and who will respond to anti-TNF therapy (FIG. 10A). Mucosal CMKLR1 expression is also significantly increased in colon or ileal biopsies of Crohn's Disease patients (n=24 non-IBD controls, n=17 CD non-responders and n=20 CD responders; GSE16879 (Arijs et al., 2009a)) before and after anti-TNF therapy in patients who will not respond to anti-TNF as compared to non-IBD controls or future responders (FIG. 10B). Finally, colon mucosa gene expression analysis in a cohort of UC patients (GSE7366146) treated with anti-α4p7 (vedolizumab) therapy confirmed also that CMKLR1 expression is also significantly increased in non-responders before and after treatment with Vedolizumab (FIG. 11).

Altogether, the meta-analysis shows that CMKLR1 is over-expressed in inflamed tissues of IBD patients, in particular in patients non-responding to current immunosuppressive or immunotherapies even before initiation of the treatment. Our meta-analysis provide evidence that the CMKLR1 expression in the colon, or rather ileon for CD, from UC or CD patients who are treatment refractory may in contrast qualify these patients as being responsive to an agonist anti-CMKLR1 antibody treatment such as an antibody of the invention.

Example 9. CMKLR1 expression and antibody binding study

ELISA Binding CMKLR1 (FIG. 12)

CMKLR1 peptide (273NH2-PYHTLNL-LELHHTAMPGSVFSLGLPLATALAIA-COOH305) (SEQ ID No: 60) (5 µg/ml) was coated in borate buffer overnight. Saturation was performed with PBS-Tween 0.1%-Gelatin 0.25% for 2 hours at 37° C. Then, 2G1 or hIgG1 antibodies were added at different concentrations for 2 hours at 37° C. Then peroxidase-conjugated secondary antibody (0.8 µg/ml) was added for 1 hour at 37° C. and revealed by a TMB substrate. The colorimetric reaction was read with TECAN.

Figure 13A:
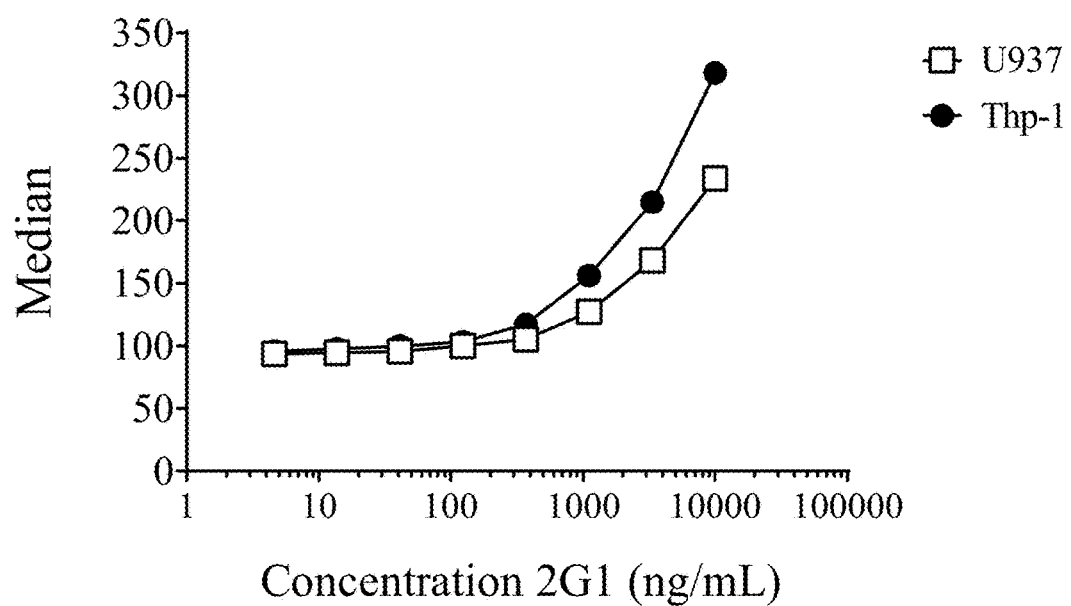

CMKLR1 Expression by FACS (FIG. 13A)

Cells were resuspended in PBS-FBS-EDTA and incubated with Fc block (1/50) for 30 minutes on ice. Staining on T cell lines (Thp-1 and U937) was performed using A488-labeled 2G1 (5 µg) or A488-labeled hIgG1 (5 µg).

Figure 13B:
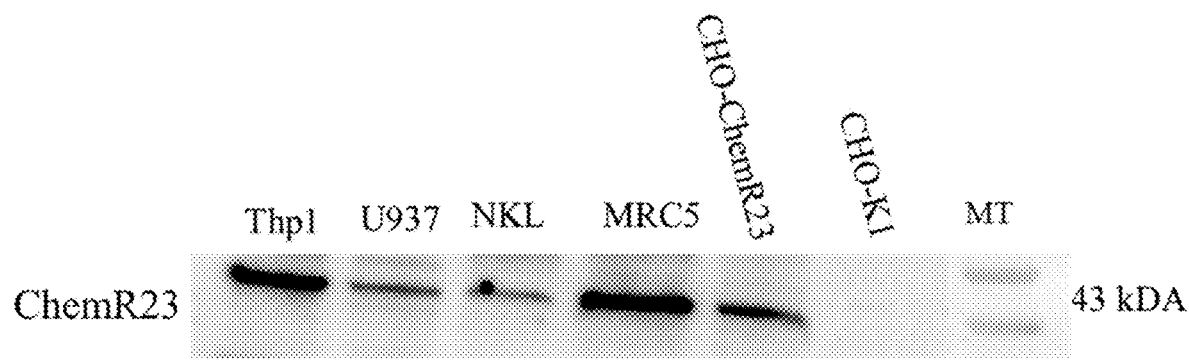
Figure 14A:
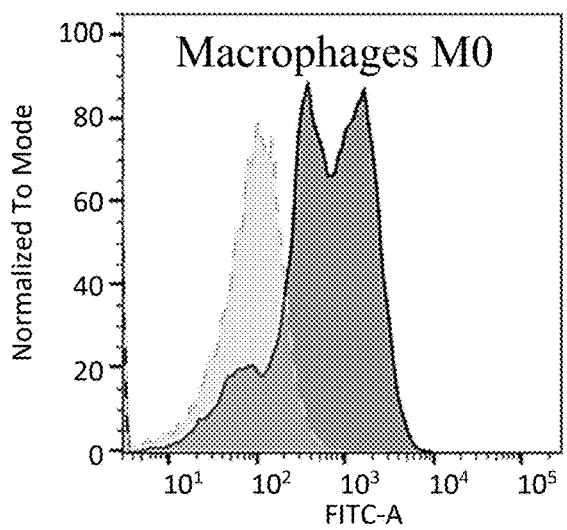
Figure 14D:
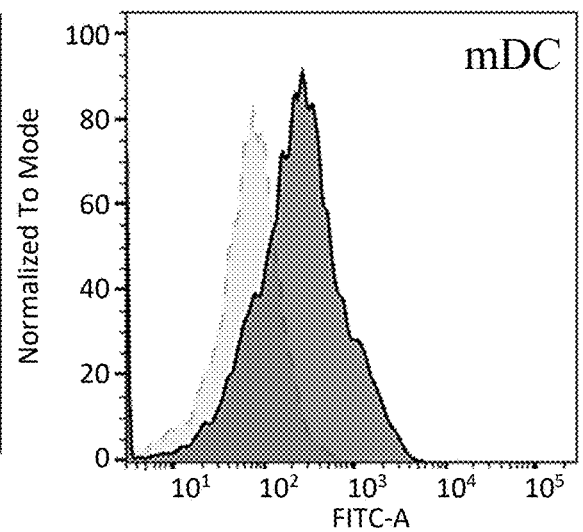
Figure 14B:
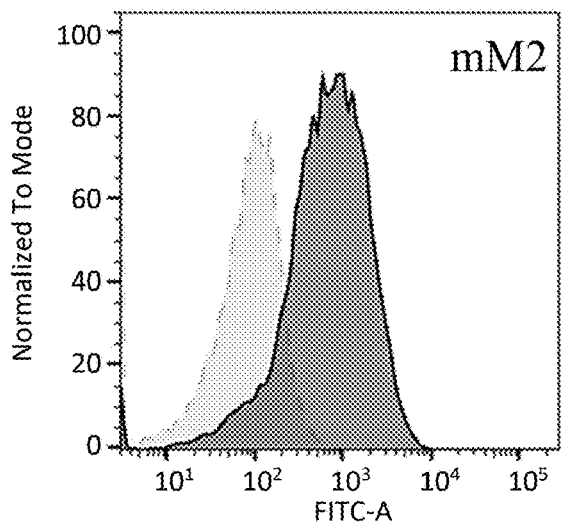
Figure 14E:
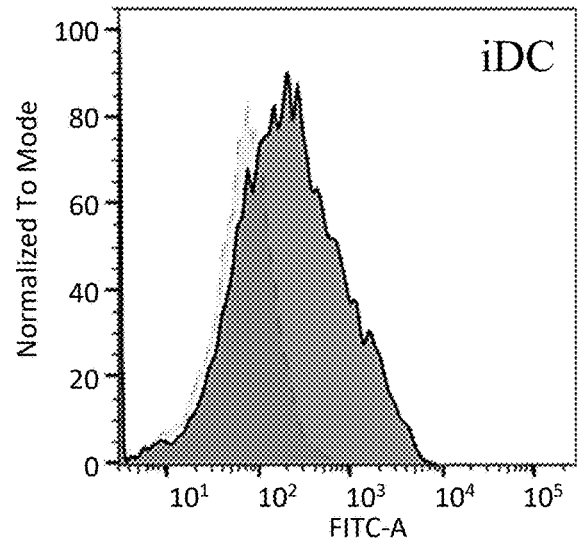
Figure 14C:
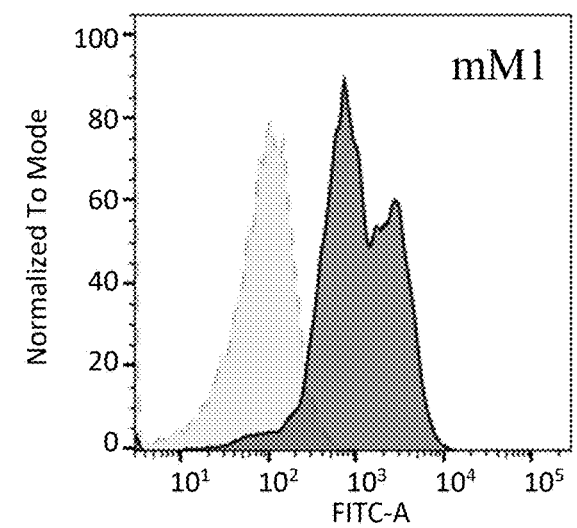

Western Blot Analysis CMKLR1 (FIG. 13B)

After protein migration and transfer as described previously, 2G1 antibody (10 µg/membrane) was incubated overnight at 4° C. and revealed with a peroxidase-conjugated secondary antibody (1:2000). The CMKLR1 expression was then detected by using Chemiluminescence and Image Reader. Western blot Images were quantified by Multi Gauge software.

RESULTS: the results illustrated on FIG. 12 confirm that the anti-CMKLR1 antibody clone 2G1 is able to bind the polypeptide forming the loop EL3 of CMKLR1. Expression of CMKLR1 on different cell lines assessed using 2G1 antibody by FACS and Western blot showed that human Tumor T cell lines Trp1 and U937 express CMKLR1 as well as transduced CMKLR1 CHO cells and human lung fibroblast cell line MRC5 and human NK cell line NKL (FIG. 13).

Example 10. Study of the CMKLR1 Expression on Myeloid Lineage

Example 10.1. Human Monocytes Differentiation and Polarization

Monocytes were collected from PBMC of buffy coat of healthy volunteers and isolated by magnetic separation or by elutriation. Then, monocytes were cultured with different cocktails of cytokines to generate differentiated unpolarized macrophages or polarized macrophages. This protocol allowed to generate polarized differentiated macrophages in order to have pro-inflammatory (M1) or pro-resolution-(M2) of inflammation macrophages in different wells. Monocytes were plated at $0.5 \cdot 10^6$ cells/mL in complete RPMI (RPMI with 10% FBS, 1% glutamine, 1% antibiotics) and 500 µL of the cell suspension was plated per well in a 24-well plate. 100 ng/mL of M-CSF was added with medium for differentiation of the cells. Cells were incubated 5 days and medium was replaced with fresh medium complemented with 100 ng/mL of M-CSF at day 3. For the polarization phases, solution of LPS-IFNg at 100 ng/mL of LPS and ng/mL of IFNg complemented with isotype controls (mIgG1 or hIgG4) (2 µg/ml) or anti-CMKLR1 antibodies (2 µg/ml) (2G1 or 2G4, H6, BZ332 or 84939) or with C15 peptide (10 nM) or RvE1 (10 ng/ml) during 3 days to generate pro-inflammatory macrophages. pro-inflammatory-IFNg macrophages could also be generated by adding only IFNg (20 ng/mL) in culture medium. For pro-resolution macrophage polarization, cells were incubated with IL-4 at ng/mL. Following differentiation and/or polarization, phenotype and functional cytokines/chemokines release was studied by FACS analysis, ELISA and Western blot.

Example 10.2. Mice Macrophages and DCs Isolation and Differentiation

Isolation of Murine Bone Marrow Derived Macrophages

Bone marrow cells were harvested and cultured in the RPMI medium supplemented with 10% FBS, glutamine and antibiotics containing macrophages colony-stimulating factor (M-CSF) at 100 ng/mL for 5 days inducing the macrophages differentiation. The macrophages were harvested and cultured for 2 days with either IFNg (20 ng/ml) and LPS (100 ng/ml) inducing the pro-inflammatory polarization or with IL-4 (20 ng/ml) inducing the pro-resolution polarization. Treatments were added during macrophage polarization at 2 µg/ml.

Bone Marrow Derived Dendritic Cells Generation

Bone marrow cells were harvested and cultured in RPMI medium supplemented with 10% FBS, glutamine and antibiotics and the dendritic cell differentiation was induced by GM-CSF at 20 ng/ml for 7 days. Then, immature dendritic cells (iDC) were collected and cultured for 24 hours with LPS (100 ng/ml) to induce the maturation from iDC to mDC. Treatments were added during differentiation and maturation at 2 µg/ml.

After differentiation of mice pro-inflammatory or pro-resolution macrophagesas explain above, cells were incubated in presence of medium, isotype control, anti-CMKLR1 antibodies: clones H6 and BZ194, C15 peptides, 2G1 the anti-CMKLR1 antibody of interest or RvE1 were used. Then the secretion of IL10, CCL17 and IL12p40 was assessed by ELISA. Cytokines secretion was measured in the supernatant using an ELISA kit from BD. Supernatants were diluted at $1/10$ for IL10 cytokines, $1/50$ for CCL17 cytokines and $1/100$ for IL12p40 cytokines.

ELISA Cytokines Secretion Study

Cytokines secretion was detected by ELISA according to the BD manufacturer instructions. Briefly, supernatants were diluted in the appropriate buffer and incubated for 2 hours after overnight coating with capture antibody and saturation. Then, cytokines were revealed with a detection biotin-coupled antibody and the signal was amplified with the biotin-streptavidin-coupled peroxidase system. TMB supplied by BD Bioscience was used as substrate and colorimetric reaction was read with TECAN.

Activation Cell Markers Analyzed by FACS

Dendritic cells were resuspended in PBS-FBS-EDTA and incubated with live and dead (LIVE/DEAD® Fixable Dead Cell Stains Yellow-Life Technologies) for 30 minutes on ice. Staining of CD11c-BV711, CD11b-APCCy7, I/Ab-APC, CD103-PerCPCy5.5, CCR7-V450, CD40-PeCy7, CD80-PE, CD86-FITC (all provided by BD Pharmingen) were performed.

Western Blot Analysis ERK/Akt

Mice pro-inflammatory macrophages (M1) were generated from bone marrow with M-CSF and polarized with IFN-gamma (IFNg) and LPS. Briefly, bone marrow cells were collected by flushing the femoral bone and cultured with 100 ng/mL of mM-CSF for 5 days and then polarized with 20 ng/mL of IFNg and 100 ng/mL of LPS for 24 h. Then, they were deprived of FBS for 24 hours with RPMI FBS 2% medium. Finally, mice pro-inflammatory macrophages were treated with 2 µg/mL of 2G1 antibody at different times: 5, 10 and 30 minutes. Cells were collected in a RIPA buffer. The protein concentration was measured by a BCA protein kit assay. Proteins were denatured by heating at 95° C. for 5 minutes and diluted in DTT and Laemmli solution. After migration and transfer, the nitrocellulose membrane was blocked with 5% BSA in TBS-T for 2 hours. Anti-phospho-ERK antibody and anti-phospho-Akt antibody (1:1000) were incubated with the membrane overnight at 4° C. and revealed with a peroxidase-conjugated secondary antibody (1:2000). Western blot Images were quantified by Multi Gauge software

Example 10.3: CMLKR1 Expression after Inflammatory Stimuli on Human Blood Monocytes and Mouse Bone Marrow Myeloid and Neutrophils Cells Human monocytes were collected from PBMC of buffy coat of healthy volunteers and isolated by magnetic separation or by elutriation. Then the monocytes (CD14 positive cells) were cultured in medium and treated with different pro-inflammatory stimuli 16 hours or 48 hours: LPS (100 ng/ml) or TNFa (100 U/ml) or IL6 (20 ng/ml).

Mouse monocytes (CD11b+ Ly6G− SSClow) and neutrophils (CD11b+ Ly6G− SSClow) were obtained from bone marrow cells harvested and cultured in RPMI medium supplemented with 10% FBS, glutamine and antibiotics. Cells were then cultured in medium and treated with different pro-inflammatory stimuli 16 hours or 48 hours: LPS (100 ng/ml) or TNFa (100 U/ml) or IL6 (20 ng/ml).

The expression of CMLKR1 was measured by FACS using commercial anti-CMKLR1 antibodies (Human anti-ChemR23: clone 84939 and Mouse anti-ChemR23: clone 477806).

RESULTS: Analysis of the expression of CMKLR1 in mice myeloid lineage illustrated on FIG. 14 revealed a good expression of the protein on monocytes and macrophages as well as on dendritic cells. On FIG. 15, the expression of CMKLR1 on human monocyte and a mice bone marrow myeloid and neutrophil cells is illustrated. This expression is clearly increased by inflammatory stimuli such as LPS, TNFa or IL6 (at least twice as compared to the control after 48 h) confirming that CMKLR1 expression on myeloid cell lineage and overexpression during inflammation could represent a therapeutic approach to downregulate and/or induce resolution of inflammation. The DC activation markers were analyzed by FACS and results illustrated on FIG. 16 shows a strong decrease of the expression of CD80, CD86, CD103, CD40 and IAb when cells were treated with RvE1 lipid or with 2G1 antibody compared to the excipient or isotype control. These results indicate that 2G1 antibody is as active on CMKLR1 pathway on DCs as RVE1. Then inventors analyzed the CMKLR1 activation pathway on mice macrophages by Western blot. FIG. 17 shows that anti-CMKLR1 antibody 2G1 was able to induce the activation of both Akt and Erk proteins after 10 to 30 minutes of incubation. These results indicate that the 2G1 antibody is able to exhibit an agonist property against CMKLR1 receptor as does RvE1 lipid.

Example 11. Competition Study on Chemerin-Induced CMKLR1 Activation with Anti-CMKLR1 Antibody Methods Competition Assay to Measure Chemerin-Dependent B-Arrestin Recruitment by CMKLR1 Receptor in Presence of Anti-CMKLR1 Antibody:

The day before the assay, CHO-K1 CMKLR1 cells (Discover'X ref 93-0313E2) were plated in pre-warmed cell reagent then plated in a 96-well plate at 100 µl/well of cells as (Discover'X ref 15-103) and incubated 48 hours at 37° C., in a 5% CO2 humidified incubator. The anti-CMKLR1 antibody was diluted (22× in 7-point series of 3-fold dilutions from 1 µM to 1 nM) and cells were incubated 30 min at 37° C. with the antibody. Then cells were stimulated with Chemerin (2 or 6 nM) according to provider protocol (Discover'x ref 92-1036) 90 min at 37° C. The luminescence was measured after Working Detection Solution addition to the cells with a plate reader with 0.5 s integration.

Measurement of the Competition of the Anti-CMKLR1 Antibody with Chemerin in the Production of AMPc by CMKLR1 Receptor:

The day before the experiment CHO-K1 CMKLR1 Gi cells (Discover'X ref 95-0080C2) were plated in pre-warmed cell reagent then plated in a 96-well plate at 100 µl/well of cells as (Discover'X ref 15-103) and incubated 24 hours at 37° C., in a 5% CO2 humidified incubator for 24 hours.

A mix of Chemerin agonist (6× in 7-point series of 3-fold dilutions from $10^{-7}$ µM to $10^{-10}$M) (Discover'x ref 92-1036 or 2324-CM-025 from R&D Systems) and forskolin (40 µM) (a cAMP activator) (Discover'x ref 92-0005) was added to the cells during 30 min at 37° C.; or cells were pre-incubated 30 min at 37° C. with anti-CMKLR1 antibody (serial dilution: 6× in 7-point series of 3-fold dilutions from 1 µM to 1 nM). Then a mix of chemerin (2 nM)+forskolin (60 nM) was added to the cells 30 min at 37° C. For the detection cAMP, antibody reagent and cAMP working detection solution was added to the plate for 1 hour at room temperature, then cAMP solution A was added, and cells incubated 3 hours at room temperature in the dark. Bioluminescence was read with a plate reader with 0.5s integration.

Figure 18B:
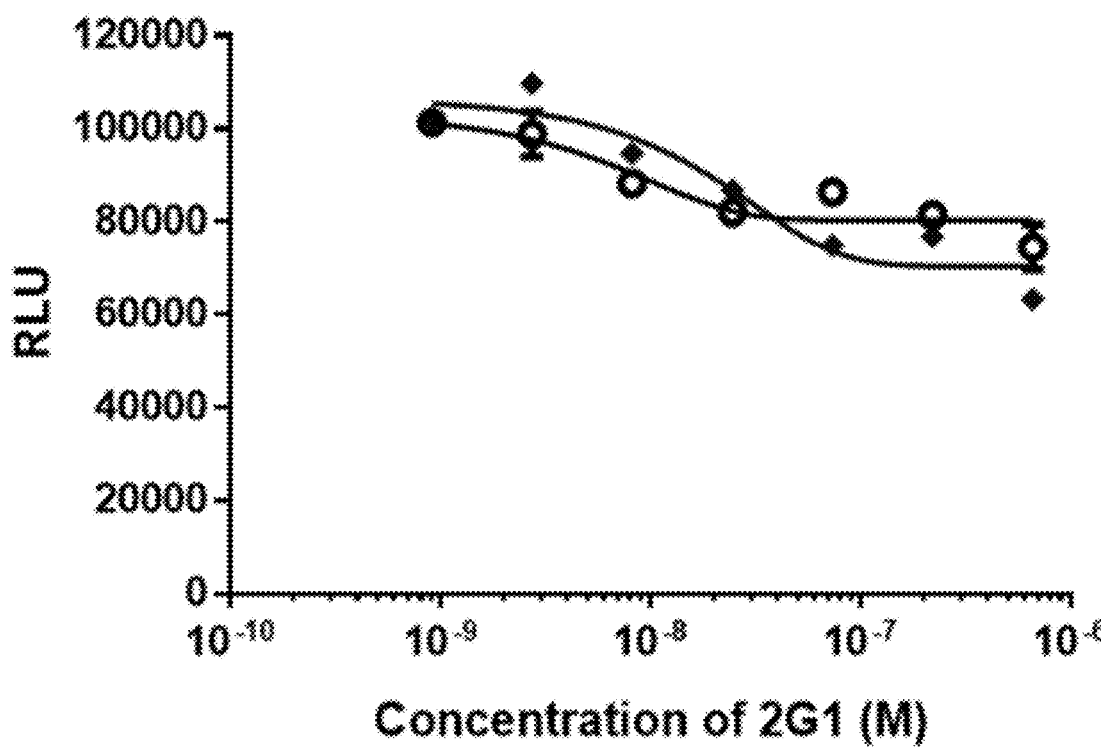

Results: In order to test if the antibody of the invention is an antagonist of the Chemerin-induced CMKLR1 activation, two assays were performed, and the results are presented on FIG. 18. Chemerin-induced inhibition of forskolin-dependent cAMP production is shown on FIG. 18A (black circles or white squares); anti-CMKLR1 antibody of the invention could not revert this inhibition of production (black circles or white squares) as compared to the control (grey diamonds). Chemerin-induced activation of the beta-arrestin presented FIG. 18B, show that the anti-CMKLR1 antibody of the invention did not significantly modify chemerin-dependent activation of the beta-arrestin (white circles as compared to black diamonds). The antibodies of the invention do not have an antagonist activity of the CMLKR1-Chemerin interaction. Furthermore, the antibodies of the invention are not able to induce chemerin-induced CMKLR1 signaling pathway, confirming that these antibodies are not agonist of chemerin of the CMLKR1 pathway.

Example 12. CD45Rb$^{high}$ T-Cell Transfer Chronic Colitis Mouse Model

Method: CD45Rb$^{high}$ CD4 T cells were isolated from the spleen of naive mice and sorted on an ARIA FACS after a negative selection of the CD4 T cells by magnetic sorting, then injected intraperitoneally at 0.5·10$^6$ cells in 100 µL of PBS into 6-weeks old female Rag1 knock-out mice. Anti-CMKLR1 antibody (2G1) or an isotype control were administered from day 32 after the CD45Rb$^{high}$ CD4 T cell transfer for 3 weeks three times a week at 1 mg/kg. The follow-up of weight was evaluated three times a week and the weight variation was determined over the initial weight. * p<0.05, ** p<0.01.

Figure 19A:
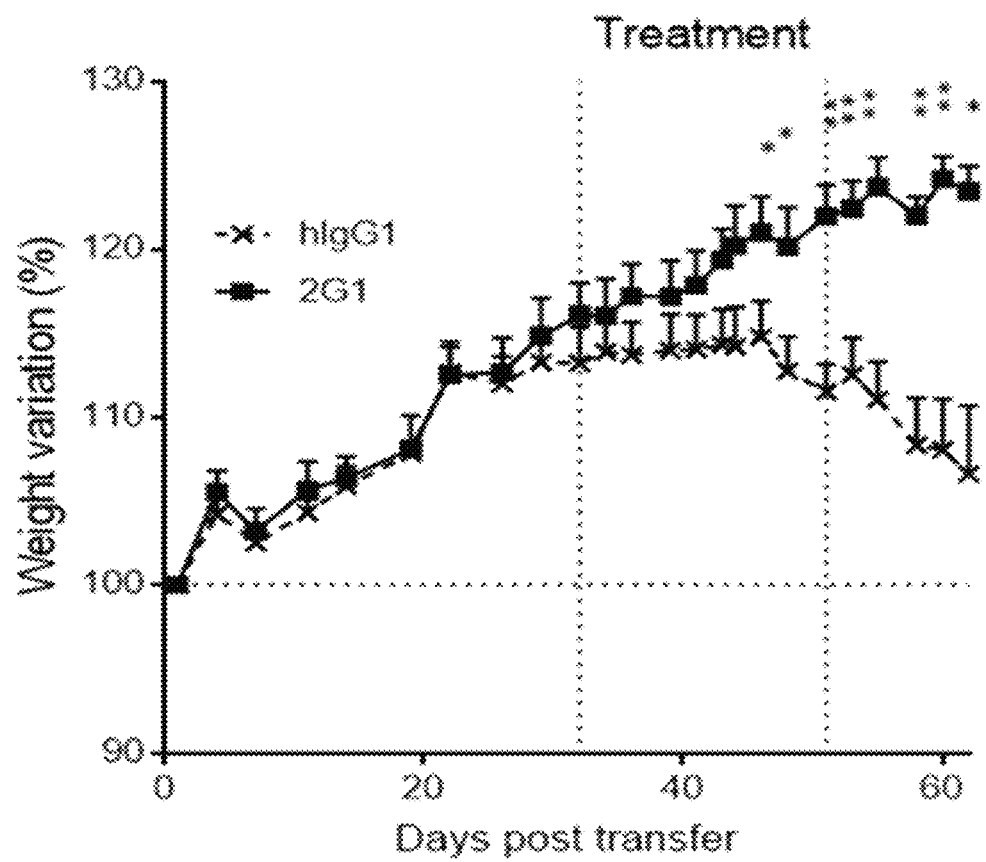
Figure 19B:
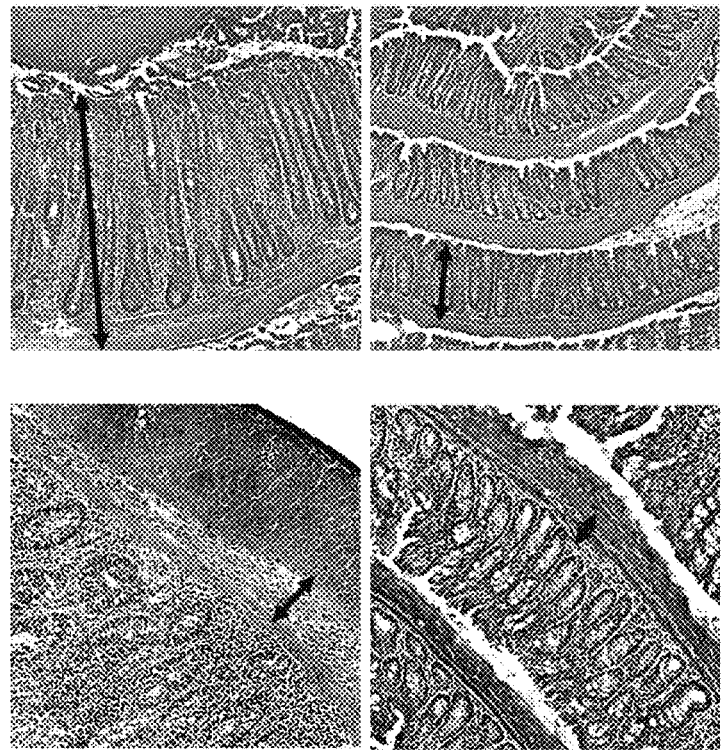
Figure 19C:
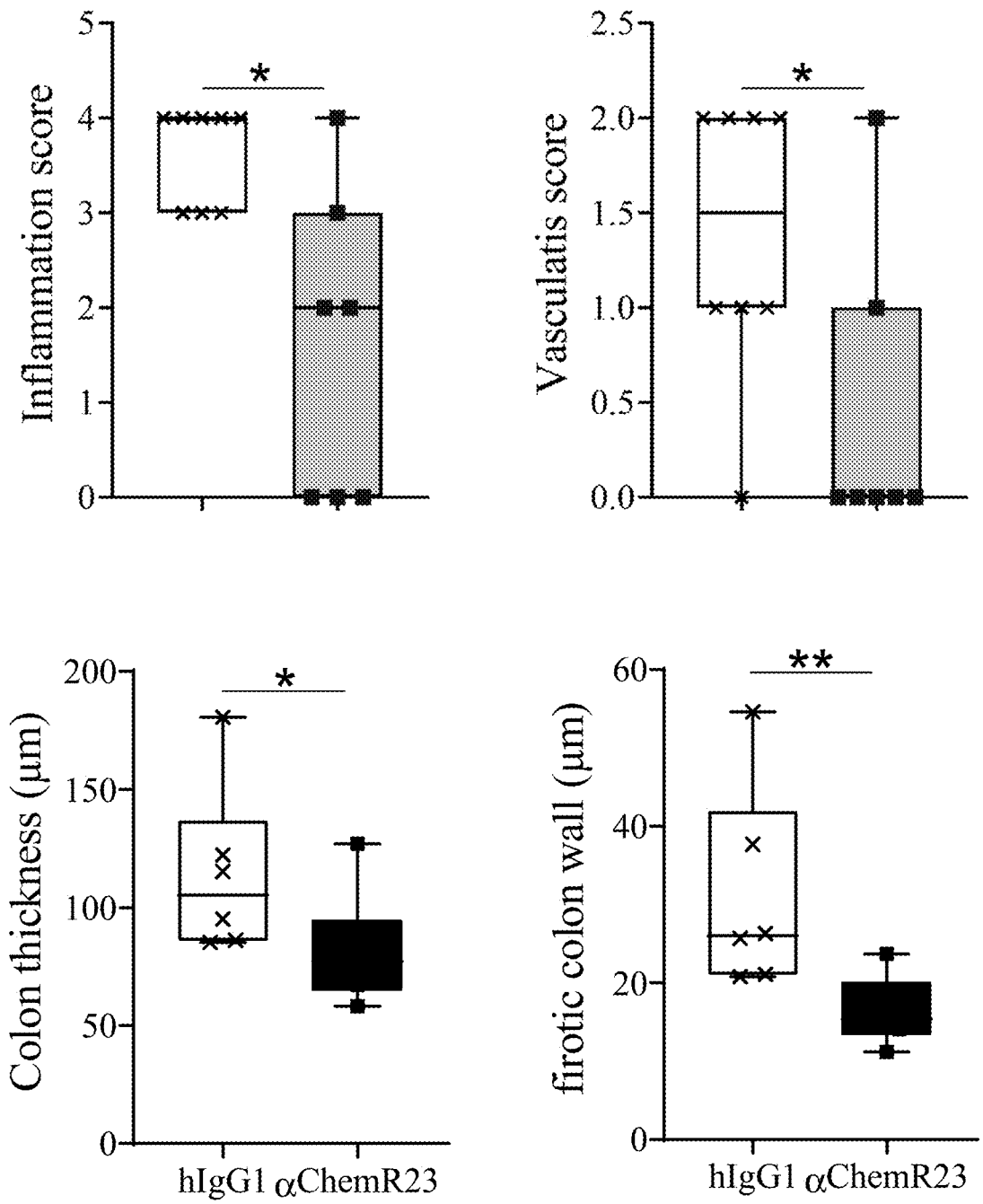
Figure 19D:
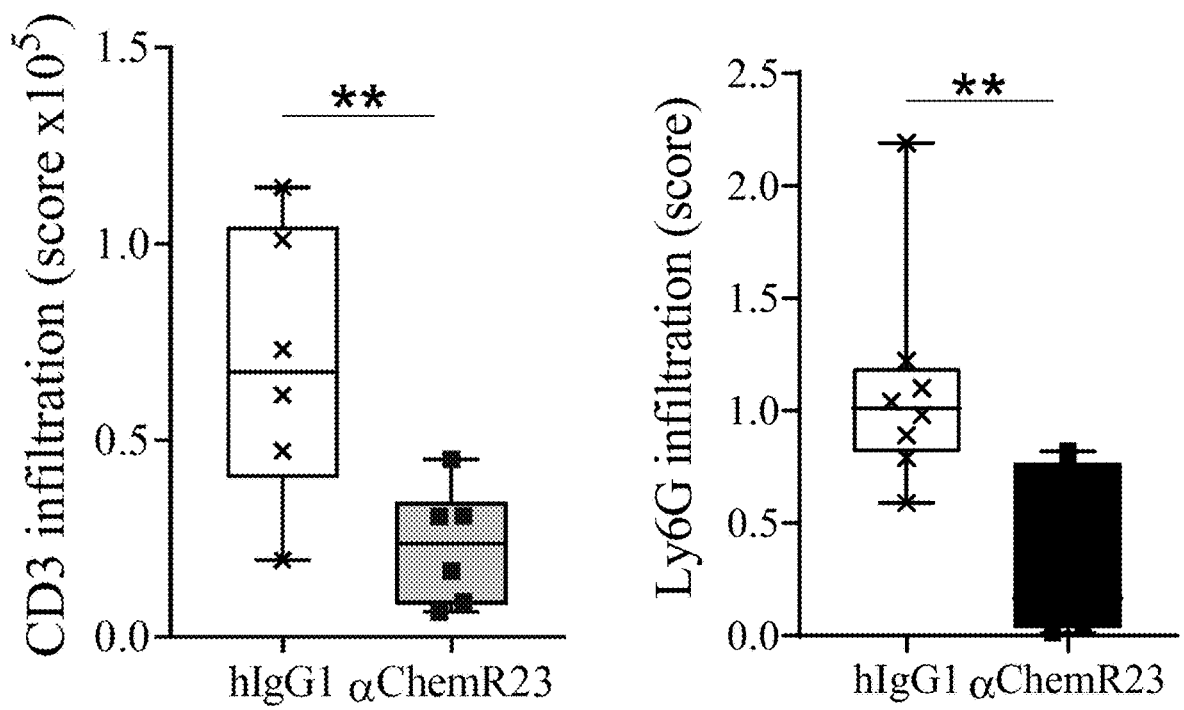

Results: FIG. 19 presents the percentage of weight variation over the time of animals treated with anti-CMLKR1 antibody or an isotype control. Both groups presented the same initial weight evolution over the first 30 days are treated with anti-CMKLR1 antibody or an isotype control. Mice treated with the anti-CMKLR1 continue to gain weight while, in contrast, control mice start to lose weight indicating development of chronic colitis as anticipated in this control group (FIG. 19A). A decrease of tissue thickness corresponding to reparation of colon was observed in the mice treated with the anti-CMKLR1. A decrease of fibrotic tissue was also observed (FIG. 19B). The different scores represent anatomic pathology scores used to calculate the severity of the pathology. Scores, comprising inflammation scores, were lower in mice treated with anti-CMKLR1 (FIG. 19C). The inventors confirm in a third model of colitis, here in a chronic model of inflammation, that anti-CMKLR1 antibodies of the invention could be of interest to treat chronic inflammatory and autoimmune diseases such as colitis.

Example 13. Anti-Tumor Effect on the Overall Survival of Mice Hepatocarcinoma Tumor Model Method: Mice were anesthetized with a cocktail of xylazine/ketamine. After a laparotomy, tumoral Hepa 1.6 cells were injected in PBS through the portal vein ($2.5 \cdot 10^6$ cells/100 μL) in PBS. The treatment was started 4 days after tumor injection. The anti-CMKLR1 antibody (2G1clone) and the hIgG1 istotype control were injected at 0.8 mg/kg three times per week during 2 weeks. The anti-PD1 monoclonal antibody was injected twice a week during 2 weeks intraperitoneally in PBS (8 mg/kg). Combination anti-CMKLR1 and anti-PD1 antibodies was tested as well (0.8 mg/kg and 8 mg/kg respectively). The Overall survival was followed during sixty days and the percentage of survival in each condition was reported FIG. 22.

Results: As shown in FIG. 20, animals treated with the anti-CMKLR1 or the anti-PD1 antibodies had seen their survival rate prolonged only for 1 animal on 7 treated (15% of treated animals) indicating a partial response (PR). However, animals treated with a combination of anti-PD1 and anti-CMKLR1 antibodies allows a significant increase of the survival rate (from 15% to 45%) with animals alive 60 days after treatment, indicating a complete response (CR). This result indicates an unexpected efficiency of the therapeutic combination (anti-PD1/antiCMKLR1 antibodies) on HCC tumor model.

Example 14. Antibody Production in Different Cell Lines

CDR of 2G1 heavy chain were grafted in three human germlines framework, named IGHV3-23*04 (corresponding to SEQ ID No. 41), IGHV1-46*01 and IGHV7-4-1. CDR of 2G1 light chain were grafted in three human germlines framework, named IGKV1-13*02 (corresponding to SEQ ID No. 50), IGKV6-21*01 and IGKV3-11*01 (IMGT nomenclature). Each sequence was fused to constant fragment of human immunoglobulin and co-transfected in mammalian cells to produce humanized antibody. In more details, for the construction of heavy chain of anti-ChemR23 A, antibody variable domain VH sequences were synthetized and cloned by EcoRV in pFUSE-CHIg-hG1 expression plasmid containing Fc of human IgG1 (pFUSE-CHIg-hG1 vector from Invivogen, Toulouse). For construction of light chain of anti-ChemR23 Antibody, variable domain VL were synthetized and cloned by BsiWI in pFuse2CLIg-hk expression plasmid containing human CLkappa (pFuse2CLIg-hk from Invivogen, Toulouse). In mammalian HEK or CHO cells, we have co-transfected, by lipofectamine method, plasmids containing VH-hFcG1 with plasmid containing VL-CLkappa. After 3-7 days incubation, supernatant was recovered and quantified by sandwich ELISA assay. Supernatant could be purified by affinity on Protein A chromatography (HiTrap, GeHealthcare) with citric acid 0.1M pH 3 elution buffer. Purified antibody was dialyzed in PBS and concentrated. They were quantified by UV (A280 nm) and tested in activity assay against C7 antigen-specific peptides.

Results. As illustrated on FIG. 21, the human germline IGHV3-23*04 for heavy chain was more efficient to produce the antibody in mammalian cells. Mutations implicated in the other framework induced less productive chains. For light chain, the human germline IGKV1-13*02 was the best to produce humanized antibody, the other germline decreased 1-log the productivity. The combination of both humanized IGHV3-23*04 and IGKV1-13*02 is suitable for the production in high yield of humanized anti-CMKLR1 antibodies. As shown on FIG. 22, this combination indeed allows the production of sufficient quantities of antibody, with a satisfactory yield.

The germline IGHV3-23*04 and the germline IGKV1-13*02 were therefore selected for further humanization of antibodies.

Few mutations were added in heavy chain or light chain. In heavy chain, mutations G33A (in CDR1), P60A (in CDR2), R94K (in FR3) were substituted to increase humanization, amino-acid D61 (in CDR2) could be replace by amino-acid E or A to reduce risk of deamination of antibody (sequence variant vB-vD). In light chain, mutations S24R, S27Q, M33L (in CDR1), T51A (in CDR2), Y71F (in FR3) were substituted to increase humanization, amino-acid N92 could be replace by amino-acid Q to reduce risk of glycosylation of antibody (sequence variant vB-vD). Each sequences were fused to constant fragment of human immunoglobulin and co-transfected in mammalian cells to produce humanized antibody. Results showed that all combination of heavy and light chains produce antibodies. Productivity seems to be differently affected in mammalian cells depending on the combination of heavy and light chains, but always in an amount sufficient for efficient production in view of a therapeutic application of the antibody.

Example 15. Recognition Capability of Anti-CMKLR1 Antibodies Produced In Vitro and Issued from Specific Germlines of Heavy Chain Variable Domain and Light Chain Variable Domain For quantitation ELISA assay, donkey anti-human IgG, Fc specific (Jackson Immunoresearch; USA; reference 709-005-098) was immobilized on plastic at 1.3 μg/ml in borate buffer (pH9) and supernatants containing antibody were added to measure binding, compared to standard antibody. After incubation and washing, mouse anti-human kappa antibody (Ose Immunotherapeutics, reference NaM76-5F3) was added and detected by peroxidase-labeled donkey anti-mouse IgG antibody (Jackson Immunoresearch; USA; reference 715-036-151). Revelation of ELISA was made by conventional methods.

For activity ELISA assay, donkey anti-human IgG, Fc specific (Jackson Immunoresearch; USA; reference 709-005-098) was immobilized on plastic at 1.3 μg/ml in borate buffer (pH9) and purified antibody were added to measure binding in BSA1% buffer, compared to wild-type 2G1. After incubation and washing, biotinylated antigen-specific peptide (Biot-C7 peptide: biotinylated NH2-PYHTLNL-LELHHTAMPGSVFSLGLPLATALAIA-OOOH, synthetized by synpeptide, SEQ ID No. 60) then, peroxidase-streptavidin (Jackson Immunoresearch; USA; reference 016-030-084) was added and revealed by conventional methods.

Combinations of heavy chains and light chains issued from VHvAv3-23*04 (SEQ ID No. 41-89.8% humanisation) and VLvAv1-13*01 (SEQ ID No. 50-82.1% humanisation) generated a humanized antibody with good binding activity to antigen-specific peptides (C7 peptide) like wild-type antibody 2G1. As illustrated on FIG. 23 and, the combinations of humanized antibody variable domain chains derived from 2G1 (For the heavy variable domain: HA corresponds to VHvAv3-23*04 and SEQ ID No. 4; HC corresponds to SEQ ID No. 42; HD corresponds to SEQ ID No. 43; For the light variable chain: LA corresponds to SEQ ID No. 50; LC corresponds to SEQ ID No. 52; LD corresponds to SEQ ID No. 53).

All combinations bound antigen-specific peptides (C7 peptide) with at least the same activity as wild-type antibody 2G1. In some cases (the combinations of HCLC, HCLD, HDLC and HDLD), binding is even better than the germline antibody HALA and the wild type antibody 2G1 (FIG. 23). As illustrated on FIG. 24, the ED50 (ng/ml) of humanized antibodies is at least equivalent to the ED50 of 2G1 antibody, and better in most of the cases.

Example 16. Biological Effect on CCR7 Internalization

MATERIAL AND METHODS. Macrophages were generated from monocytes of healthy volunteers with 100 ng/mL of M-CSF for 5 days. Then, macrophages were collected and incubated with coated mAb at 10 mg/mL in presence of 20 ng/mL of IFNγ in order to obtain M1 inflammatory macrophages. Then, M1 were phenotyped for CXCR4 and CCR7 by flow cytometry and cytokines released in the supernatant were dosed by ELISA. Dendritic cells were generated from monocytes of healthy volunteers with 50 ng/mL of GM-CSF and 20 ng/mL of IL-4 for 6 days. Then DC were phenotyped for CCR7 by flow cytometry.

RESULTS. 2G1 and all humanized 2G1 variants (HALA, HCLC, HCLD, HDLC and HDLD) were immobilized on plate. Isotype control was added as controls. Two isotypes which prevent FcRγ binding, i.e., 2G1-N297A (2G1 wt mutated in N297A to reduce FcγR binding), and 2G4 (wt with isotype IgG4mutated in S228P to stabilise hinge region) were also added. Pro-inflammatory macrophages M1 were added on coated plate for 48 h, and CCR7 expression at the surface of the macrophages was measured by flow cytometry.

As illustrated on FIG. 25, 2G1 and all the humanized 2G1 variants were able to decrease expression of CCR7 at the surface of pro-inflammatory macrophages (M1). However, the internalization of CCR7 is not observed with isotype IgG1-N297A or IgG4 which prevents FcRγ binding indicating that isotype IgG1 was preferred to obtain this biological activity.

Example 17. Apoptosis and Mortality of Neutrophils

Neutrophils are usually located at the site of inflammation and their presence sustain the inflammatory process, thereby preventing the resolution of the inflammation to be initiated or to be actively sustained which may lead to chronic inflammation. Neutrophil apoptosis prevents the release of neutrophil histotoxic contents and exerts an anti-inflammatory effect.

Figure 26A:
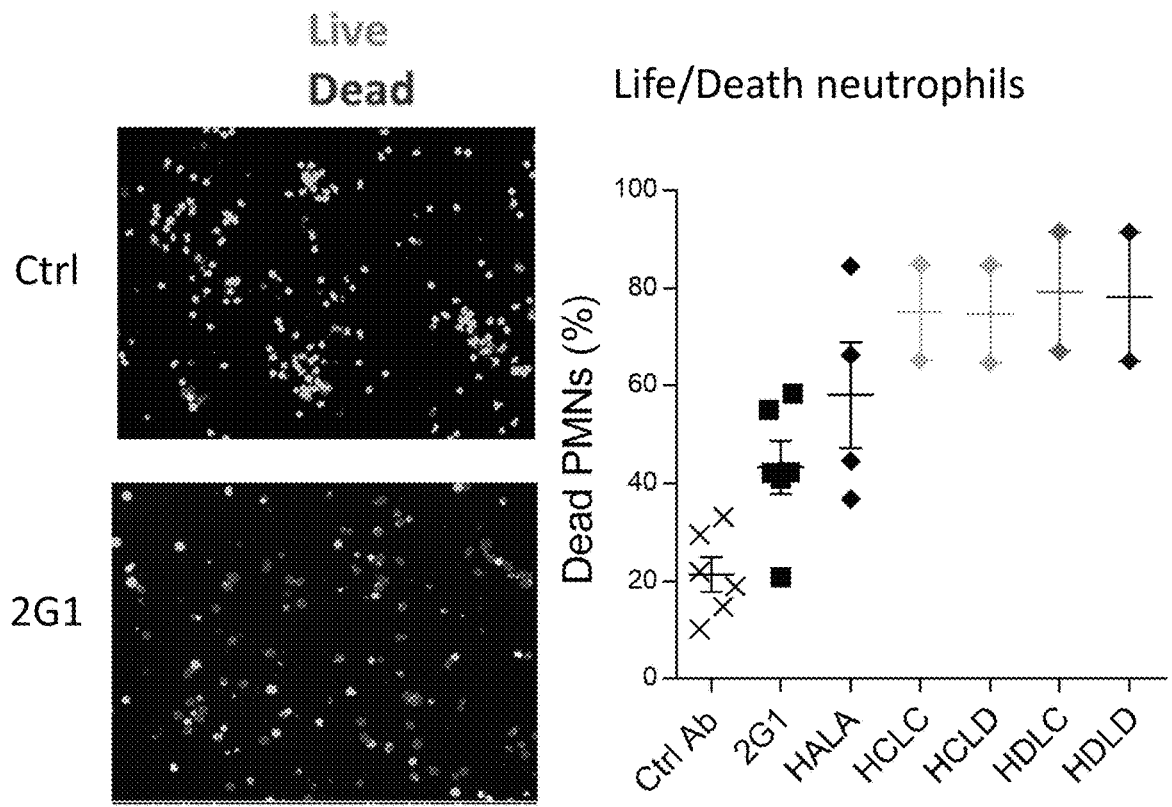
Figure 26B:
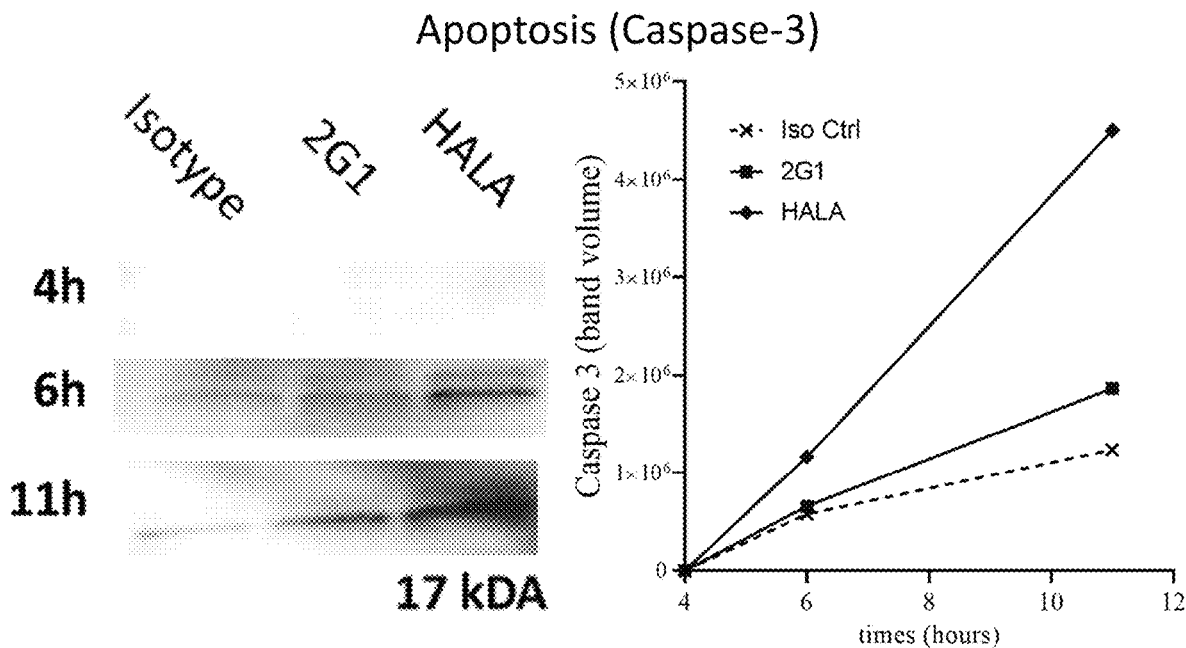

As illustrated on FIG. 26A, neutrophils life/death ratio is higher in cells treated with an antibody of the invention, thereby illustrating the effect on these cells of the agonist of the invention.
CASPASE-3 Expression Material and Methods PMN from healthy volunteers were incubated in culture medium with coated Ab at 10 μg/mL for different times and collected for Caspase-3 staining analyzed by Western Blot. The intensity of Capase-3 expression was calculated on WB.

RESULTS: As illustrated on FIG. 26B, the administration of an anti-CMKLR1 agonist enhances caspase-3 activity, as compared to cells treated with a control antibody. The antibody HALA exhibits higher effect on caspase 3 activity as compared to the 2G1 antibody. 2G1 WT and HALA increases caspase-3 cleavage, which means that ChemR23 triggering leads to Caspase-3-dependent apoptosis.
Percentage of Dead PMN and ROS Test (FIG. 26C):

PMN from healthy volunteers were incubated in culture medium with coated Ab at 10 μg/mL for 24 h or 5 h and stained either with a dead/viability kit (LIVE/DEAD (Invitrogen)) or a specific marker of reactive oxygen species (ROS) respectively. The percentages of positive cells were obtained by analyzing the pictures with ImageJ software.

RESULTS: 2G1 and all humanized variants of 2G1 increase the mortality of PMN after 24 hours. At 48 hours, the percentage of dead cells incubated with IgG1 control and HALA variant is similar indicating that antibodies by triggering CMKLR1 signaling only accelerate programmed cell death in PMN. 2G1 and all humanized variants of 2G1 accelerate the death of PMN and so the humanized variants preserve pro-resolutive properties. 2G1 and HALA variants increase the ROS production by PMN after 5 h.

As illustrated on FIG. 27B, the percentage of ChemR23-positive cells (macrophages and neutrophils) is increased when inflammation is induced. But, the percentage of neutrophils in exudates is not significantly decreased in animals treated with the anti-CMKLR1 antibody (FIG. 27C; black square), while the overall percentage of macrophages in exudates is slightly enhanced (FIG. 27D). This indicates that the administration of the CMKLR1 agonist does not reduce the overall number of myeloid cells in the exudates, and has an effect on apoptosis of the neutrophils mainly at the site of inflammation. As illustrated on FIG. 27E and FIG. 27F, the percentage of dead neutrophils is increased when the agonist of CMKLR1 is administered, as well as their death. These results illustrate the positive effect of the agonist of CMKLR1 for treating a delay in the resolution of the inflammation, since the neutrophil population is impacted not in exudates but at the site of inflammation.

In conclusion, except for induced apoptosis of neutrophils on the site of inflammation, a treatment with an antibody of the invention does not lead to the apoptosis of all neutrophil population. This feature may be advantageous to reduce side-effect(s).

Example 18. Transmigration of Neutrophils

Neutrophils migrate after recruitment to the inflammatory site, thereby initiating, enhancing and/or sustaining the inflammatory process.

Material and Methods

Human endothelial cells (HDMEC) were incubated for 24 h in the transwell coated with gelatin and activated overnight with TNF-alpha at 100 U/mL or without inflammatory conditions. Then, PMN from healthy volunteers or ANCA patients were incubated in transwell containing the monolayer of HDMEC for 4 hours. Antibodies (Iso Ctrl and 2G1) were added at 10 μg/mL+/−TNF-alpha at 100 U/mL during the 4 hours of the transmigration assay. The lower transmigrated part of the transwell was collected and the transmigrated PMN were counted by flow cytometry using counting beads.
Results Neutrophil treated with 2G1 have a lower transmigration capability compared to cells treated with control compounds (FIG. 28A). 2G1 avoids PMN transmigration through endothelial monolayer especially under inflammatory condition when PMN and endothelial cells were activated with TNFa in healthy volunteers and in AIDs' patients (FIG. 28B).

The antibody of the invention has the capability to reduce the transmigration capability of neutrophils.

Example 19—CD62L Expression

MATERIAL AND METHODS. PMN from healthy volunteers were incubated in culture medium with coated Ab at 10 μg/mL for different times and collected for CD62L staining analyzed by flow cytometry (FIG. 29, left panel). The cell surface expression of CD62L in cells incubated with antibody of the invention is reduced compared to cells incubated in absence of the antibody. The soluble form of the CD62L released by shedding is detected by ELISA in the supernatant of PMN incubated with coated Ab. The treatment of PMN with the anti-ChemR23 antibody increases the concentration of soluble CD62L compared to the isotype control condition (FIG. 29, right panel).

Example 20—Mesothelioma Model Survival

Mice treated according to the method explained in the description of the figure with an agonist of CMKLR1 have a higher survival rate than mice treated with a control antibody, thereby illustrating the positive effect of a compound according to the invention for treating mesothelioma (FIG. 30).

Example 21—CRC Model

Figure 31A:
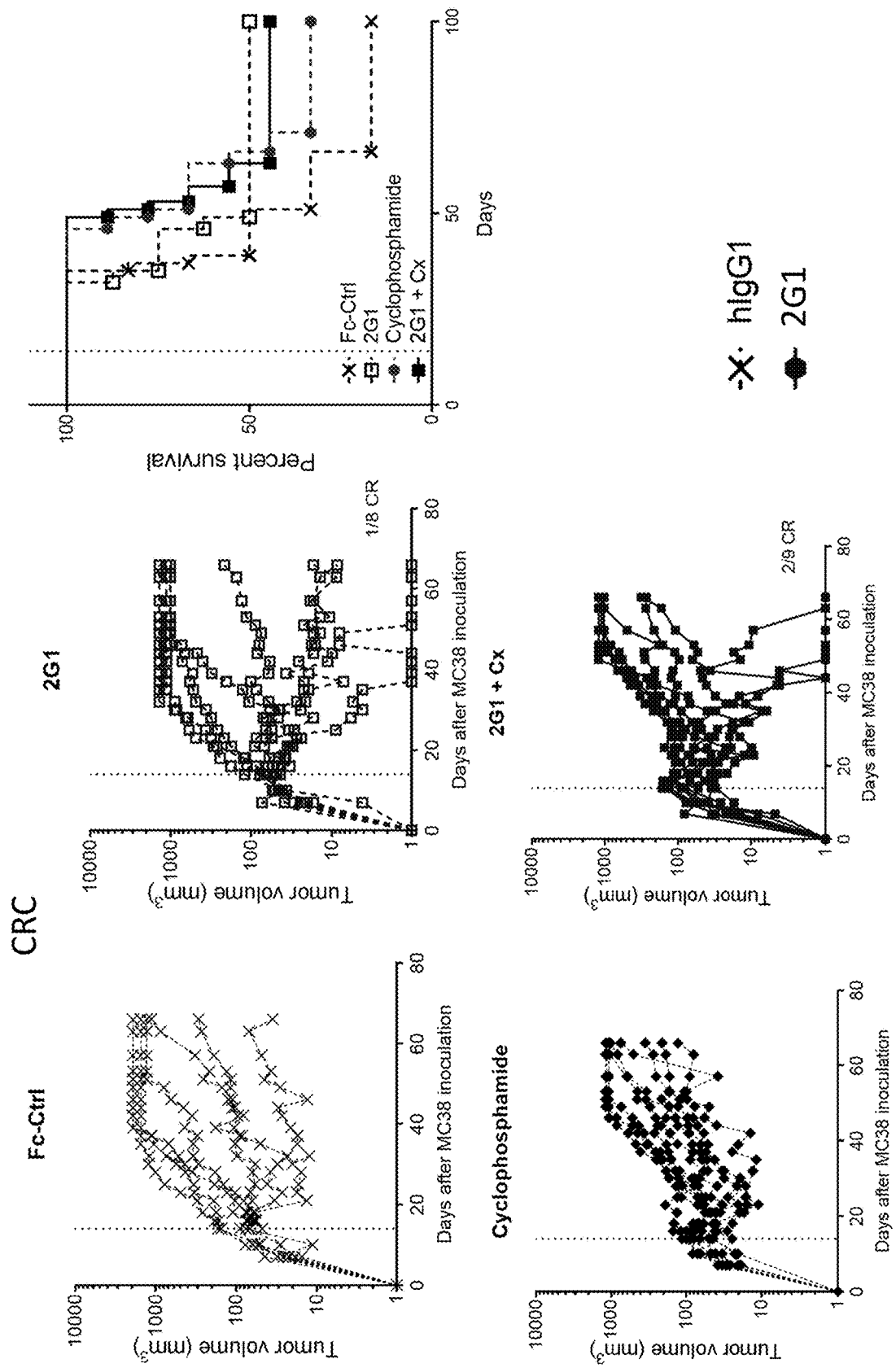

As illustrated on FIG. 31A, the tumor volume is reduced in animals treated with the anti-CMKLR1 antibody of the invention, as compared to the control antibody. In several cases, complete remission is also observed, thereby illustrating the positive effect of a compound according to the invention for treating CRC.

Figure 31B:
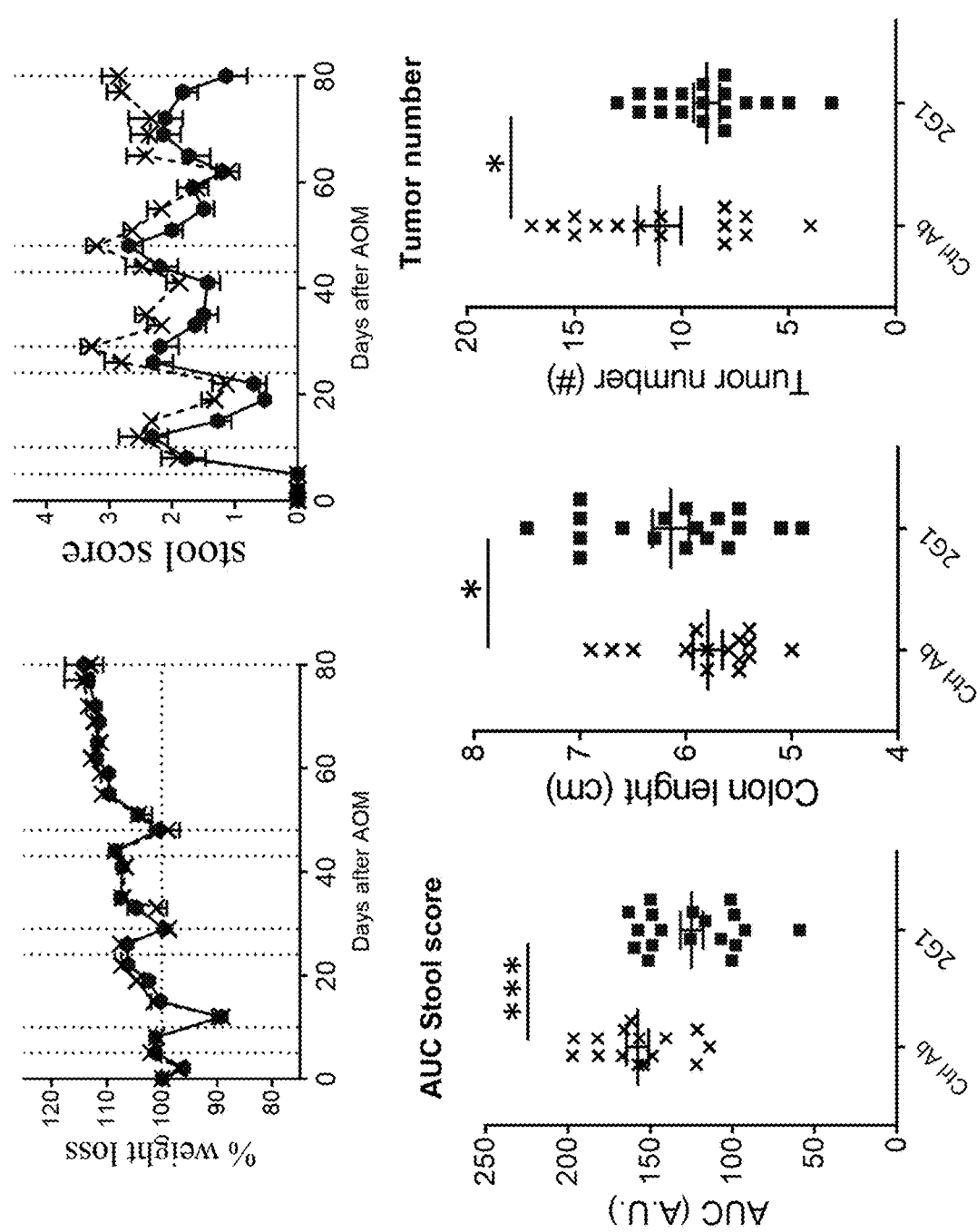

Moreover, as exemplified on FIG. 31B, the treatment with an anti-CMKLR1 monoclonal antibody (OSE-230) leads to a reduction of the stool score, and the reduction of tumor number.

Example 22—Autoimmune Encephalomyelitis Experimental Model

Figure 32B:
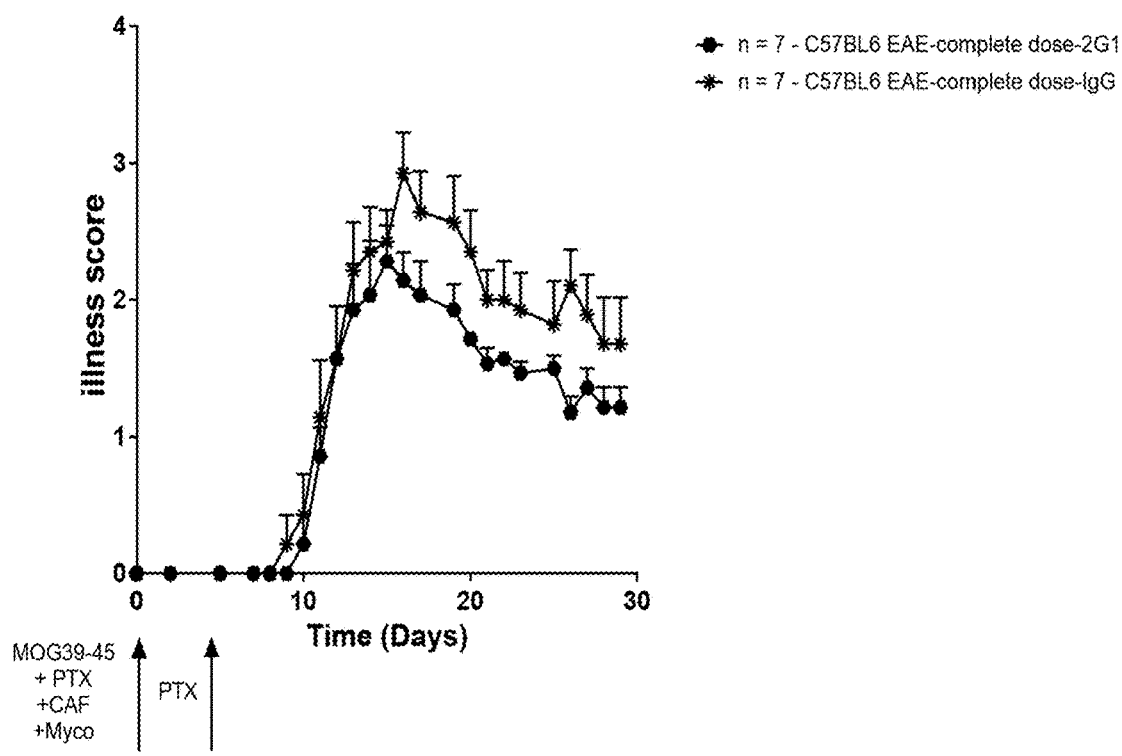

In this model, the curative administration of the antibody of the invention in EAE model does not lead to the reduction of the weight (FIG. 32A), as compared to animals treated with a control antibody. But the illness score is significantly reduced when the treatment is performed with the anti-CMKLR1 antibody (FIG. 32B). The anti-CMKLR1 antibody leads to a great improvement of the illness score as soon as ten-day posttreatment as compared to the control, since the score is approximately 30% lower in animals treated with the agonist compound. It is therefore illustrated that a treatment with an anti-CMKLR1 compound is effective for treating autoimmune encephalomyelitis.

Example 23: Optimization of CDR amino acid residue

Few mutations were added in heavy chain or light chain of HDLD variant to substitute amino-acid implicated in immunogenicity predicted with in silico with IEDB software and HLA-II prediction software (NetMHCpanII method).

It is further emphasized that among a very high number of possible mutations of amino acids, the inventors have studied and identified some very advantageous ones than do not impact substantially and inappropriately the biological activity of the product. The expertise lead to the selection described hereafter.

In heavy chain, amino acids substitution D61E in CDR2 (HD-61E, SEQ ID NO: 89), R52G in CDR2 (HD-R52G, SEQ ID NO: 90), or R52aG, A49S, N52S and Y53S in CDR2 (HEF, SEQ ID NO: 91) were achieved to reduce immunogenicity. In light chain, amino acid N92 in CDR3 was substituted with amino acid S (LD-N92S, SEQ ID NO: 92) or Q (LD-T52S, SEQ ID NO: 93) to prevent posttranslational modification. T52S in CDR2 was also substituted to reduce immunogenicity in LD-N92S variant. N92Q in CDR3 and T52S, T55E in CDR2, and W47L in Framework 2 were substituted to reduce immunogenicity in LEF variant (SEQ ID NO: 55). The sequences are indicated in the table below:

TABLE 3

Optimized heavy and light chain of HDLD variant sequences.

| | | |
|---|---|---|
| HD-D61E: 2G1-VH-D61E_IGHV3-23*04 | EVQLVESGGGLVQPGGSLRL SCAASGFTFSSYAMSWVRQA PGKGLELVATINRYGGSTYY AESVKGRFTISRDNSKNTLY LQMNSLRAEDTAVYYCPKLI YYGNEGDSWGQGTLVTVSS | SEQ ID NO: 89 |
| HD-R52G: 2G1-VH-R52G-IGHV3-23*04 | EVQLVESGGGLVQPGGSLRL SCAASGFTFSSYAMSWVRQA PGKGLELVATINGYGGSTYY AASVKGRFTISRDNSKNTLY LQMNSLRAEDTAVYYCPKLI YYGNEGDSWGQGTLVTVSS | SEQ ID NO: 90 |
| HEF: 2G1-VHVEF_IGHV3-23*04 | EVQLVESGGGLVQPGGSLRL SCAASGFTFSSYAMSWVRQA PGKGLELVSTISGSGGSTYY AASVKGRFTISRDNSKNTLY LQMNSLRAEDTAVYYCPKLI YYGNEGDSWGQGTLVTVSS | SEQ ID NO: 91 |
| LD-N92S: 2G1-VLvD2-IGKV1-13*02 | AIQLTQSPSSLSASVGDRVT ITCRASQSVSFLHWYQQKPG KAPKRWIYDATKLTSGVPSR FSGSGSGTDFTLTISSLQPE DFATYYCQQWSSKPPLTFGG GTKVEIK | SEQ ID NO: 92 |
| LD-T52S: 2G1-VLVE-IGKV1-13*02 | AIQLTQSPSSLSASVGDRVT ITCRASQSVSFLHWYQQKPG KAPKRWIYDASKLTSGVPSR FSGSGSGTDFTLTISSLQPE DFATYYCQQWQSKPPLTFGG GTKVEIK | SEQ ID NO: 93 |
| LEF: 2G1-VLvEF-IGKV1-13*02 | AIQLTQSPSSLSASVGDRVT ITCRASQSVSFLHWYQQKPG KAPKRLIYDASKLESGVPSR FSGSGSGTDFTLTISSLQPE DFATYYCQQWQSKPPLTFGG GTKVEIK | SEQ ID NO: 55 |

As it will be detailed in the following examples, among all the possible combinations, antibodies comprising light chain LDT52S, and in particular HEF-LDT52S variant are particularly advantageous. In comparison to the other antibodies tested, HEF-LDT52S optimized to reduce immunogenicity present high binding activity and stability while maintaining biological functions.

Each sequence was fused to constant fragment of human immunoglobulin and co-transfected in mammalian cells to produce humanized antibody. Results showed that all combination of heavy and light chains produce antibodies. Productivity seems to be differently affected in mammalian cells depending on the combination of heavy and light chains, but always in an amount suitable for efficient production in view of a therapeutic application of the antibody.

Example 24: Recognition Capability of Anti-CMKLR1 Antibodies Produced In Vitro

For activity ELISA assay, donkey anti-human IgG, Fc specific (Jackson Immunoresearch; USA; reference 709-005-098) was immobilized on plastic at 1.3 µg/ml in borate buffer (pH9) and purified antibody was added to measure binding in BSA1% buffer, compared to wild-type 2G1. After incubation and washing, biotinylated antigen-specific peptide (Biot-C7 peptide: biotinylated NH2-PYHTLNL-LELHHTAMPGSVFSLGLPLATALAIA —COOH, synthetized by synpeptide, SEQ ID No. 60) then, peroxidase-streptavidin (Jackson Immunoresearch; USA; reference 016-030-084) was added and revealed by conventional methods.

As illustrated on FIG. 33 the combinations of humanized antibody variable domain chains derived from 2G1 (For the heavy variable domain: HD corresponds to SEQ ID No. 43 and HEF correspond to SEQ ID NO: 91; For the light variable chain: LD corresponds to SEQ ID No. 53; LD-T52S corresponds to SEQ ID No. 93 and LEF corresponds to SEQ ID NO: 55) generated a humanized antibody with better binding activity than the germline antibody HALA and the wild type antibody 2G1 to antigen-specific peptides (C7 peptide).

Example 25: Stability Assay

Each purified humanized anti-ChemR23 antibody (HALA, HDLD, HD-LDT52S, HEF-LDT52S, HEF-LEF) were incubated for 7 days at 4° C. or 37° C. After 7 days, the binding of purified antibodies was analyzed by ELISA assay and the aggregate formation was analyzed by gel filtration (Superdex 200 10/300GL, GeHealthcare).

Figure 34A:
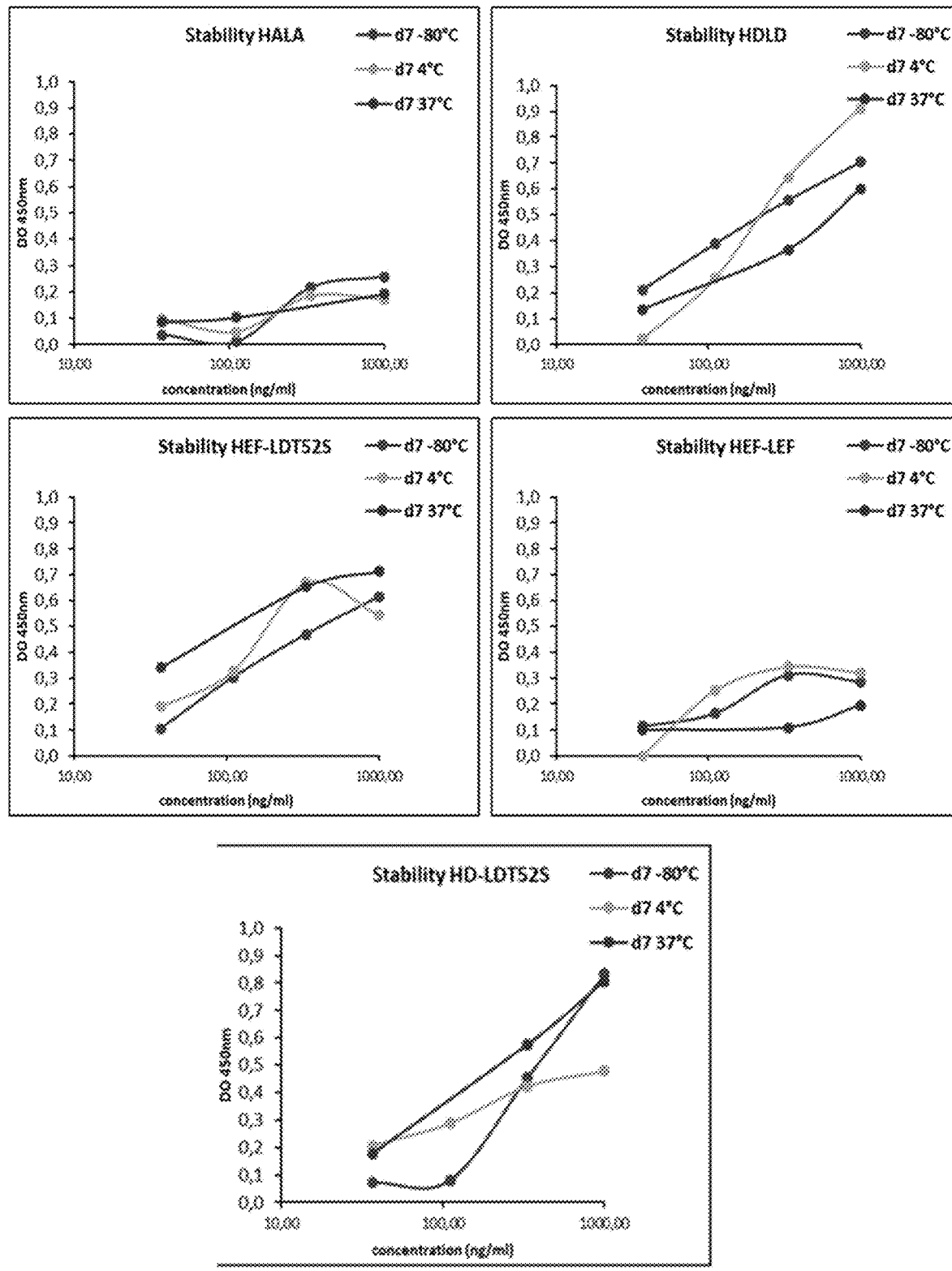

As illustrated on FIG. 34A, all the purified antibodies presented similar binding activity at 37° C., 4° C. or −80° C. As illustrated on FIG. 34B, the percentage of aggregate did not change after 7 days at 37° C. for HDLD and HEF-LDT52S.

Example 26: Biological Effect on CCR7 Internalization

The humanized 2G1 variant HEF-LD-T52S was immobilized on plate. Isotype control was added as control. Pro-inflammatory macrophages M1 were added on coated plate for 48 h, and CCR7 expression at the surface of the macrophages was measured by flow cytometry. As illustrated on FIG. 35, the humanized 2G1 variant HEF-LD-T52S was able to decrease expression of CCR7 at the surface of pro-inflammatory macrophages (M1) compared to isotype control. The humanized 2G1 variant HEF-LD-T52S optimized to reduce immunogenicity conserved functional properties of 2G1 antibody.

Example 27: Biological Effect on PMN Viability

PMN from healthy volunteers were incubated in culture medium with coated HEF-LDT52S, HEF-LEF and HDLD antibody variants at 10 µg/mL for 24 h and stained either with a dead/viability kit (LIVE/DEAD (Invitrogen)). The percentages of positive cells were obtained by analyzing the pictures with Fiji software. Isotype control was added as control. A mutated version of HEF-LDT52S antibody which does not bind to Fc receptors (FcR) (HEF-LDT52S N297A) were also added. As illustrated in FIG. 36, 2G1 and all HEF-LDT52S, HEF-LEF and HDLD humanized variants of 2G1 accelerate the death of PMN and so the humanized variants preserve pro-resolutive properties.

The humanized HEF-LDT52S variant was optimized to reduce immunogenicity. This optimized variant maintains high binding activity and stability while maintaining biological functions.

BIBLIOGRAPHY

Arijs, I., De Hertogh, G., Lemaire, K., Quintens, R., Van Lommel, L., Van Steen, K., Leemans, P., Cleynen, I., Van Assche, G., Vermeire, S., et al. (2009a). Mucosal gene expression of antimicrobial peptides in inflammatory bowel disease before and after first infliximab treatment. PloS One 4, e7984.

Arijs, I., Li, K., Toedter, G., Quintens, R., Van Lommel, L., Van Steen, K., Leemans, P., De Hertogh, G., Lemaire, K., Ferrante, M., et al. (2009b). Mucosal gene signatures to predict response to infliximab in patients with ulcerative colitis. Gut 58, 1612-1619.

Arijs, I., Hertogh, G. D., Lemmens, B., Lommel, L. V., Bruyn, M. de, Vanhove, W., Cleynen, I., Machiels, K., Ferrante, M., Schuit, F., et al. (2018). Effect of vedolizumab (anti-α4β7-integrin) therapy on histological healing and mucosal gene expression in patients with UC. Gut 67, 43-52.

Bannenberg, G. L., Chiang, N., Ariel, A., Arita, M., Tjonahen, E., Gotlinger, K. H., Hong, S., and Serhan, C. N. (2005). Molecular circuits of resolution: formation and actions of resolvins and protectins. J. Immunol. Baltim. Md 1950 174, 4345-4355.

Bozaoglu, K., Bolton, K., McMillan, J., Zimmet, P., Jowett, J., Collier, G., Walder, K., and Segal, D. (2007). Chemerin Is a Novel Adipokine Associated with Obesity and Metabolic Syndrome. Endocrinology 148, 4687-4694.

Buckley, C. D., Gilroy, D. W., and Serhan, C. N. (2014). Proresolving Lipid Mediators and Mechanisms in the Resolution of Acute Inflammation. Immunity 40, 315-327.

Cash, J. L., et al., 2008. Synthetic chemerin-derived peptides suppress inflammation through ChemR23. J. Exp. Med. 205, 767-775

Ernst, M. C., and Sinal, C. J. (2010). Chemerin: at the crossroads of inflammation and obesity. Trends Endocrinol. Metab. TEM 21, 660-667.

Goralski, K. B., McCarthy, T. C., Hanniman, E. A., Zabel, B. A., Butcher, E. C., Parlee, S. D., Muruganandan, S., and Sinal, C. J. (2007). Chemerin, a Novel Adipokine That Regulates Adipogenesis and Adipocyte Metabolism. J. Biol. Chem. 282, 28175-28188.

Ichim, G., and Tait, S. W. G. (2016). A fate worse than death: apoptosis as an oncogenic process. Nat. Rev. Cancer 16, 539-548.

Kaur, J., Adya, R., Tan, B. K., Chen, J., and Randeva, H. S. (2010). Identification of chemerin receptor (ChemR23) in human endothelial cells: Chemerin-induced endothelial angiogenesis. Biochem. Biophys. Res. Commun. 391, 1762-1768.

Peyrassol, X., Laeremans, T., Gouwy, M., Lahura, V., Debulpaep, M., Damme, J. V., Steyaert, J., Parmentier, M., and Langer, I. (2016). Development by Genetic Immunization of Monovalent Antibodies (Nanobodies) Behaving as Antagonists of the Human ChemR23 Receptor. J. Immunol. 196, 2893-2901.

Roh, S., Song, S.-H., Choi, K.-C., Katoh, K., Wittamer, V., Parmentier, M., and Sasaki, S. (2007). Chemerin—a new adipokine that modulates adipogenesis via its own receptor. Biochem. Biophys. Res. Commun. 362, 1013-1018.

Samson, M., Edinger, A. L., Stordeur, P., Rucker, J., Verhasselt, V., Sharron, M., Govaerts, C., Mollereau, C., Vassart, G., Doms, R. W., et al. (1998). ChemR23, a putative chemoattractant receptor, is expressed in monocyte-derived dendritic cells and macrophages and is a coreceptor for SIV and some primary HIV-1 strains. Eur. J. Immunol. 28, 1689-1700.

Sell, H., Laurencikiene, J., Taube, A., Eckardt, K., Cramer, A., Horrighs, A., Arner, P., and Eckel, J. (2009). Chemerin Is a Novel Adipocyte-Derived Factor Inducing Insulin Resistance in Primary Human Skeletal Muscle Cells. Diabetes 58, 2731-2740.

Serhan, C. N. (2014a). Pro-resolving lipid mediators are leads for resolution physiology. Nature 510, 92-101.

Serhan, C. N. (2014b). Pro-resolving lipid mediators are leads for resolution physiology. Nature 510, 92-101.

Sulciner, M. L., Serhan, C. N., Gilligan, M. M., Mudge, D. K., Chang, J., Gartung, A., Lehner, K. A., Bielenberg, D. R., Schmidt, B., Dalli, J., et al. (2017). Resolvins suppress tumor growth and enhance cancer therapy. J. Exp. Med. jem.20170681.

Watts, S. W., Dorrance, A. M., Penfold, M. E., Rourke, J. L., Sinal, C. J., Seitz, B., Sullivan, T. J., Charvat, T. T., Thompson, J. M., Burnett, R., et al. (2013). Chemerin connects fat to arterial contraction. Arterioscler. Thromb. Vasc. Biol. 33, 1320-1328.

Wittamer, V., Franssen, J.-D., Vulcano, M., Mirjolet, J.-F., Poul, E. L., Migeotte, I., Brezillon, S., Tyldesley, R., Blanpain, C., Detheux, M., et al. (2003). Specific Recruitment of Antigen-presenting Cells by Chemerin, a Novel Processed Ligand from Human Inflammatory Fluids. J. Exp. Med. 198, 977-985.

Zabel, B. A., Rott, A., and Butcher, E. C. (2015). Leukocyte chemoattractant receptors in human disease pathogenesis. Annu. Rev. Pathol. 10, 51-81.

The invention claimed is:

1. An anti-Chemerin Like Receptor 1 (CMKLR1) antibody or antigen-binding fragment thereof which binds to CMKLR1, said antibody or antigen-binding fragment thereof comprising:
   a. a heavy chain variable (VH) domain comprising the amino acid sequence of SEQ ID NO: 91 and a light chain variable (VL) domain comprising the amino acid sequence of SEQ ID NO: 93; or
   b. a VH domain comprising the amino acid sequence of SEQ ID NO: 91 and a VL domain comprising the amino acid sequence of SEQ ID NO: 55.

2. The anti-CMKLR1 antibody or antigen-binding fragment thereof according to claim 1 wherein the antibody or antigen-binding fragment thereof binds specifically to the third extra-cellular loop (EL3) of CMKLR1.

3. The anti-CMKLR1 antibody or antigen-binding fragment thereof according to claim 1 wherein the antibody or antigen-binding fragment thereof binds specifically an epitope located within the polypeptide comprising the amino acid sequence of SEQ ID NO: 2 or SEQ ID NO: 59 or to an epitope located within the amino acid sequence of SEQ ID NO: 60.

4. The anti-CMKLR1 antibody or antigen-binding fragment thereof according to claim 1, which is a Resolvin E1-like agonist of CMKLR1.

5. The anti-CMKLR1 antibody or antigen-binding fragment thereof according to claim 1, which comprises a heavy chain variable domain comprising the amino acid sequence of SEQ ID NO: 91 and a light chain variable domain comprising the amino acid sequence of SEQ ID NO: 93.

6. The anti-CMKLR1 antibody or antigen-binding fragment thereof according to claim 5, wherein the light chain constant domain comprises the sequence of SEQ ID NO: 79, and wherein the antibody heavy chain constant domain is derived from a human IgG1, IgG2, IgG3, or IgG4 heavy chain constant domain.

7. The anti-CMKLR1 antibody or antigen-binding fragment thereof according to claim 5, wherein the antibody heavy chain constant domain comprises the amino acid sequence of SEQ ID NO: 80, SEQ ID NO: 81, SEQ ID NO: 82, SEQ ID NO: 83, or SEQ ID NO: 84.

8. The anti-CMKLR1 antibody or antigen-binding fragment thereof according to claim 5, wherein the antibody heavy chain constant domain comprises the amino acid sequence of SEQ ID NO: 80 or SEQ ID NO: 83.

9. A method for treating an inflammatory disease, an autoimmune disease or a cancer in a subject in need thereof, the method comprising administering to said subject an effective amount of anti-CMKLR1 antibody or antigen-binding fragment thereof according to claim 5.

10. The method according to claim 9, wherein said inflammatory disease is selected from NASH, scleroderma, cystic fibrosis, and ANCA.

11. The anti-CMKLR1 antibody or antigen-binding fragment thereof according to claim 1, which does not activate the beta-arrestin signaling pathway in CMKLR1-positive cells in vitro or in vivo.

12. The anti-CMKLR1 antibody or antigen-binding fragment thereof according to claim 1, which does not exhibit a depletion of CMKLR1-positive cells in vitro and/or in vivo.

13. The anti-CMKLR1 antibody or antigen-binding fragment thereof according to claim 1, which does not compete with Chemerin for the binding to CMKLR1 or which does not interfere with the binding of Chemerin to CMKLR1.

14. The anti-CMKLR1 antibody or antigen-binding fragment according to claim 1 which is a humanized monoclonal antibody or antigen-binding fragment thereof.

15. The anti-CMKLR1 antibody or antigen-binding fragment according to claim 14 wherein the antibody light chain constant domain is derived from a human kappa light chain constant domain.

16. The anti-CMKLR1 antibody or antigen-binding fragment according to claim 14 wherein the light chain constant domain comprises the sequence of SEQ ID NO: 79, and wherein the antibody heavy chain constant domain is derived from a human IgG1, IgG2, IgG3, or IgG4 heavy chain constant domain.

17. The anti-CMKLR1 antibody or antigen-binding fragment according to claim 14, wherein the antibody heavy chain constant domain comprises the amino acid sequence of SEQ ID NO: 80, SEQ ID NO: 81, SEQ ID NO: 82, SEQ ID NO: 83, or SEQ ID NO: 84.

18. The anti-CMKLR1 antibody or antigen-binding fragment according to claim 14 wherein the antibody heavy chain constant domain comprises the amino acid sequence of SEQ ID NO: 80 or SEQ ID NO: 83.

19. A method for treating an inflammatory disease, an autoimmune disease or a cancer in a subject in need thereof, the method comprising administering to said subject an effective amount of the anti-CMKLR1 antibody or antigen-binding fragment thereof according to claim 1.

20. The method according to claim 19, wherein said inflammatory disease is selected from NASH (Nonalcoholic steatohepatitis), scleroderma, cystic fibrosis, and anti-neutrophil cytoplasm antibodies-related disease (ANCA).

* * * * *

SEQUENCE LISTING

```
<160> NUMBER OF SEQ ID NOS: 93

<210> SEQ ID NO 1
<211> LENGTH: 373
<212> TYPE: PRT
<213> ORGANISM: artificial sequence
<220> FEATURE:
<223> OTHER INFORMATION: Synthetic sequence

<400> SEQUENCE: 1

Met Arg Met Glu Asp Glu Asp Tyr Asn Thr Ser Ile Ser Tyr Gly Asp
1               5                   10                  15

Glu Tyr Pro Asp Tyr Leu Asp Ser Ile Val Val Leu Glu Asp Leu Ser
            20                  25                  30

Pro Leu Glu Ala Arg Val Thr Arg Ile Phe Leu Val Val Val Tyr Ser
        35                  40                  45

Ile Val Cys Phe Leu Gly Ile Leu Gly Asn Gly Leu Val Ile Ile Ile
    50                  55                  60

Ala Thr Phe Lys Met Lys Lys Thr Val Asn Met Val Trp Phe Leu Asn
65                  70                  75                  80

Leu Ala Val Ala Asp Phe Leu Phe Asn Val Phe Leu Pro Ile His Ile
                85                  90                  95

Thr Tyr Ala Ala Met Asp Tyr His Trp Val Phe Gly Thr Ala Met Cys
            100                 105                 110

Lys Ile Ser Asn Phe Leu Leu Ile His Asn Met Phe Thr Ser Val Phe
        115                 120                 125

Leu Leu Thr Ile Ile Ser Ser Asp Arg Cys Ile Ser Val Leu Leu Pro
    130                 135                 140

Val Trp Ser Gln Asn His Arg Ser Val Arg Leu Ala Tyr Met Ala Cys
145                 150                 155                 160

Met Val Ile Trp Val Leu Ala Phe Phe Leu Ser Ser Pro Ser Leu Val
                165                 170                 175

Phe Arg Asp Thr Ala Asn Leu His Gly Lys Ile Ser Cys Phe Asn Asn
            180                 185                 190

Phe Ser Leu Ser Thr Pro Gly Ser Ser Ser Trp Pro Thr His Ser Gln
        195                 200                 205
```

```
Met Asp Pro Val Gly Tyr Ser Arg His Met Val Thr Val Thr Arg
    210                 215                 220

Phe Leu Cys Gly Phe Leu Val Pro Val Leu Ile Ile Thr Ala Cys Tyr
225                 230                 235                 240

Leu Thr Ile Val Cys Lys Leu Gln Arg Asn Arg Leu Ala Lys Thr Lys
                245                 250                 255

Lys Pro Phe Lys Ile Val Thr Ile Ile Thr Phe Phe Leu Cys
                260                 265                 270

Trp Cys Pro Tyr His Thr Leu Asn Leu Leu Glu Leu His His Thr Ala
                275                 280                 285

Met Pro Gly Ser Val Phe Ser Leu Gly Leu Pro Leu Ala Thr Ala Leu
    290                 295                 300

Ala Ile Ala Asn Ser Cys Met Asn Pro Ile Leu Tyr Val Phe Met Gly
305                 310                 315                 320

Gln Asp Phe Lys Lys Phe Lys Val Ala Leu Phe Ser Arg Leu Val Asn
                325                 330                 335

Ala Leu Ser Glu Asp Thr Gly His Ser Ser Tyr Pro Ser His Arg Ser
                340                 345                 350

Phe Thr Lys Met Ser Ser Met Asn Glu Arg Thr Ser Met Asn Glu Arg
                355                 360                 365

Glu Thr Gly Met Leu
    370
```

```
<210> SEQ ID NO 2
<211> LENGTH: 18
<212> TYPE: PRT
<213> ORGANISM: artificial sequence
<220> FEATURE:
<223> OTHER INFORMATION: Synthetic sequence

<400> SEQUENCE: 2

Glu Leu His His Thr Ala Met Pro Gly Ser Val Phe Ser Leu Gly Leu
1               5                   10                  15

Pro Leu
```

```
<210> SEQ ID NO 3
<211> LENGTH: 10
<212> TYPE: PRT
<213> ORGANISM: artificial sequence
<220> FEATURE:
<223> OTHER INFORMATION: Synthetic sequence

<400> SEQUENCE: 3

Gly Phe Thr Phe Ser Ser Tyr Gly Met Ser
1               5                   10
```

```
<210> SEQ ID NO 4
<211> LENGTH: 10
<212> TYPE: PRT
<213> ORGANISM: artificial sequence
<220> FEATURE:
<223> OTHER INFORMATION: Synthetic sequence

<400> SEQUENCE: 4

Gly Phe Thr Phe Ser Ser Tyr Ala Met Ser
1               5                   10
```

```
<210> SEQ ID NO 5
<211> LENGTH: 10
<212> TYPE: PRT
<213> ORGANISM: artificial sequence
```

```
<220> FEATURE:
<223> OTHER INFORMATION: Synthetic sequence

<400> SEQUENCE: 5

Gly Tyr Thr Phe Thr Ser Tyr Gly Met Ser
1               5                   10

<210> SEQ ID NO 6
<211> LENGTH: 10
<212> TYPE: PRT
<213> ORGANISM: artificial sequence
<220> FEATURE:
<223> OTHER INFORMATION: Synthetic sequence

<400> SEQUENCE: 6

Gly Tyr Thr Phe Thr Ser Tyr Ala Met Ser
1               5                   10

<210> SEQ ID NO 7
<211> LENGTH: 10
<212> TYPE: PRT
<213> ORGANISM: artificial sequence
<220> FEATURE:
<223> OTHER INFORMATION: Synthetic sequence

<400> SEQUENCE: 7

Gly Tyr Thr Phe Thr Ser Tyr Ala Met Asn
1               5                   10

<210> SEQ ID NO 8
<211> LENGTH: 17
<212> TYPE: PRT
<213> ORGANISM: artificial sequence
<220> FEATURE:
<223> OTHER INFORMATION: Synthetic sequence

<400> SEQUENCE: 8

Thr Ile Asn Arg Tyr Gly Gly Ser Thr Tyr Tyr Pro Asp Ser Val Lys
1               5                   10                  15

Gly

<210> SEQ ID NO 9
<211> LENGTH: 17
<212> TYPE: PRT
<213> ORGANISM: artificial sequence
<220> FEATURE:
<223> OTHER INFORMATION: Synthetic sequence

<400> SEQUENCE: 9

Thr Ile Asn Arg Tyr Gly Gly Ser Thr Tyr Tyr Ala Asp Ser Val Lys
1               5                   10                  15

Gly

<210> SEQ ID NO 10
<211> LENGTH: 17
<212> TYPE: PRT
<213> ORGANISM: artificial sequence
<220> FEATURE:
<223> OTHER INFORMATION: Synthetic sequence

<400> SEQUENCE: 10

Thr Ile Asn Gly Tyr Gly Gly Ser Thr Tyr Tyr Ala Glu Ser Val Lys
1               5                   10                  15

Gly
```

```
<210> SEQ ID NO 11
<211> LENGTH: 17
<212> TYPE: PRT
<213> ORGANISM: artificial sequence
<220> FEATURE:
<223> OTHER INFORMATION: Synthetic sequence

<400> SEQUENCE: 11

Thr Ile Ser Gly Ser Gly Gly Ser Thr Tyr Tyr Ala Glu Ser Val Lys
1               5                   10                  15

Gly

<210> SEQ ID NO 12
<211> LENGTH: 17
<212> TYPE: PRT
<213> ORGANISM: artificial sequence
<220> FEATURE:
<223> OTHER INFORMATION: Synthetic sequence

<400> SEQUENCE: 12

Thr Ile Ser Gly Ser Gly Gly Ser Thr Tyr Tyr Ala Ala Ser Val Lys
1               5                   10                  15

Gly

<210> SEQ ID NO 13
<211> LENGTH: 10
<212> TYPE: PRT
<213> ORGANISM: artificial sequence
<220> FEATURE:
<223> OTHER INFORMATION: Synthetic sequence

<400> SEQUENCE: 13

Leu Ile Tyr Tyr Gly Asn Glu Gly Asp Ser
1               5                   10

<210> SEQ ID NO 14
<211> LENGTH: 10
<212> TYPE: PRT
<213> ORGANISM: artificial sequence
<220> FEATURE:
<223> OTHER INFORMATION: Synthetic sequence

<400> SEQUENCE: 14

Leu Ile Tyr Tyr Gly Asn Glu Gly Glu Ser
1               5                   10

<210> SEQ ID NO 15
<211> LENGTH: 10
<212> TYPE: PRT
<213> ORGANISM: artificial sequence
<220> FEATURE:
<223> OTHER INFORMATION: Synthetic sequence

<400> SEQUENCE: 15

Leu Ile Tyr Tyr Gly Asn Glu Gly Asp Thr
1               5                   10

<210> SEQ ID NO 16
<211> LENGTH: 10
<212> TYPE: PRT
<213> ORGANISM: artificial sequence
<220> FEATURE:
<223> OTHER INFORMATION: Synthetic sequence

<400> SEQUENCE: 16
```

```
Leu Ile Tyr Tyr Gly Asn Glu Gly Glu Thr
1               5                   10

<210> SEQ ID NO 17
<211> LENGTH: 10
<212> TYPE: PRT
<213> ORGANISM: artificial sequence
<220> FEATURE:
<223> OTHER INFORMATION: Synthetic sequence

<400> SEQUENCE: 17

Ser Ala Ser Ser Ser Val Ser Phe Met His
1               5                   10

<210> SEQ ID NO 18
<211> LENGTH: 10
<212> TYPE: PRT
<213> ORGANISM: artificial sequence
<220> FEATURE:
<223> OTHER INFORMATION: Synthetic sequence

<400> SEQUENCE: 18

Arg Ala Ser Gln Ser Val Ser Phe Met His
1               5                   10

<210> SEQ ID NO 19
<211> LENGTH: 10
<212> TYPE: PRT
<213> ORGANISM: artificial sequence
<220> FEATURE:
<223> OTHER INFORMATION: Synthetic sequence

<400> SEQUENCE: 19

Arg Ala Ser Gln Ser Val Ser Phe Leu His
1               5                   10

<210> SEQ ID NO 20
<211> LENGTH: 10
<212> TYPE: PRT
<213> ORGANISM: artificial sequence
<220> FEATURE:
<223> OTHER INFORMATION: Synthetic sequence

<400> SEQUENCE: 20

Arg Ala Ser Gln Gly Ile Ser Phe Leu Ala
1               5                   10

<210> SEQ ID NO 21
<211> LENGTH: 10
<212> TYPE: PRT
<213> ORGANISM: artificial sequence
<220> FEATURE:
<223> OTHER INFORMATION: Synthetic sequence

<400> SEQUENCE: 21

Arg Ala Ser Gln Ser Val Ser Phe Leu Ala
1               5                   10

<210> SEQ ID NO 22
<211> LENGTH: 10
<212> TYPE: PRT
<213> ORGANISM: artificial sequence
<220> FEATURE:
<223> OTHER INFORMATION: Synthetic sequence

<400> SEQUENCE: 22

Arg Ala Ser Gln Ser Ile Ser Phe Leu His
```

```
1               5               10
```

<210> SEQ ID NO 23
<211> LENGTH: 10
<212> TYPE: PRT
<213> ORGANISM: artificial sequence
<220> FEATURE:
<223> OTHER INFORMATION: Synthetic sequence

<400> SEQUENCE: 23

```
Arg Ala Ser Gln Gly Ile Ser Ser Leu Ala
1               5                   10
```

<210> SEQ ID NO 24
<211> LENGTH: 7
<212> TYPE: PRT
<213> ORGANISM: artificial sequence
<220> FEATURE:
<223> OTHER INFORMATION: Synthetic sequence

<400> SEQUENCE: 24

```
Asp Thr Thr Lys Leu Thr Ser
1               5
```

<210> SEQ ID NO 25
<211> LENGTH: 7
<212> TYPE: PRT
<213> ORGANISM: artificial sequence
<220> FEATURE:
<223> OTHER INFORMATION: Synthetic sequence

<400> SEQUENCE: 25

```
Asp Ala Thr Lys Leu Thr Ser
1               5
```

<210> SEQ ID NO 26
<211> LENGTH: 7
<212> TYPE: PRT
<213> ORGANISM: artificial sequence
<220> FEATURE:
<223> OTHER INFORMATION: Synthetic sequence

<400> SEQUENCE: 26

```
Asp Ala Ser Lys Leu Thr Ser
1               5
```

<210> SEQ ID NO 27
<211> LENGTH: 7
<212> TYPE: PRT
<213> ORGANISM: artificial sequence
<220> FEATURE:
<223> OTHER INFORMATION: Synthetic sequence

<400> SEQUENCE: 27

```
Asp Ala Ser Lys Leu Glu Ser
1               5
```

<210> SEQ ID NO 28
<211> LENGTH: 7
<212> TYPE: PRT
<213> ORGANISM: artificial sequence
<220> FEATURE:
<223> OTHER INFORMATION: Synthetic sequence

<400> SEQUENCE: 28

```
Asp Ala Thr Lys Ser Thr Ser
1               5
```

```
<210> SEQ ID NO 29
<211> LENGTH: 7
<212> TYPE: PRT
<213> ORGANISM: artificial sequence
<220> FEATURE:
<223> OTHER INFORMATION: Synthetic sequence

<400> SEQUENCE: 29

Asp Ala Ser Lys Ser Phe Ser
1               5

<210> SEQ ID NO 30
<211> LENGTH: 7
<212> TYPE: PRT
<213> ORGANISM: artificial sequence
<220> FEATURE:
<223> OTHER INFORMATION: Synthetic sequence

<400> SEQUENCE: 30

Asp Ala Thr Lys Arg Thr Thr
1               5

<210> SEQ ID NO 31
<211> LENGTH: 7
<212> TYPE: PRT
<213> ORGANISM: artificial sequence
<220> FEATURE:
<223> OTHER INFORMATION: Synthetic sequence

<400> SEQUENCE: 31

Asp Ala Ser Lys Ser Thr Ser
1               5

<210> SEQ ID NO 32
<211> LENGTH: 7
<212> TYPE: PRT
<213> ORGANISM: artificial sequence
<220> FEATURE:
<223> OTHER INFORMATION: Synthetic sequence

<400> SEQUENCE: 32

Asp Ala Ser Lys Arg Thr Thr
1               5

<210> SEQ ID NO 33
<211> LENGTH: 7
<212> TYPE: PRT
<213> ORGANISM: artificial sequence
<220> FEATURE:
<223> OTHER INFORMATION: Synthetic sequence

<400> SEQUENCE: 33

Asp Ala Ser Ser Leu Glu Ser
1               5

<210> SEQ ID NO 34
<211> LENGTH: 10
<212> TYPE: PRT
<213> ORGANISM: artificial sequence
<220> FEATURE:
<223> OTHER INFORMATION: Synthetic sequence

<400> SEQUENCE: 34

Gln Gln Trp Asn Ser Lys Pro Pro Leu Thr
1               5                   10
```

```
<210> SEQ ID NO 35
<211> LENGTH: 10
<212> TYPE: PRT
<213> ORGANISM: artificial sequence
<220> FEATURE:
<223> OTHER INFORMATION: Synthetic sequence

<400> SEQUENCE: 35

Gln Gln Trp Gln Ser Lys Pro Pro Leu Thr
1               5                   10

<210> SEQ ID NO 36
<211> LENGTH: 10
<212> TYPE: PRT
<213> ORGANISM: artificial sequence
<220> FEATURE:
<223> OTHER INFORMATION: Synthetic sequence

<400> SEQUENCE: 36

Gln Gln Phe Gln Ser Tyr Pro Pro Leu Thr
1               5                   10

<210> SEQ ID NO 37
<211> LENGTH: 119
<212> TYPE: PRT
<213> ORGANISM: artificial sequence
<220> FEATURE:
<223> OTHER INFORMATION: Synthetic sequence

<400> SEQUENCE: 37

Glu Val Gln Leu Val Ala Ser Gly Gly Gly Leu Val Gln Pro Gly Gly
1               5                   10                  15

Ser Leu Lys Leu Ser Cys Ala Ala Ser Gly Phe Thr Phe Ser Ser Tyr
            20                  25                  30

Gly Met Ser Trp Val Arg Gln Thr Pro Asp Arg Arg Leu Glu Leu Val
        35                  40                  45

Ala Thr Ile Asn Arg Tyr Gly Ser Thr Tyr Tyr Pro Asp Ser Val
    50                  55                  60

Lys Gly Arg Phe Thr Ile Ser Arg Asp Asn Ala Lys Asn Thr Leu Tyr
65                  70                  75                  80

Leu Gln Met Ser Ser Leu Lys Ser Glu Asp Thr Ala Met Tyr Tyr Cys
                85                  90                  95

Pro Arg Leu Ile Tyr Tyr Gly Asn Glu Gly Asp Ser Trp Gly Gln Gly
                100                 105                 110

Thr Thr Leu Thr Val Ser Ser
            115

<210> SEQ ID NO 38
<211> LENGTH: 119
<212> TYPE: PRT
<213> ORGANISM: artificial sequence
<220> FEATURE:
<223> OTHER INFORMATION: Synthetic sequence

<400> SEQUENCE: 38

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Gly Met Ser Trp Val Arg Gln Ala Pro Gly Lys Gly Leu Glu Leu Val
        35                  40                  45
```

Ala Thr Ile Asn Arg Tyr Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Pro Lys Leu Ile Tyr Tyr Gly Asn Glu Gly Asp Ser Trp Gly Gln Gly
                100                 105                 110

Thr Leu Val Thr Val Ser Ser
            115

<210> SEQ ID NO 39
<211> LENGTH: 119
<212> TYPE: PRT
<213> ORGANISM: artificial sequence
<220> FEATURE:
<223> OTHER INFORMATION: Synthetic sequence

<400> SEQUENCE: 39

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Leu Val
        35                  40                  45

Ala Thr Ile Asn Gly Tyr Gly Gly Ser Thr Tyr Tyr Ala Glu Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Pro Lys Leu Ile Tyr Tyr Gly Asn Glu Gly Asp Ser Trp Gly Gln Gly
                100                 105                 110

Thr Leu Val Thr Val Ser Ser
            115

<210> SEQ ID NO 40
<211> LENGTH: 119
<212> TYPE: PRT
<213> ORGANISM: artificial sequence
<220> FEATURE:
<223> OTHER INFORMATION: Synthetic sequence

<400> SEQUENCE: 40

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Leu Val
        35                  40                  45

Ser Thr Ile Ser Gly Ser Gly Gly Ser Thr Tyr Tyr Ala Glu Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Pro Lys Leu Ile Tyr Tyr Gly Asn Glu Gly Asp Ser Trp Gly Gln Gly
                100                 105                 110

Thr Leu Val Thr Val Ser Ser
        115

<210> SEQ ID NO 41
<211> LENGTH: 119
<212> TYPE: PRT
<213> ORGANISM: artificial sequence
<220> FEATURE:
<223> OTHER INFORMATION: Synthetic sequence

<400> SEQUENCE: 41

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Gly Met Ser Trp Val Arg Gln Ala Pro Gly Lys Gly Leu Glu Leu Val
        35                  40                  45

Ala Thr Ile Asn Arg Tyr Gly Gly Ser Thr Tyr Tyr Pro Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Pro Arg Leu Ile Tyr Tyr Gly Asn Glu Gly Asp Ser Trp Gly Gln Gly
            100                 105                 110

Thr Leu Val Thr Val Ser Ser
        115

<210> SEQ ID NO 42
<211> LENGTH: 119
<212> TYPE: PRT
<213> ORGANISM: artificial sequence
<220> FEATURE:
<223> OTHER INFORMATION: Synthetic sequence

<400> SEQUENCE: 42

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Gly Met Ser Trp Val Arg Gln Ala Pro Gly Lys Gly Leu Glu Leu Val
        35                  40                  45

Ala Thr Ile Asn Arg Tyr Gly Gly Ser Thr Tyr Tyr Ala Ala Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Pro Lys Leu Ile Tyr Tyr Gly Asn Glu Gly Asp Ser Trp Gly Gln Gly
            100                 105                 110

Thr Leu Val Thr Val Ser Ser
        115

<210> SEQ ID NO 43
<211> LENGTH: 119
<212> TYPE: PRT
<213> ORGANISM: artificial sequence
<220> FEATURE:
<223> OTHER INFORMATION: Synthetic sequence

```
<400> SEQUENCE: 43

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Leu Val
        35                  40                  45

Ala Thr Ile Asn Arg Tyr Gly Ser Thr Tyr Tyr Ala Ala Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Pro Lys Leu Ile Tyr Tyr Gly Asn Glu Gly Asp Ser Trp Gly Gln Gly
            100                 105                 110

Thr Leu Val Thr Val Ser Ser
            115

<210> SEQ ID NO 44
<211> LENGTH: 119
<212> TYPE: PRT
<213> ORGANISM: artificial sequence
<220> FEATURE:
<223> OTHER INFORMATION: Synthetic sequence

<400> SEQUENCE: 44

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Leu Val
        35                  40                  45

Ser Thr Ile Ser Arg Ser Gly Gly Ser Thr Tyr Tyr Ala Ala Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Pro Lys Leu Ile Tyr Tyr Gly Asn Glu Gly Asp Ser Trp Gly Gln Gly
            100                 105                 110

Thr Leu Val Thr Val Ser Ser
            115

<210> SEQ ID NO 45
<211> LENGTH: 119
<212> TYPE: PRT
<213> ORGANISM: artificial sequence
<220> FEATURE:
<223> OTHER INFORMATION: Synthetic sequence

<400> SEQUENCE: 45

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Leu Val
        35                  40                  45
```

```
Ser Thr Ile Ser Gly Ser Gly Gly Ser Thr Tyr Tyr Ala Ala Ser Val
        50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                85                  90                  95

Ala Lys Leu Ile Tyr Tyr Gly Asn Glu Gly Asp Ser Trp Gly Gln Gly
            100                 105                 110

Thr Leu Val Thr Val Ser Ser
            115

<210> SEQ ID NO 46
<211> LENGTH: 119
<212> TYPE: PRT
<213> ORGANISM: artificial sequence
<220> FEATURE:
<223> OTHER INFORMATION: Synthetic sequence

<400> SEQUENCE: 46

Glu Val Gln Leu Val Glu Ser Gly Gly Gly Leu Val Gln Pro Gly Gly
 1               5                  10                  15

Ser Leu Arg Leu Ser Cys Ala Ala Ser Gly Phe Thr Phe Ser Ser Tyr
                20                  25                  30

Ala Met Ser Trp Val Arg Gln Ala Pro Gly Lys Gly Leu Glu Trp Val
            35                  40                  45

Ser Thr Ile Ser Gly Ser Gly Gly Ser Thr Tyr Tyr Ala Ala Ser Val
        50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                85                  90                  95

Ala Lys Leu Ile Tyr Tyr Gly Asn Glu Gly Asp Ser Trp Gly Gln Gly
            100                 105                 110

Thr Leu Val Thr Val Ser Ser
            115

<210> SEQ ID NO 47
<211> LENGTH: 119
<212> TYPE: PRT
<213> ORGANISM: artificial sequence
<220> FEATURE:
<223> OTHER INFORMATION: Synthetic sequence

<400> SEQUENCE: 47

Glu Val Gln Leu Val Glu Ser Gly Gly Gly Leu Val Gln Pro Gly Gly
 1               5                  10                  15

Ser Leu Arg Leu Ser Cys Ala Ala Ser Gly Phe Thr Phe Ser Ser Tyr
                20                  25                  30

Ala Met Ser Trp Val Arg Gln Ala Pro Gly Lys Gly Leu Glu Trp Val
            35                  40                  45

Ser Thr Ile Ser Gly Ser Gly Gly Ser Thr Tyr Tyr Ala Ala Ser Val
        50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                85                  90                  95

Ala Lys Leu Ile Tyr Tyr Gly Asn Glu Gly Glu Ser Trp Gly Gln Gly
```

Thr Leu Val Thr Val Ser Ser
        115

<210> SEQ ID NO 48
<211> LENGTH: 119
<212> TYPE: PRT
<213> ORGANISM: artificial sequence
<220> FEATURE:
<223> OTHER INFORMATION: Synthetic sequence

<400> SEQUENCE: 48

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Thr Ile Ser Gly Ser Gly Gly Ser Thr Tyr Tyr Ala Ala Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Leu Ile Tyr Tyr Gly Asn Glu Gly Asp Thr Trp Gly Gln Gly
            100                 105                 110

Thr Leu Val Thr Val Ser Ser
        115

<210> SEQ ID NO 49
<211> LENGTH: 108
<212> TYPE: PRT
<213> ORGANISM: artificial sequence
<220> FEATURE:
<223> OTHER INFORMATION: Synthetic sequence

<400> SEQUENCE: 49

Gln Ile Val Leu Thr Gln Ser Pro Ala Ile Met Ser Ala Ser Pro Gly
1               5                   10                  15

Glu Lys Val Thr Met Thr Cys Ser Ala Ser Ser Ser Val Ser Phe Met
            20                  25                  30

His Trp Tyr Gln Gln Lys Ser Gly Thr Ser Pro Lys Arg Trp Ile Tyr
        35                  40                  45

Asp Thr Thr Lys Leu Thr Ser Gly Val Pro Ala Arg Phe Ser Gly Ser
    50                  55                  60

Gly Ser Gly Thr Phe Tyr Ser Leu Thr Ile Ser Ser Met Glu Ala Glu
65                  70                  75                  80

Asp Ala Ala Thr Tyr Tyr Cys Gln Gln Trp Asn Ser Lys Pro Pro Leu
                85                  90                  95

Thr Phe Gly Pro Gly Thr Lys Leu Glu Leu Lys Arg
            100                 105

<210> SEQ ID NO 50
<211> LENGTH: 107
<212> TYPE: PRT
<213> ORGANISM: artificial sequence
<220> FEATURE:
<223> OTHER INFORMATION: Synthetic sequence

<400> SEQUENCE: 50

```
Ala Ile Gln Leu Thr Gln Ser Pro Ser Ser Leu Ser Ala Ser Val Gly
1               5                   10                  15

Asp Arg Val Thr Ile Thr Cys Ser Ala Ser Ser Val Ser Phe Met
            20                  25                  30

His Trp Tyr Gln Gln Lys Pro Gly Lys Ala Pro Lys Arg Trp Ile Tyr
            35                  40                  45

Asp Thr Thr Lys Leu Thr Ser Gly Val Pro Ser Arg Phe Ser Gly Ser
        50                  55                  60

Gly Ser Gly Thr Asp Tyr Thr Leu Thr Ile Ser Ser Leu Gln Pro Glu
65              70                  75                  80

Asp Phe Ala Thr Tyr Tyr Cys Gln Gln Trp Asn Ser Lys Pro Pro Leu
                85                  90                  95

Thr Phe Gly Gly Gly Thr Lys Val Glu Ile Lys
            100                 105
```

<210> SEQ ID NO 51
<211> LENGTH: 107
<212> TYPE: PRT
<213> ORGANISM: artificial sequence
<220> FEATURE:
<223> OTHER INFORMATION: Synthetic sequence

<400> SEQUENCE: 51

```
Ala Ile Gln Leu Thr Gln Ser Pro Ser Ser Leu Ser Ala Ser Val Gly
1               5                   10                  15

Asp Arg Val Thr Ile Thr Cys Arg Ala Ser Gln Ser Val Ser Phe Met
            20                  25                  30

His Trp Tyr Gln Gln Lys Pro Gly Lys Ala Pro Lys Arg Trp Ile Tyr
            35                  40                  45

Asp Ala Thr Lys Leu Thr Ser Gly Val Pro Ser Arg Phe Ser Gly Ser
        50                  55                  60

Gly Ser Gly Thr Asp Tyr Thr Leu Thr Ile Ser Ser Leu Gln Pro Glu
65              70                  75                  80

Asp Phe Ala Thr Tyr Tyr Cys Gln Gln Trp Asn Ser Lys Pro Pro Leu
                85                  90                  95

Thr Phe Gly Gly Gly Thr Lys Val Glu Ile Lys
            100                 105
```

<210> SEQ ID NO 52
<211> LENGTH: 107
<212> TYPE: PRT
<213> ORGANISM: artificial sequence
<220> FEATURE:
<223> OTHER INFORMATION: Synthetic sequence

<400> SEQUENCE: 52

```
Ala Ile Gln Leu Thr Gln Ser Pro Ser Ser Leu Ser Ala Ser Val Gly
1               5                   10                  15

Asp Arg Val Thr Ile Thr Cys Arg Ala Ser Gln Ser Val Ser Phe Leu
            20                  25                  30

His Trp Tyr Gln Gln Lys Pro Gly Lys Ala Pro Lys Arg Trp Ile Tyr
            35                  40                  45

Asp Ala Thr Lys Leu Thr Ser Gly Val Pro Ser Arg Phe Ser Gly Ser
        50                  55                  60

Gly Ser Gly Thr Asp Phe Thr Leu Thr Ile Ser Ser Leu Gln Pro Glu
65              70                  75                  80

Asp Phe Ala Thr Tyr Tyr Cys Gln Gln Trp Asn Ser Lys Pro Pro Leu
```

-continued

```
                85                  90                  95
Thr Phe Gly Gly Gly Thr Lys Val Glu Ile Lys
            100                 105

<210> SEQ ID NO 53
<211> LENGTH: 107
<212> TYPE: PRT
<213> ORGANISM: artificial sequence
<220> FEATURE:
<223> OTHER INFORMATION: Synthetic sequence

<400> SEQUENCE: 53

Ala Ile Gln Leu Thr Gln Ser Pro Ser Ser Leu Ser Ala Ser Val Gly
1               5                   10                  15

Asp Arg Val Thr Ile Thr Cys Arg Ala Ser Gln Ser Val Ser Phe Leu
            20                  25                  30

His Trp Tyr Gln Gln Lys Pro Gly Lys Ala Pro Lys Arg Trp Ile Tyr
        35                  40                  45

Asp Ala Thr Lys Leu Thr Ser Gly Val Pro Ser Arg Phe Ser Gly Ser
    50                  55                  60

Gly Ser Gly Thr Asp Phe Thr Leu Thr Ile Ser Ser Leu Gln Pro Glu
65                  70                  75                  80

Asp Phe Ala Thr Tyr Tyr Cys Gln Gln Trp Gln Ser Lys Pro Pro Leu
                85                  90                  95

Thr Phe Gly Gly Gly Thr Lys Val Glu Ile Lys
            100                 105

<210> SEQ ID NO 54
<211> LENGTH: 107
<212> TYPE: PRT
<213> ORGANISM: artificial sequence
<220> FEATURE:
<223> OTHER INFORMATION: Synthetic sequence

<400> SEQUENCE: 54

Ala Ile Gln Leu Thr Gln Ser Pro Ser Ser Leu Ser Ala Ser Val Gly
1               5                   10                  15

Asp Arg Val Thr Ile Thr Cys Arg Ala Ser Gln Ser Val Ser Phe Leu
            20                  25                  30

His Trp Tyr Gln Gln Lys Pro Gly Lys Ala Pro Lys Arg Trp Ile Tyr
        35                  40                  45

Asp Ala Ser Lys Leu Thr Ser Gly Val Pro Ser Arg Phe Ser Gly Ser
    50                  55                  60

Gly Ser Gly Thr Asp Phe Thr Leu Thr Ile Ser Ser Leu Gln Pro Glu
65                  70                  75                  80

Asp Phe Ala Thr Tyr Tyr Cys Gln Gln Trp Gln Ser Lys Pro Pro Leu
                85                  90                  95

Thr Phe Gly Gly Gly Thr Lys Val Glu Ile Lys
            100                 105

<210> SEQ ID NO 55
<211> LENGTH: 107
<212> TYPE: PRT
<213> ORGANISM: artificial sequence
<220> FEATURE:
<223> OTHER INFORMATION: Synthetic sequence

<400> SEQUENCE: 55

Ala Ile Gln Leu Thr Gln Ser Pro Ser Ser Leu Ser Ala Ser Val Gly
1               5                   10                  15
```

Asp Arg Val Thr Ile Thr Cys Arg Ala Ser Gln Ser Val Ser Phe Leu
            20                  25                  30

His Trp Tyr Gln Gln Lys Pro Gly Lys Ala Pro Lys Arg Leu Ile Tyr
            35                  40                  45

Asp Ala Ser Lys Leu Glu Ser Gly Val Pro Ser Arg Phe Ser Gly Ser
    50                  55                  60

Gly Ser Gly Thr Asp Phe Thr Leu Thr Ile Ser Ser Leu Gln Pro Glu
65                  70                  75                  80

Asp Phe Ala Thr Tyr Tyr Cys Gln Gln Trp Gln Ser Lys Pro Pro Leu
                85                  90                  95

Thr Phe Gly Gly Gly Thr Lys Val Glu Ile Lys
            100                 105

<210> SEQ ID NO 56
<211> LENGTH: 107
<212> TYPE: PRT
<213> ORGANISM: artificial sequence
<220> FEATURE:
<223> OTHER INFORMATION: Synthetic sequence

<400> SEQUENCE: 56

Ala Ile Gln Leu Thr Gln Ser Pro Ser Ser Leu Ser Ala Ser Val Gly
1               5                   10                  15

Asp Arg Val Thr Ile Thr Cys Arg Ala Ser Gln Ser Val Ser Phe Leu
            20                  25                  30

His Trp Tyr Gln Gln Lys Pro Gly Lys Ala Pro Lys Arg Leu Ile Tyr
            35                  40                  45

Asp Ala Thr Lys Leu Thr Ser Gly Val Pro Ser Arg Phe Ser Gly Ser
    50                  55                  60

Gly Ser Gly Thr Asp Phe Thr Leu Thr Ile Ser Leu Gln Pro Glu
65                  70                  75                  80

Asp Phe Ala Thr Tyr Tyr Cys Gln Gln Trp Gln Ser Lys Pro Pro Leu
                85                  90                  95

Thr Phe Gly Gly Gly Thr Lys Val Glu Ile Lys
            100                 105

<210> SEQ ID NO 57
<211> LENGTH: 107
<212> TYPE: PRT
<213> ORGANISM: artificial sequence
<220> FEATURE:
<223> OTHER INFORMATION: Synthetic sequence

<400> SEQUENCE: 57

Ala Ile Gln Leu Thr Gln Ser Pro Ser Ser Leu Ser Ala Ser Val Gly
1               5                   10                  15

Asp Arg Val Thr Ile Thr Cys Arg Ala Ser Gln Gly Ile Ser Phe Leu
            20                  25                  30

Ala Trp Tyr Gln Gln Lys Pro Gly Lys Ala Pro Lys Arg Leu Ile Tyr
            35                  40                  45

Asp Ala Ser Lys Leu Glu Ser Gly Val Pro Ser Arg Phe Ser Gly Ser
    50                  55                  60

Gly Ser Gly Thr Asp Phe Thr Leu Thr Ile Ser Ser Leu Gln Pro Glu
65                  70                  75                  80

Asp Phe Ala Thr Tyr Tyr Cys Gln Gln Trp Gln Ser Lys Pro Pro Leu
                85                  90                  95

Thr Phe Gly Gly Gly Thr Lys Val Glu Ile Lys

<210> SEQ ID NO 58
<211> LENGTH: 107
<212> TYPE: PRT
<213> ORGANISM: artificial sequence
<220> FEATURE:
<223> OTHER INFORMATION: Synthetic sequence

<400> SEQUENCE: 58

Ala Ile Gln Leu Thr Gln Ser Pro Ser Ser Leu Ser Ala Ser Val Gly
1               5                   10                  15

Asp Arg Val Thr Ile Thr Cys Arg Ala Ser Gln Gly Ile Ser Ser Leu
            20                  25                  30

Ala Trp Tyr Gln Gln Lys Pro Gly Lys Ala Pro Lys Arg Leu Ile Tyr
        35                  40                  45

Asp Ala Ser Ser Leu Glu Ser Gly Val Pro Ser Arg Phe Ser Gly Ser
    50                  55                  60

Gly Ser Gly Thr Asp Phe Thr Leu Thr Ile Ser Ser Leu Gln Pro Glu
65                  70                  75                  80

Asp Phe Ala Thr Tyr Tyr Cys Gln Gln Phe Gln Ser Tyr Pro Pro Leu
                85                  90                  95

Thr Phe Gly Gly Gly Thr Lys Val Glu Ile Lys
            100                 105

<210> SEQ ID NO 59
<211> LENGTH: 5
<212> TYPE: PRT
<213> ORGANISM: artificial sequence
<220> FEATURE:
<223> OTHER INFORMATION: Synthetic sequence

<400> SEQUENCE: 59

Ala Met Pro Gly Ser
1               5

<210> SEQ ID NO 60
<211> LENGTH: 33
<212> TYPE: PRT
<213> ORGANISM: artificial sequence
<220> FEATURE:
<223> OTHER INFORMATION: Synthetic sequence

<400> SEQUENCE: 60

Pro Tyr His Thr Leu Asn Leu Leu Glu Leu His His Thr Ala Met Pro
1               5                   10                  15

Gly Ser Val Phe Ser Leu Gly Leu Pro Leu Ala Thr Ala Leu Ala Ile
            20                  25                  30

Ala

<210> SEQ ID NO 61
<211> LENGTH: 17
<212> TYPE: PRT
<213> ORGANISM: artificial sequence
<220> FEATURE:
<223> OTHER INFORMATION: Synthetic sequence

<400> SEQUENCE: 61

Thr Ile Asn Arg Tyr Gly Gly Ser Thr Tyr Tyr Ala Glu Ser Val Lys
1               5                   10                  15

Gly

<210> SEQ ID NO 62
<211> LENGTH: 119
<212> TYPE: PRT
<213> ORGANISM: artificial sequence
<220> FEATURE:
<223> OTHER INFORMATION: Synthetic sequence

<400> SEQUENCE: 62

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Leu Val
        35                  40                  45

Ala Thr Ile Asn Arg Tyr Gly Gly Ser Thr Tyr Tyr Ala Glu Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Pro Lys Leu Ile Tyr Tyr Gly Asn Glu Gly Asp Ser Trp Gly Gln Gly
            100                 105                 110

Thr Leu Val Thr Val Ser Ser
        115

<210> SEQ ID NO 63
<211> LENGTH: 17
<212> TYPE: PRT
<213> ORGANISM: artificial sequence
<220> FEATURE:
<223> OTHER INFORMATION: Synthetic sequence

<400> SEQUENCE: 63

Thr Ile Asn Arg Tyr Gly Gly Ser Thr Tyr Tyr Ala Ala Ser Val Lys
1               5                   10                  15

Gly

<210> SEQ ID NO 64
<211> LENGTH: 17
<212> TYPE: PRT
<213> ORGANISM: artificial sequence
<220> FEATURE:
<223> OTHER INFORMATION: Synthetic sequence

<400> SEQUENCE: 64

Thr Ile Ser Arg Ser Gly Gly Ser Thr Tyr Tyr Ala Ala Ser Val Lys
1               5                   10                  15

Gly

<210> SEQ ID NO 65
<211> LENGTH: 25
<212> TYPE: PRT
<213> ORGANISM: artificial sequence
<220> FEATURE:
<223> OTHER INFORMATION: Synthetic sequence

<400> SEQUENCE: 65

Glu Val Gln Leu Val Glu Ser Gly Gly Gly Leu Val Gln Pro Gly Gly
1               5                   10                  15

Ser Leu Arg Leu Ser Cys Ala Ala Ser
            20                  25

<210> SEQ ID NO 66
<211> LENGTH: 14
<212> TYPE: PRT
<213> ORGANISM: artificial sequence
<220> FEATURE:
<223> OTHER INFORMATION: Synthetic sequence

<400> SEQUENCE: 66

Trp Val Arg Gln Ala Pro Gly Lys Gly Leu Glu Leu Val Ala
1               5                   10

<210> SEQ ID NO 67
<211> LENGTH: 14
<212> TYPE: PRT
<213> ORGANISM: artificial sequence
<220> FEATURE:
<223> OTHER INFORMATION: Synthetic sequence

<400> SEQUENCE: 67

Trp Val Arg Gln Ala Pro Gly Lys Gly Leu Glu Leu Val Ser
1               5                   10

<210> SEQ ID NO 68
<211> LENGTH: 14
<212> TYPE: PRT
<213> ORGANISM: artificial sequence
<220> FEATURE:
<223> OTHER INFORMATION: Synthetic sequence

<400> SEQUENCE: 68

Trp Val Arg Gln Ala Pro Gly Lys Gly Leu Glu Trp Val Ser
1               5                   10

<210> SEQ ID NO 69
<211> LENGTH: 32
<212> TYPE: PRT
<213> ORGANISM: artificial sequence
<220> FEATURE:
<223> OTHER INFORMATION: Synthetic sequence

<400> SEQUENCE: 69

Arg Phe Thr Ile Ser Arg Asp Asn Ser Lys Asn Thr Leu Tyr Leu Gln
1               5                   10                  15

Met Asn Ser Leu Arg Ala Glu Asp Thr Ala Val Tyr Tyr Cys Pro Lys
            20                  25                  30

<210> SEQ ID NO 70
<211> LENGTH: 32
<212> TYPE: PRT
<213> ORGANISM: artificial sequence
<220> FEATURE:
<223> OTHER INFORMATION: Synthetic sequence

<400> SEQUENCE: 70

Arg Phe Thr Ile Ser Arg Asp Asn Ser Lys Asn Thr Leu Tyr Leu Gln
1               5                   10                  15

Met Asn Ser Leu Arg Ala Glu Asp Thr Ala Val Tyr Tyr Cys Ala Lys
            20                  25                  30

<210> SEQ ID NO 71
<211> LENGTH: 11
<212> TYPE: PRT
<213> ORGANISM: artificial sequence
<220> FEATURE:
<223> OTHER INFORMATION: Synthetic sequence

```
<400> SEQUENCE: 71

Trp Gly Gln Gly Thr Leu Val Thr Val Ser Ser
1               5                   10

<210> SEQ ID NO 72
<211> LENGTH: 23
<212> TYPE: PRT
<213> ORGANISM: artificial sequence
<220> FEATURE:
<223> OTHER INFORMATION: Synthetic sequence

<400> SEQUENCE: 72

Ala Ile Gln Leu Thr Gln Ser Pro Ser Ser Leu Ser Ala Ser Val Gly
1               5                   10                  15

Asp Arg Val Thr Ile Thr Cys
            20

<210> SEQ ID NO 73
<211> LENGTH: 15
<212> TYPE: PRT
<213> ORGANISM: artificial sequence
<220> FEATURE:
<223> OTHER INFORMATION: Synthetic sequence

<400> SEQUENCE: 73

Trp Tyr Gln Gln Lys Pro Gly Lys Ala Pro Lys Arg Trp Ile Tyr
1               5                   10                  15

<210> SEQ ID NO 74
<211> LENGTH: 15
<212> TYPE: PRT
<213> ORGANISM: artificial sequence
<220> FEATURE:
<223> OTHER INFORMATION: Synthetic sequence

<400> SEQUENCE: 74

Trp Tyr Gln Gln Lys Pro Gly Lys Ala Pro Lys Arg Leu Ile Tyr
1               5                   10                  15

<210> SEQ ID NO 75
<211> LENGTH: 32
<212> TYPE: PRT
<213> ORGANISM: artificial sequence
<220> FEATURE:
<223> OTHER INFORMATION: Synthetic sequence

<400> SEQUENCE: 75

Gly Val Pro Ser Arg Phe Ser Gly Ser Gly Ser Gly Thr Asp Tyr Thr
1               5                   10                  15

Leu Thr Ile Ser Ser Leu Gln Pro Glu Asp Phe Ala Thr Tyr Tyr Cys
            20                  25                  30

<210> SEQ ID NO 76
<211> LENGTH: 32
<212> TYPE: PRT
<213> ORGANISM: artificial sequence
<220> FEATURE:
<223> OTHER INFORMATION: Synthetic sequence

<400> SEQUENCE: 76

Gly Val Pro Ser Arg Phe Ser Gly Ser Gly Ser Gly Thr Asp Phe Thr
1               5                   10                  15

Leu Thr Ile Ser Ser Leu Gln Pro Glu Asp Phe Ala Thr Tyr Tyr Cys
            20                  25                  30
```

```
<210> SEQ ID NO 77
<211> LENGTH: 10
<212> TYPE: PRT
<213> ORGANISM: artificial sequence
<220> FEATURE:
<223> OTHER INFORMATION: Synthetic sequence

<400> SEQUENCE: 77

Phe Gly Gly Gly Thr Lys Val Glu Ile Lys
1               5                   10

<210> SEQ ID NO 78
<211> LENGTH: 32
<212> TYPE: PRT
<213> ORGANISM: artificial sequence
<220> FEATURE:
<223> OTHER INFORMATION: Synthetic sequence

<400> SEQUENCE: 78

Arg Phe Thr Ile Ser Arg Asp Asn Ser Lys Asn Thr Leu Tyr Leu Gln
1               5                   10                  15

Met Asn Ser Leu Arg Ala Glu Asp Thr Ala Val Tyr Tyr Cys Pro Arg
            20                  25                  30

<210> SEQ ID NO 79
<211> LENGTH: 106
<212> TYPE: PRT
<213> ORGANISM: artificial sequence
<220> FEATURE:
<223> OTHER INFORMATION: Synthetic sequence

<400> SEQUENCE: 79

Thr Val Ala Ala Pro Ser Val Phe Ile Phe Pro Pro Ser Asp Glu Gln
1               5                   10                  15

Leu Lys Ser Gly Thr Ala Ser Val Val Cys Leu Leu Asn Asn Phe Tyr
            20                  25                  30

Pro Arg Glu Ala Lys Val Gln Trp Lys Val Asp Asn Ala Leu Gln Ser
        35                  40                  45

Gly Asn Ser Gln Glu Ser Val Thr Glu Gln Asp Ser Lys Asp Ser Thr
    50                  55                  60

Tyr Ser Leu Ser Ser Thr Leu Thr Leu Ser Lys Ala Asp Tyr Glu Lys
65                  70                  75                  80

His Lys Val Tyr Ala Cys Glu Val Thr His Gln Gly Leu Ser Ser Pro
                85                  90                  95

Val Thr Lys Ser Phe Asn Arg Gly Glu Cys
            100                 105

<210> SEQ ID NO 80
<211> LENGTH: 330
<212> TYPE: PRT
<213> ORGANISM: artificial sequence
<220> FEATURE:
<223> OTHER INFORMATION: Synthetic sequence

<400> SEQUENCE: 80

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45
```

```
Gly Val His Thr Phe Pro Ala Val Leu Gln Ser Ser Gly Leu Tyr Ser
 50                  55                  60

Leu Ser Ser Val Val Thr Val Pro Ser Ser Leu Gly Thr Gln Thr
 65                  70                  75                  80

Tyr Ile Cys Asn Val Asn His Lys Pro Ser Asn Thr Lys Val Asp Lys
                 85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 81
<211> LENGTH: 326
<212> TYPE: PRT
<213> ORGANISM: artificial sequence
<220> FEATURE:
<223> OTHER INFORMATION: Synthetic sequence

<400> SEQUENCE: 81

Ala Ser Thr Lys Gly Pro Ser Val Phe Pro Leu Ala Pro Cys Ser Arg
 1               5                  10                  15

Ser Thr Ser Glu Ser Thr Ala Ala Leu Gly Cys Leu Val Lys Asp Tyr
                 20                  25                  30

Phe Pro Glu Pro Val Thr Val Ser Trp Asn Ser Gly Ala Leu Thr Ser
             35                  40                  45

Gly Val His Thr Phe Pro Ala Val Leu Gln Ser Ser Gly Leu Tyr Ser
         50                  55                  60

Leu Ser Ser Val Val Thr Val Pro Ser Ser Asn Phe Gly Thr Gln Thr
 65                  70                  75                  80
```

Tyr Thr Cys Asn Val Asp His Lys Pro Ser Asn Thr Lys Val Asp Lys
                85                  90                  95

Thr Val Glu Arg Lys Cys Cys Val Glu Cys Pro Pro Cys Pro Ala Pro
            100                 105                 110

Pro Val Ala Gly Pro Ser Val Phe Leu Phe Pro Pro Lys Pro Lys Asp
            115                 120                 125

Thr Leu Met Ile Ser Arg Thr Pro Glu Val Thr Cys Val Val Val Asp
130                 135                 140

Val Ser His Glu Asp Pro Glu Val Gln Phe Asn Trp Tyr Val Asp Gly
145                 150                 155                 160

Val Glu Val His Asn Ala Lys Thr Lys Pro Arg Glu Glu Gln Phe Asn
                165                 170                 175

Ser Thr Phe Arg Val Val Ser Val Leu Thr Val Val His Gln Asp Trp
            180                 185                 190

Leu Asn Gly Lys Glu Tyr Lys Cys Lys Val Ser Asn Lys Gly Leu Pro
        195                 200                 205

Ala Pro Ile Glu Lys Thr Ile Ser Lys Thr Lys Gly Gln Pro Arg Glu
    210                 215                 220

Pro Gln Val Tyr Thr Leu Pro Pro Ser Arg Glu Glu Met Thr Lys Asn
225                 230                 235                 240

Gln Val Ser Leu Thr Cys Leu Val Lys Gly Phe Tyr Pro Ser Asp Ile
                245                 250                 255

Ser Val Glu Trp Glu Ser Asn Gly Gln Pro Glu Asn Asn Tyr Lys Thr
            260                 265                 270

Thr Pro Pro Met Leu Asp Ser Asp Gly Ser Phe Phe Leu Tyr Ser Lys
        275                 280                 285

Leu Thr Val Asp Lys Ser Arg Trp Gln Gln Gly Asn Val Phe Ser Cys
    290                 295                 300

Ser Val Met His Glu Ala Leu His Asn His Tyr Thr Gln Lys Ser Leu
305                 310                 315                 320

Ser Leu Ser Pro Gly Lys
            325

<210> SEQ ID NO 82
<211> LENGTH: 327
<212> TYPE: PRT
<213> ORGANISM: artificial sequence
<220> FEATURE:
<223> OTHER INFORMATION: Synthetic sequence

<400> SEQUENCE: 82

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
            100                 105                 110

-continued

```
Glu Phe Leu Gly Gly Pro Ser Val Phe Leu Phe Pro Pro Lys Pro Lys
            115                 120                 125

Asp Thr Leu Met Ile Ser Arg Thr Pro Glu Val Thr Cys Val Val Val
            130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
            195                 200                 205

Pro Ser Ser Ile Glu Lys Thr Ile Ser Lys Ala Lys Gly Gln Pro Arg
        210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
290                 295                 300

Cys Ser Val Met His Glu Ala Leu His Asn His Tyr Thr Gln Lys Ser
305                 310                 315                 320

Leu Ser Leu Ser Leu Gly Lys
            325

<210> SEQ ID NO 83
<211> LENGTH: 330
<212> TYPE: PRT
<213> ORGANISM: artificial sequence
<220> FEATURE:
<223> OTHER INFORMATION: Synthetic sequence

<400> SEQUENCE: 83

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140
```

-continued

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
            165                 170                 175

Glu Gln Tyr Asn Ser Thr Tyr Arg Val Val Ser Val Leu Thr Val Leu
        180                 185                 190

His Gln Asp Trp Leu Asn Gly Lys Glu Tyr Lys Cys Lys Val Ser Asn
            195                 200                 205

Lys Ala Leu Pro Ala Pro Ile Ala Lys Thr Ile Ser Lys Ala Lys Gly
210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
            245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
        290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 84
<211> LENGTH: 327
<212> TYPE: PRT
<213> ORGANISM: artificial sequence
<220> FEATURE:
<223> OTHER INFORMATION: Synthetic sequence

<400> SEQUENCE: 84

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Pro Cys Pro Ala Pro
            100                 105                 110

Glu Phe Leu Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

```
Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
            195                 200                 205

Pro Ser Ser Ile Glu Lys Thr Ile Ser Lys Ala Lys Gly Gln Pro Arg
            210                 215                 220

Glu Pro Gln Val Tyr Thr Leu Pro Pro Ser Gln Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
            275                 280                 285

Arg Leu Thr Val Asp Lys Ser Arg Trp Gln Glu Gly Asn Val Phe Ser
            290                 295                 300

Cys Ser Val Met His Glu Ala Leu His Asn His Tyr Thr Gln Lys Ser
305                 310                 315                 320

Leu Ser Leu Ser Pro Gly Lys
                325

<210> SEQ ID NO 85
<211> LENGTH: 119
<212> TYPE: PRT
<213> ORGANISM: artificial sequence
<220> FEATURE:
<223> OTHER INFORMATION: Synthetic sequence

<400> SEQUENCE: 85

Gln Val Gln Leu Val Gln Ser Gly Ala Glu Val Lys Lys Pro Gly Ala
1               5                   10                  15

Ser Val Lys Val Ser Cys Lys Ala Ser Gly Phe Thr Phe Ser Ser Tyr
                20                  25                  30

Gly Met Ser Trp Val Arg Gln Ala Pro Gly Gln Gly Leu Glu Leu Val
            35                  40                  45

Ala Thr Ile Asn Arg Tyr Gly Gly Ser Thr Tyr Tyr Pro Asp Ser Phe
    50                  55                  60

Lys Gly Arg Val Thr Ile Thr Arg Asp Asn Ser Thr Ser Thr Leu Tyr
65                  70                  75                  80

Met Glu Leu Ser Ser Leu Arg Ser Glu Asp Thr Ala Val Tyr Tyr Cys
                85                  90                  95

Pro Arg Leu Ile Tyr Tyr Gly Asn Glu Gly Asp Ser Trp Gly Gln Gly
            100                 105                 110

Thr Leu Val Thr Val Ser Ser
        115

<210> SEQ ID NO 86
<211> LENGTH: 119
<212> TYPE: PRT
<213> ORGANISM: artificial sequence
<220> FEATURE:
<223> OTHER INFORMATION: Synthetic sequence

<400> SEQUENCE: 86

Gln Val Gln Leu Val Gln Ser Gly Ser Glu Leu Lys Lys Pro Gly Ala
1               5                   10                  15

Ser Val Lys Val Ser Cys Lys Ala Ser Gly Phe Thr Phe Ser Ser Tyr
```

-continued

```
                20                  25                  30
Gly Met Ser Trp Val Arg Gln Ala Pro Gly Gln Gly Leu Glu Leu Val
            35                  40                  45

Ala Thr Ile Asn Arg Tyr Gly Gly Ser Thr Tyr Tyr Pro Asp Ser Phe
        50                  55                  60

Lys Gly Arg Phe Val Ile Ser Arg Asp Asn Ser Val Ser Thr Leu Tyr
 65                  70                  75                  80

Leu Gln Ile Ser Ser Leu Lys Ala Glu Asp Thr Ala Val Tyr Tyr Cys
                85                  90                  95

Pro Arg Leu Ile Tyr Tyr Gly Asn Glu Gly Asp Ser Trp Gly Gln Gly
            100                 105                 110

Thr Leu Val Thr Val Ser Ser
            115

<210> SEQ ID NO 87
<211> LENGTH: 107
<212> TYPE: PRT
<213> ORGANISM: artificial sequence
<220> FEATURE:
<223> OTHER INFORMATION: Synthetic sequence

<400> SEQUENCE: 87

Glu Ile Val Leu Thr Gln Ser Pro Asp Phe Gln Ser Val Thr Pro Lys
 1               5                  10                  15

Glu Lys Val Thr Ile Thr Cys Ser Ala Ser Ser Ser Val Ser Phe Met
            20                  25                  30

His Trp Tyr Gln Gln Lys Pro Asp Gln Ser Pro Lys Arg Trp Ile Tyr
        35                  40                  45

Asp Thr Thr Lys Leu Thr Ser Gly Val Pro Ser Arg Phe Ser Gly Ser
    50                  55                  60

Gly Ser Gly Thr Asp Tyr Thr Leu Thr Ile Asn Ser Leu Glu Ala Glu
 65                  70                  75                  80

Asp Ala Ala Thr Tyr Tyr Cys Gln Gln Trp Asn Ser Lys Pro Pro Leu
                85                  90                  95

Thr Phe Gly Gly Gly Thr Lys Val Glu Ile Lys
            100                 105

<210> SEQ ID NO 88
<211> LENGTH: 107
<212> TYPE: PRT
<213> ORGANISM: artificial sequence
<220> FEATURE:
<223> OTHER INFORMATION: Synthetic sequence

<400> SEQUENCE: 88

Glu Ile Val Leu Thr Gln Ser Pro Ala Thr Leu Ser Leu Ser Pro Gly
 1               5                  10                  15

Glu Arg Ala Thr Leu Ser Cys Ser Ala Ser Ser Ser Val Ser Phe Met
            20                  25                  30

His Trp Tyr Gln Gln Lys Pro Gly Gln Ala Pro Arg Arg Trp Ile Tyr
        35                  40                  45

Asp Thr Thr Lys Leu Thr Ser Gly Ile Pro Ala Arg Phe Ser Gly Ser
    50                  55                  60

Gly Ser Gly Thr Asp Tyr Thr Leu Thr Ile Ser Ser Leu Glu Pro Glu
 65                  70                  75                  80

Asp Phe Ala Val Tyr Tyr Cys Gln Gln Trp Asn Ser Lys Pro Pro Leu
                85                  90                  95
```

Thr Phe Gly Gly Gly Thr Lys Val Glu Ile Lys
        100                 105

<210> SEQ ID NO 89
<211> LENGTH: 119
<212> TYPE: PRT
<213> ORGANISM: Artificial sequence
<220> FEATURE:
<223> OTHER INFORMATION: synthetic sequence

<400> SEQUENCE: 89

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Leu Val
        35                  40                  45

Ala Thr Ile Asn Arg Tyr Gly Gly Ser Thr Tyr Tyr Ala Glu Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Pro Lys Leu Ile Tyr Tyr Gly Asn Glu Gly Asp Ser Trp Gly Gln Gly
            100                 105                 110

Thr Leu Val Thr Val Ser Ser
        115

<210> SEQ ID NO 90
<211> LENGTH: 119
<212> TYPE: PRT
<213> ORGANISM: Artificial sequence
<220> FEATURE:
<223> OTHER INFORMATION: Synthetic sequence

<400> SEQUENCE: 90

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Leu Val
        35                  40                  45

Ala Thr Ile Asn Gly Tyr Gly Gly Ser Thr Tyr Tyr Ala Ala Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Pro Lys Leu Ile Tyr Tyr Gly Asn Glu Gly Asp Ser Trp Gly Gln Gly
            100                 105                 110

Thr Leu Val Thr Val Ser Ser
        115

<210> SEQ ID NO 91
<211> LENGTH: 119
<212> TYPE: PRT
<213> ORGANISM: Artificial sequence
<220> FEATURE:
<223> OTHER INFORMATION: Synthetic sequence

```
<400> SEQUENCE: 91

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Leu Val
        35                  40                  45

Ser Thr Ile Ser Gly Ser Gly Gly Ser Thr Tyr Tyr Ala Ala Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Pro Lys Leu Ile Tyr Tyr Gly Asn Glu Gly Asp Ser Trp Gly Gln Gly
            100                 105                 110

Thr Leu Val Thr Val Ser Ser
        115

<210> SEQ ID NO 92
<211> LENGTH: 107
<212> TYPE: PRT
<213> ORGANISM: Artificial sequence
<220> FEATURE:
<223> OTHER INFORMATION: Synthetic sequence

<400> SEQUENCE: 92

Ala Ile Gln Leu Thr Gln Ser Pro Ser Ser Leu Ser Ala Ser Val Gly
1               5                   10                  15

Asp Arg Val Thr Ile Thr Cys Arg Ala Ser Gln Ser Val Ser Phe Leu
            20                  25                  30

His Trp Tyr Gln Gln Lys Pro Gly Lys Ala Pro Lys Arg Trp Ile Tyr
        35                  40                  45

Asp Ala Thr Lys Leu Thr Ser Gly Val Pro Ser Arg Phe Ser Gly Ser
    50                  55                  60

Gly Ser Gly Thr Asp Phe Thr Leu Thr Ile Ser Ser Leu Gln Pro Glu
65                  70                  75                  80

Asp Phe Ala Thr Tyr Tyr Cys Gln Gln Trp Ser Ser Lys Pro Pro Leu
                85                  90                  95

Thr Phe Gly Gly Gly Thr Lys Val Glu Ile Lys
            100                 105

<210> SEQ ID NO 93
<211> LENGTH: 107
<212> TYPE: PRT
<213> ORGANISM: Artificial sequence
<220> FEATURE:
<223> OTHER INFORMATION: Synthetic sequence

<400> SEQUENCE: 93

Ala Ile Gln Leu Thr Gln Ser Pro Ser Ser Leu Ser Ala Ser Val Gly
1               5                   10                  15

Asp Arg Val Thr Ile Thr Cys Arg Ala Ser Gln Ser Val Ser Phe Leu
            20                  25                  30

His Trp Tyr Gln Gln Lys Pro Gly Lys Ala Pro Lys Arg Trp Ile Tyr
        35                  40                  45

Asp Ala Ser Lys Leu Thr Ser Gly Val Pro Ser Arg Phe Ser Gly Ser
    50                  55                  60
```

-continued

```
Gly Ser Gly Thr Asp Phe Thr Leu Thr Ile Ser Ser Leu Gln Pro Glu
 65              70                  75                  80

Asp Phe Ala Thr Tyr Tyr Cys Gln Gln Trp Gln Ser Lys Pro Pro Leu
                 85                  90                  95

Thr Phe Gly Gly Gly Thr Lys Val Glu Ile Lys
                100             105
```